(12) United States Patent
Avasiloaie et al.

(10) Patent No.: US 11,001,232 B2
(45) Date of Patent: May 11, 2021

(54) WIPER ADAPTER AND WIPER ASSEMBLY INCORPORATING THE SAME

(71) Applicant: Trico Products Corporation, Rochester Hills, MI (US)

(72) Inventors: Valentin Avasiloaie, Dearborn Heights, MI (US); Daniel Ehde, Ortonville, MI (US); Mitica Polocoser, Wayne, MI (US)

(73) Assignee: Trico Products Corporation, Rochester Hills, MI (US)

( * ) Notice: Subject to any disclaimer, the term of this patent is extended or adjusted under 35 U.S.C. 154(b) by 181 days.

(21) Appl. No.: 16/075,704

(22) PCT Filed: Feb. 5, 2017

(86) PCT No.: PCT/US2017/016742
§ 371 (c)(1),
(2) Date: Aug. 6, 2018

(87) PCT Pub. No.: WO2017/136845
PCT Pub. Date: Aug. 10, 2017

(65) Prior Publication Data
US 2019/0118778 A1    Apr. 25, 2019

Related U.S. Application Data

(60) Provisional application No. 62/291,810, filed on Feb. 5, 2016, provisional application No. 62/326,096, filed on Apr. 22, 2016.

(51) Int. Cl.
*B60S 1/40* (2006.01)
*B60S 1/38* (2006.01)

(52) U.S. Cl.
CPC ............ *B60S 1/4048* (2013.01); *B60S 1/381* (2013.01); *B60S 1/3848* (2013.01);
(Continued)

(58) Field of Classification Search
CPC .... B60S 1/4038; B60S 1/4041; B60S 1/4045; B60S 1/4048; B60S 2001/4051;
(Continued)

(56) References Cited

U.S. PATENT DOCUMENTS 7,690,074 B2 *  4/2010  Ostrowski ............. B60S 1/3868
                                                15/250.201
8,505,151 B2 *  8/2013  Depondt ............... B60S 1/4038
                                                15/250.32
(Continued)

*Primary Examiner* — Gary K. Graham
(74) *Attorney, Agent, or Firm* — Miller Canfield

(57) ABSTRACT

An adapter (124) for attaching to an attachment member (138) of a wiper arm (114) extending to a terminal end (140) with an upper wall (142) and a pair of side walls (144) depending from the upper wall. The side walls each have an inward protrusion (146) and a U-shaped cutout (148) formed at the end defining upper (150) and lower cutout (152) edges. The upper wall has an aperture (156). The adapter has a body (158) with first (160) and second (162) ends. A stop (164) formed at the first end abuts the attachment member end. A slot (166) formed at the second end receives one of the protrusions. A resilient finger (168) attached to the body has a tooth (170) engaging the aperture to prevent longitudinal movement between the attachment member and adapter. A brace (172) formed at the first end is received in one of the cutouts when the tooth engages the aperture. The brace at least partially abuts the lower cutout edge and remains spaced from the upper cutout edge.

5 Claims, 72 Drawing Sheets

(52) U.S. Cl.
CPC ........... *B60S 1/3886* (2013.01); *B60S 1/3879* (2013.01); *B60S 2001/4051* (2013.01); *B60S 2001/4054* (2013.01); *B60S 2001/4058* (2013.01)

(58) Field of Classification Search
CPC ....................... B60S 2001/4054; B60S 1/381; B60S 1/3886; B60S 1/3848; B60S 1/3879; B60S 2001/4058
USPC ..................................................... 15/250.32
See application file for complete search history.

(56) References Cited

U.S. PATENT DOCUMENTS

| | | | | |
|---|---|---|---|---|
| 8,931,133 | B2* | 1/2015 | Coart | B60S 1/3868 |
| | | | | 15/250.001 |
| 2012/0047673 | A1* | 3/2012 | Depondt | B60S 1/4019 |
| | | | | 15/250.32 |
| 2013/0007977 | A1* | 1/2013 | Depondt | B60S 1/4003 |
| | | | | 15/250.32 |
| 2013/0239353 | A1 | 9/2013 | Yoshimoto | |
| 2015/0151718 | A1 | 6/2015 | Moll | |
| 2015/0166017 | A1* | 6/2015 | Young, III | B60S 1/3849 |
| | | | | 15/250.32 |
| 2015/0329087 | A1* | 11/2015 | Young, III | B60S 1/381 |
| | | | | 15/250.201 |

* cited by examiner

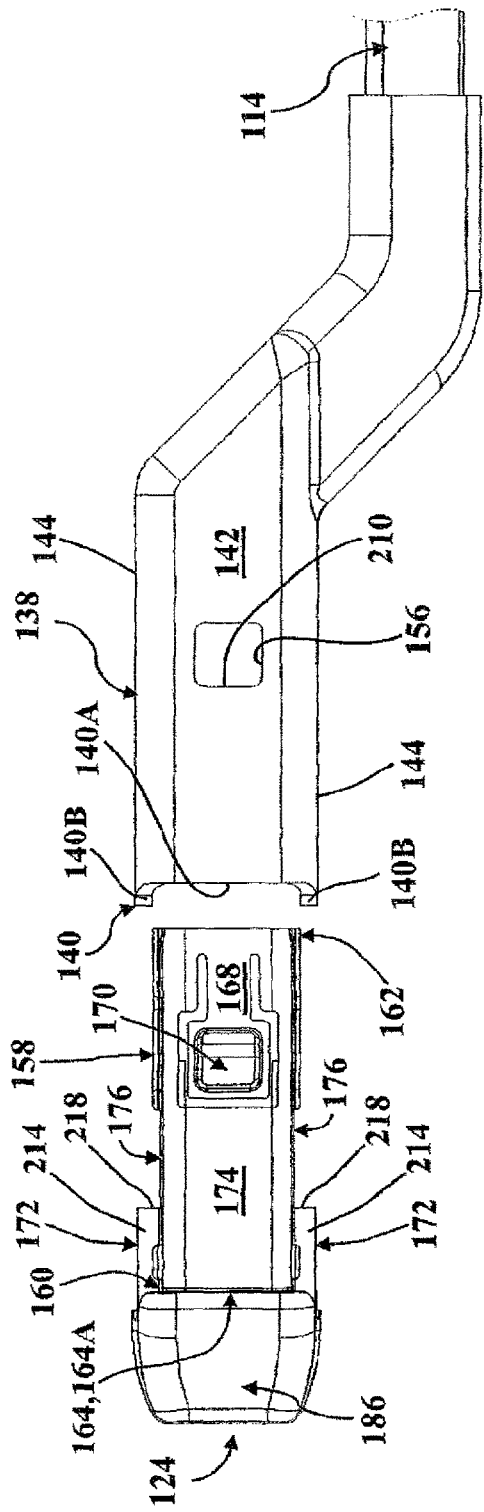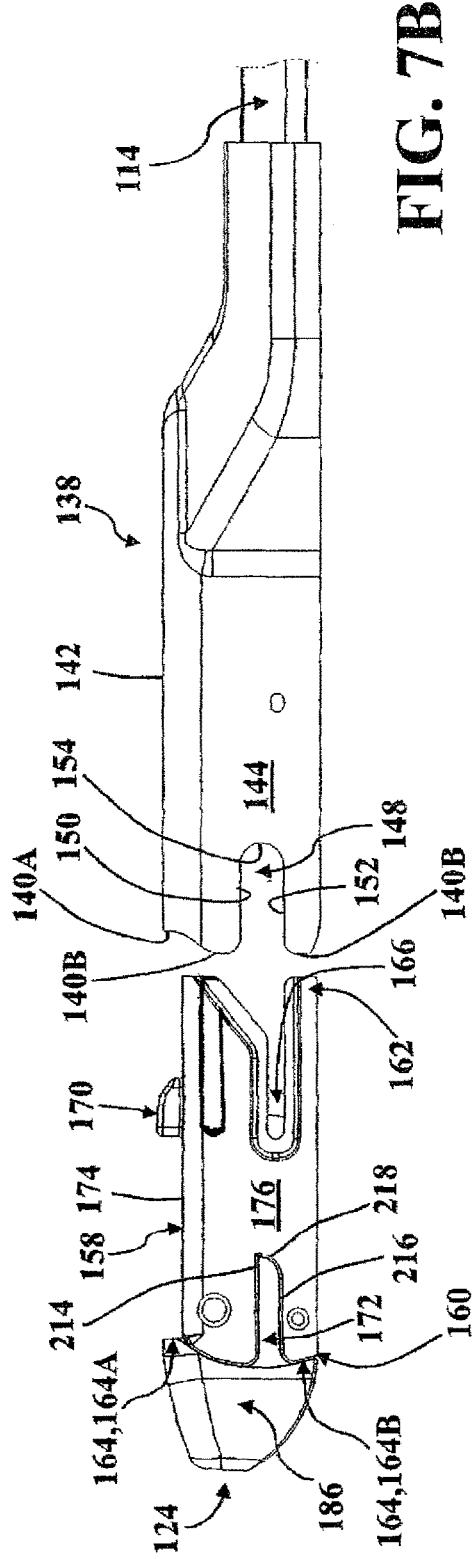

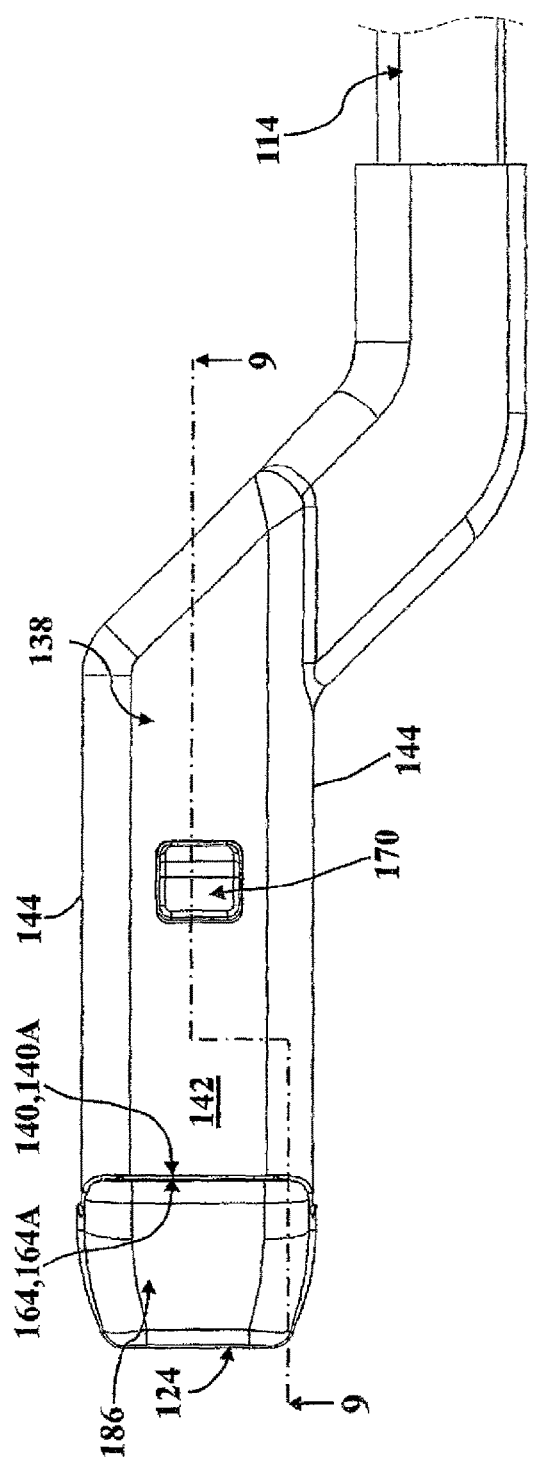
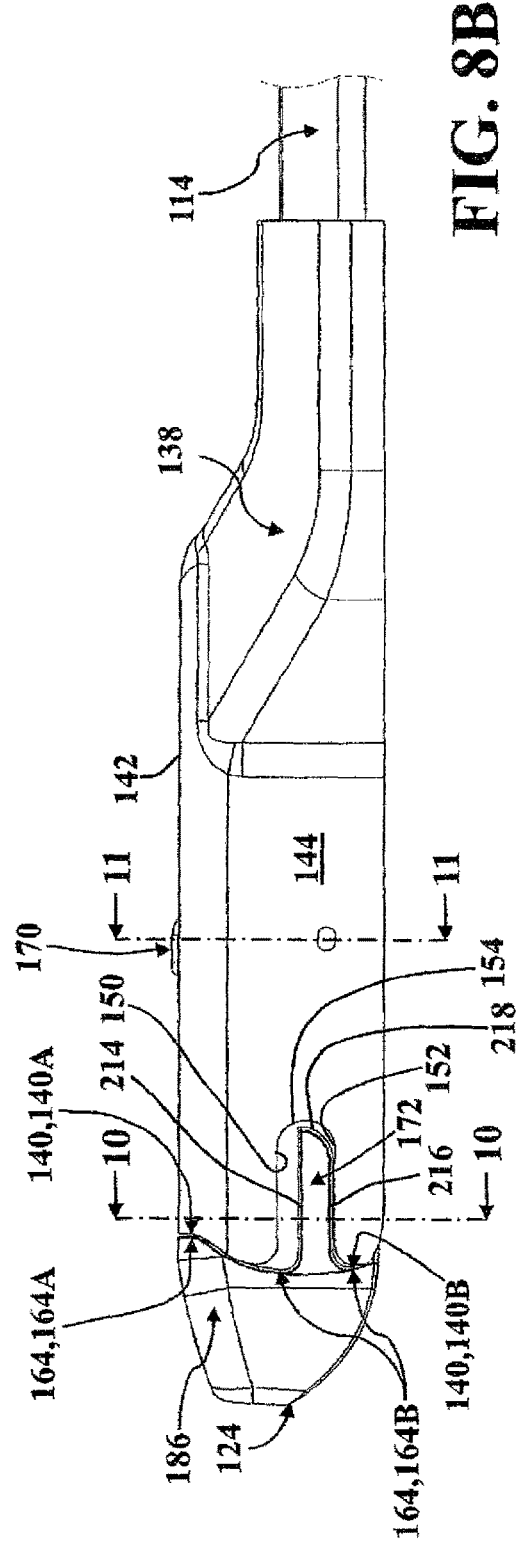
FIG. 8A
FIG. 8B

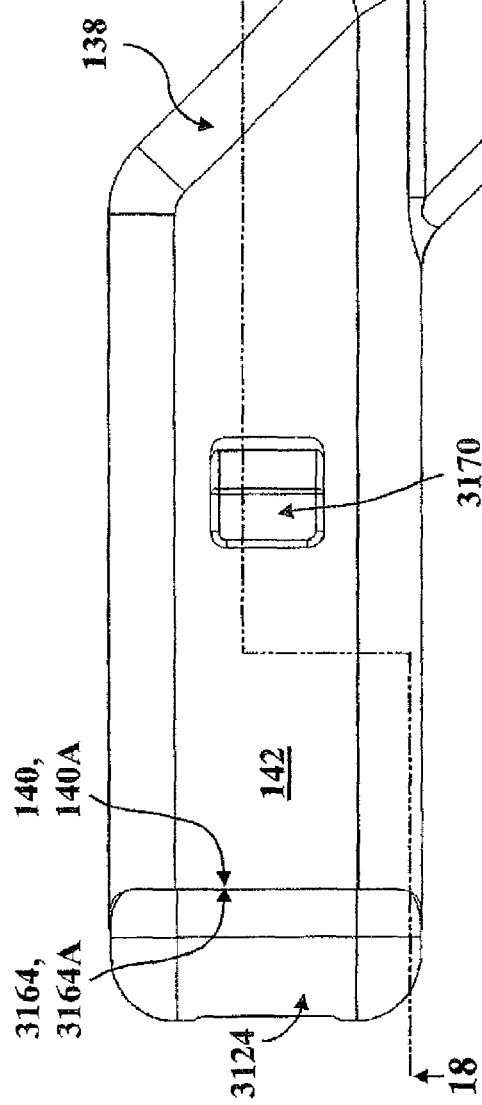
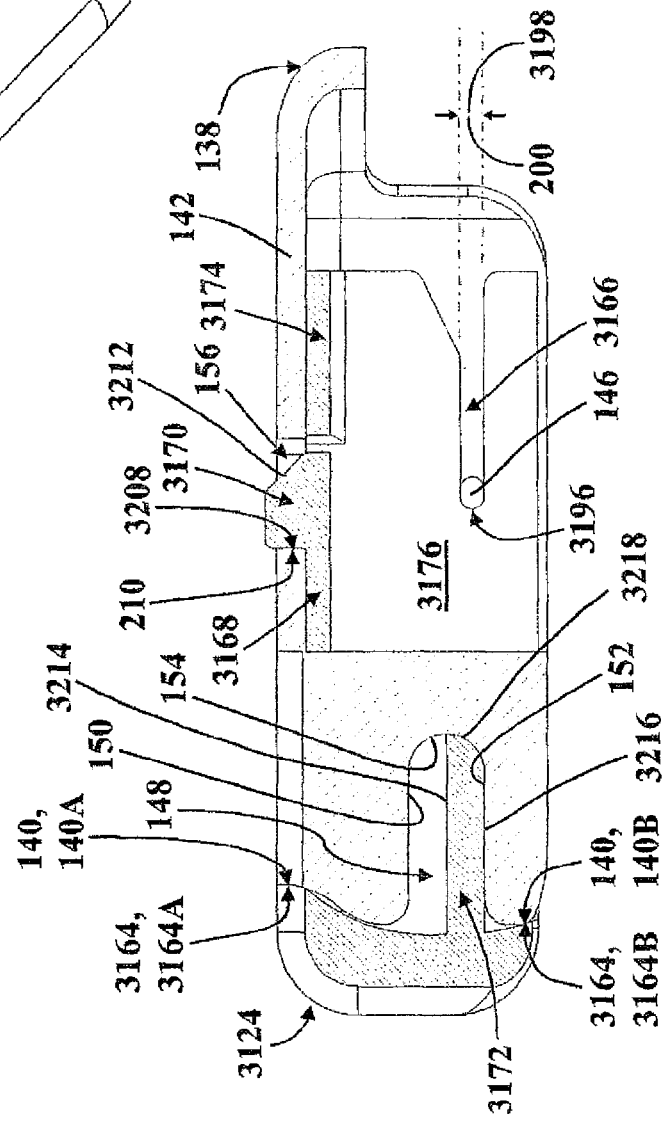

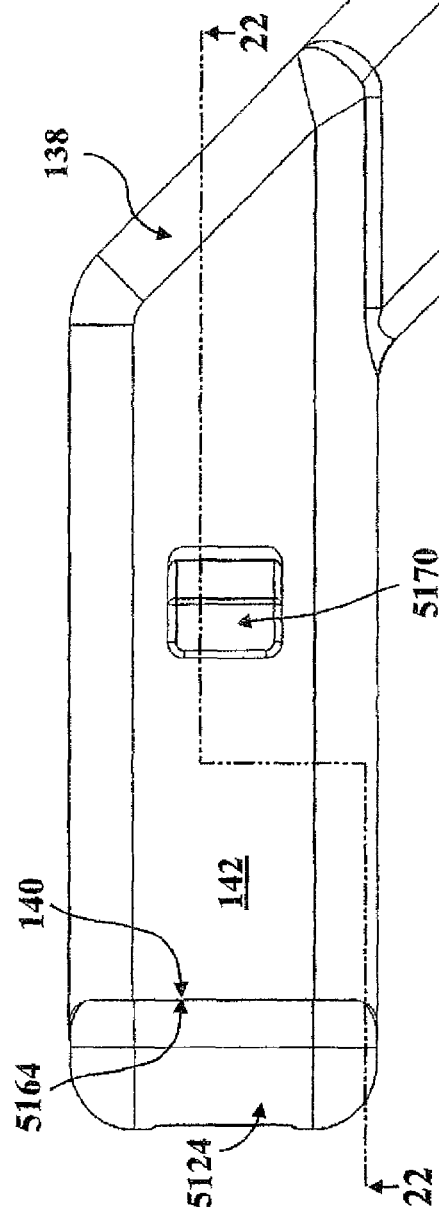
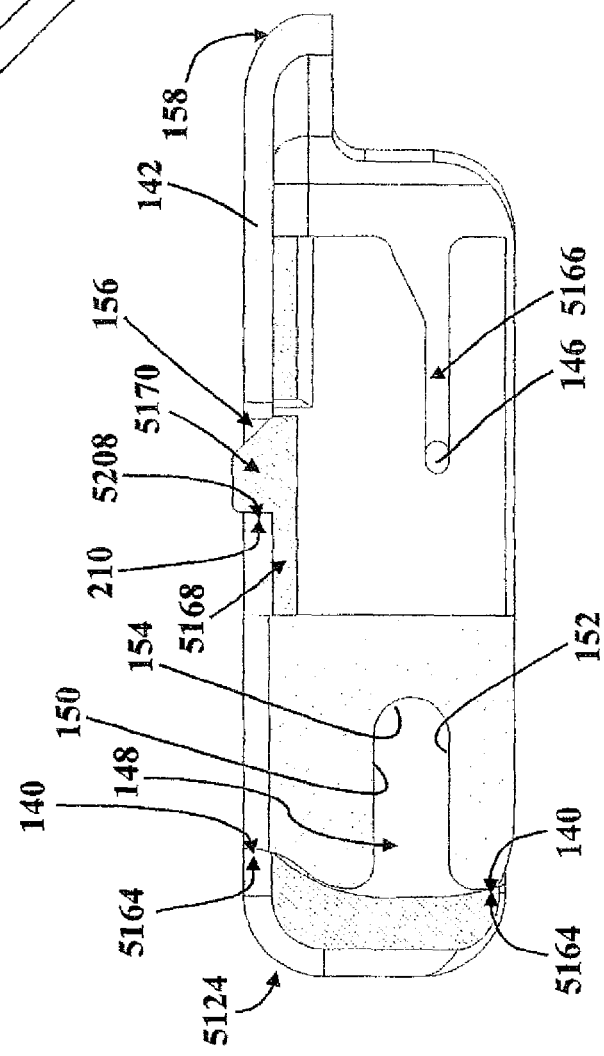

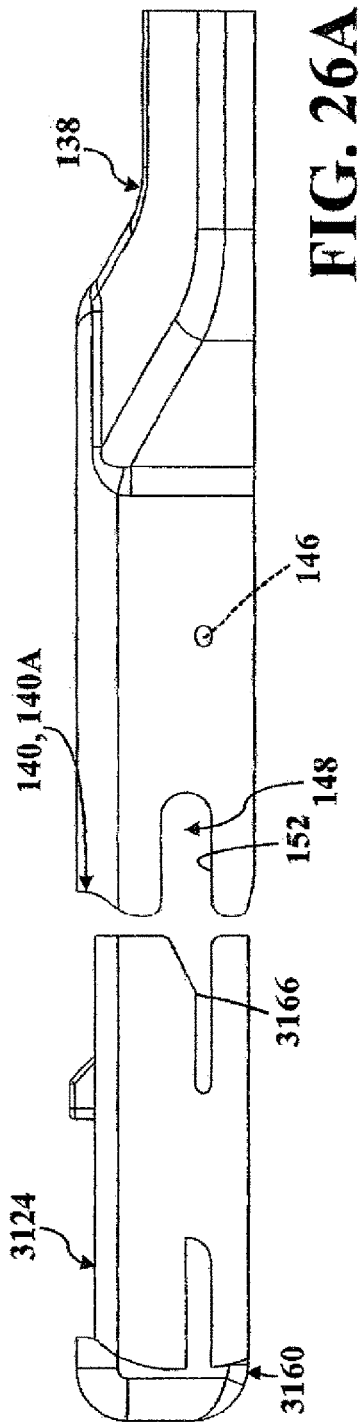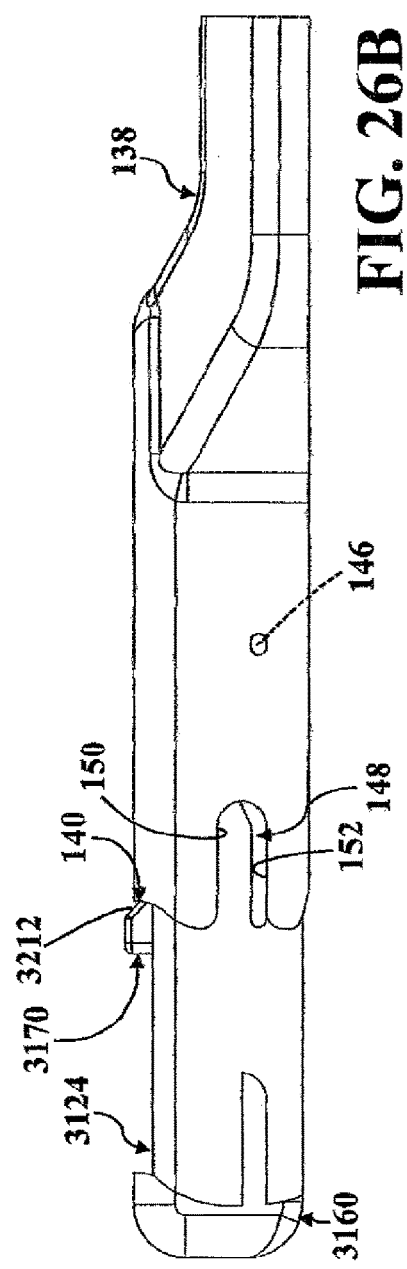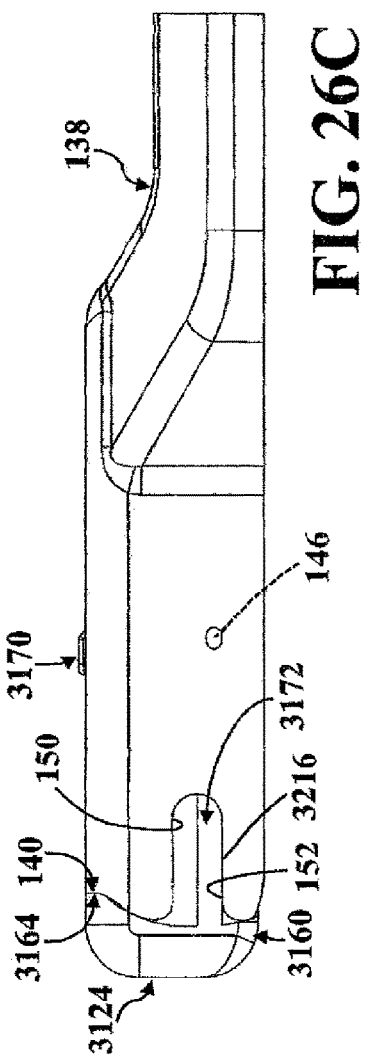

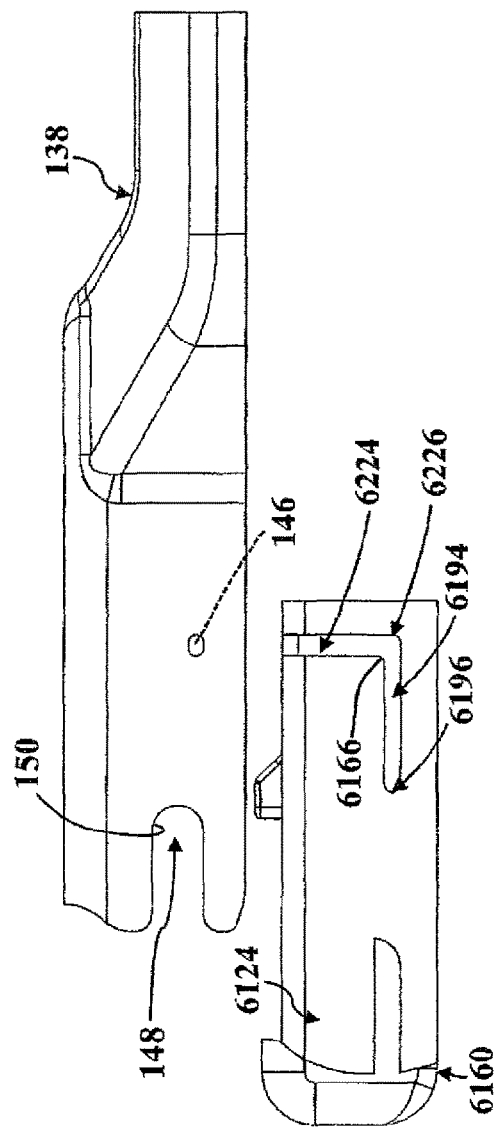
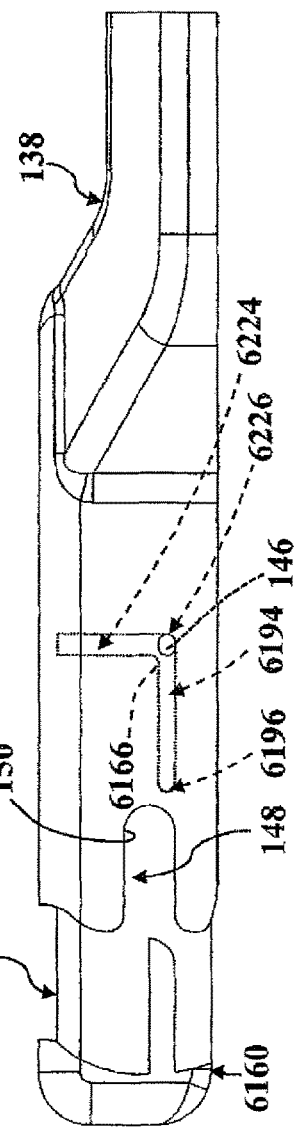
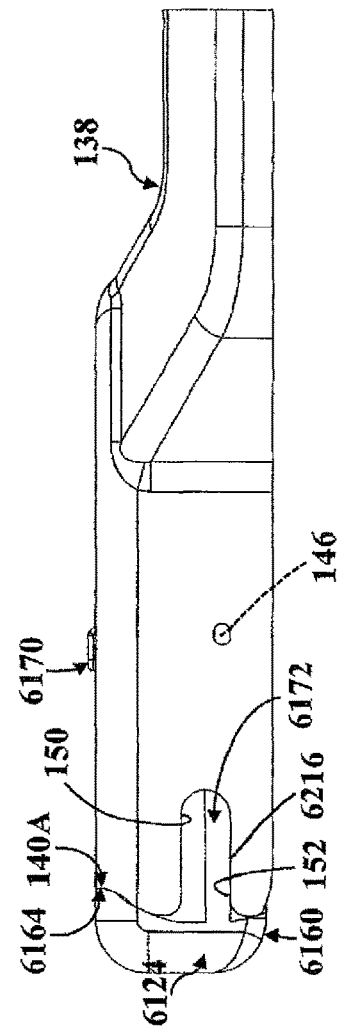
FIG. 27A
FIG. 27B
FIG. 27C

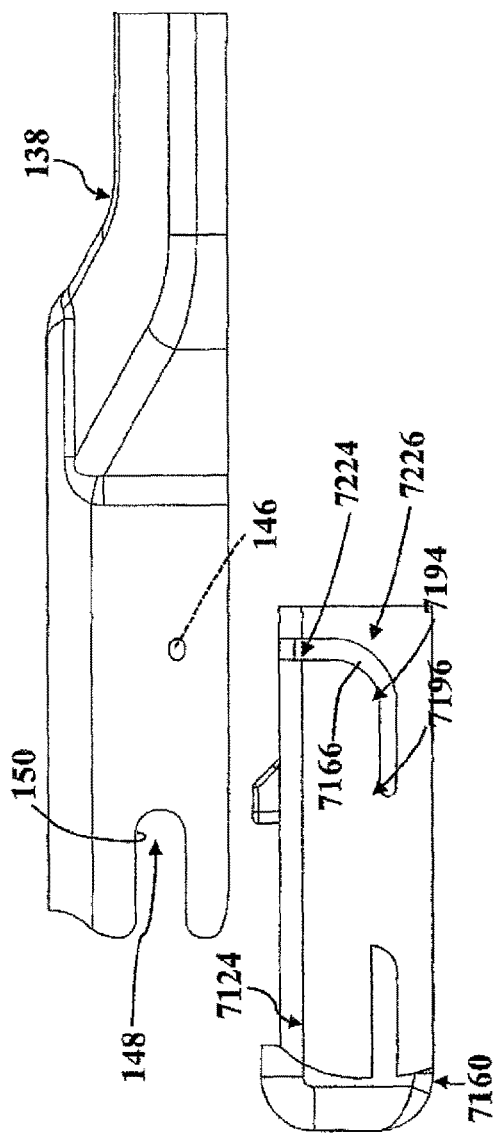
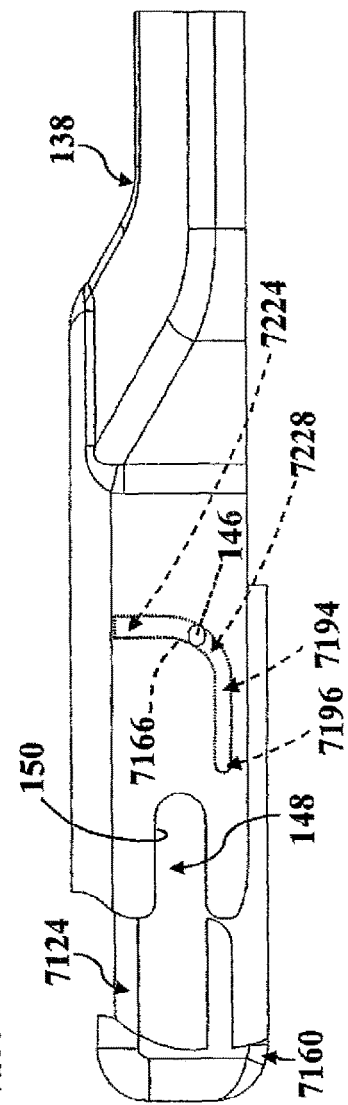
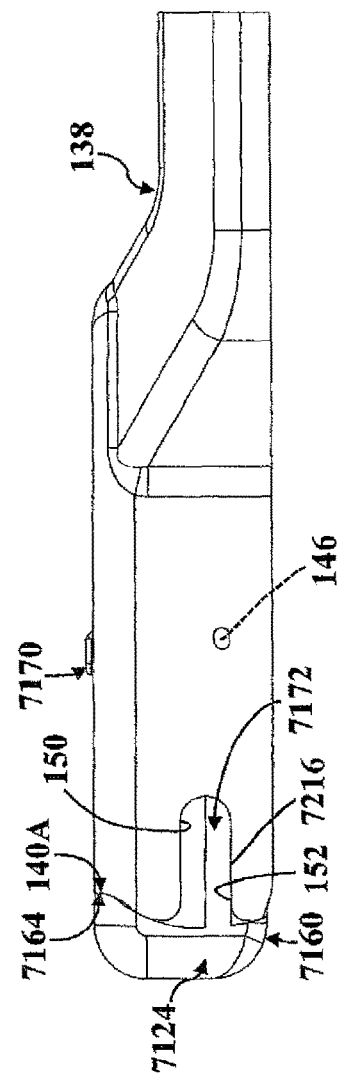
FIG. 28A
FIG. 28B
FIG. 28C

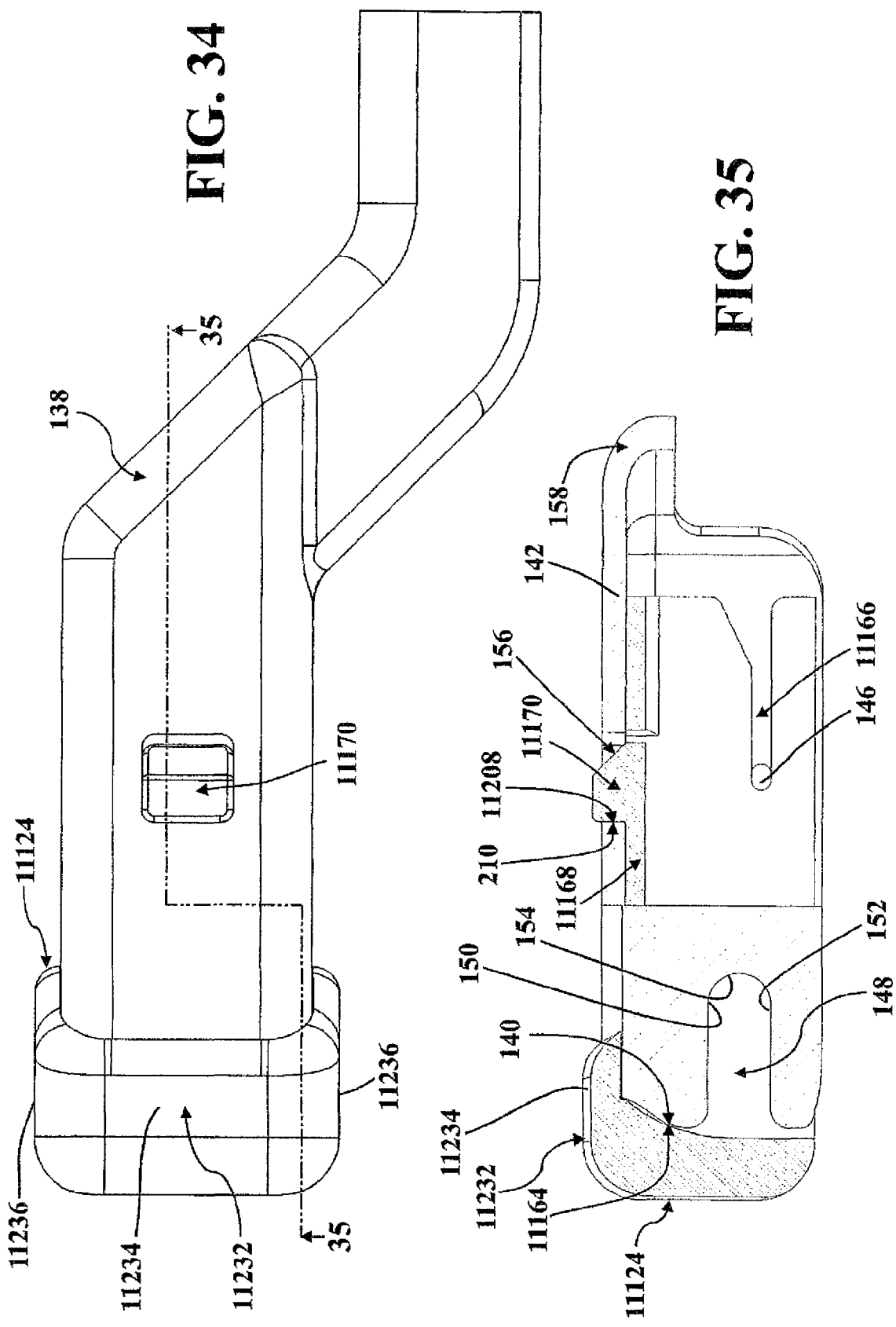

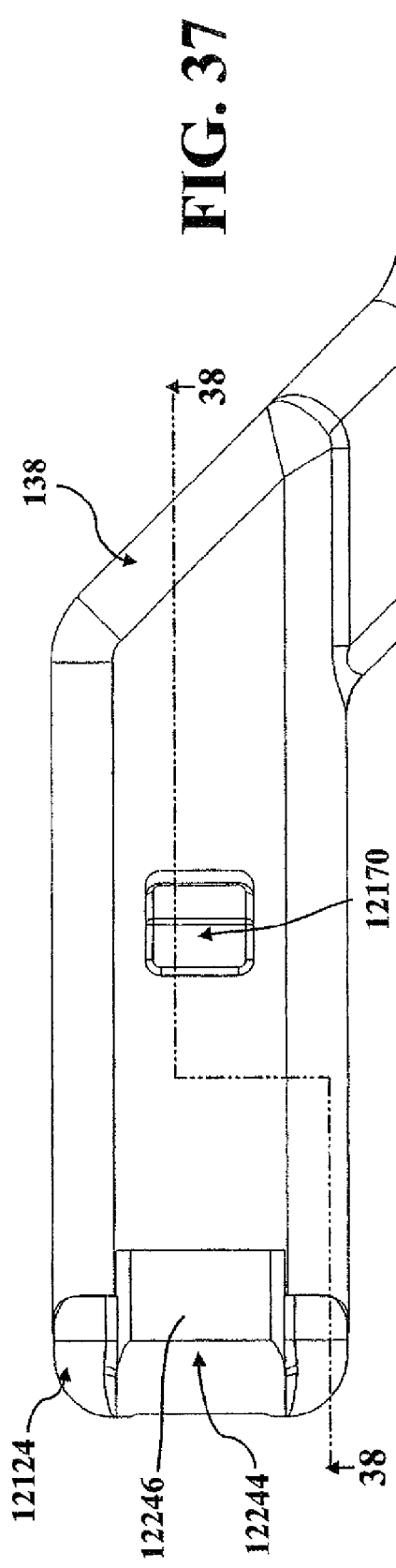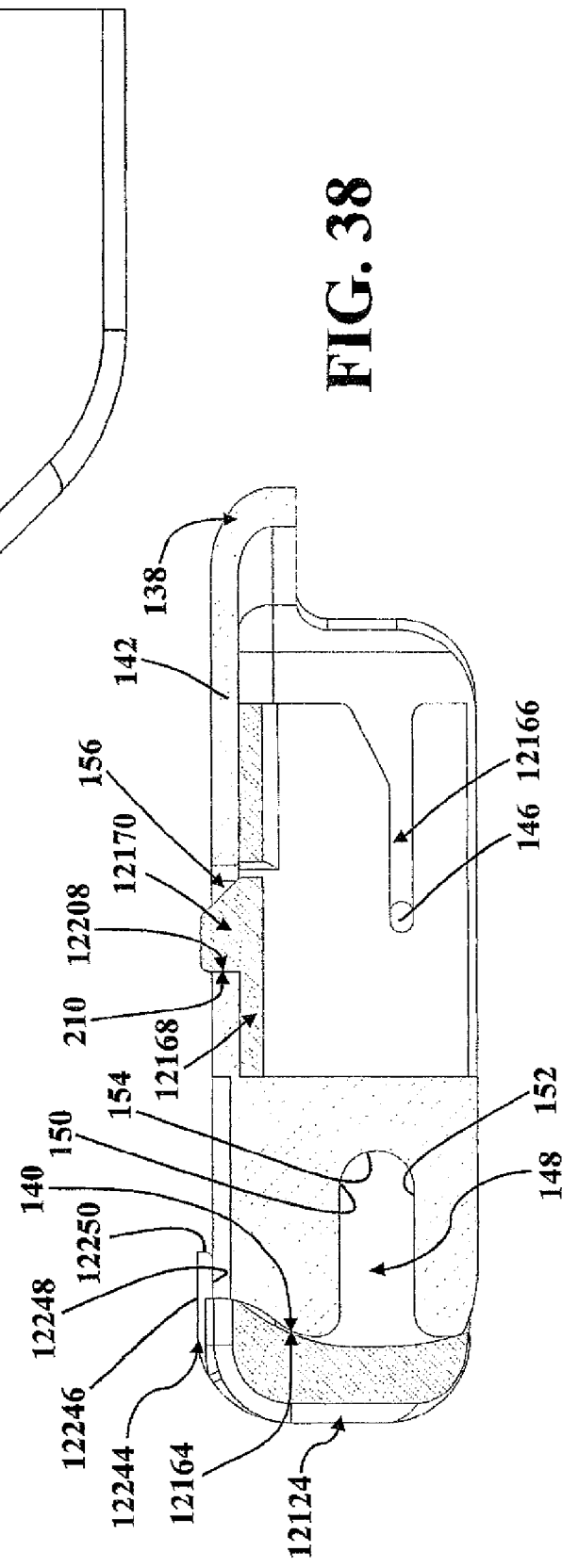

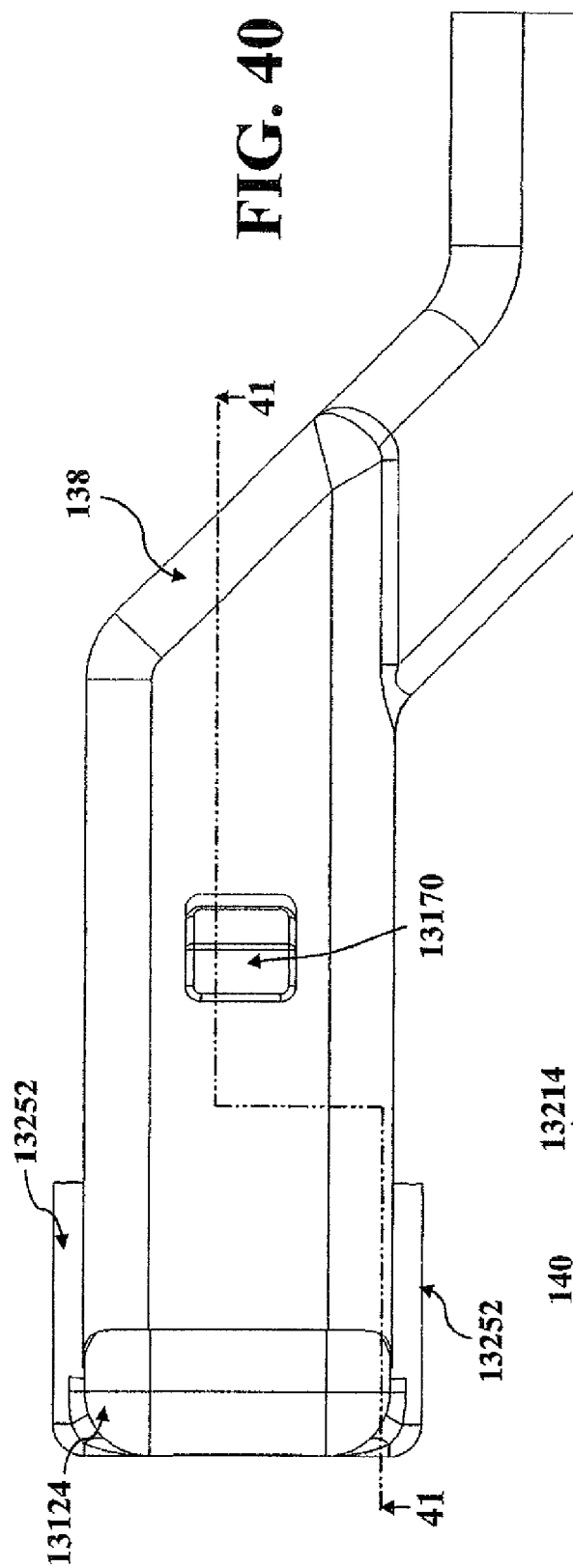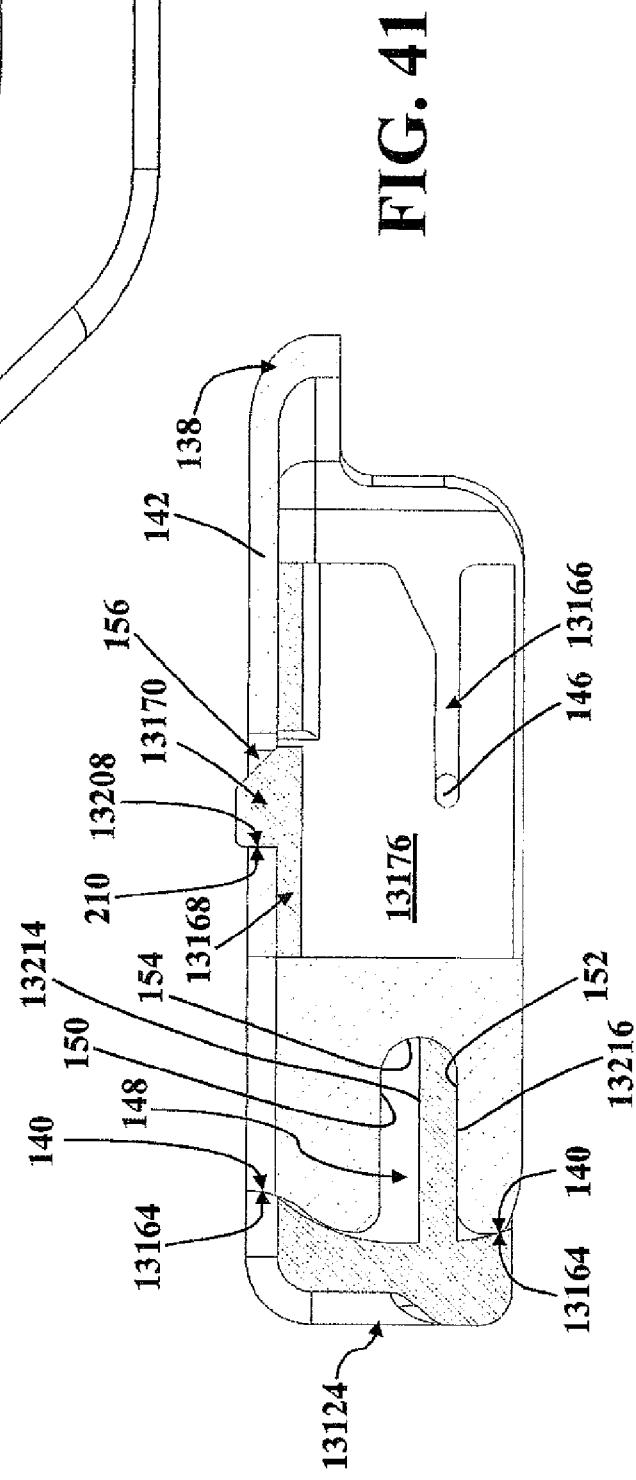

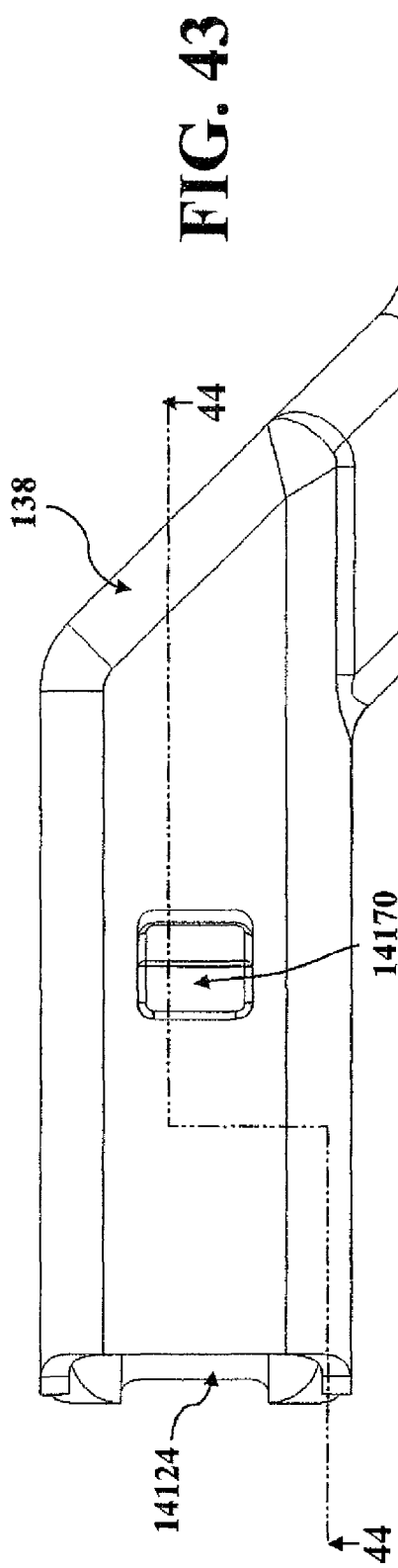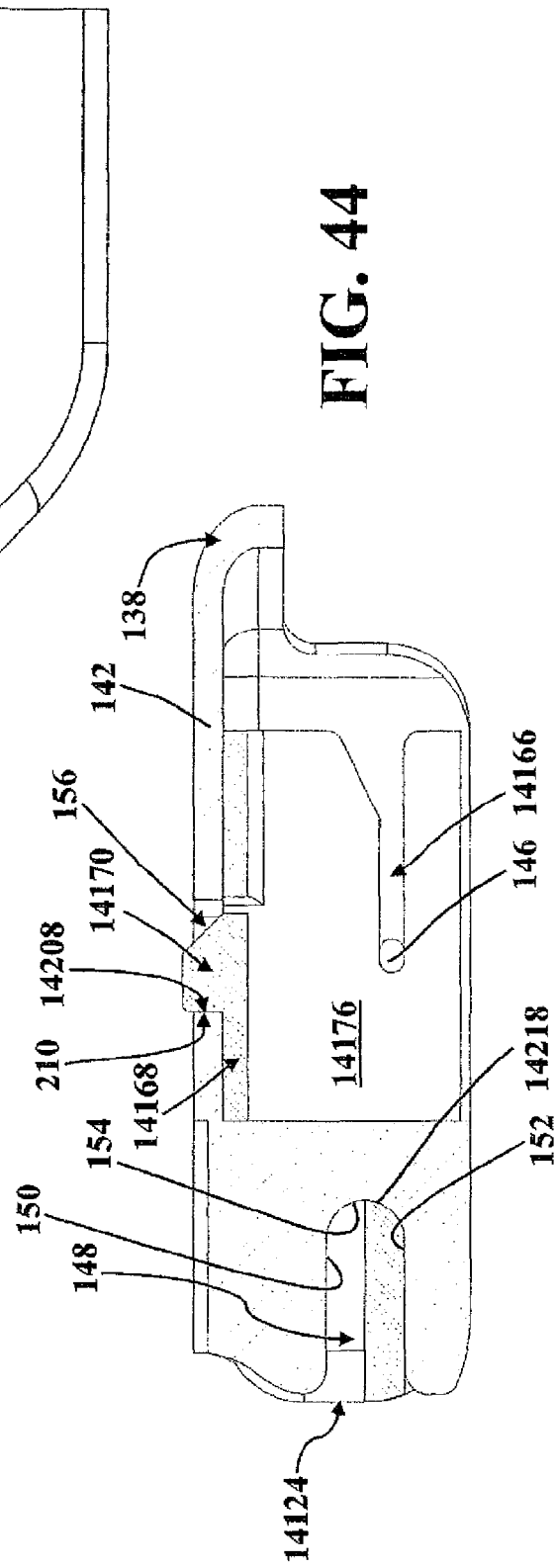

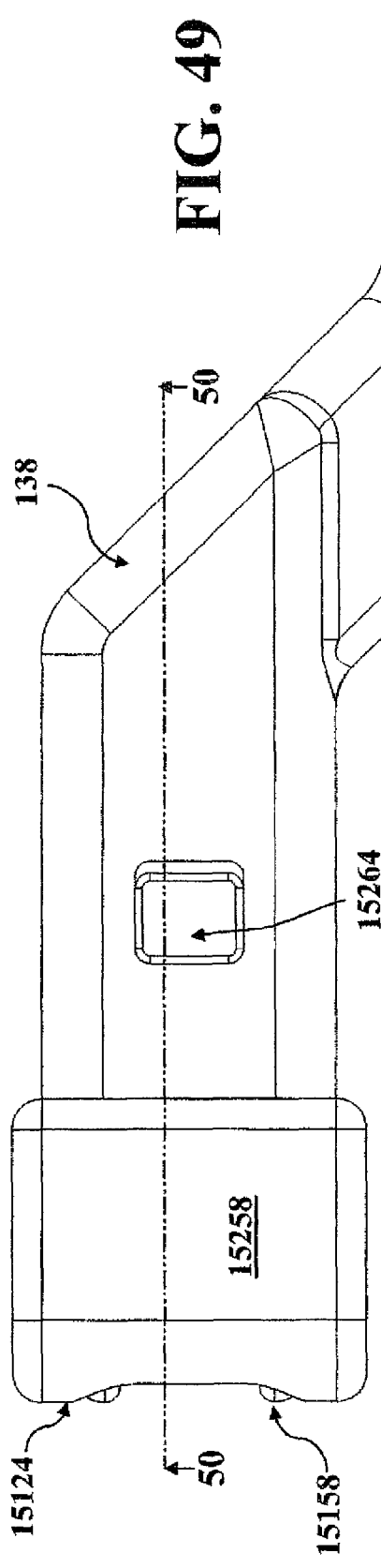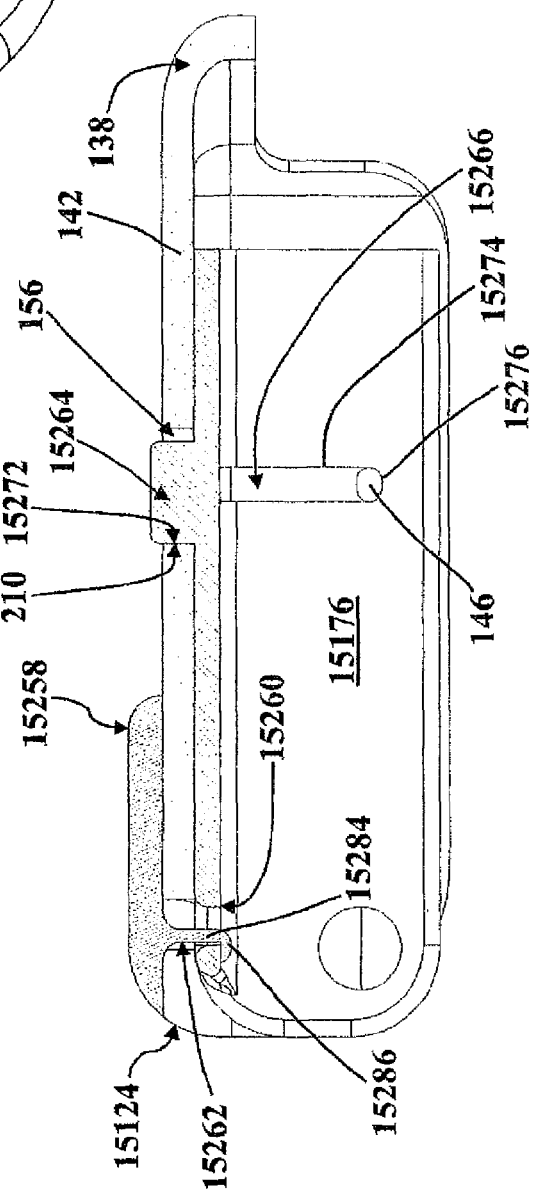

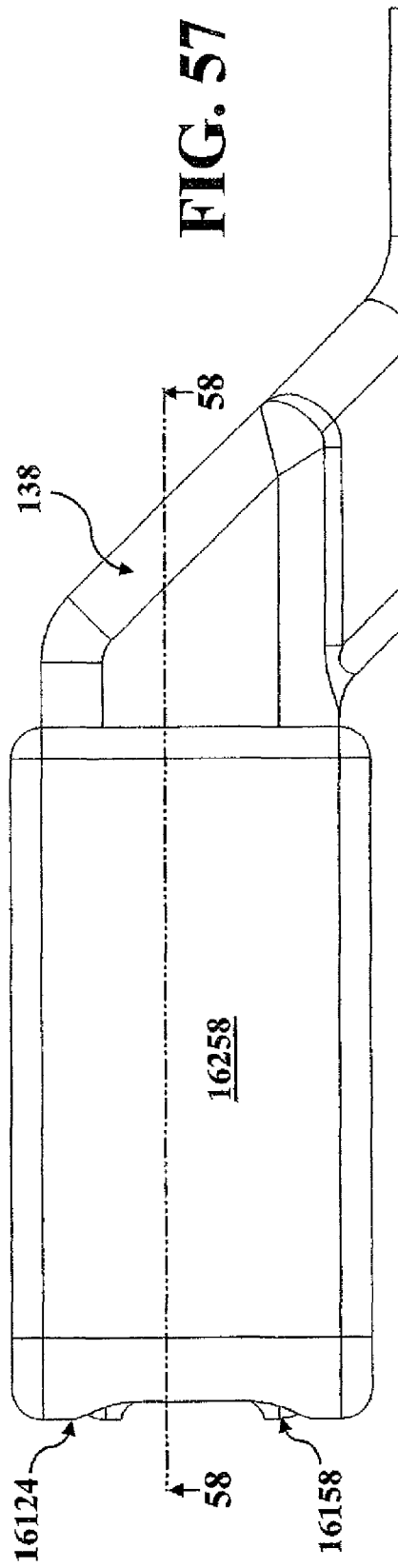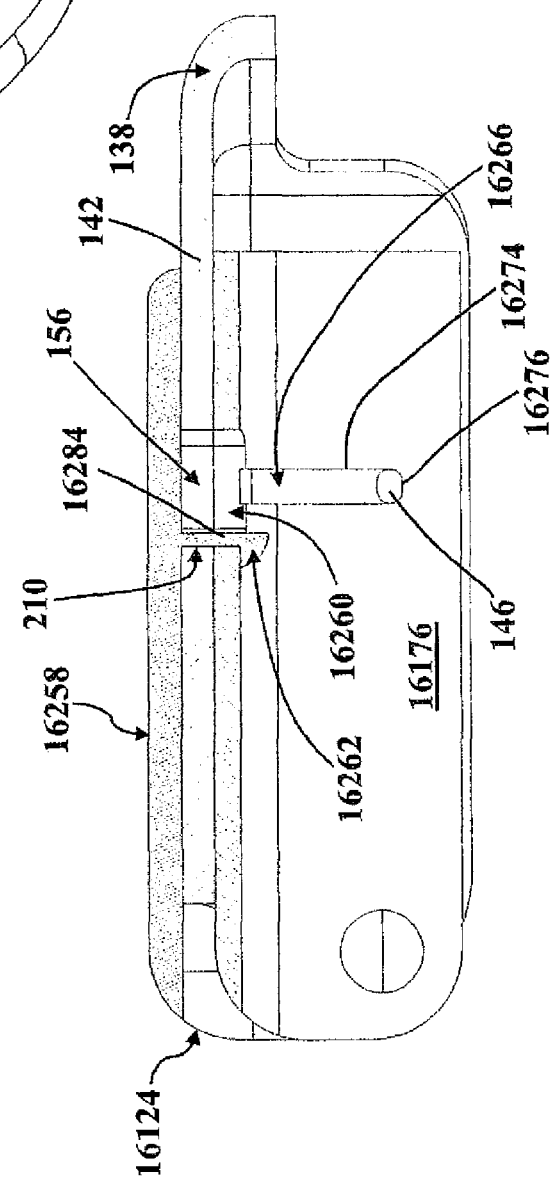

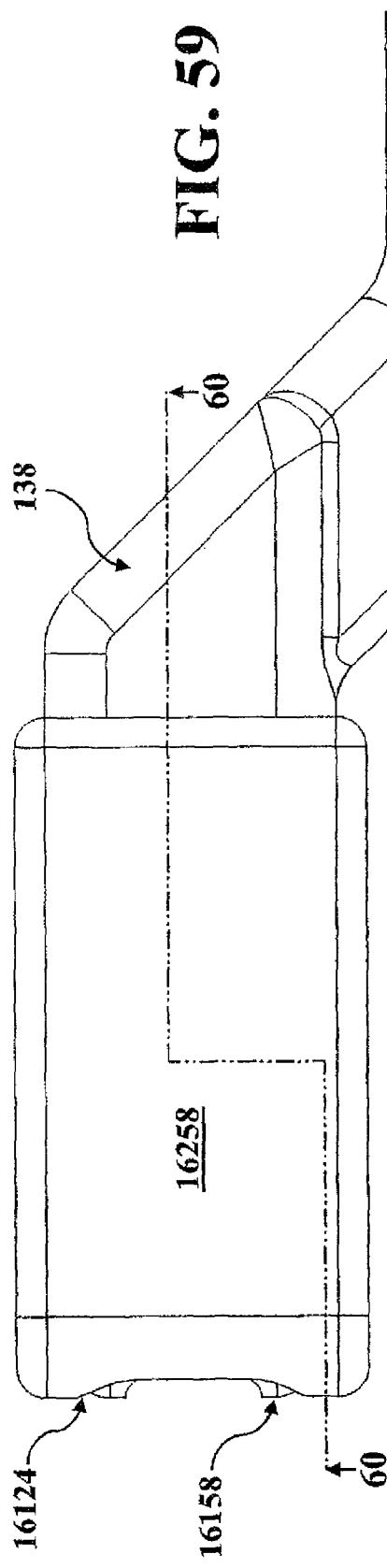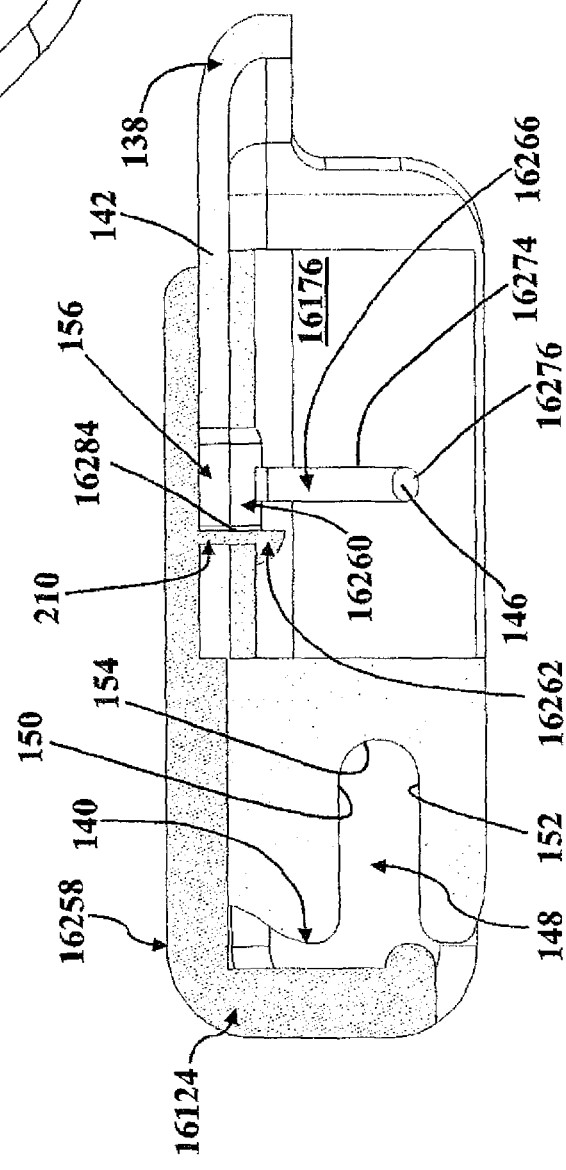

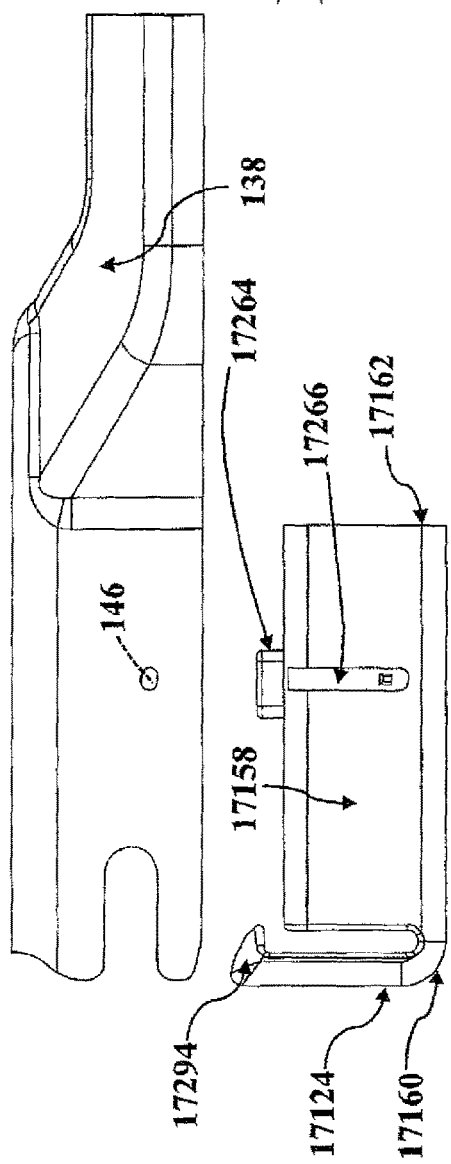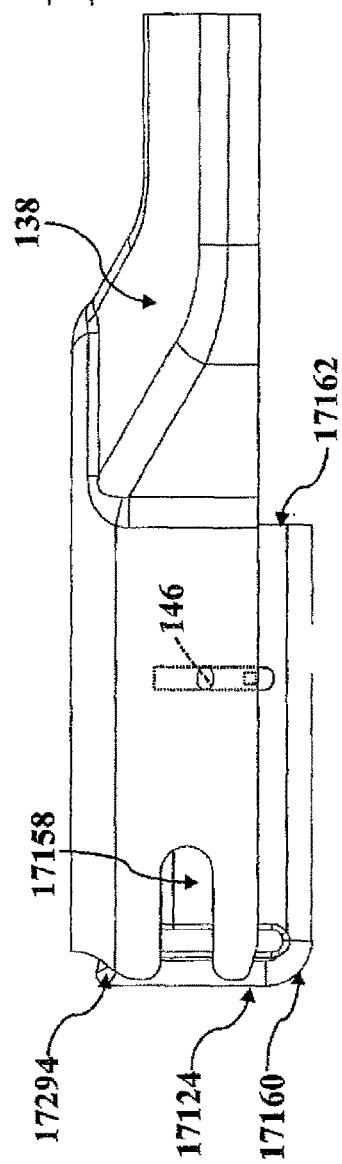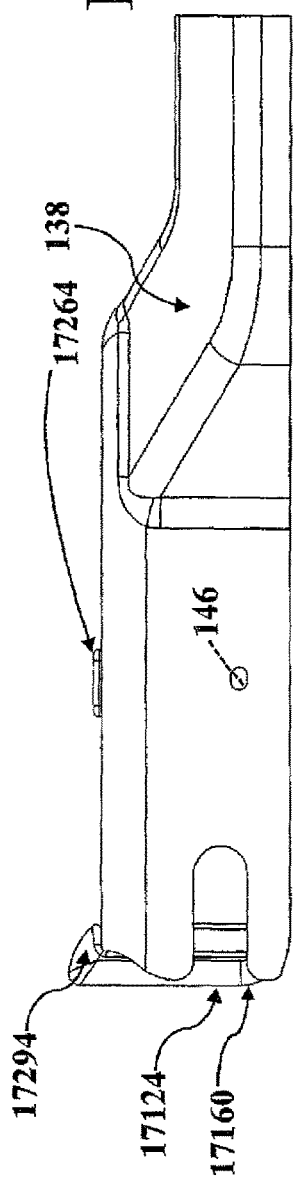

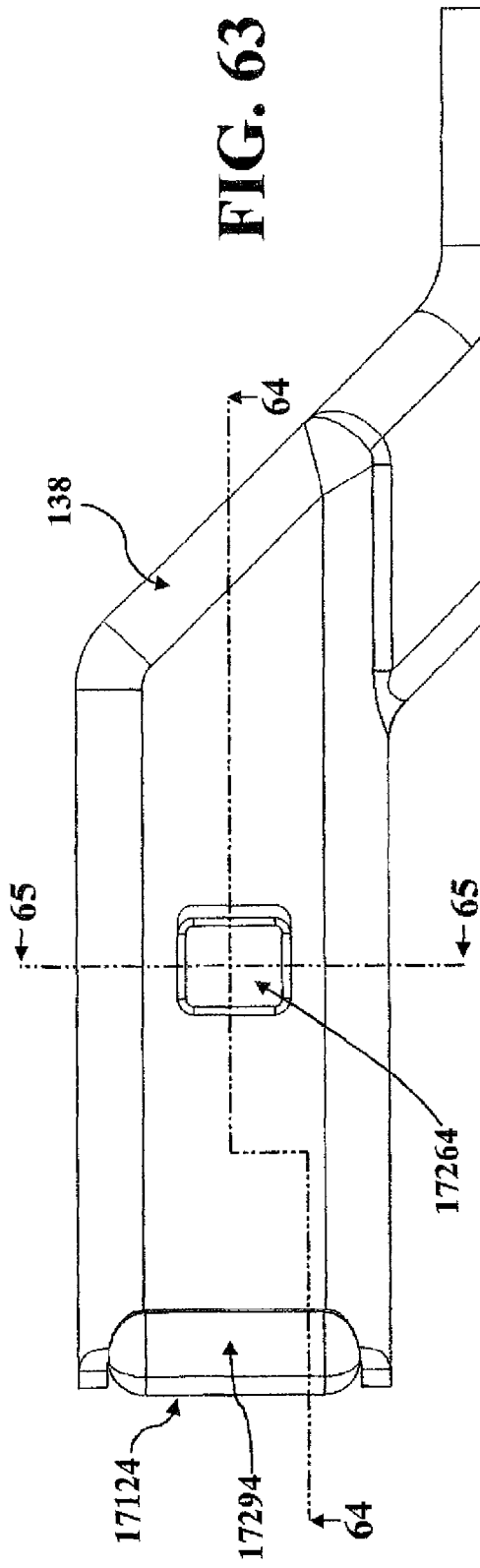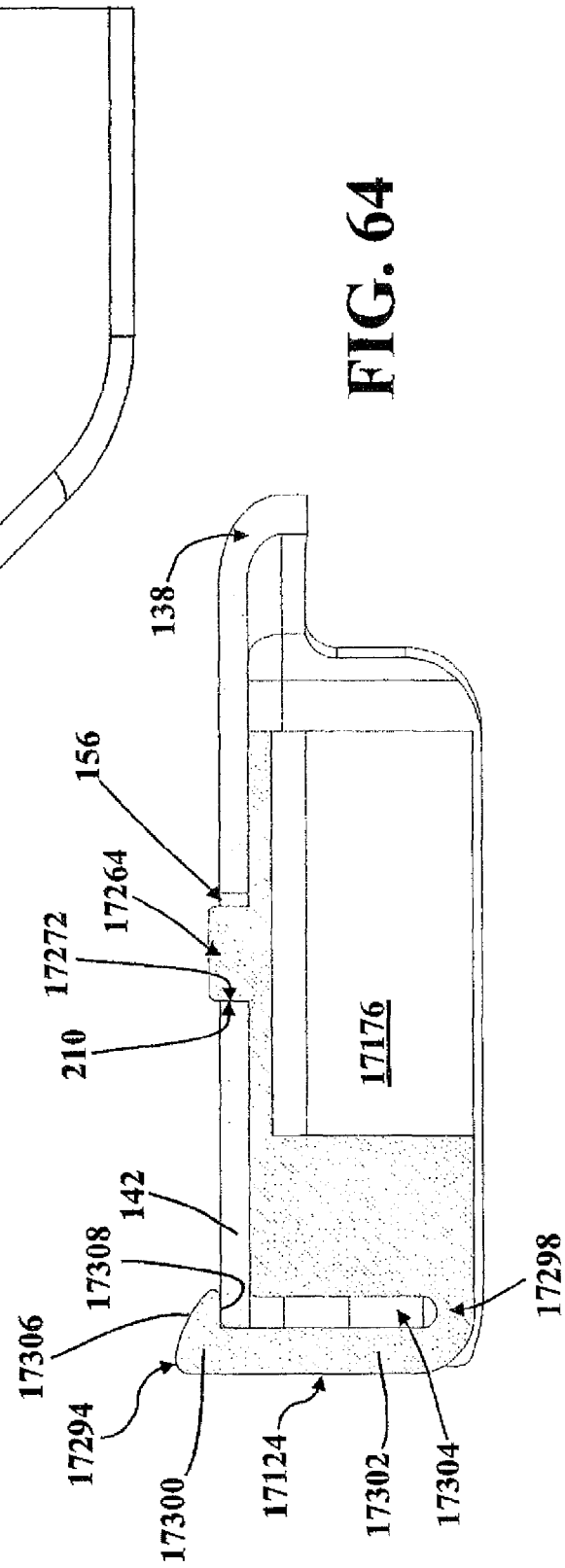

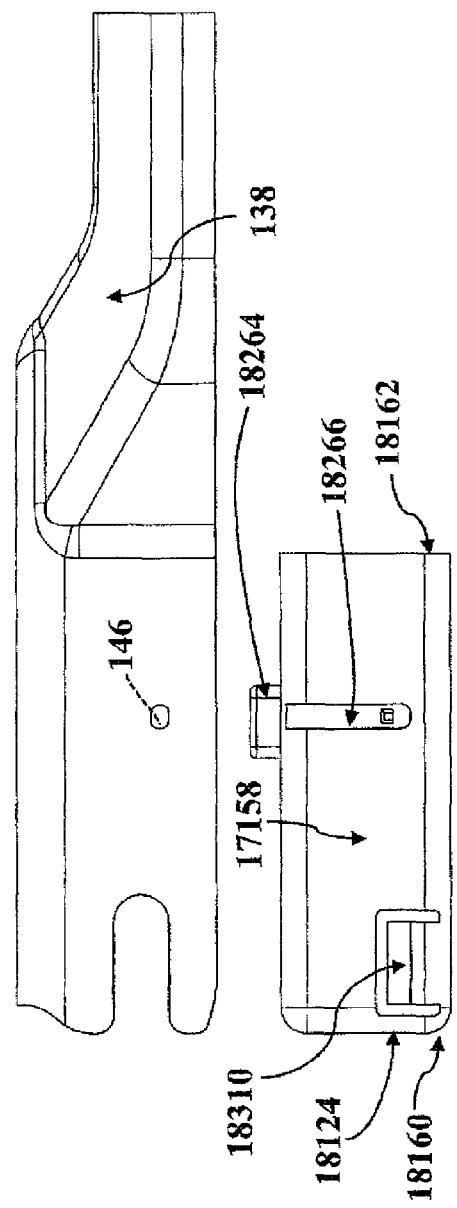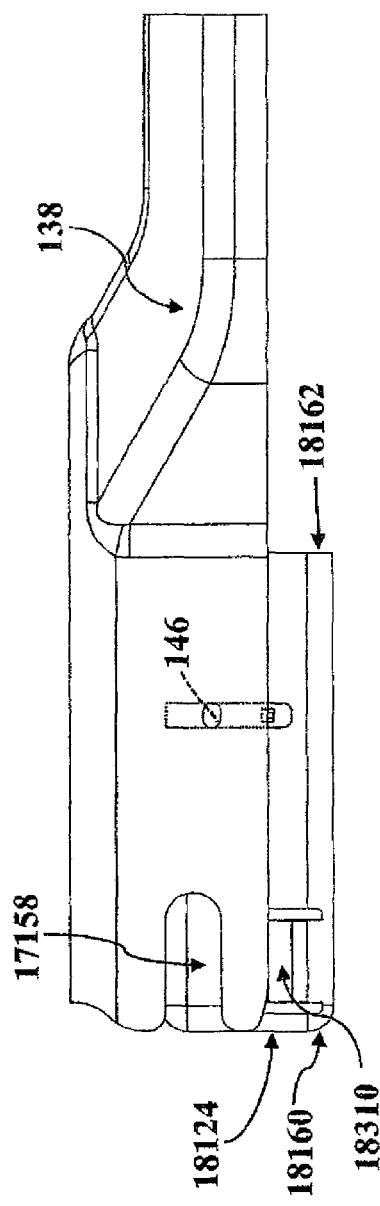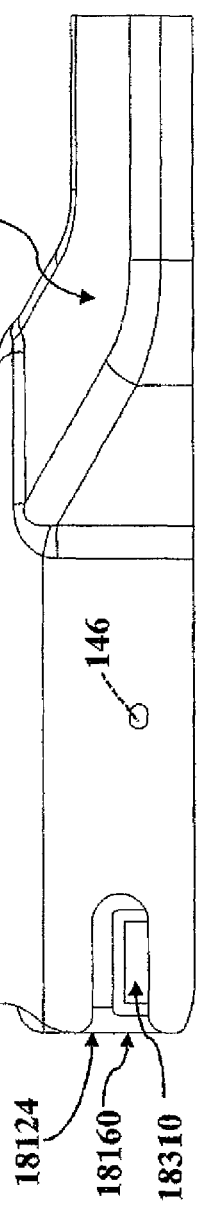

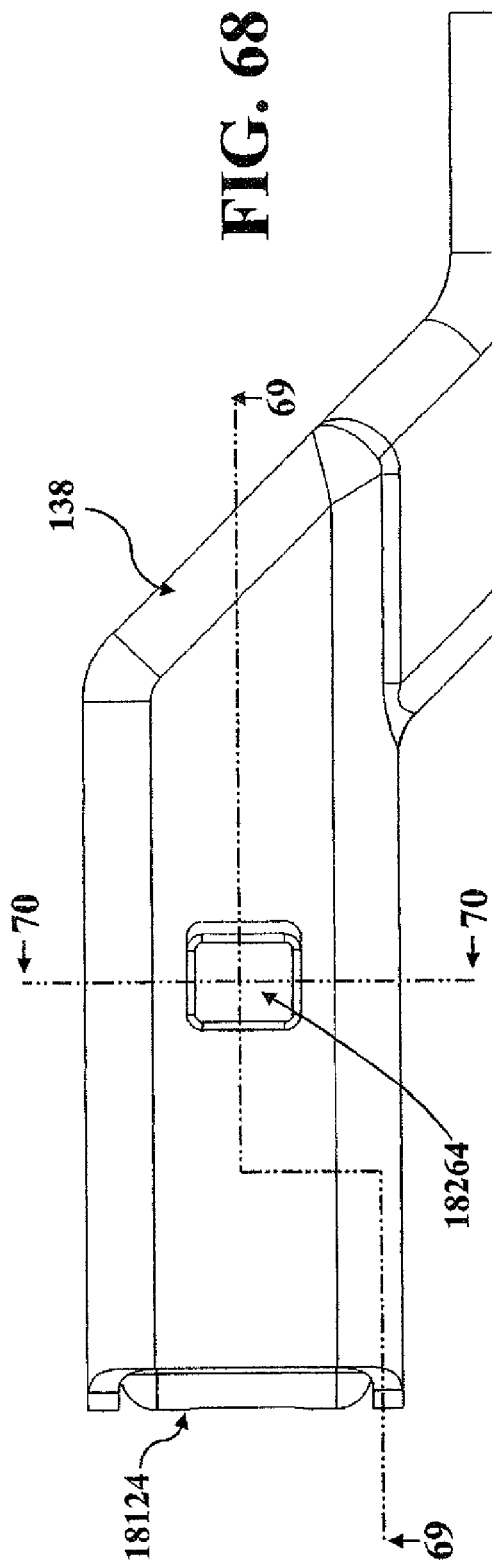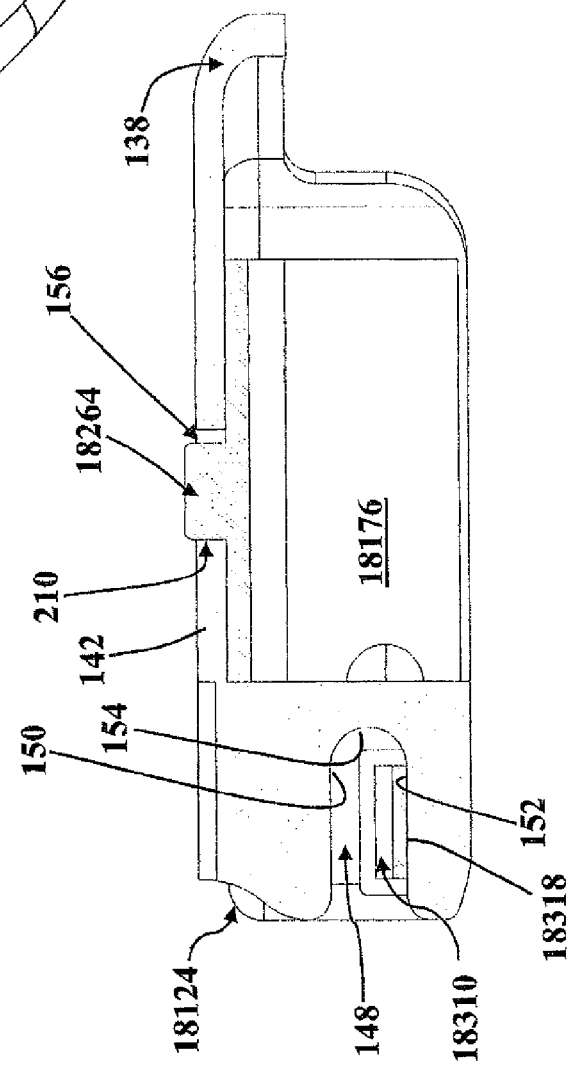

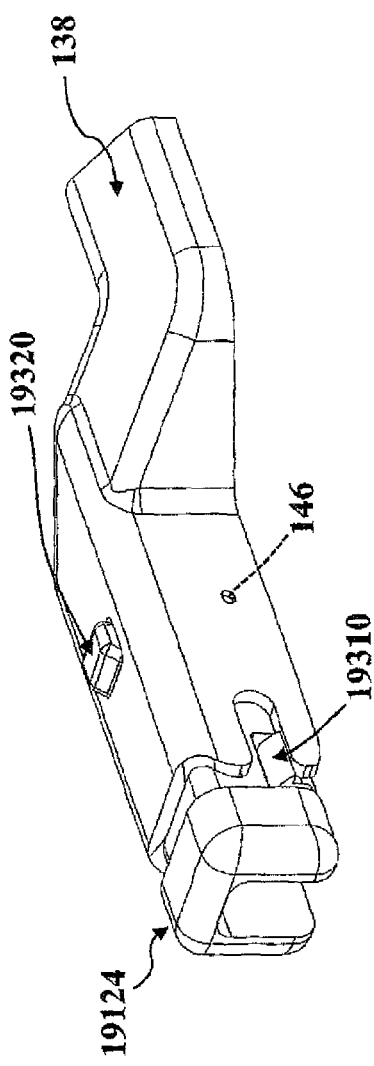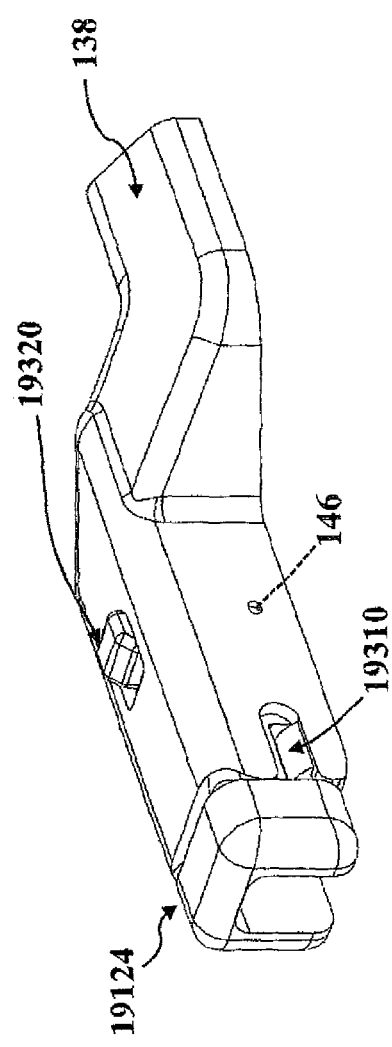

WIPER ADAPTER AND WIPER ASSEMBLY INCORPORATING THE SAME

CROSS-REFERENCE TO RELATED APPLICATION

This application claims priority to and all the benefits of U.S. Provisional Application No. 62/291,810, filed Feb. 5, 2016 and U.S. Provisional Application No. 62/326,096, filed Apr. 22, 2016.

BACKGROUND OF THE INVENTION

1. Field of the Invention

The present invention relates, generally, to wiper systems and, more specifically, to wiper adapters for wiper assemblies.

2. Description of the Related Art

Conventional automotive wiper systems known in the art include some type of wiper assembly (sometimes referred to as a wiper blade) mounted to a wiper arm which, in turn, is mounted adjacent to a surface to be wiped, such as a windshield of a vehicle, and pivotally driven to impart reciprocal motion to the wiper assembly across the windshield. The wiper assembly typically includes a rubber wiping element that contacts the windshield across the surface to be wiped. The wiper assembly often incorporates one or more metal strips that act to reinforce the wiping element and facilitate wiping contact by the wiping element across what is typically a curved glass surface. The wiper assembly also typically includes a coupler that attaches to and supports the one or more metal strips, and an adapter pivotally attached to the coupler. The adapter allows the wiper assembly to be releasably attached to the wiper arm. In this context, the wiper arm delivers a downward force to the wiper assembly that is distributed thereacross so as to press the wiper assembly into contact with the windshield. The wiper assembly also typically includes an airfoil that attaches to the metal strips, and may also include pair of end caps located at distal ends of the wiper assembly.

Each of the components of a wiper assembly of the type described above must cooperate to effectively clean a surface to be wiped. In addition, each of the components must be designed not only to facilitate an improved wipe quality, but also so as to reduce the cost and complexity of assembling the wiper assembly.

While wiper assemblies known in the related art have generally performed well for their intended purpose, there remains a need in the art for a wiper assembly that has superior operational characteristics, reduces the cost of manufacturing the assembly, and provides simple releasable attachment to wiper arms.

SUMMARY OF THE INVENTION

The present invention overcomes the disadvantages in the related art in an adapter for use in releasably attaching a wiper assembly to a wiper arm attachment member. The attachment member extends to a terminal end with an upper wall and a pair of side walls depending from the upper wall. The side walls each have an inwardly-extending protrusion spaced longitudinally from the terminal end and a U-shaped cutout formed at the terminal end defining upper and lower cutout edges. The upper wall has an aperture spaced longitudinally from the terminal end. The adapter has a body with first and second ends. A stop is formed on the body at the first end for abutting the terminal end of the attachment member. At least one slot is formed in the body at the second end for receiving one of the protrusions of the attachment member. A resilient finger is operatively attached to the body and has a tooth for engaging the aperture of the attachment member so as to prevent longitudinal movement between the adapter and the attachment member of the wiper arm when the stop abuts the terminal end of the attachment member. At least one brace is formed on the body at the first end for being received in one of the cutouts of the attachment member when the tooth of the resilient finger engages the aperture of the attachment member. The brace at least partially abuts the lower cutout edge of the attachment member and remains spaced from the upper cutout edge of the attachment member.

In addition, the present invention is directed toward a wiper assembly for use in releasably attaching to a wiper arm attachment member which extends to a terminal end with an upper wall and a pair of side walls depending from the upper wall. The side walls each have an inwardly-extending protrusion spaced longitudinally from the terminal end and a U-shaped cutout formed at the terminal end defining upper and lower cutout edges. The upper wall has an aperture spaced longitudinally from the terminal end. The wiper assembly includes a wiping element adapted to contact the surface to be wiped, and at least one elongated spline acting to support the wiping element. The spline has opposing longitudinal ends. An airfoil is operatively attached to the spline. A pair of end caps are operatively attached to each of the longitudinal ends of the spline. A coupler is operatively attached to the spline between the longitudinal ends. An adapter is pivotally attached to the coupler. The adapter has a body with first and second ends. A stop is formed on the body at the first end for abutting the terminal end of the attachment member. At least one slot is formed in the body at the second end for receiving one of the protrusions of the attachment member. A resilient finger is operatively attached to the body and has a tooth for engaging the aperture of the attachment member so as to prevent longitudinal movement between the adapter and the attachment member of the wiper arm when the stop abuts the terminal end of the attachment member. At least one brace is formed on the body at the first end for being received in one of the cutouts of the attachment member when the tooth of the resilient finger engages the aperture of the attachment member. The brace at least partially abuts the lower cutout edge of the attachment member and remains spaced from the upper cutout edge of the attachment member.

In addition, the present invention is directed toward an adapter for use in releasably attaching a wiper assembly to a wiper arm attachment member. The attachment member extends to a terminal end with an upper wall and a pair of side walls depending from the upper wall. The side walls each have an inwardly-extending protrusion spaced longitudinally from the terminal end and a U-shaped cutout formed at the terminal end defining upper and lower cutout edges. The upper wall has an aperture spaced longitudinally from the terminal end. The adapter has a body with first and second ends. A stop is formed on the body at the first end for abutting the terminal end of the attachment member. At least one slot is formed in the body at the second end for receiving one of the protrusions of the attachment member. A resilient finger is operatively attached to the body and has a tooth for engaging the aperture of the attachment member so as to prevent longitudinal movement between the adapter and the attachment member of the wiper arm when the stop abuts the terminal end of the attachment member.

In addition, the present invention is directed toward a wiper assembly for use in releasably attaching to a wiper arm attachment member which extends to a terminal end with an upper wall and a pair of side walls depending from the upper wall. The side walls each have an inwardly-extending protrusion spaced longitudinally from the terminal end and a U-shaped cutout formed at the terminal end defining upper and lower cutout edges. The upper wall has an aperture spaced longitudinally from the terminal end. The wiper assembly includes a wiping element adapted to contact the surface to be wiped, and at least one elongated spline acting to support the wiping element. The spline has opposing longitudinal ends. An airfoil is operatively attached to the spline. A pair of end caps are operatively attached to each of the longitudinal ends of the spline. A coupler is operatively attached to the spline between the longitudinal ends. An adapter is pivotally attached to the coupler. The adapter has a body with first and second ends. A stop is formed on the body at the first end for abutting the terminal end of the attachment member. At least one slot is formed in the body at the second end for receiving one of the protrusions of the attachment member. A resilient finger is operatively attached to the body and has a tooth for engaging the aperture of the attachment member so as to prevent longitudinal movement between the adapter and the attachment member of the wiper arm when the stop abuts the terminal end of the attachment member.

In addition, the present invention is directed toward an adapter for use in releasably attaching a wiper assembly to a wiper arm attachment member. The attachment member extends to a terminal end with an upper wall and a pair of side walls depending from the upper wall. The side walls each have an inwardly-extending protrusion spaced longitudinally from the terminal end and a U-shaped cutout formed at the terminal end defining upper and lower cutout edges. The upper wall has an aperture spaced longitudinally from the terminal end. The adapter has a body with first and second ends. A stop is formed on the body at the first end for abutting the terminal end of the attachment member. At least one slot is formed in the body at the second end for receiving one of the has a tooth for engaging the aperture of the attachment member so as to prevent longitudinal movement between the adapter and the attachment member of the wiper arm when the stop abuts the terminal end of the attachment member. At least one brace is formed on the body at the first end for being received in one of the cutouts of the attachment member when the tooth of the resilient finger engages the aperture of the attachment member wherein the brace at least partially abuts the lower cutout edge of the attachment member.

In addition, the present invention is directed toward a wiper assembly for use in releasably attaching to a wiper arm attachment member which extends to a terminal end with an upper wall and a pair of side walls depending from the upper wall. The side walls each have an inwardly-extending protrusion spaced longitudinally from the terminal end and a U-shaped cutout formed at the terminal end defining upper and lower cutout edges. The upper wall has an aperture spaced longitudinally from the terminal end. The wiper assembly includes a wiping element adapted to contact the surface to be wiped, and at least one elongated spline acting to support the wiping element. The spline has opposing longitudinal ends. An airfoil is operatively attached to the spline. A pair of end caps are operatively attached to each of the longitudinal ends of the spline. A coupler is operatively attached to the spline between the longitudinal ends. An adapter is pivotally attached to the coupler. The adapter has a body with first and second ends. A stop is formed on the body at the first end for abutting the terminal end of the attachment member. At least one slot is formed in the body at the second end for receiving one of the has a tooth for engaging the aperture of the attachment member so as to prevent longitudinal movement between the adapter and the attachment member of the wiper arm when the stop abuts the terminal end of the attachment member. At least one brace is formed on the body at the first end for being received in one of the cutouts of the attachment member when the tooth of the resilient finger engages the aperture of the attachment member wherein the brace at least partially abuts the lower cutout edge of the attachment member.

In addition, the present invention is directed toward an adapter for use in releasably attaching a wiper assembly to a wiper arm attachment member. The attachment member extends to a terminal end with an upper wall and a pair of side walls depending from the upper wall. The side walls each have an inwardly-extending protrusion spaced longitudinally from the terminal end and a U-shaped cutout formed at the terminal end defining upper and lower cutout edges. The upper wall has an aperture spaced longitudinally from the terminal end. The adapter has a body with first and second ends. At least one slot is formed in the body at the second end for receiving one of the protrusions of the attachment member of the wiper arm. The slot has a floor arranged to abut one of the protrusions of the attachment member so as to limit longitudinal movement of the attachment member towards the first end of the body of the adapter when the floor abuts the protrusion. A resilient finger is operatively attached to the body and has a tooth for engaging the aperture of the attachment member so as to prevent longitudinal movement between the adapter and the attachment member of the wiper arm when the floor of the slot abuts the protrusion of the attachment member. At least one brace is formed on the body at the first end for being received in one of the cutouts of the attachment member when the tooth of the resilient finger engages the aperture of the attachment member. The brace at least partially abuts the lower cutout edge of the attachment member and remains spaced from the upper cutout edge of the attachment member.

In addition, the present invention is directed toward a wiper assembly for use in releasably attaching to a wiper arm attachment member which extends to a terminal end with an upper wall and a pair of side walls depending from the upper wall. The side walls each have an inwardly-extending protrusion spaced longitudinally from the terminal end and a U-shaped cutout formed at the terminal end defining upper and lower cutout edges. The upper wall has an aperture spaced longitudinally from the terminal end. The wiper assembly includes a wiping element adapted to contact the surface to be wiped, and at least one elongated spline acting to support the wiping element. The spline has opposing longitudinal ends. An airfoil is operatively attached to the spline. A pair of end caps are operatively attached to each of the longitudinal ends of the spline. A coupler is operatively attached to the spline between the longitudinal ends. An adapter is pivotally attached to the coupler. The adapter has a body with first and second ends. At least one slot is formed in the body at the second end for receiving one of the protrusions of the attachment member of the wiper arm. The slot has a floor arranged to abut one of the protrusions of the attachment member so as to limit longitudinal movement of the attachment member towards the first end of the body of the adapter when the floor abuts the protrusion. A resilient finger is operatively attached to the body and has a tooth for engaging the aperture of the attachment member so as to prevent longitudinal movement between the adapter and the attachment member of the wiper arm when the floor of the slot abuts the protrusion of the attachment member. At least one brace is formed on the body at the first end for being received in one of the cutouts of the attachment member when the tooth of the resilient finger engages the aperture of the attachment member. The brace at least partially abuts the lower cutout edge of the attachment member and remains spaced from the upper cutout edge of the attachment member.

In this way, the adapter and wiper assembly of the present invention cooperate to effectively clean a surface to be wiped and, at the same time, provide simple releasable attachment to the wiper arm attachment member. Further, the adapter and wiper assembly of the present invention provide advantages related to usability, manufacturing, component assembly, and performance in use.

BRIEF DESCRIPTION OF THE DRAWINGS

Other objects, features, and advantages of the present invention will be readily appreciated as the same becomes better understood after reading the subsequent description taken in connection with the accompanying drawings.

FIG. 7A is a top-side plan view of the adapter and the attachment member of FIG. 6A shown in the first configuration.

FIG. 7B is a right-side plan view of the adapter and the attachment member of FIG. 6A shown in the first configuration.

FIG. 8A is a top-side plan view of the adapter and the attachment member of FIG. 6D shown secured in the fourth configuration.

FIG. 8B is a right-side plan view of the adapter and the attachment member of FIG. 6D shown secured in the fourth configuration.

FIG. 17 is a top-side plan view of the third embodiment of the adapter of FIGS. 13A-13B shown secured to the attachment member of FIGS. 5A-5B.

FIG. 18 is a sectional view taken along line 18-18 of FIG. 17.

FIG. 21 is a top-side plan view of the fifth embodiment of the adapter of FIG. 16 shown secured to the attachment member of FIGS. 5A-5B.

FIG. 22 is a sectional view taken along line 22-22 of FIG. 21.

FIG. 26A is a right-side plan view of the third embodiment of the adapter of FIGS. 13A-13B and 23 shown spaced from the attachment member of FIGS. 5A-5B.

FIG. 26B is a right-side plan view of the adapter and the attachment member of FIG. 26A shown with the attachment member sliding into engagement with the adapter.

FIG. 26C is a right-side plan view of the adapter and the attachment member of FIGS. 26A-26B shown with the adapter secured to the attachment member.

FIG. 27A is a right-side plan view of the sixth embodiment of the adapter of FIG. 24 shown spaced from the attachment member of FIGS. 5A-5B.

FIG. 27B is a right-side plan view of the adapter and the attachment member of FIG. 27A shown with the attachment member sliding into engagement with the adapter.

FIG. 27C is a right-side plan view of the adapter and the attachment member of FIGS. 27A-27B shown with the adapter secured to the attachment member.

FIG. 28A is a right-side plan view of the seventh embodiment of the adapter of FIG. 25 shown spaced from the attachment member of FIGS. 5A-5B.

FIG. 28B is a right-side plan view of the adapter and the attachment member of FIG. 28A shown with the attachment member sliding into engagement with the adapter.

FIG. 28C is a right-side plan view of the adapter and the attachment member of FIGS. 28A-28B shown with the adapter secured to the attachment member.

FIG. 34 is a top-side plan view of the eleventh embodiment of the adapter of FIGS. 33A-33B shown secured to the attachment member of FIGS. 5A-5B.

FIG. 35 is a sectional view taken along line 35-35 of FIG. 34.

FIG. 37 is a top-side plan view of the twelfth embodiment of the adapter of FIGS. 36A-36B shown secured to the attachment member of FIGS. 5A-5B.

FIG. 38 is a sectional view taken along line 38-38 of FIG. 37.

FIG. 40 is a top-side plan view of the thirteenth embodiment of the adapter of FIGS. 39A-39B shown secured to the attachment member of FIGS. 5A-5B.

FIG. 41 is a sectional view taken along line 41-41 of FIG. 40.

FIG. 43 is a top-side plan view of the fourteenth embodiment of the adapter of FIGS. 42A-42B shown secured to the attachment member of FIGS. 5A-5B.

FIG. 44 is a sectional view taken along line 44-44 of FIG. 43.

FIG. 49 is a top-side plan view of the fifteenth embodiment of the adapter of FIGS. 45A-48C shown secured to the attachment member of FIGS. 5A-5B.

FIG. 50 is a sectional view taken along line 50-50 of FIG. 49.

FIG. 57 is a top-side plan view of the sixteenth embodiment of the adapter of FIGS. 53A-56C shown secured to the attachment member of FIGS. 5A-5B.

FIG. 58 is a sectional view taken along line 58-58 of FIG. 57.

FIG. 59 is another top-side plan view of the sixteenth embodiment of the adapter and the attachment member of FIG. 57.

FIG. 60 is a sectional view taken along line 60-60 of FIG. 59.

FIG. 62A is a right-side plan view of the seventeenth embodiment of the adapter of FIGS. 61A-61B shown spaced from the attachment member of FIGS. 5A-5B.

FIG. 62B is a right-side plan view of the adapter and the attachment member of FIG. 62A shown with the attachment member dropping into engagement with the adapter.

FIG. 62C is a right-side plan view of the adapter and the attachment member of FIGS. 62A-62B shown with the adapter secured to the attachment member FIG. 63 is a top-side plan view of the seventeenth embodiment of the adapter of FIGS. 61A-62C shown secured to the attachment member of FIGS. 5A-5B.

FIG. 64 is a sectional view taken along line 64-64 of FIG. 63.

FIG. 67A is a right-side plan view of the eighteenth embodiment of the adapter of FIGS. 66A-66B shown spaced from the attachment member of FIGS. 5A-5B.

FIG. 67B is a right-side plan view of the adapter and the attachment member of FIG. 67A shown with the attachment member dropping into engagement with the adapter.

FIG. 67C is a right-side plan view of the adapter and the attachment member of FIGS. 67A-67B shown with the adapter secured to the attachment member.

FIG. 68 is a top-side plan view of the eighteenth embodiment of the adapter of FIGS. 66A-67C shown secured to the attachment member of FIGS. 5A-5B.

FIG. 69 is a sectional view taken along line 69-69 of FIG. 68.

FIG. 72C is a perspective view of the adapter and the attachment member of FIGS. 72A-72B shown with the attachment member continuing to slide into engagement with the adapter.

FIG. 72D is a perspective view of the adapter and the attachment member of FIGS. 72A-72C shown with the adapter secured to the attachment member.

DETAILED DESCRIPTION OF THE INVENTION

Figure 1:
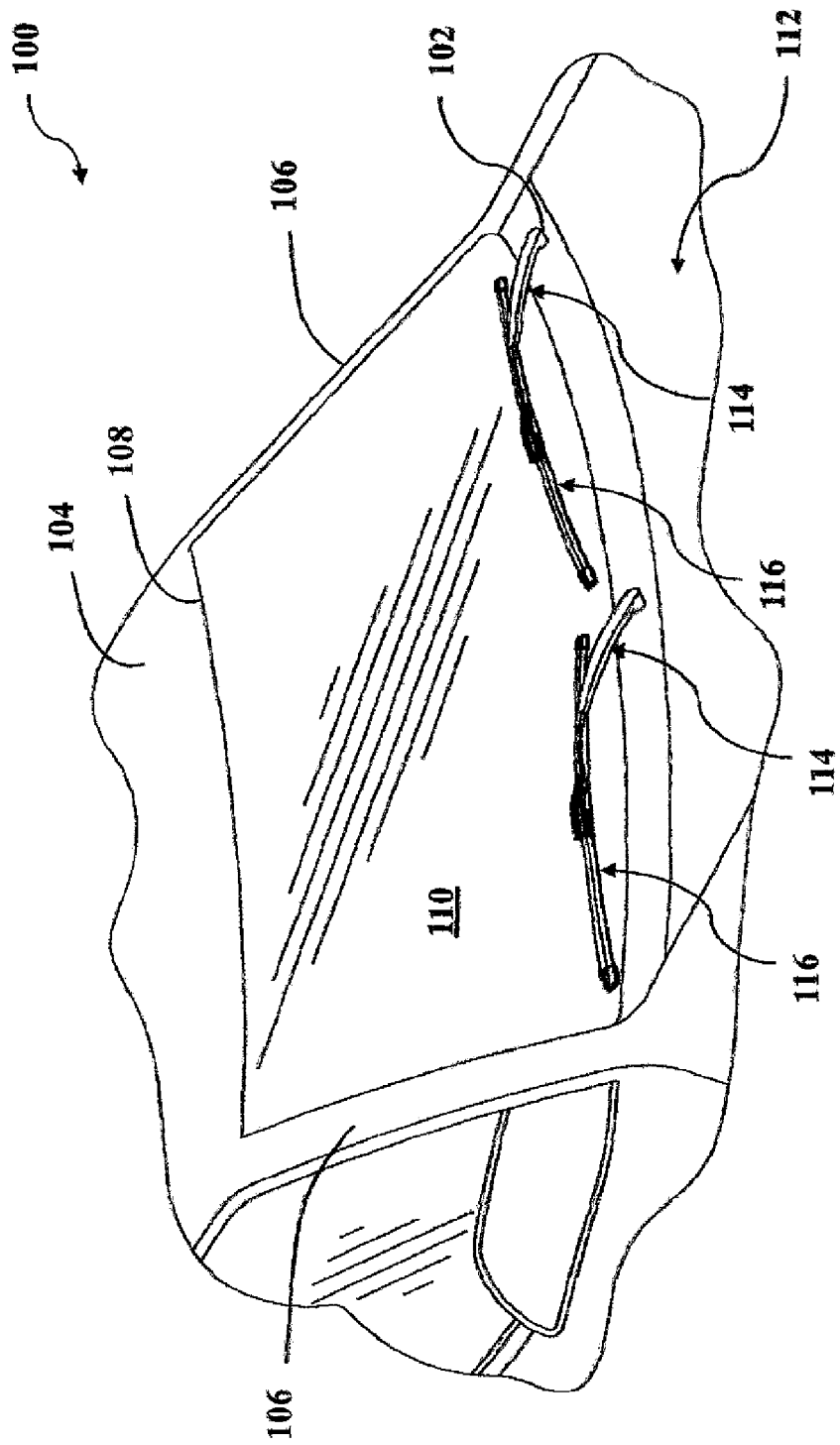
FIG. 1 is a partial perspective view of a front of a vehicle having a pair of wiper assemblies pivotally mounted to respective wiper arms for reciprocal movement across a windshield of the vehicle.

With reference to the Figures, where like numerals are used to designate like structure throughout the several views, a portion of a vehicle is schematically illustrated at 20 in FIG. 1. The vehicle 100 includes a cowl 102, a roof 104, and a pair of laterally spaced front A-pillars 106 extending between the roof 104 and the cowl 102. The A-pillars 106, roof 104, and cowl 102 cooperate to define a generally rectangular opening 108 in which a curved or "swept back" glass windshield 110 is supported. As illustrated, the vehicle 100 is an automobile, but could be any type of vehicle, such as a heavy-duty truck, train, airplane, ship, construction vehicle or equipment, military vehicle, or any other type of vehicle that contains surface wiper systems.

A wiper system is generally indicated at 112 in FIG. 1 and is employed to clean the windshield 110. The wiper system 112 includes a pair of wiper arms, generally indicated at 114, and a pair of wiper assemblies, generally indicated at 116, which correspond to the driver and passenger sides of the vehicle 100. However, those having ordinary skill in the art will appreciate that the wiper system 112 could employ a single wiper arm 114 and a single wiper assembly 116, or more than two wiper arms 114 and more than two wiper assemblies 116, without departing from the scope of the present invention. In the representative example illustrated herein, each wiper assembly 116 is carried by a corresponding wiper arm 114. The wiper system 112 also includes an electric motor (not shown, but generally known in the art) to move the wiper assemblies 116 in an oscillating manner across the surface of the windshield 110.

While the wiper assembly 116 illustrated in FIG. 1 is shown in connection with the front windshield 110 of the vehicle 100, those having ordinary skill in the art will appreciate that wiper assemblies 116 could be used in other areas of the vehicle 100 that employ a wiper system 112, such as a rear window (not shown) or a head lamp (not shown). Thus, it will be understood that the present invention is not limited for use solely in connection with wiper arms 114 adapted for use on a vehicle's windshield 110, but for use in all applications where wiper systems 32 are employed.

Figure 2:
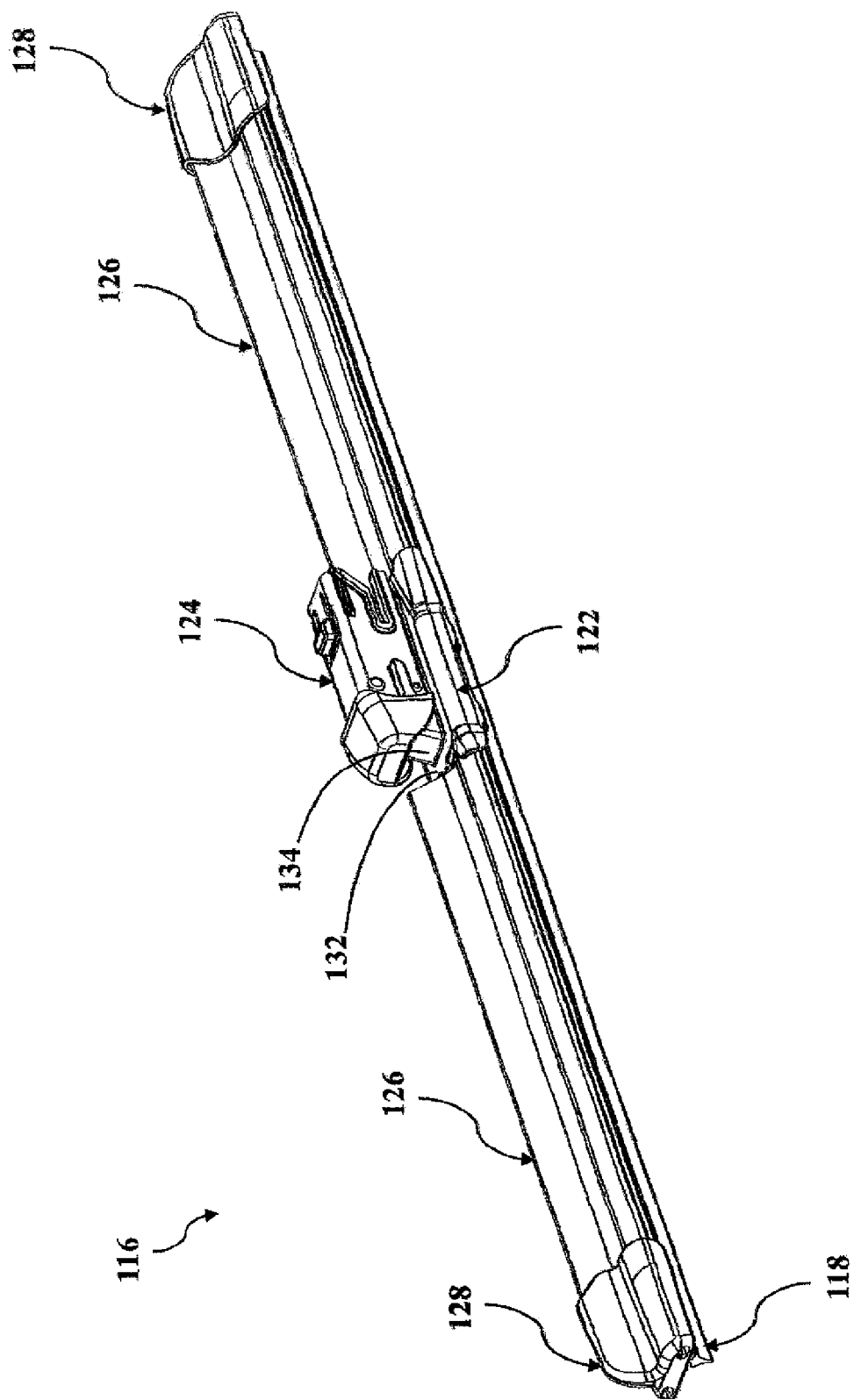
FIG. 2 is an enlarged perspective view of a wiper assembly having a coupler and an adapter pivotally mounted to the coupler according to a first embodiment of the present invention.
Figure 3:
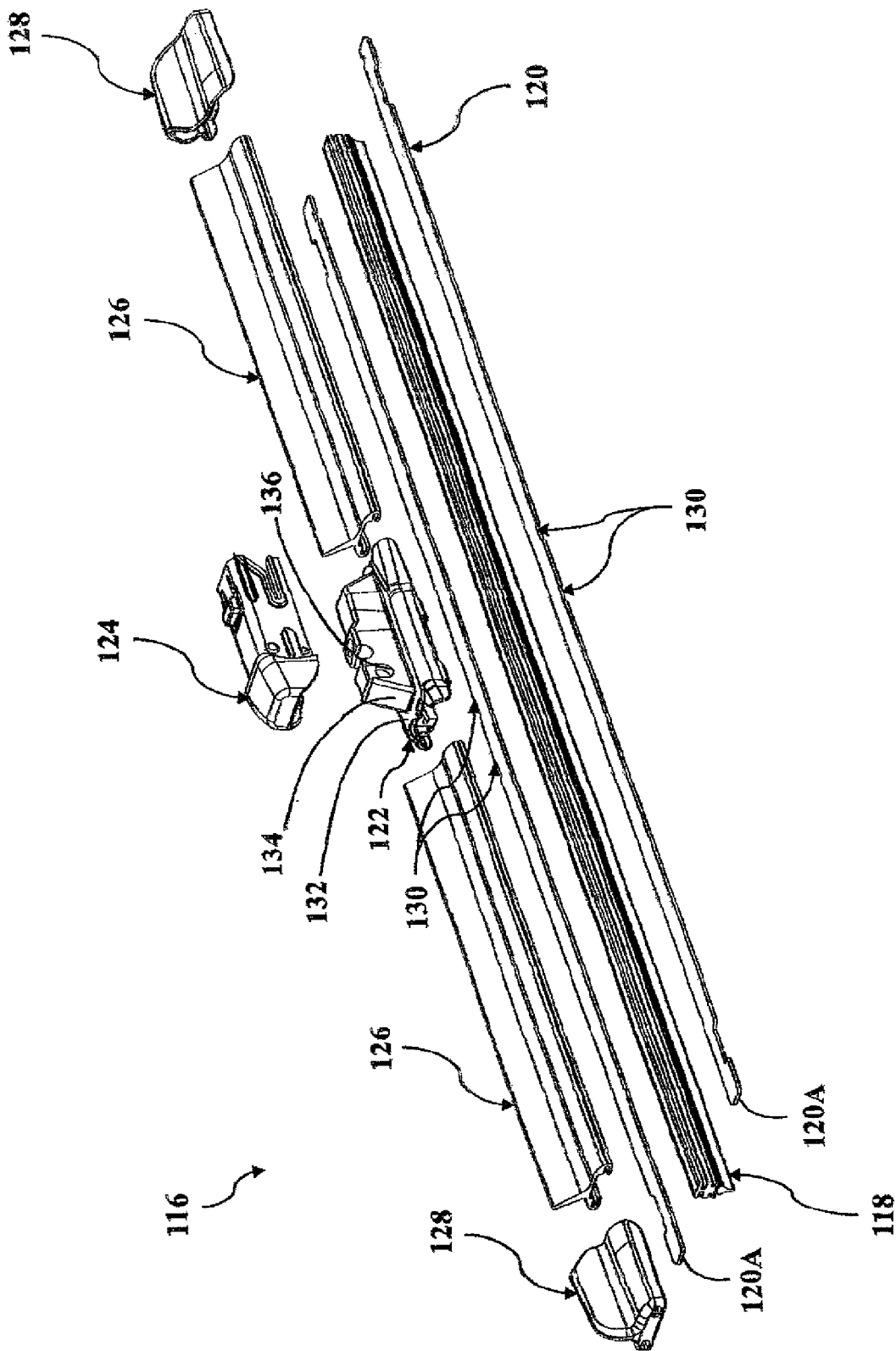
FIG. 3 is an exploded perspective view of the wiper assembly of FIG. 2.

Referring to FIGS. 2 and 3, the wiper assembly 116 includes a wiping element 118 that is adapted to contact a surface of the vehicle 100 to be wiped, in this representative example, the windshield 110. The wiper assembly 116 also includes at least one support member 120 that defines a longitudinal axis and that acts to reinforce or support the wiping element 118. In the representative embodiment illustrated herein, the support member 120 is a pair of splines 120A that operatively reinforce or support the wiping element 118. However, those having ordinary skill in the art will appreciate from the description that follows that the support member 120 may be either monolithic or defined by a pair of splines 120A. The wiper assembly 116 also includes a coupler 122 operatively attached to the support member 120. As is described in greater detail below, the coupler 122 is configured to attach to an adapter 124 which, in turn, is adapted to connect the wiper assembly 116 to the wiper arm 114. The wiper assembly 116 may also include an airfoil assembly, generally indicated at 116, to prevent the wiper assembly 116 from lifting away from the surface of the windshield 110. The wiper assembly 116 may still further include one or more end caps, generally indicated at 128, to prevent the airfoil assembly 126 from disengaging the support member 120. Each of these components will be described in greater detail below.

The wiping element 118 is configured to a predetermined length corresponding to a particular application, and is often manufactured through an extrusion process which enables the length of the wiping element 118 to be easily adjusted without a substantial increase in manufacturing expense. While the wiping element 118 is constructed from a flexible rubber, those having ordinary skill in the art will appreciate that the wiping element 118 could be constructed from any flexible material, such as silicone or another polymer, without departing from the scope of the present invention.

In the embodiment illustrated herein, the wiping element 118 has opposing grooves (not shown in detail, but generally known in the art) extending laterally therein and longitudinally therealong between the longitudinal ends of the wiping element 118. The grooves receive the splines 120A of the support member 120. This configuration is referred to in the art as a "twin rail" beam blade. However, those having ordinary skill in the art will appreciate that the support member 120 could be operatively attached to the wiping element 118 in other ways, such as by gluing, without departing from the scope of the present invention. Moreover, it will be appreciated that the wiper assembly 116 could employ one or more carriers (not shown, but generally known in the art) interposed between the support member 120 and wiping element 118 such that the support member 120 does not directly engage the wiping element 118.

The support member 120 may be constructed from a resiliently flexible material, such as spring steel or a polymer, and is adapted to apply force from an intermediate position between its longitudinal ends. More specifically, the support member 120 receives force from the spring loaded wiper arm 114 at an intermediate position and distributes this force across the span of the support member 120 toward its longitudinal ends. To that end, the support member 120 may be curved longitudinally with a predetermined radius of curvature. In the related art, this predetermined radius of curvature is sometimes referred to as a "free form" radius of curvature. Accordingly, the curvature of the support member 120 may be symmetrical or asymmetrical, depending on the force requirements of the application and the contour of the windshield 110. The flexible, free form, pre-curved support member 120 straightens out when the wiper arm 114 applies a force thereto to flatten the support member 120, and directs the wiping element 118 to contact the windshield 110. Thus, the elongated support member 120 includes a free-form curvature that ensures force distribution on windshields having various curvatures and that effects proper wrapping about the windshield 110.

As illustrated in FIG. 3, the splines 120A of the support member 120 may have a substantially constant width and a constant thickness throughout the length between the longitudinal ends of the support member 120. The constant width and thickness are adapted to provide high lateral and torsional stiffness so as to avoid lateral and torsional deflections, which cause the wiping element 118 to stick/slip ("chatter") on the windshield 110 during operation. Thus, the cross-section of the support member 120 has a generally rectangular outer profile that makes the support member 120 easier to manufacture. More specifically, where the support member 120 is constructed from metal, such as spring steel, the tools and machinery used to manufacture the support member 120 are less complicated than that required to manufacture one having varying widths and/or thickness. Furthermore, where the support member 120 is constructed from a polymer, such as a thermoplastic elastomer, the tools and extrusion process machinery are also less complicated than those employed to manufacture varying widths and/or thicknesses. However, those having ordinary skill in the art will appreciate that the support member 120 illustrated herein may include a varying thickness and/or width without departing from the scope of the present invention. Further, as mentioned above, those having ordinary skill in the art will appreciate that the support member 120 could be monolithic or a plurality of splines 120A.

The support member 120 may include one or more notches (not shown in detail) located near the longitudinal ends of the splines 120A of the support member 120, which are generally trapezoidal or rectangular in shape, but may be any shape suitable to cooperate with the end caps 128 to retain the end caps 128 to the support member 120. Additionally, the support member 120 may include one or more securing features 130 for cooperating with the coupler 122 to operatively attach the support member 120 to the coupler 122. In the embodiment illustrated in FIG. 3, the securing features 130 are formed as a plurality of rectangular notches that cooperate with the coupler 122 to secure the splines 120A of the support member 120 to the coupler 122. However, those having ordinary skill in the art will appreciate that the securing features 130 could be of any suitable shape or configuration, or could be omitted entirely, without departing from the scope of the present invention. Specifically, those having ordinary skill in the art will appreciate that the coupler 122 could be fixed to the support member 120 in several different ways. By way of non-limiting example, the coupler 122 could be glued, welded, crimped, bolted, riveted, formed-over, locked, or otherwise fixed to the support member 120 without departing from the scope of the present invention As noted above, the wiper assembly 116 also typically includes at least one airfoil assembly 126 operatively mounted to the support member 120. The airfoil assembly 126 extends substantially along the length of the wiper assembly 116 and acts to reduce the likelihood of wind lift by allowing air to flow over the wiper assembly 116. More specifically, and in the embodiment illustrated herein, the airfoil assembly 126 is formed as two individual components operatively mounted to the support member 120, with the coupler 122 disposed between the airfoils 126. However, those having ordinary skill in the art will appreciate that the airfoil assembly 126 could be formed as any suitable number of individual components without departing from the scope of the present invention. By way of non-limiting example, the airfoil assembly 126 could be defined by a single unitary component, could be integrated with the wiping element 118, or could be omitted entirely.

While the wiper assembly 116 depicted in FIGS. 2 and 3 includes airfoils 126 with asymmetric, angled profiles that extend along a substantially constant cross-section, those having ordinary skill in the art will appreciate that the airfoils 126 could be formed differently without departing from the scope of the present invention. The airfoil assembly 126 is configured to a predetermined length corresponding to a particular application, and may be manufactured by an extrusion process. However, those having ordinary skill in the art will appreciate that the airfoil assembly 126 could be constructed in other ways, such as by an injection molding, without departing from the scope of the present invention. Moreover, those having ordinary skill in the art will appreciate that manufacturing by extrusion enables the length of the airfoil assembly 126 to be easily adjusted without a substantial increase in manufacturing expense. Further still, while the airfoil assembly 126 is constructed from plastic, those having ordinary skill in the art will appreciate that the airfoil assembly 126 could be constructed from any suitable material without departing from the scope of the present invention. Moreover, while the airfoil assembly 126 is extruded from a single material, those having ordinary skill in the art will appreciate that the airfoil assembly 126 could be formed from a plurality of materials, such as by coextrusion, over-molding, skin coating, etc., without departing from the scope of the present invention.

As illustrated in FIGS. 2 and 3 and as noted above, the wiper assembly 116 includes a pair of end caps, generally indicated at 128, which are adapted to be disposed adjacent to the distal ends of the support member 120. The end caps 128 are secured to the support member 120 and may have a profile that substantially mimics the contours of the airfoil assembly 126 so as to maintain the wind lift characteristics of the wiper assembly 116 and to provide an increased aesthetic value. The end caps 128 also provide a mass increase adjacent to the distal ends of the support member 120 that helps prevent localized chatter along the extremities of the wiping element 118 caused by a combination of wind lift and a decrease in the force distributed to this area from the wiper arm 114 via the splines 120A, as described above. It will be appreciated that the end caps 128 may include a locking arm (not shown, but generally known in the art) or other features that engage notches (not shown in detail) formed in the splines 120A of the support member 120 so as to secure the end caps 128 thereto.

As previously noted, in one embodiment of the present invention, the wiper assembly 116 includes a coupler 122 operatively attached to the support member 120. As illustrated in FIG. 3, the coupler 122 includes a base portion 132 and a saddle 134 extending therefrom. The saddle 134 includes opposing cylindrical recesses 136 configured to pivotally engage the adapter 124, as is discussed more thoroughly below. However, those having ordinary skill in the art will appreciate that the coupler 122 could be connected to the adapter 124 in any suitable way without departing from the scope of the present invention. In the embodiment illustrated herein, the coupler 122 is a unitary, one piece component. However, those having ordinary skill in the art will appreciate that the coupler 122 could be designed as a plurality of components that interlock or otherwise cooperate to operatively attach to the support member 120, without departing from the scope of the present invention. The coupler 122 is constructed from plastic and is formed using an injection molding process. However, those having ordinary skill in the art will appreciate that the coupler 122 could be constructed from any suitable material formed using any suitable process without departing from the scope of the present invention.

As noted above, the adapter 124 is configured to releasably attach to the wiper arm 114. Specifically, the adapter 124 facilitates releasable attachment of the wiper assembly 116 to a wiper arm 114 having a particular type of attachment member 138, which is described more thoroughly below. Typically, the attachment member 138 is formed separately from the wiper arm 114 and then operatively attached thereto, such as by crimping or welding. However, those having ordinary skill in the art will appreciate that the attachment member 138 could also be formed integrally with the wiper arm 114.

Figure 5A:
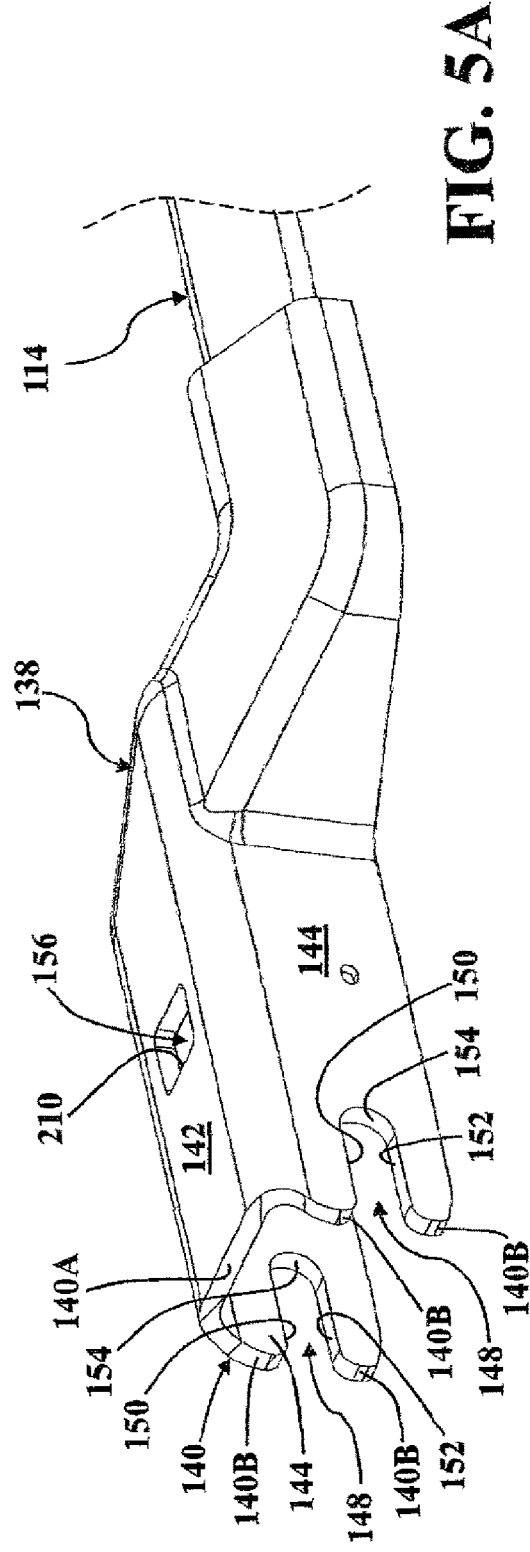
FIG. 5A is a perspective view of the wiper arm of FIG. 1, showing an attachment member configured for releasable attachment to the adapter of FIGS. 2-4B.
Figure 5B:
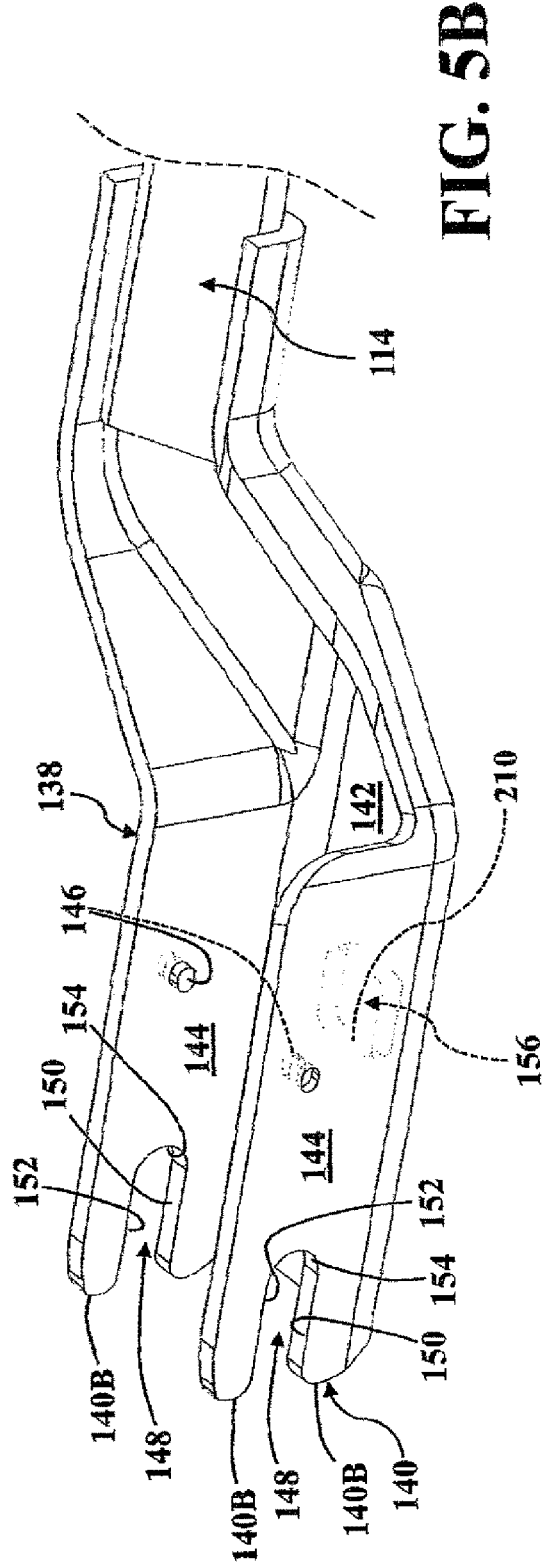
FIG. 5B is a rotated perspective view of the wiper arm and attachment member of FIG. 5A, with portions of the attachment member shown in phantom.

Referring now to FIGS. 5A-5B, the attachment member 138 extends to a terminal end 140 with an upper wall 142 and a pair of side walls 144 depending from the upper wall 142. Here, the terminal end 140 is defined by a front edge 140A of the upper wall 142 and curved edges 140B of the side walls 144 (see FIG. 5A). The side walls 144 each have an inwardly-extending protrusion 146. The protrusions 146 face each other, have a substantially rounded-rectangular profile, and are spaced longitudinally from the terminal end 140. The side walls 144 also each have a U-shaped cutout 148 formed at the terminal end 140. The cutouts 148 are formed transversely through the side walls 144 and each defines an upper cutout edge 150, a lower cutout edge 152 spaced vertically below the upper cutout edge 150, and a curve cutout edge 154 which connects the upper cutout edge 150 and the lower cutout edge 152 and which faces the terminal end 140. The attachment member 138 also has an aperture 156 formed in the upper wall 144. The aperture 156 has a rounded-rectangular profile and is spaced vertically above the protrusions 146 and longitudinally from the terminal end 140. In FIG. 5B, the aperture 156 and portions of the protrusions 146 are shown in phantom. Those having ordinary skill in the art will appreciate from the discussion that follows that neither the wiper arm 114 nor the attachment member 138 described above form part of the present invention.

As will be appreciated from the subsequent description below, the present invention is directed towards adapters 124, and wiper blade assemblies 116 which employ those adapters 124, configured so as to facilitate releasable attachment to the specific type of attachment member 138 described herein. More specifically, twenty discrete adapter 124 embodiments are described herein. As a threshold matter, those having ordinary skill in the art will appreciate that certain structural features shown in connection with the various embodiments could be re-arranged or otherwise combined with structural features of various other embodiments without departing from the scope of the present invention, as is discussed in greater detail below.

Referring again to FIGS. 4-5, a first embodiment of the adapter 124 of the present invention is shown. The adapter 124 includes a body, generally indicated at 158, that has a first end 160 and a second end 162. A stop, generally indicated at 164, is formed on the body 158 at the first end 160. The stop 164 is arranged so as to abut the terminal end 140 of the attachment member 138. At least one slot 166 is formed in the body 158 at the second end 162. The slot 166 is arranged so as to receive one of the protrusions 146 of the attachment member 138. A resilient finger, generally indicated at 168, is operatively attached to the body 160 and has a tooth 170 arranged so as to engage the aperture 156 of the attachment member 138 so as to prevent longitudinal movement between the adapter 124 and the attachment member 138 when the stop 164 abuts the terminal end 140 of the attachment member 138, as described in greater detail below. At least one brace, generally indicated at 172, is formed on the body 158 at the first end 160. The brace 172 is arranged so as to be received in one of the cutouts 148 of the attachment member 138 when the tooth 170 of the resilient finger 168 engages the aperture 156 of the attachment member 138, wherein the brace 172 at least partially abuts the lower cutout edge 152 of the attachment member 138 and remains spaced from the upper cutout edge 150 of the attachment member 138 (see FIG. 9). The body 158, stop 164, slot 166, resilient finger 168, tooth 170, and brace 172 of the adapter 124 cooperate to effect releasable securing of the wiper assembly 116 to the wiper arm 114. Each of these components will be described in greater detail below.

Figure 9:
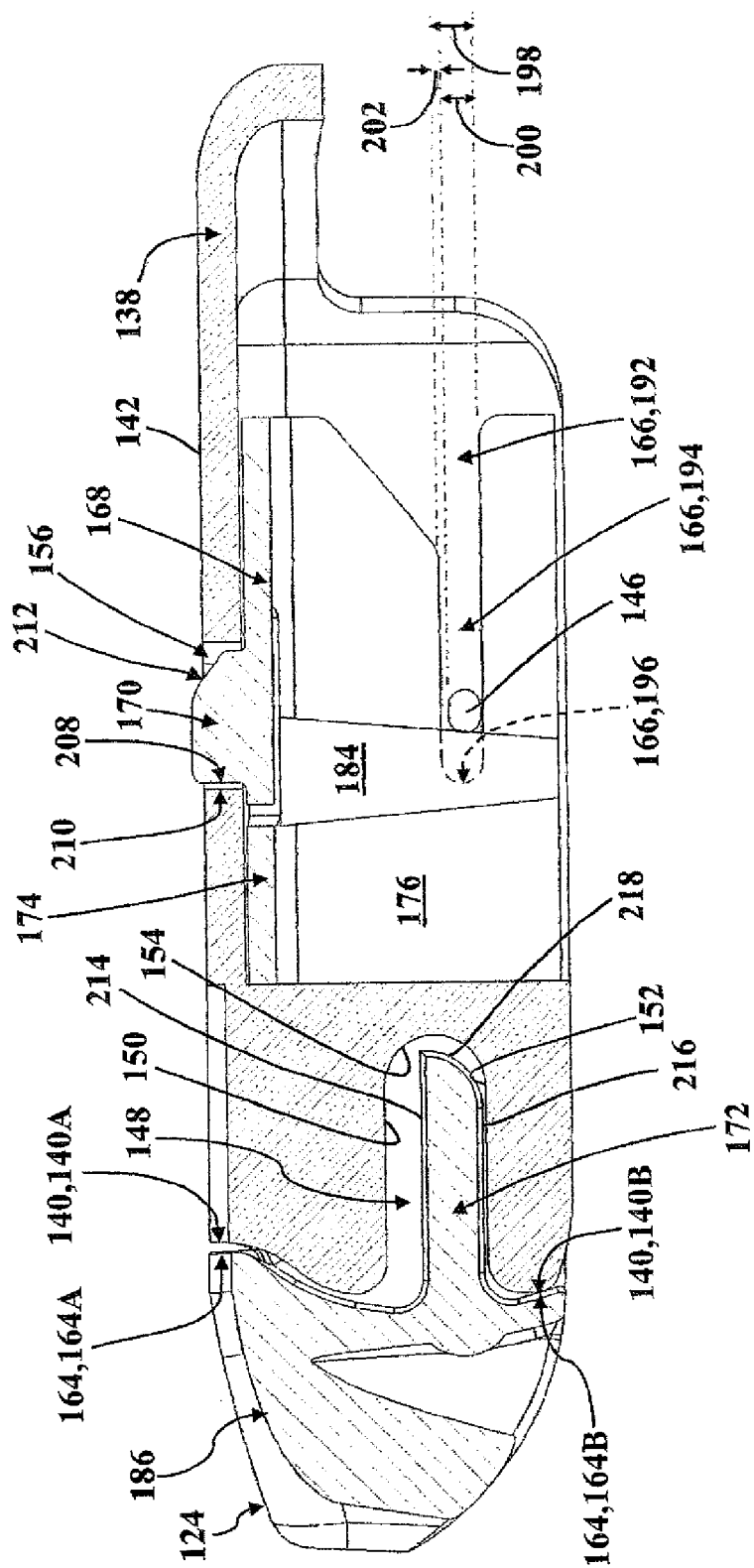
FIG. 9 is a sectional view taken along line 9-9 of FIG. 8A, showing the adapter and the attachment member secured in the fourth configuration with a portion of the adapter shown in phantom.
Figure 10:
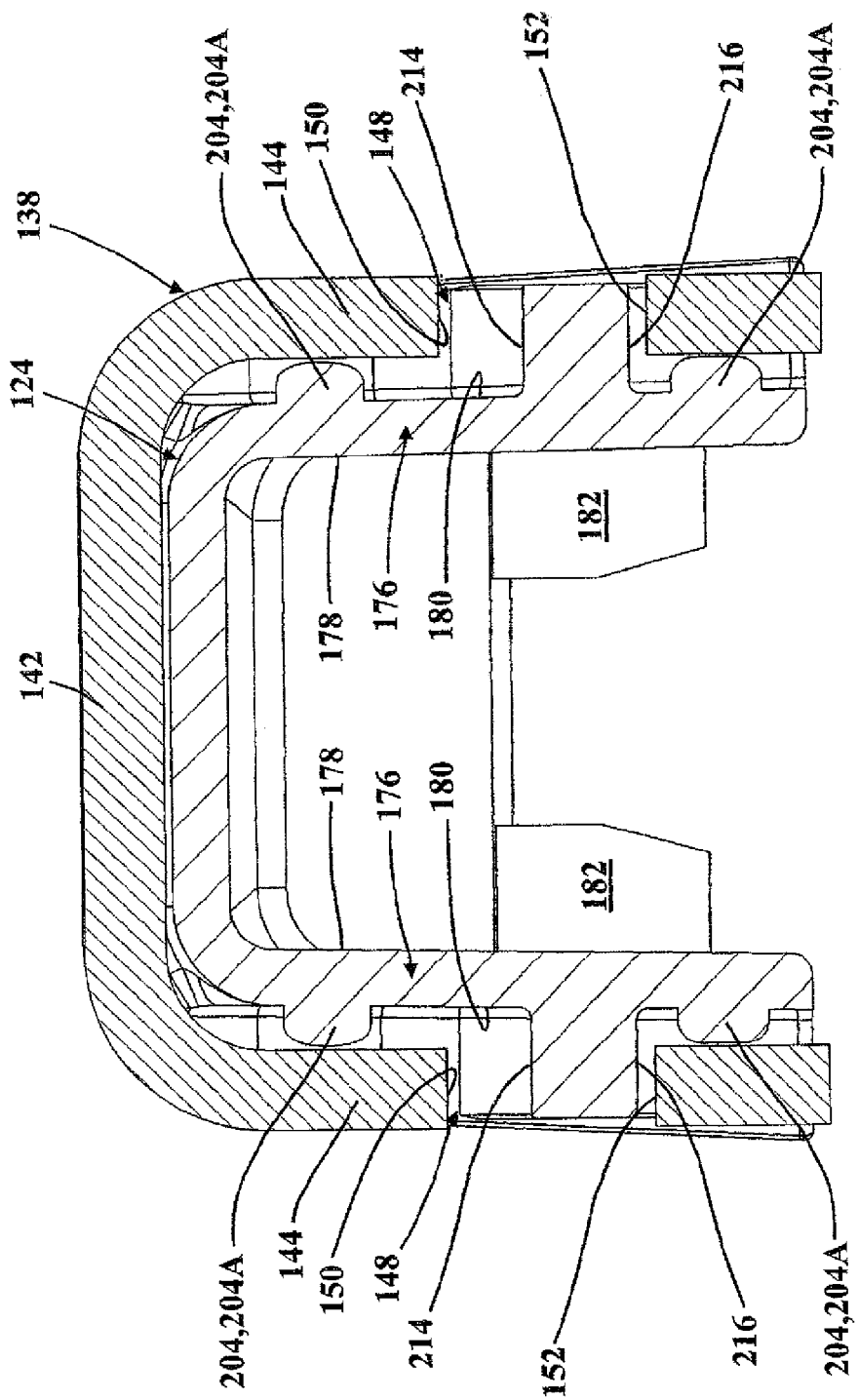
FIG. 10 is a sectional view taken along line 10-10 of FIG. 8B, showing the adapter and the attachment member secured in the fourth configuration.
Figure 11:
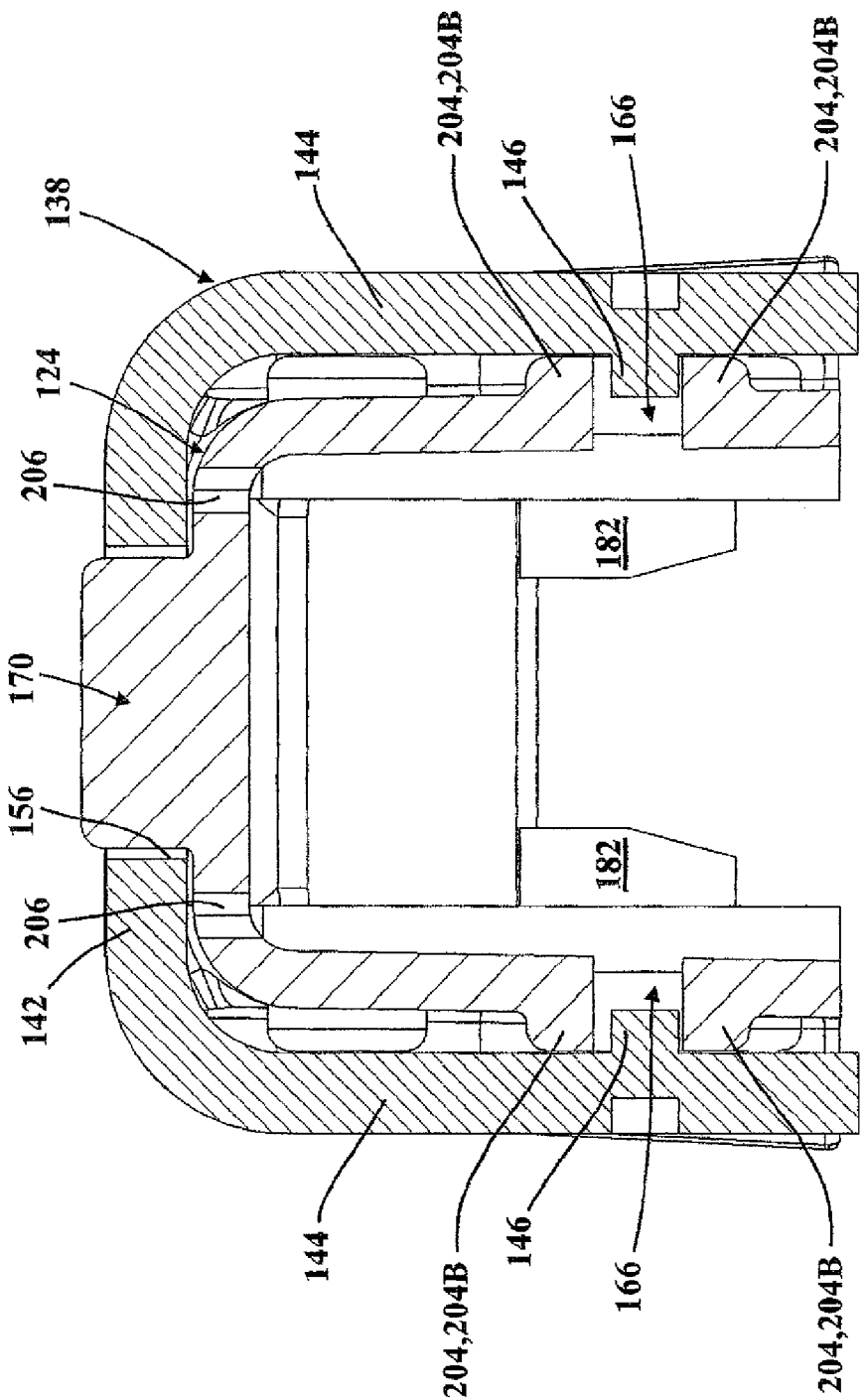
FIG. 11 is a sectional view taken along line 11-11 of FIG. 8B, showing the adapter and the attachment member secured in the fourth configuration.

With reference now to FIGS. 2-4B and 9-11, as noted above, the adapter 124 is pivotally mounted to the coupler 122 which, in turn, is operatively attached to the support member 120. The body 158 of the adapter 124 includes a deck 174 extending between the first end 160 and the second end 162, and a pair of opposing sidewalls 176 depending from the deck 174. The sidewalls 176 of the adapter 124 each have an inner surface 178 and an outer surface 180 (see FIGS. 4A-4B). As shown in FIGS. 9 and 11, in this embodiment, the sidewalls 176 each extend from the deck 174 at an obtuse angle such that the sidewalls 176 are angled away from each other. However, it will be appreciated that the sidewalls 176 could extend in any suitable way, including extending substantially perpendicular to the deck 174, without departing from the scope of the present invention. Similarly, while the inner surface 178 of each sidewall 176 is substantially parallel to the respective outer surface 180 of the sidewall 176 in this embodiment, those having ordinary skill in the art will appreciate that the surfaces 178, 180 of the sidewalls 176 could be arranged, disposed, or otherwise configured in any suitable way without departing from the scope of the present invention.

Figure 4A:
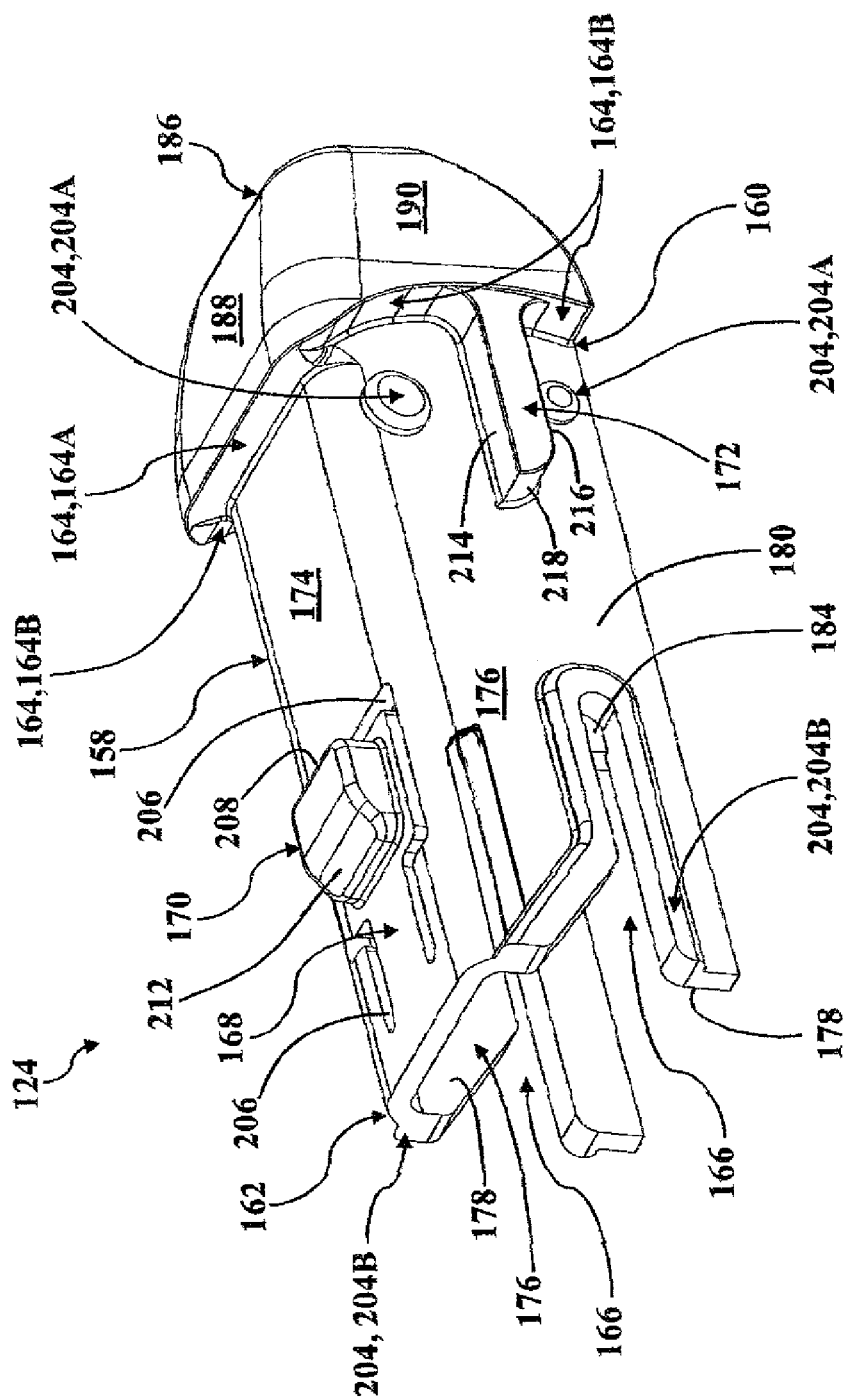
FIG. 4A is an enlarged perspective view of the adapter of FIGS. 2-3.
Figure 4B:
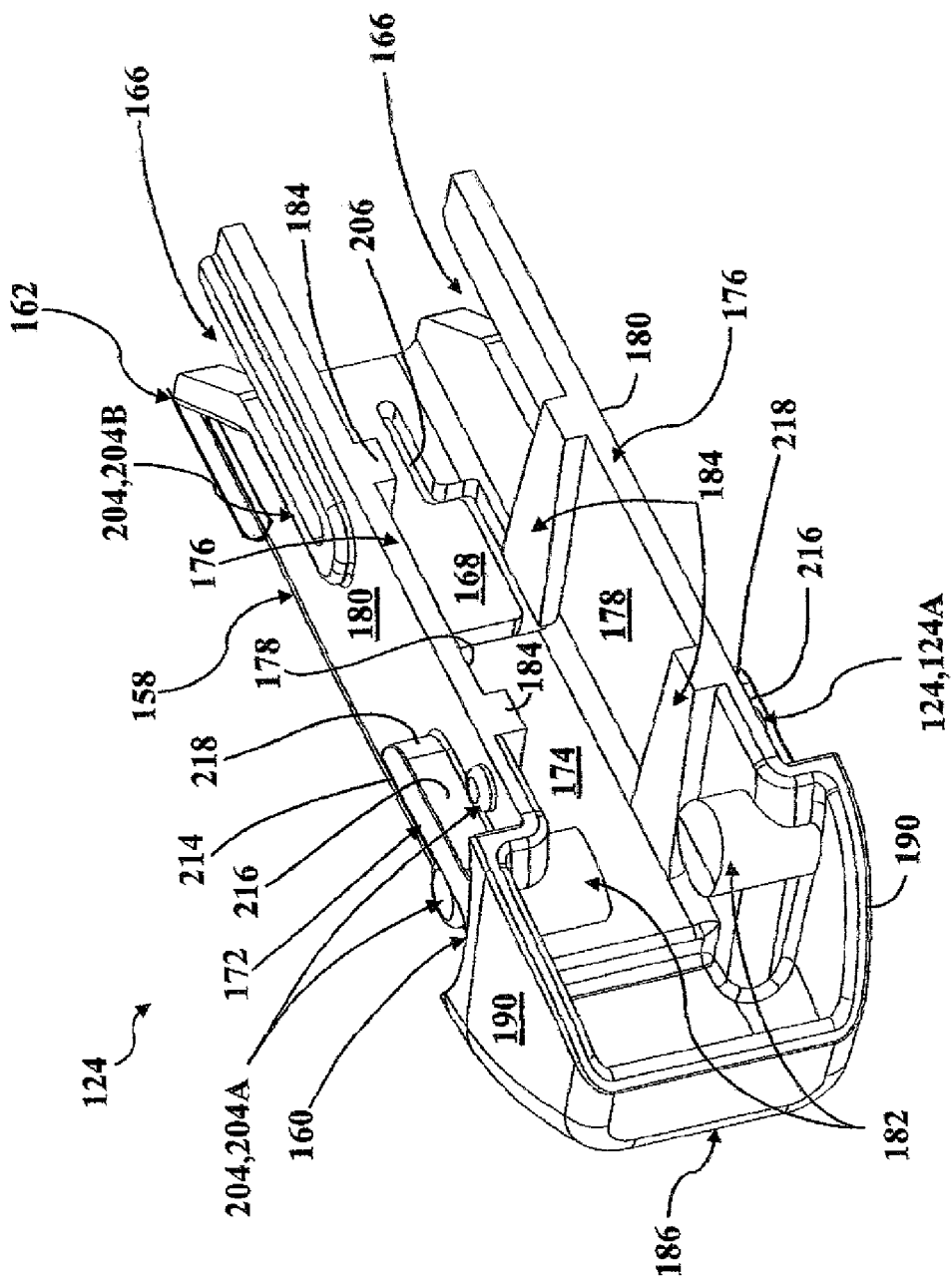
FIG. 4B is a rotated perspective view of the adapter of FIGS. 2-4A.

As shown best in FIG. 4B, a pair of inwardly-facing trunnions 182 are disposed at the first end 160 of the body 158. The trunnions 182 are integrally formed with the body 158, extend towards each other from the respective inner surfaces 178 of the sidewalls 176, and are configured to be disposed in the recesses 136 formed in the saddle 134 of the coupler 122 so as to effect pivoting of the adapter 124 mounted to the coupler 122. While the various embodiments of the adapter 124 described herein employ integrally-formed trunnions 182 positioned adjacent to the first end 160 of the body 158, those having ordinary skill in the art will appreciated that the adapter 124 could employ different structure and/or components to effect pivoting with respect to the coupler 122 without departing from the scope of the present invention. By way of non-limiting example, the arrangement of trunnions 182 and recesses 136 could be interchanged such that the coupler 122 could be provided with trunnions and recesses could be formed in the adapter 124, or an additional component such as a pin could be employed to engage in corresponding bearing bores and/or knocks formed in the adapter 124 and/or the coupler 122.

In one embodiment, the adapter 124 includes at least one dampening formation 184 configured to at least partially engage a portion of the saddle 134 of the coupler 122 so as to effect rotation dampening between the adapter 124 and the coupler 122 in use. It will be appreciated that the dampening formations 184 also provide rigidity to the body 158 of the adapter 124. As shown in FIG. 4B, each of the sidewalls 176 includes a respective pair of inwardly-facing and vertically-extending dampening formations 184. However, those having ordinary skill in the art will appreciate that the adapter 124 could employ any suitable number of dampening formations 184 configured in any suitable way, or could omit dampening formations 184 altogether, without departing from the scope of the present invention.

As noted above, in this embodiment, the adapter 124 includes at least one stop 164 formed on the body 158 at the first end 160 for abutting the terminal end 140 of the attachment member 138. In the first representative embodiment illustrated herein, the adapter 124 includes a head, generally indicated at 186, formed on the body 158 at the first end 160 which, in turn, defines the stop 164. More specifically, the head 186 of the adapter 124 extends vertically outwardly from the deck 174 to a head upper surface 188 so as to define a front stop 164A, and also extends outwardly from each of the sidewalls 176 to respective head side surfaces 190 so as to define respective side stops 164B (see FIGS. 4A-4B). The head upper surface 188 extends between and merges with the head side surfaces 190, and the surfaces 188, 190 are shaped so as to give the head 186 a smooth, tapered profile which compliments the shape and profile of the attachment member 138, thereby providing increased aesthetic value. However, those having ordinary skill in the art will appreciate that the head upper surface 188 and/or the head side surfaces 190 could be arranged or otherwise configured differently without departing from the scope of the present invention.

The front stop 164A is arranged to abut the front edge 140A of the terminal end 140 defined by the upper wall 142 of the attachment member 138, and the side stops 164B are each arranged to abut one of the side edges 140B of the terminal end 140 defined by the respective side walls 144 of the attachment member 138, as noted above. However, as is reflected in the discussion of subsequent embodiments of the present invention described in greater detail below, those having ordinary skill in the art will appreciate that the stop 164 of the adapter 124 could be configured in any suitable way sufficient to abut any suitable part of the terminal end 140 of the attachment member 138, with or without the use of a head 186 as described above, without departing from the scope of the present invention. By way of non-limiting example, the stop 164 could be realized by a protrusion extending vertically from the deck 174 of the adapter 124 arranged to abut only the front edge 140A of the terminal end 140 of the attachment member 138. By way of further non-limiting example, the stop 164 could be realized by a protrusion extending transversely from one of the sidewalls 176 of the adapter 124 arranged to abut only one of the side edges 140B of the terminal end 140 of the attachment member 138.

As noted above, the adapter 124 includes at least one slot 166 formed in the body 158 at the second end 162 for receiving one of the protrusions 146 of the attachment member 138. In the first representative embodiment illustrated herein, the adapter 124 has a pair of slots 166 formed at the second end 162, which each receive one of the protrusions 146 of the attachment member 138. The slots 166 extend longitudinally from the second end 162 of the body 158 towards the first end 160 of the body 158. More specifically, the slots 166 each have an opening 192, a channel 194, and a floor 196 (see FIG. 9). The opening 192 is disposed at the second end 162 of the body 158 and tapers so as to merge with the channel 194. The channel 194 extends longitudinally towards the first end 160 to the floor 196, which has a rounded profile in this embodiment. As will be appreciated from the subsequent description of the configurations shown throughout FIGS. 6A-6D, the opening 192 is configured so as to guide the attachment member 138 with respect to the adapter 124 during connection between the wiper assembly 116 and the wiper arm 114, and helps facilitate alignment between the various components and structure of the first embodiment of the adapter 124 and the attachment member 138.

In FIG. 9, the floors 196 and a portion of the channels 194 of the slots 166 are shown in phantom behind one of the dampening formations 184, which partially extend into the slots 166 in this embodiment (see FIG. 4A). With continued reference to FIG. 9, the protrusions 146 are accommodated in the respective channels 194 of the slots 166 when the adapter 124 is secured to the attachment member 138. In this embodiment, the channels 194 have a substantially rectangular profile with a width 198 that is greater than a height 200 of the protrusions 146. In one embodiment, a gap 202 is defined by the difference in the width 198 of the channels 194 and the height 200 of the protrusions 146. It will be appreciated that the presence of the gap 202 can help ensure smooth engagement of the protrusions 146 in the slots 166, and can help compensate for variations in manufacturing tolerances of the attachment member 138. Similarly, as shown in FIG. 9, the protrusions 146 are spaced longitudinally from the respective floors 196 of the slots 166 to help compensate for variations in manufacturing tolerances of the attachment member 138. However, those having ordinary skill in the art will appreciate that the slots 166 could be configured in a number of different ways sufficient to receive the protrusions 146 without departing from the scope of the present invention. By way of non-limiting example, the channels 194 of the slots 166 could have a tapered or other profile, and/or a width 198 sized so as to provide minimal gap 202 so as to restrict relative movement of the protrusions 146 in the slots 166. Similarly, it is conceivable that the channels 194 could be configured such that the protrusions 146 at least partially abut a portion of the respective floors 196 when the adapter 124 is secured to the attachment member 138.

With reference now to FIGS. 4A-4B, 10, and 11, in one embodiment, the adapter 124 includes at least one lateral formation, generally indicated at 204, which extends outwardly from one of the sidewalls 176 and which is arranged to abut one of the side walls 144 of the attachment member 138. As described in greater detail below, a plurality of lateral formations 204 are arranged on each of the sidewalls 176 of the adapter 124 so as to minimize lateral play between the attachment member 138 and the secured adapter 124. In the first representative embodiment, each sidewall 176 of the adapter 124 includes a pair of vertically spaced apart front lateral formations 204A and a rear lateral formation 204B. The front lateral formations 204A are formed adjacent to the first end 160 of the body 158, and the rear lateral formations 204B are formed adjacent to the second end 162 of the body 158. Both front lateral formations 204A formed on each of the sidewalls 176 of the adapter 124 have rounded-cylindrical profiles and are sized and spaced so as to abut the respective side wall 144 of the attachment member 138 adjacent to the cutout 148 (see FIG. 10). More specifically, in this embodiment, each brace 172 of the adapter 124 is interposed vertically between each pair of front lateral formations 204A (see also FIG. 7B). The rear lateral formations 204B have profiles that are complimentary to and border the profile of the slots 166 described above and have a portion also extending longitudinally parallel along a portion of the deck 174 to form a generally Z-shaped formation. Here, each rear lateral formation 204B extends outwardly from the respective sidewall 176 of the adapter 124 adjacent to the slot 166 so as to abut the respective side wall 144 of the attachment member 138 adjacent to the protrusions 146 (see FIG. 11) and also abut the side wall 144 adjacent the top wall 142 to laterally align the sidewall 176 with the side wall 144. In the first representative embodiment illustrated herein, the slots 166 are congruently formed in both the sidewalls 176 and the rear lateral formations 204B so as to receive the protrusions 146.

As noted above, in this embodiment, the adapter 124 includes a resilient finger 168 operatively attached to the body 158 with a tooth 170 which extends vertically so as to engage the aperture 156 of the attachment member 138. Here, the resilient finger 168 extends into a window 206 formed in the deck 174 of the adapter between the first end 160 and the second end 162. Here, the resilient finger 168 extends longitudinally towards the first end 160. The tooth 170 of the resilient finger 168 has a generally rounded-rectangular profile that compliments the profile of the aperture 156 of the attachment member 138. As shown best in FIG. 9, the tooth 170 has a tooth face 208 arranged to abut a corresponding aperture face 210 of the aperture 156 of the attachment member 138. The tooth 170 also has a cam face 212 which faces away from the tooth face 208 arranged so as to deflect the resilient finger 168 and tooth 170 downwardly into the window 206 in response to engagement with the terminal end 140 of the attachment member 138. Specifically, in this embodiment, the front edge 140A of the attachment member 138 engages the cam face 212 of the tooth 170 so as to deflect the resilient finger 168 and tooth 170 downwardly until the aperture 156 of the attachment member 138 comes into longitudinal alignment with the tooth 170, after which the resilient finger 168 returns upwardly out of the window 206 and the tooth face 208 of the tooth 170 abuts the aperture face 210 of the aperture 156 so as to restrict longitudinal movement between the attachment member 138 and the adapter 124.

As noted above, in the first embodiment, the adapter 124 includes at least one brace 172 formed on the body 158 at the first end 160 for being received in one of the cutouts 148 of the attachment member 138. In the first embodiment, the adapter 124 includes a pair of braces 172, each brace 172 extending outwardly from one of the sidewalls 176 and merging longitudinally with the head 186. However, as will be appreciated from the discussion of the subsequent embodiments of the adapter 124 described below, the adapter 124 could be configured in a number of different ways, such as with only a single brace 172, without departing from the scope of the present invention.

As shown best in FIG. 9, the braces 172 each have an upper brace surface 214, a lower brace surface 216, and a curve brace surface 218. In this embodiment, when the attachment member 138 is secured to the adapter 124, the lower brace surface 216 at least partially abuts the lower cutout edge 152 of the cutout 148 and the upper brace surface 214 is spaced below the upper cutout edge 150 of the cutout 148. More specifically, in the first embodiment, no portion of the adapter 124 engages or otherwise abuts the upper cutout edge 150 of the cutout 148 of the attachment member 138. As shown in FIGS. 8B and 9, the upper brace surface 214 extends closer to the second end 162 of the body 158 of the adapter 124 than the lower brace surface 216. Here, the lower brace surface 216 extends to and merges with the curve brace surface 218 which, in turn, curves upward to and merges with the upper brace surface 214. In this embodiment, the curve brace surface 218 is spaced longitudinally from the curve cutout edge 154 of the cutout 148. However, as will be appreciated from the discussion of the subsequent embodiments described below, the braces 172 could be configured such that the curve brace surface 218 abuts or otherwise engages a portion of the cutout edge 154 of the cutout 148 when the adapter 124 is secured to the attachment member 138.

Figure 6A:
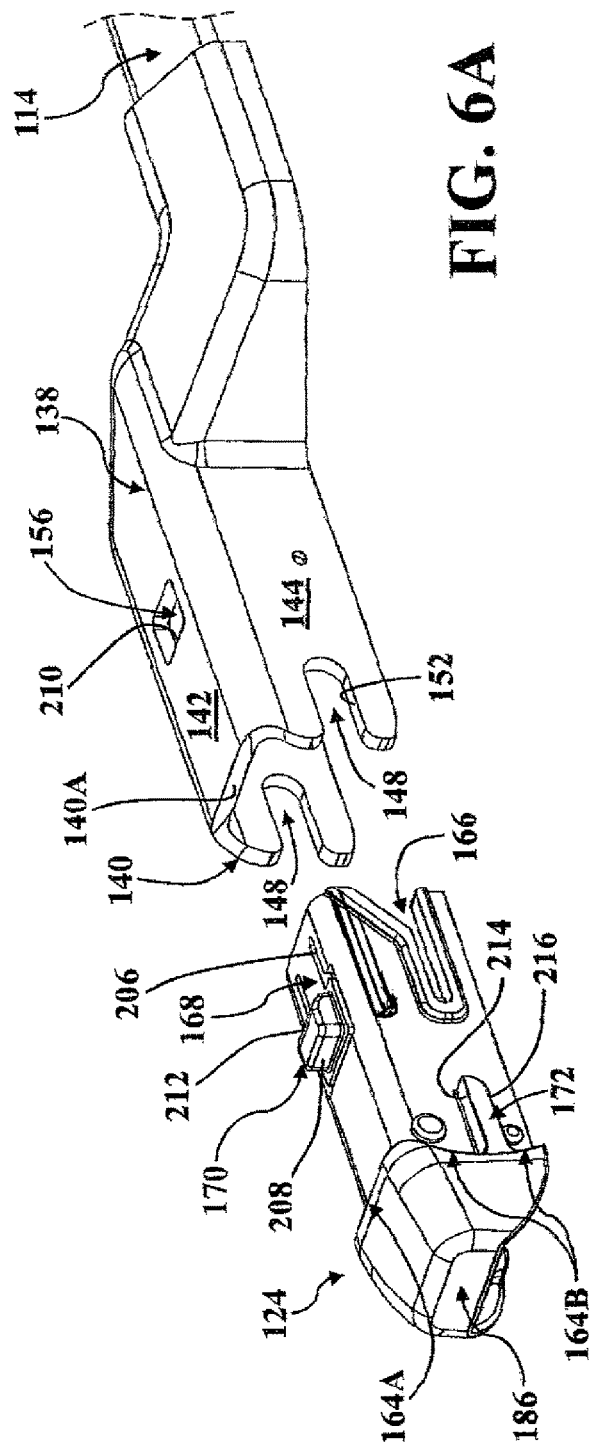
FIG. 6A is a perspective view of the adapter of FIGS. 2-4B shown in a first configuration spaced from the attachment member of FIGS. 5A-5B.
Figure 6B:
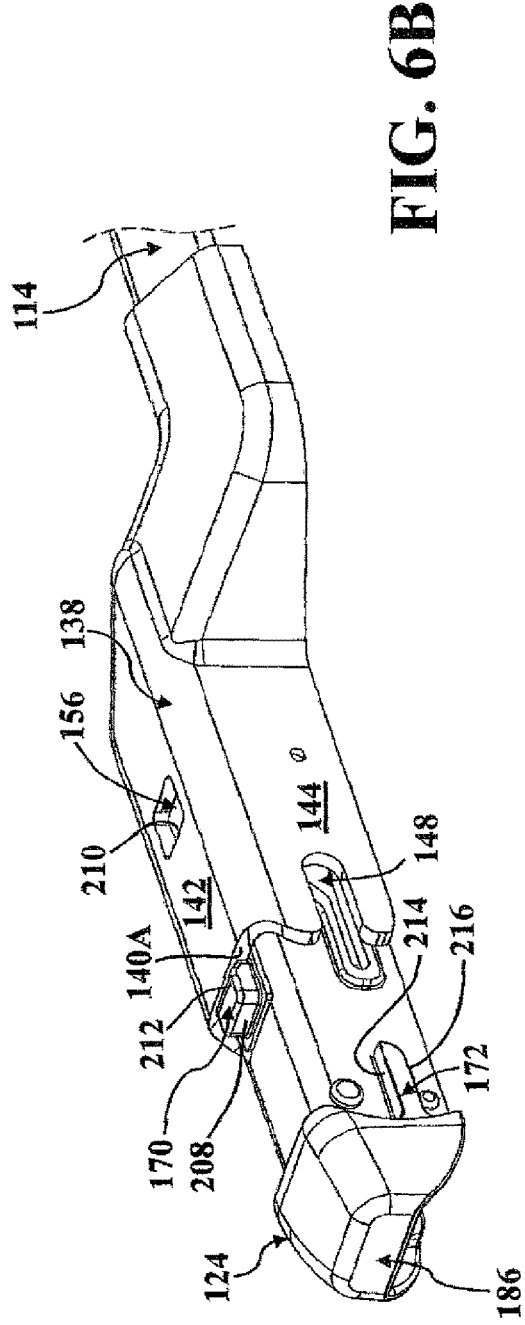
FIG. 6B is a perspective view of the adapter and the attachment member of FIG. 6A shown in a second configuration with the attachment member beginning to slide into engagement with the adapter.
Figure 6C:
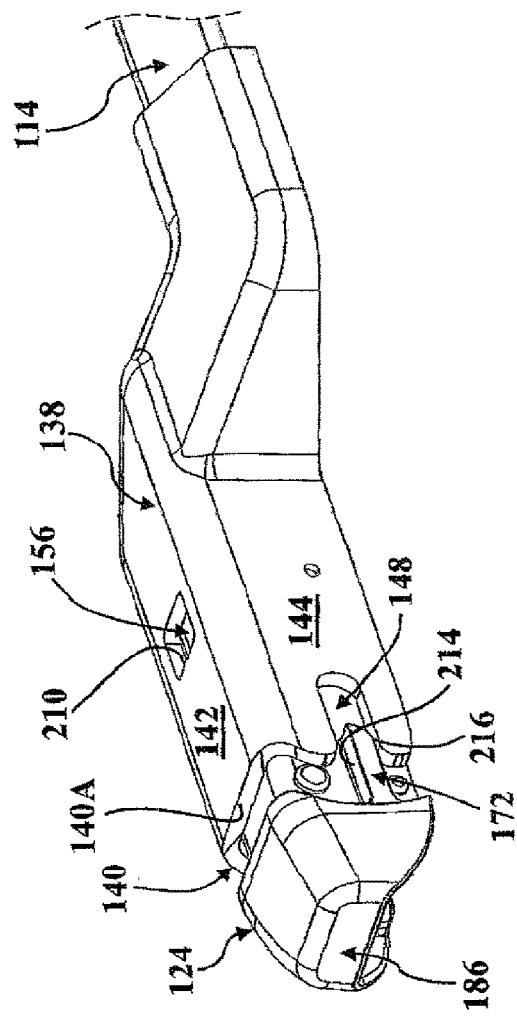
FIG. 6C is a perspective view of the adapter and the attachment member of FIGS. 6A-6B shown in a third configuration with the attachment member continuing to slide into engagement with the adapter.
Figure 6D:
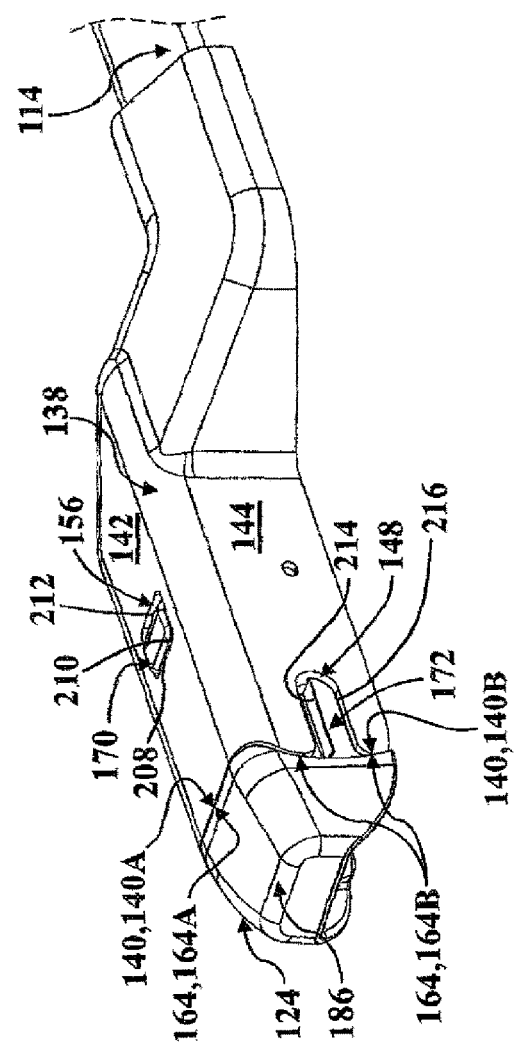
FIG. 6D is a perspective view of the adapter and the attachment member of FIGS. 6A-6C shown in a fourth configuration with the adapter secured to the attachment member.

In operation, to effect proper connection to the wiper arm 114, the first embodiment of the adapter 124 of the wiper assembly 116 is positioned in a first configuration such that the attachment member 138 is near the adapter 124 (see FIG. 6A). Next, the attachment member 138 is brought into engagement with the adapter 124 until a second configuration is achieved in which the front edge 140A of the terminal end 140 of the attachment member 138 comes into contact with the cam face 212 of the tooth 170 of the resilient finger 168 of the adapter 124 (see FIG. 6B). As the attachment member 138 is moved longitudinally towards the first end 160 of the adapter 124, the protrusions 146 of the attachment member 138 enter the openings 192 of the slots 166 of the adapter 124, which then guide the protrusions 146 into the channels 194 of the slots 166 and, at the same time, help deflect the tooth 170 and the resilient finger 168 downwardly into the window 206 as the lower brace surfaces 216 of the braces 172 come into abutment with the lower cutout edges 152 of the cutouts 148 of the attachment member 138 (see FIG. 6C). As the attachment member 138 is moved longitudinally further towards the first end 160 of the adapter 124, the terminal end 140 of the attachment member 138 comes into abutment with the stop 164 of the adapter 124 as the aperture 156 of the attachment member 138 comes into longitudinal alignment with the tooth 170 of the adapter 124 in a fourth configuration, whereby the resilient finger 168 returns upwardly out of the window 206 and the tooth face 208 of the tooth 170 abuts the aperture face 210 of the aperture 156 so as to restrict longitudinal movement between the attachment member 138 and the adapter 124 (see FIG. 6D).

Figure 12A:
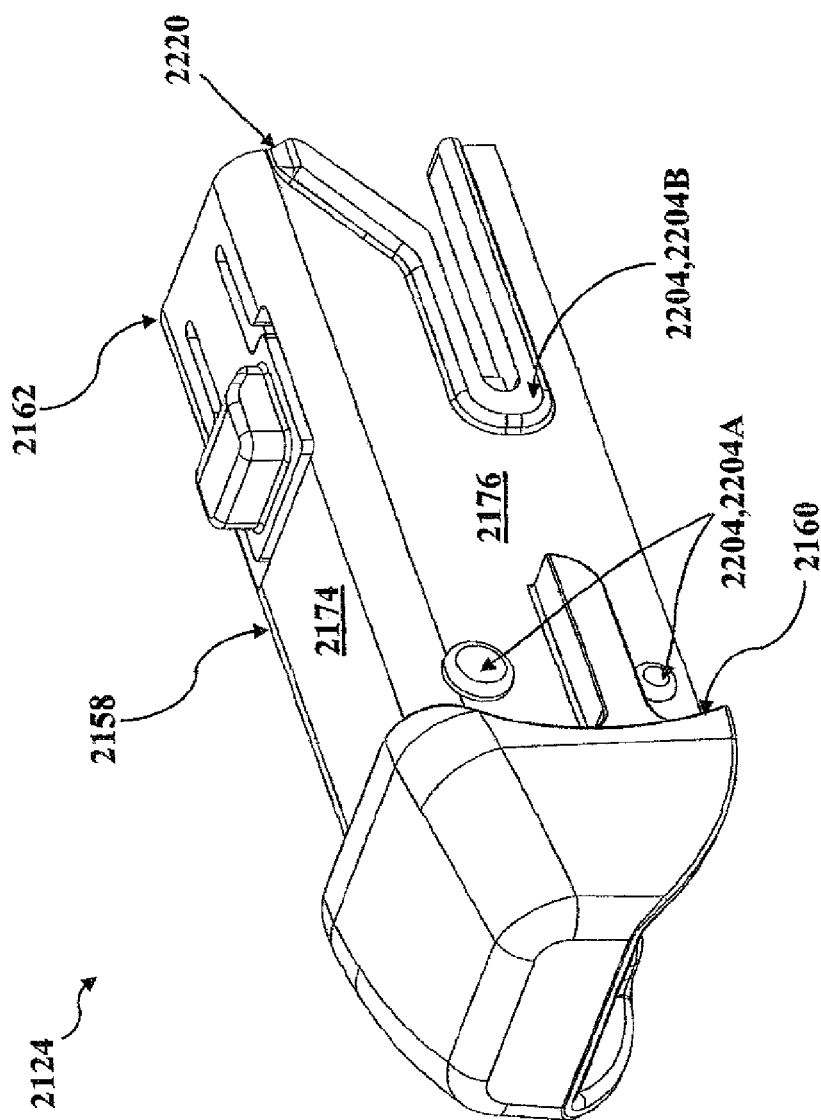
FIG. 12A is a perspective view of an adapter according to a second embodiment.
Figure 12B:
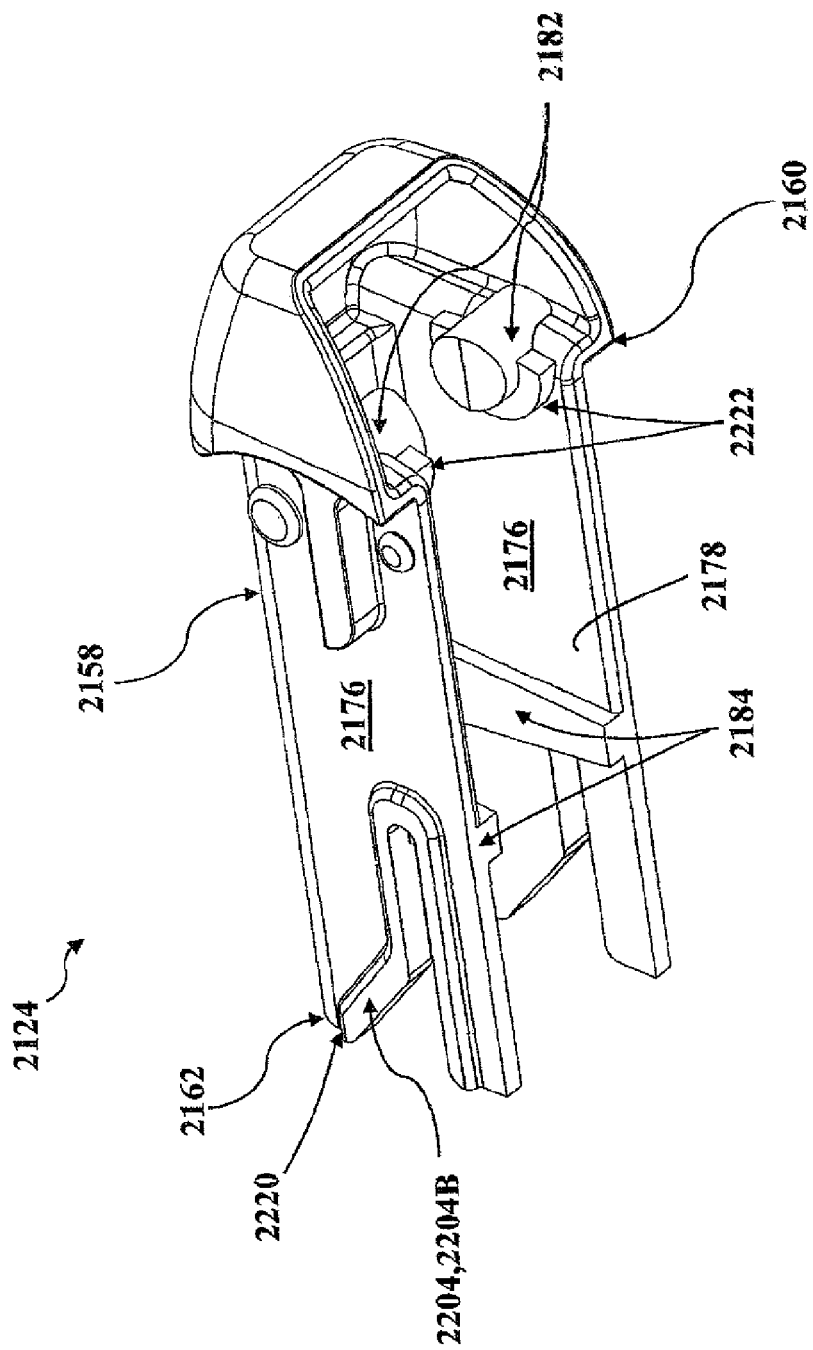
FIG. 12B is a rotated perspective view of the adapter of FIG. 12A.

As noted above, a second embodiment of the adapter of the wiper assembly 116 is shown in FIGS. 12A-12B. In the description that follows, the structure and components of the second embodiment that are the same as or that otherwise correspond to the structure and components of the first embodiment are provided with the same reference numerals increased by 2000.

The second embodiment of the adapter 2124 is depicted in FIGS. 12A-12B, and is substantially similar to the first embodiment of the adapter 124 described above. Thus, for the purposes of clarity and consistency, only the specific differences between the second embodiment of the adapter 2124 and the first embodiment of the adapter 124 will be described below and only certain structural features and components common between the embodiments will be discussed herein and depicted in the drawings of the second embodiment of the adapter 2124. Unless otherwise indicated below, it will be appreciated that the description of the first embodiment of the adapter 124 above may be incorporated by reference with respect to the second embodiment of the adapter 2124 without limitation.

As shown in FIG. 12A, in the second embodiment, the adapter 2124 further includes a pair of rear chamfers 2220 adjacent to the second end 2162 of the body 2158. The rear chamfers 2220 are arranged at an oblique angle with respect to the sidewalls 2176 and the deck 2174, and are formed in the rear lateral formations 2204. It will be appreciated that the rear chamfers 2220 help facilitate assembly of the adapter 2124 with the attachment member 138. Specifically, the chamfers 2220 are arranged so as to help laterally align the adapter 2124 and the attachment member 138.

As shown in FIG. 12B, the second embodiment of the adapter 2124 includes dampening formations 2184 which are formed similarly to the first embodiment of the adapter 124 described above (compare FIG. 12B to FIG. 4B). Specifically, the adapter 2124 includes a single pair of inwardly-facing and vertically-extending dampening formations 2184 formed adjacent to the second end 2162 of the body 2158, and the adapter 2124 also includes a pair of bearing dampening formations 2222 formed at the trunnions 2182. The bearing dampening formations 2222 are inwardly-facing, have a substantially c-shaped profile, and extend laterally from the inner surfaces 2178 of the respective sidewalls 2176 of the adapter 2124 adjacent to the first end 2160 of the body 2158.

As noted above, a third embodiment of the adapter of the wiper assembly 116 is shown in FIGS. 13A-14, 17, 18, 23, 26A-26C, and 29. In the description that follows, the structure and components of the third embodiment that are the same as or that otherwise correspond to the structure and components of the first embodiment are provided with the same reference numerals increased by 3000.

Figure 13A:
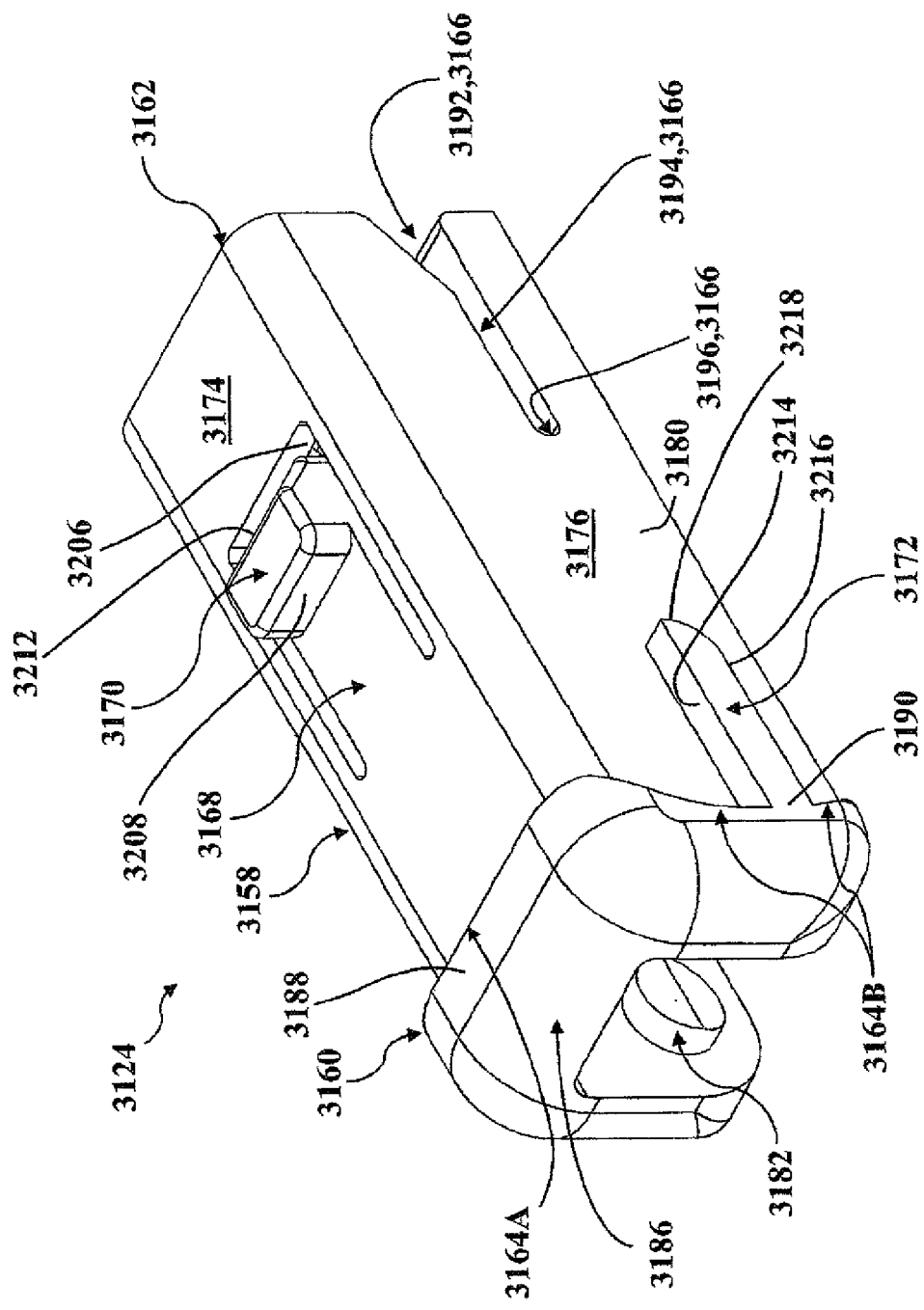
FIG. 13A is a perspective view of an adapter according to a third embodiment.
Figure 13B:
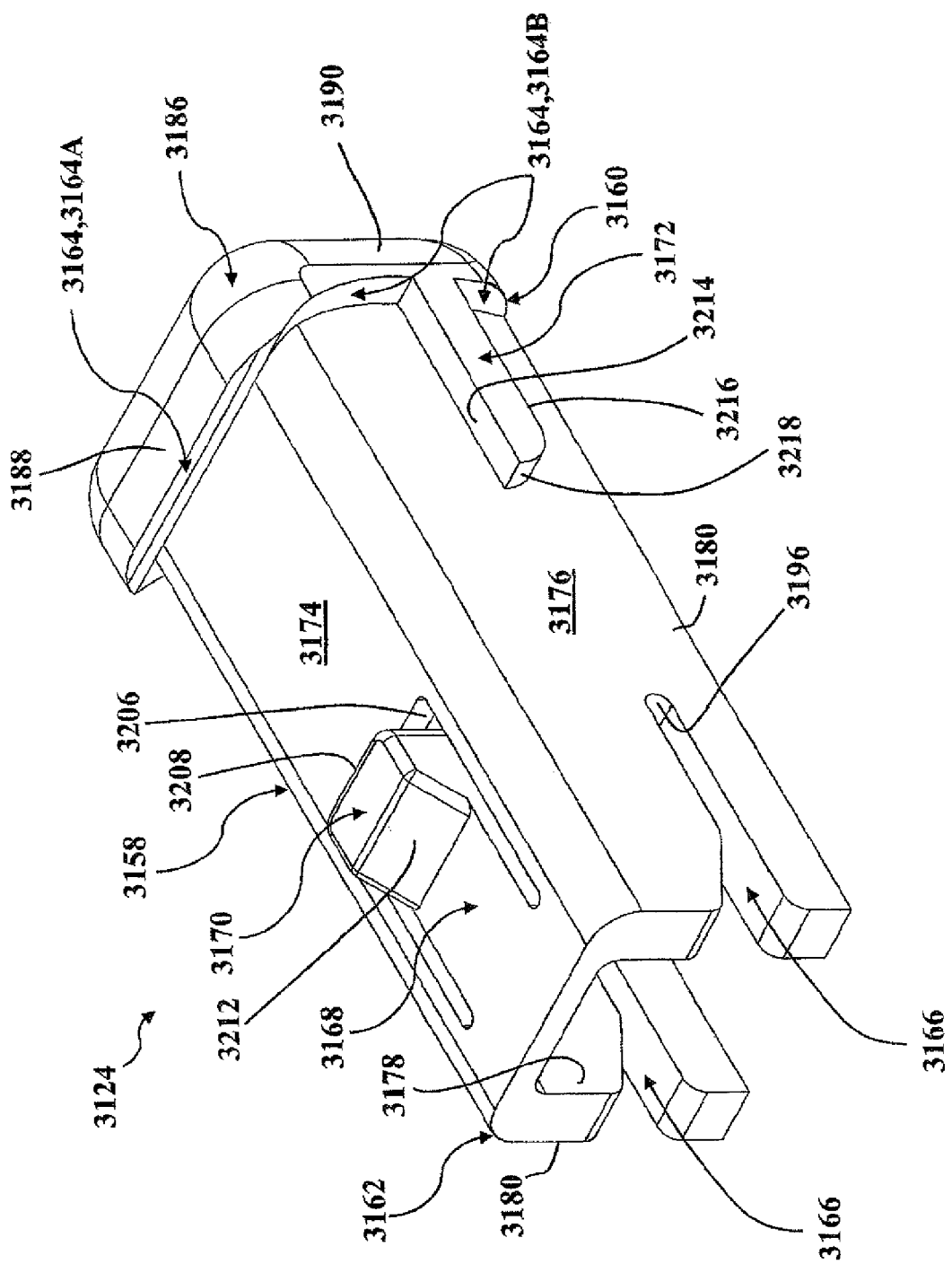
FIG. 13B is a rotated perspective view of the adapter of FIG. 13A.
Figure 14:
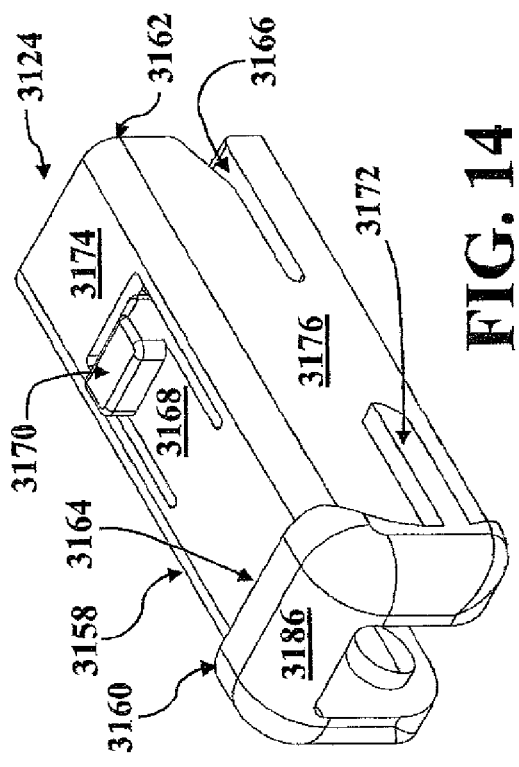
FIG. 14 is another perspective view of the third embodiment of the adapter of FIG. 13A.

The third embodiment of the adapter 3124 is depicted in FIGS. 13A-14, and is similar to the first embodiment of the adapter 124 described above. Here too, in the third embodiment, the body 3158 of the adapter 3124 extends between the first end 3160 and the second end 3162. The stop 3164 is formed at the first end 3160 and is arranged so as to abut the terminal end 140 of the attachment member 138. The slots 3166 are formed in the body 3158 at the second end 3162 and are arranged so as to receive the protrusions 146 of the attachment member 138. The resilient finger 3168 is operatively attached to the body 3160 with the tooth 3170 arranged so as to engage the aperture 156 of the attachment member 138 so as to prevent longitudinal movement between the adapter 3124 and the attachment member 138 when the stop 3164 abuts the terminal end 140 of the attachment member 138. The braces 3172 are formed on the body 3158 at the first end 3160 and are arranged so as to be received in one of the cutouts 148 of the attachment member 138 when the tooth 3170 of the resilient finger 3168 engages the aperture 156 of the attachment member 3138. The braces 3172 at least partially abut the respective lower cutout edges 152 of the attachment member 138 and remain spaced from the upper cutout edge 150 of the attachment member 138 when secured thereto (see FIG. 18). The specific configuration of the body 3158, stop 3164, slots 3166, resilient finger 3168, tooth 3170, and brace 3172 of the third embodiment of the adapter 3124 will be described in greater detail below.

As is shown best in FIG. 13A, the body 3158 of the third embodiment of the adapter 3124 also includes a deck 3174 extending between the first end 3160 and the second end 3162 with opposing sidewalls 3176 depending from the deck 3174, each of which has an inner surface 3178 and an outer surface 3180. As shown best in FIG. 13B, in this embodiment, the sidewalls 3176 each extend from the deck 3174 substantially perpendicularly such that the inner and outer surfaces 3178, 3180 of the sidewalls 3176 are substantially parallel to each other. However, as noted above in connection with the first embodiment of the adapter 124, those having ordinary skill in the art will appreciate that the sidewalls 3176 could be configured differently without departing from the scope of the present invention.

Here too in the third embodiment, the adapter 3124 employs inwardly-facing trunnions 3182 formed on the body 3158 adjacent to the first end 3160. The trunnions 3182 extend towards each other from the respective inner surfaces 3178 of the sidewalls 3176 and are arranged to be disposed within the recesses 136 formed in the saddle 134 of the coupler 122 so as to effect pivoting of the adapter 3124 with respect to the coupler 122 in operation. However, as noted above in connection with the first embodiment of the adapter 124, those having ordinary skill in the art will appreciate that the trunnions 3182 could be configured or otherwise arranged in any suitable way sufficient to effect pivoting of the adapter 3124 with respect to the coupler 122, or the trunnions 3182 could be omitted with the adapter 3124 and coupler 122 employing a different arrangement of structural features and/or components to effect pivoting, without departing from the scope of the present invention.

With continued reference to FIGS. 13A-14, 17, and 18, the stop 3164 of the third embodiment of the adapter 3124 is similarly formed on the body 3158 at the first end 3160. More specifically, the head 3186 of the adapter 3124 is formed on the body 3158 at the first end 3160 and defines the stop 3164. The head 3186 extends vertically outwardly from the deck 3174 to the head upper surface 3188 which, in turn, defines the front stop 3164A. Similarly, the head 3186 extends laterally outwardly with respect to each of the sidewalls 3176 to the respective head side surfaces 3190 which, in turn, define the correspondingly respective side stops 3164 (see FIGS. 13A-13B). Here too, the head upper surface 3188 extends between and merges with the head side surfaces 3190, and the surfaces 3188, 3190 are shaped so as to give the head 3186 a smooth, rounded profile which compliments the shape and profile of the attachment member 138, thereby providing increased aesthetic value. However, as noted above in connection with the first embodiment of the adapter 124, those having ordinary skill in the art will appreciate that the head 3186 and/or the head surfaces 3186, 3188 could be arranged or otherwise configured in any suitable way without departing from the scope of the present invention. Here, the front stop 3164A is likewise arranged so as to abut the front edge 140A of the terminal end 140 defined by the upper wall 142 of the attachment member 138, and the side stops 3164B are each arranged so as to abut one of the side edges 140B of the terminal end 140 defined by the respective side walls 144 of the attachment member 138 (see FIGS. 5A-5B).

The third embodiment of the adapter 3124 includes slots 3166 formed in the body 3158 at the second end 3162 for receiving the respective protrusions 146 of the attachment member 138. Here too, the slots 3166 extend longitudinally from the second end 3162 of the body 3158 towards the first end 3160 of the body 3158, with the opening 3192 at the second end 3162 arranged so as to taper and merge into the channel 3194 which, in turn, extends to and merges with the floor 3196. The openings 3192 and the channels 3194 are similarly configured so as to guide the attachment member 138 with respect to the adapter 3124 during connection between the wiper assembly 116 and the wiper arm 114, and helps facilitate alignment between the various components and structural features of the adapter 3124 and the attachment member 138.

As shown best in FIG. 18, in this third embodiment of the adapter 3124, the floors 3196 of the slots 3166 are arranged so as to abut the respective protrusions 146 of the attachment member 138 when the adapter 3124 is secured thereto. Those having ordinary skill in the art will appreciate that this abutting arrangement helps facilitate longitudinal alignment between the adapter 3124 and the attachment member 138. Specifically, in this third embodiment, when the protrusions 146 of the attachment member 138 abut the floors 3196 of the slots 3166, the stop 3164 likewise abuts the terminal end 140 of the attachment member 138, and the tooth 3170 of the resilient finger 3168 comes into longitudinal alignment with the aperture 156 of the attachment member 138. However, those having ordinary skill in the art will appreciate that the slots 3166 could be configured such that the protrusions 146 of the attachment member 138 were spaced from the floors 3196 when the adapter 3124 is secured to the attachment member 138, such as is described in above in connection with the first embodiment of the adapter 124. Similarly, while the channels 194 of first embodiment of the adapter 124 described above are shaped with respect to the height 200 of the protrusions 146 such that the gap 202 is shown defined therebetween, the width 3198 of the channels 3194 of the third embodiment of the adapter 3124 is relatively close to the height 200 of the protrusions 146 in comparison (compare FIG. 9 to FIG. 18). Here, the channels 3194 have a width 3198 which is large enough to facilitate accommodating the protrusions 146 while allowing for variations in manufacturing tolerances, but which is also sized with respect to the height 200 of the protrusions 146 so as to minimize vertical play between the attachment member 138 and the secured adapter 3124 in operation. However, as will be appreciated from the discussion of subsequent embodiments described below, those having ordinary skill in the art will appreciate that the slots 3166 could be configured with a profile of any suitable size, shape, or configuration sufficient to facilitate releasable attachment with the attachment member 138.

Referring again to FIGS. 13A-14, 17, and 18, as noted above, the third embodiment of the adapter 3124 also employs the resilient finger 3168 and tooth 3170 to engage the aperture 156 of the attachment member 138 so as to effect longitudinal retention between the adapter 3124 and the attachment member 138. In this embodiment, the resilient finger 3168 extends longitudinally into the window 3206 which is similarly formed in the deck 3174 between the first end 3160 and the second end 3162. In this third embodiment of the adapter 3124, the resilient finger 3168 extends longitudinally towards the second end 3162 (compare FIG. 13A to FIG. 4A). As described above in connection with the first embodiment of the adapter 124, the tooth 3170 of the third embodiment of the adapter 3124 also has a generally rounded-rectangular profile that compliments the profile of the aperture 156 of the attachment member 138. Here too, the tooth face 3208 is arranged to abut the aperture face 210 of the aperture 156 of the attachment member 138 when secured, and the cam face 3212 faces away from the tooth face 3208 and is arranged so as to deflect the resilient finger 3168 and tooth 3170 downwardly into the window 3206 in response to engagement with the terminal end 140 of the attachment member 138. Specifically, the front edge 140A of the attachment member 138 likewise engages the cam face 3212 of the tooth 3170 so as to deflect the resilient finger 3168 and tooth 3170 downwardly until the aperture 156 of the attachment member 138 comes into longitudinal alignment with the tooth 3170, after which the resilient finger 3168 returns upwardly out of the window 3206 and the tooth face 3208 of the tooth 3170 abuts the aperture face 210 of the aperture 156 so as to restrict longitudinal movement between the attachment member 138 and the adapter 3124 (see FIG. 18).

As shown best in FIGS. 13A-13B and 18, as noted above, the third embodiment of the adapter 3124 includes braces 3172 formed on the body 3158 at the first end 3160 for being received in respective cutouts 148 of the attachment member 138. Each brace 3172 extends laterally outwardly from one of the sidewalls 3176 and merges longitudinally with the head 3186. Here too, when the adapter 3124 is secured to the attachment member 138, the lower brace surface 3216 at least partially abuts the lower cutout edge 152 of the cutout 148, the upper brace surface 3214 is spaced below the upper cutout edge 150 of the cutout 148, and no portion of the adapter 3124 engages or otherwise abuts the upper cutout edge 150 of the cutout 148 of the attachment member 138. The lower brace surface 3216 similarly extends longitudinally to and merges with the curve brace surface 3218 which, in turn, curves upward to and merges with the upper brace surface 3214. In this third embodiment of the adapter 3124, the curve brace surface 3218 abuts the curve cutout edge 154 of the cutout 148 of the attachment member 138 when the adapter 3124 is secured to the attachment member 138 (compare FIG. 18 to FIG. 9).

Referring now to FIGS. 26A-26C, certain assembly steps for securing the third embodiment of the adapter 3124 to the attachment member 138 are shown sequentially. Here, certain previously-introduced reference numerals are recited below for illustrative purposes but have been omitted from FIGS. 26A-26C for clarity. In order to effect proper connection to the wiper arm 114, the third embodiment of the adapter 3124 of the wiper assembly 116 is positioned such that the attachment member 138 is spaced longitudinally near the adapter 3124 (see FIG. 26A). Next, the attachment member 138 is brought into engagement with the adapter 3124 whereby the attachment member 138 and/or adapter 3124 are moved longitudinally towards each other such that the front edge 140A of the terminal end 140 of the attachment member 138 comes into contact with the cam face 3212 of the tooth 3170 of the resilient finger 3168 of the adapter 3124 (see FIG. 26B; see also FIGS. 13A-13B). As the attachment member 138 moves further longitudinally towards the first end 3160 of the adapter 3124, the protrusions 146 of the attachment member 138 enter the openings 3192 of the slots 3166 of the adapter 3124, which then guide the protrusions 146 into the channels 3194 of the slots 3166 and, at the same time, help deflect the tooth 3170 and the resilient finger 3168 downwardly into the window 3206 as the lower brace surfaces 3216 of the braces 3172 come into abutment with the lower cutout edges 152 of the cutouts 148 of the attachment member 138 (see also FIGS. 13A-13B). As the attachment member 138 moves even further longitudinally towards the first end 3160 of the adapter 3124, the terminal end 140 of the attachment member 138 comes into abutment with the stop 3164 of the adapter 3124 as the aperture 156 of the attachment member 138 comes into longitudinal alignment with the tooth 3170 of the adapter 3124 (see FIG. 26C), whereby the resilient finger 3168 returns upwardly out of the window 3206, bringing the tooth 3170 into the aperture 156 such that the tooth face 3208 of the tooth 3170 abuts the aperture face 210 of the aperture 156 so as to restrict longitudinal movement between the attachment member 138 and the adapter 3124 (see FIG. 18). It will be appreciated that no portion of the third embodiment of the adapter 3124 engages or otherwise abuts the upper cutout edge 150 of the cutout 148 of the attachment member 138.

Figure 15:
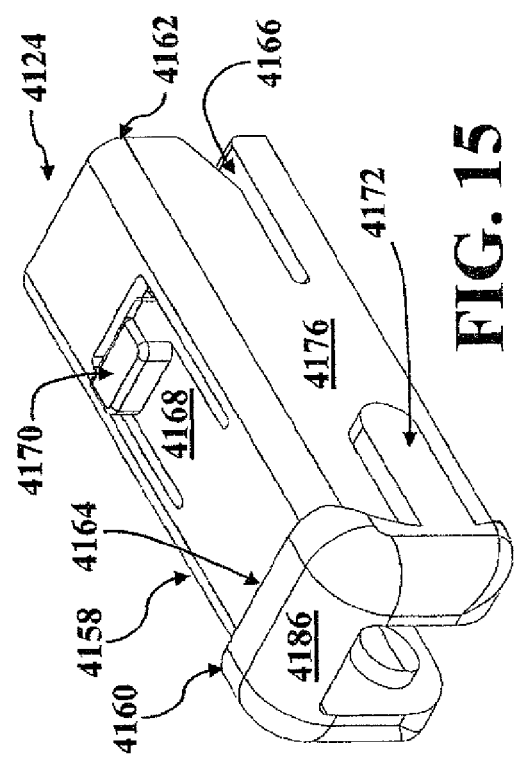
FIG. 15 is a perspective view of an adapter according to a fourth embodiment.
Figure 19:
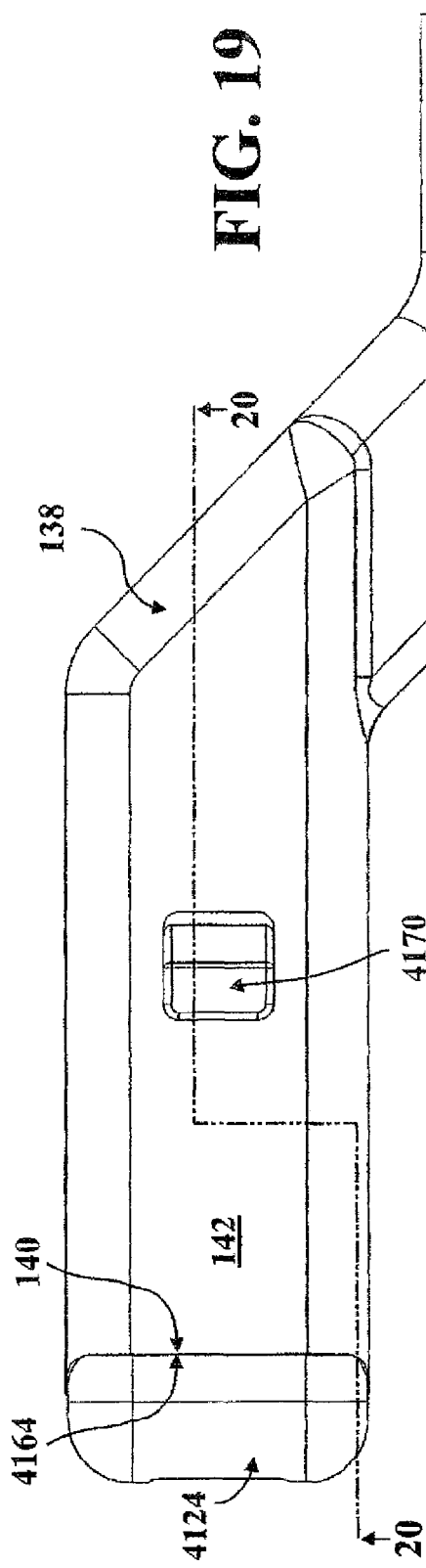
FIG. 19 is a top-side plan view of the fourth embodiment of the adapter of FIG. 15 shown secured to the attachment member of FIGS. 5A-5B.
Figure 20:
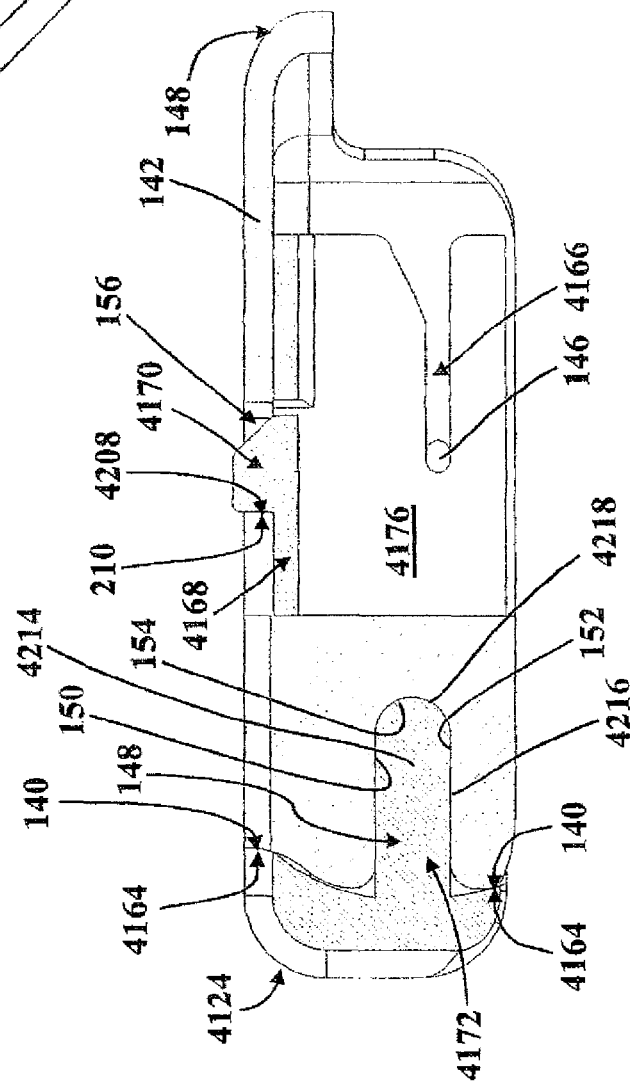
FIG. 20 is a sectional view taken along line 20-20 of FIG. 19.

As noted above, a fourth embodiment of the adapter of the wiper assembly 116 is shown in FIGS. 15, 19, and 20. In the description that follows, the structure and components of the fourth embodiment that are the same as or that otherwise correspond to the structure and components of the first embodiment are provided with the same reference numerals increased by 4000.

The fourth embodiment of the adapter 4124 depicted in FIGS. 15, 19, and 20, is also substantially similar to the third embodiment of the adapter 3124 described above (compare FIG. 15 to FIG. 14). Thus, for the purposes of clarity and consistency, only the specific differences between the fourth embodiment of the adapter 4124 and the third embodiment of the adapter 3124 will be described below and only certain structural features and components common between these embodiments will be discussed herein and depicted in the drawings of the fourth embodiment of the adapter 4124. Unless otherwise indicated below, it will be appreciated that the description of the third embodiment of the adapter 3124 above may be incorporated by reference with respect to the fourth embodiment of the adapter 4124 without limitation.

As best shown in FIGS. 15 and 20, the fourth embodiment of the adapter 4124 similarly includes the stop 4164 defined by the head 4186 at the first end 4160 of the body 4158, and the slot 4166 and the resilient finger 4168 with the tooth 4170 at the second end 4162 of the body 4158. Moreover, the adapter 4124 also includes braces 4172 formed on the body 4158 at the first end 4160 for being received in respective cutouts 148 of the attachment member 138. Each brace 4172 extends laterally outwardly from one of the sidewalls 4176 and merges longitudinally with the head 4186. Here too, when the adapter 4124 is secured to the attachment member 138, the lower brace surface 4216 at least partially abuts the lower cutout edge 152 of the cutout 148. However, in this fourth embodiment, the braces 4172 of the adapter 4124 are configured to "fill" the respective cutouts 148 of the attachment member 138 such that the upper brace surfaces 4214 of the braces 4172 of the adapter 4124 abut the respective upper cutout edges 150 of the cutouts 148 of the attachment member 138 (compare FIG. 15 to FIG. 14). Here, both the lower brace surface 4216 and the upper brace surface 4214 extend longitudinally from the head 4186 to the curve brace surface 4218 which, in this fourth embodiment, has a rounded profile shaped complimentary to the curve cutout edge 154 of the cutout 148 of the attachment member 138. However, those having ordinary skill in the art will appreciate that the braces 4172 could be configured with any suitable structure and/or arrangement sufficient to cooperate with at least the resilient finger 4168 at the second end 4162 and at least one of the stop 4164 and/or the head 4186 at the first end 4160 so as to effect longitudinal and vertical retention of the attachment member 138, without departing from the scope of the present invention.

Figure 16:
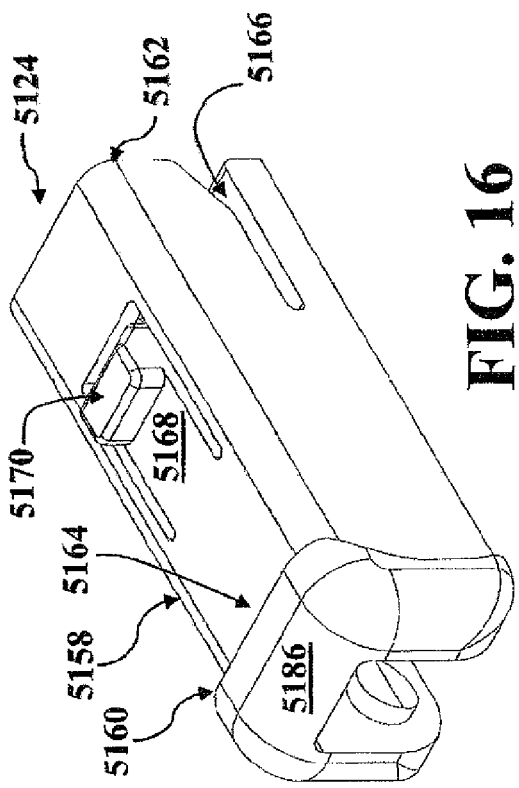
FIG. 16 is a perspective view of an adapter according to a fifth embodiment.

As noted above, a fifth embodiment of the adapter of the wiper assembly 116 is shown in FIGS. 16, 21, and 22. In the description that follows, the structure and components of the fifth embodiment that are the same as or that otherwise correspond to the structure and components of the first embodiment are provided with the same reference numerals increased by 5000.

The fifth embodiment of the adapter 5124 depicted in FIGS. 16, 21, and 22 is also substantially similar to the third embodiment of the adapter 3124 described above (compare FIG. 16 to FIG. 14). Thus, for the purposes of clarity and consistency, only the specific differences between the fifth embodiment of the adapter 5124 and the third embodiment of the adapter 3124 will be described below and only certain structural features and components common between these embodiments will be discussed herein and depicted in the drawings of the fifth embodiment of the adapter 5124. Unless otherwise indicated below, it will be appreciated that the description of the third embodiment of the adapter 3124 above may be incorporated by reference with respect to the fifth embodiment of the adapter 5124 without limitation.

As best shown in FIGS. 16 and 22, the fifth embodiment of the adapter 5124 similarly includes the stop 5164 defined by the head 5186 at the first end 5160 of the body 5158, and the slot 5166 and the resilient finger 5168 with the tooth 5170 at the second end 5162 of the body 5158. However, in this fifth embodiment, the adapter 5124 is configured so as to secure to the attachment member 138 without engaging in the cutouts 158 of the attachment member 138. To that end, the adapter 5124 here employs the stop 5164 of the head 5186 at the first end 5160, and the slots 5166 and the resilient finger 5168 with the tooth 5170 at second end 5162, which cooperate so as to effect vertical and longitudinal retention to the attachment member 138. Here, the front stop 5164A and the side stops 5164B are arranged to abut the front edge 140A and the side edges 140B, respectively, of the terminal end 140 of the attachment member 138 when the adapter 5124 is secured. It will be appreciated that no portion of the fifth embodiment of the adapter 5124 engages or otherwise abuts the upper cutout edge 150 of the cutout 148 of the attachment member 138.

As shown best in FIG. 20, the side stops 5164B are arranged with respect to the front stop 5164A such that abutment with the terminal end 140 of the attachment member 138 effects vertical and longitudinal retention at the first end 5160 of the body 5158 of the adapter 5124. Specifically, the side stops 5164B defined by the head 5186 are spaced longitudinally further away from the second end 5162 of the body 5158 than the front stop 5164A. Similarly, the side stops 5164B defined by the head 5186 are spaced vertically further away from the head upper surface 188 than the front stop 5164A. This arrangement effects retention at the first end 5160 and cooperates with the retention afforded by the slots 5166 and the resilient finger 5168 at the second end 5162, whereby the tooth 5170 of the resilient finger 5168 engages the aperture 156 of the attachment member 138, so as to secure the adapter 5124 to the attachment member 128 in use.

With reference now to FIGS. 14-16, the third, fourth, and fifth embodiments of the adapter 3124, 4124, 5124 are shown respectively. As indicated above, the fourth and fifth embodiments of the adapter 4124, 5124 are substantially similar to the third embodiment of the adapter 3124 except with respect to the configuration of the braces. Specifically, while the third embodiment of the adapter 3124 employs braces 3172 which remain spaced from the upper cutout edges 150 of the cutouts 148 of the attachment member 138, the fourth embodiment of the adapter 4124 employs braces 4172 which "fill" the cutouts 148, and the fifth embodiment of the adapter 5124 omits braces altogether. Moreover, in each of the third, fourth, and fifth embodiments of the adapter 3124, 4124, 5124, the stop 3164, 4164, 5164 defined by the head 3186, 4186, 5186 helps to effect vertical and longitudinal retention at the first end 3160, 4160, 5160 of the body 3158, 4158, 5158. Those having ordinary skill in the art will appreciate that the braces 3172, 4172 provide additional retention via engagement distributed along one or both of the cutouts 148 of the attachment member 138, contribute to ease of assembly when securing to the attachment member 138, and also provide an increased aesthetic value to the wiper assembly 116 in use. However, it will be further appreciated that the braces 3172, 4172 could be configured or arranged differently, or could be omitted in certain embodiments where sufficient retention is otherwise achieved at the first end, without departing from the scope of the present invention.

As noted above, a sixth embodiment of the adapter of the wiper assembly 116 is shown in FIGS. 24 and 27A-27C. In the description that follows, the structure and components of the sixth embodiment that are the same as or that otherwise correspond to the structure and components of the first embodiment are provided with the same reference numerals increased by 6000.

The sixth embodiment of the adapter 6124 depicted in FIGS. 24 and 27A-27C is also substantially similar to the third embodiment of the adapter 3124 described above (compare FIG. 24 to FIG. 23). Thus, for the purposes of clarity and consistency, only the specific differences between the sixth embodiment of the adapter 6124 and the third embodiment of the adapter 3124 will be described below and only certain structural features and components common between these embodiments will be discussed herein and depicted in the drawings of the sixth embodiment of the adapter 6124. Unless otherwise indicated below, it will be appreciated that the description of the third embodiment of the adapter 3124 above may be incorporated by reference with respect to the sixth embodiment of the adapter 6124 without limitation.

Figure 24:
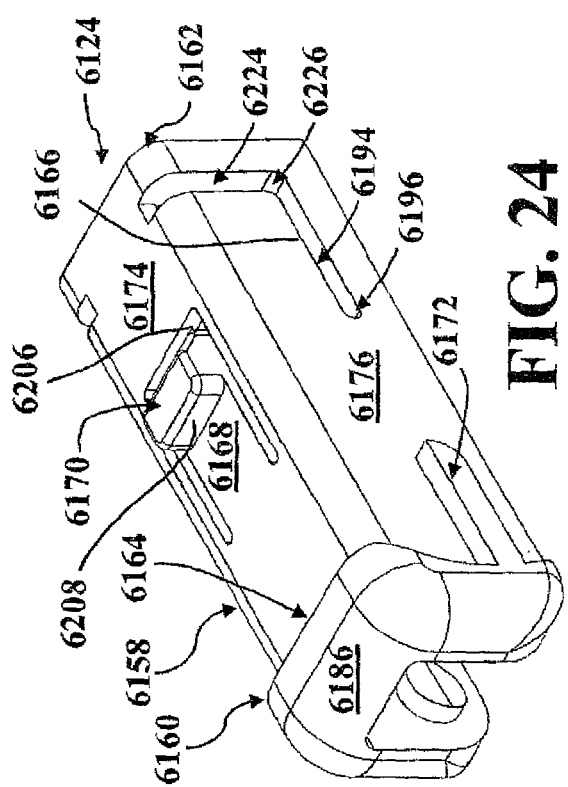
FIG. 24 is a perspective view of an adapter according to a sixth embodiment.
Figure 29:
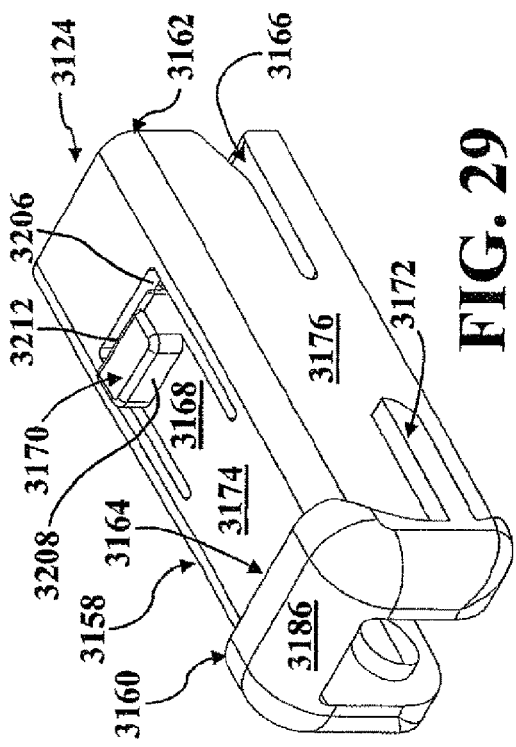
FIG. 29 is another perspective view of the third embodiment of the adapter of FIG. 13A.

As best shown in FIG. 24, the sixth embodiment of the adapter 6124 similarly includes both the braces 6172 and the stop 6164 defined by the head 6186 at the first end 6160 of the body 6158, and the slots 6166 and the resilient finger 6168 with the tooth 6170 at the second end 6162 of the body 6158. However, in this sixth embodiment of the adapter 6124, the slots 6166 have an "L" shaped configuration which facilitates securing to the attachment member 138 in a sequential "top-down, linear" fashion, which is different than the linear fashion discussed above in connection with the third embodiment of the adapter 3124 (compare FIGS. 27A-27C to FIGS. 26A-26C). Here, the slots 6166 are likewise formed in the respective sidewalls 6176 of the body 6158 and are arranged so as to receive the respective protrusions 146 of the attachment member 138, with the channels 6194 extending longitudinally towards the first end 6160 and merging into the respective floors 6196. However, in this sixth embodiment, the slots 6166 each further include a vertical opening, generally indicated at 6224, which is formed in the respective sidewall 6176 and which extends vertically to the deck 6174 and which is disposed in communication with the respective channel 6194. As described in greater detail below, the vertical openings 6224 and the channels 6194 are configured so as to guide the attachment member 138 with respect to the adapter 6124 during connection between the wiper assembly 116 and the wiper arm 114, and help facilitate alignment between the various components and structural features of the adapter 6124 and the attachment member 138.

Referring now to FIGS. 27A-27C, certain assembly steps for securing the sixth embodiment of the adapter 6124 to the attachment member 138 are shown sequentially. Here, certain previously-introduced reference numerals are recited below for illustrative purposes but have been omitted from FIGS. 27A-27C for clarity. In order to effect proper connection to the wiper arm 114, the sixth embodiment of the adapter 6124 of the wiper assembly 116 is positioned such that the attachment member 138 is spaced vertically above the adapter 6124 with the vertical openings 6224 of the slots 6166 aligned longitudinally with the protrusions 146 of the attachment member 138 (see FIG. 27A). Next, the attachment member 138 is brought into engagement with the adapter 6124 whereby the attachment member 138 and/or adapter 6124 are moved vertically towards each other such that the protrusions 146 of the attachment member 138 are guided into and travels along the vertical openings 6224 of the slots 6166 towards the channels 6194 of the slots 6166 (compare FIG. 27A to FIG. 27B). In FIG. 27B, the slots 6166 are shown in phantom for illustrative purposes.

As the attachment member 138 moves further vertically closer to the adapter 6124, the upper wall 142 of the attachment member 138 comes into contact with the tooth 6170 of the resilient finger 6168 of the adapter 6124, which deflects the tooth 6170 and the resilient finger 6168 downwardly into the window 6206 as the upper wall 142 of the attachment member 138 comes into abutment with the deck 6174 of the adapter 6124. In this sixth embodiment of the adapter 6124, the vertical openings 6224 meet the channels 6194 of the slots 6166 at an apex 6226 which is sized to accommodate the protrusions 146 and to facilitate subsequent linear movement of the attachment member 138 towards the first end 6160 of the adapter 6124. As shown best in FIG. 27B, the vertical openings 6224, the apexes 6226, and the channels 6194 of the slots 6166 are sized so as to accommodate the protrusions 146 and help facilitate guiding the adapter 6124 into the attachment member 138 during assembly. As shown best in FIG. 27B, the slots 6166 in this sixth embodiment are arranged such that the terminal end 140 of the attachment member 138 is spaced longitudinally from the braces 6172 of the adapter 6124 when the protrusions 146 are positioned at the apexes 6226. After reaching the apexes 6226, the protrusions 146 enter the channels 6194 and the attachment member 138 can subsequently move linearly and longitudinally towards the first end 6160 of the adapter 6124 as the protrusions 146 move along the channels 6194 away from the apexes 6226 and towards the floors 6196 (compare FIG. 27B to FIG. 27C).

As the attachment member 138 moves longitudinally towards the first end 6160 of the adapter 6124, the resilient finger 6168 remains deflected downwardly into the window 6206 as the lower brace surfaces 6216 of the braces 6172 come into abutment with the lower cutout edges 152 of the cutouts 148 of the attachment member 138. As the attachment member 138 moves further longitudinally towards the first end 6160 of the adapter 6124, the terminal end 140 of the attachment member 138 comes into abutment with the stop 6164 of the adapter 6124 as the aperture 156 of the attachment member 138 comes into longitudinal alignment with the tooth 6170 of the adapter 6124 (see FIG. 27C), whereby the resilient finger 6168 returns upwardly out of the window 6206 and the tooth face 6208 of the tooth 6170 abuts the aperture face 210 of the aperture 156 so as to restrict longitudinal movement between the attachment member 138 and the adapter 6124.

As noted above, a seventh embodiment of the adapter of the wiper assembly 116 is shown in FIGS. 25 and 28A-28C. In the description that follows, the structure and components of the seventh embodiment that are the same as or that otherwise correspond to the structure and components of the first embodiment are provided with the same reference numerals increased by 7000.

The seventh embodiment of the adapter 7124 depicted in FIGS. 25 and 28A-28C is also substantially similar to the third embodiment of the adapter 3124 described above (compare FIG. 25 to FIG. 23). Thus, for the purposes of clarity and consistency, only the specific differences between the seventh embodiment of the adapter 7124 and the third embodiment of the adapter 3124 will be described below and only certain structural features and components common between these embodiments will be discussed herein and depicted in the drawings of the seventh embodiment of the adapter 7124. Unless otherwise indicated below, it will be appreciated that the description of the third embodiment of the adapter 3124 above may be incorporated by reference with respect to the seventh embodiment of the adapter 7124 without limitation.

Figure 25:
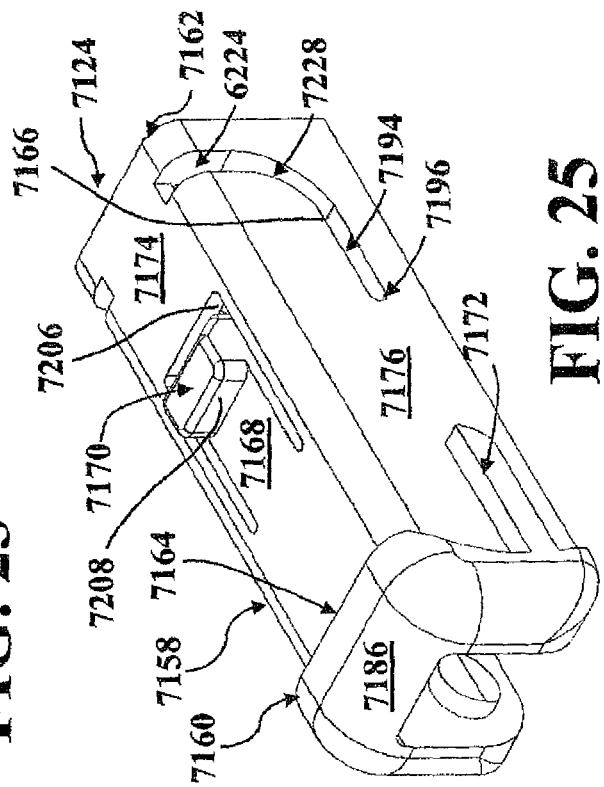
FIG. 25 is a perspective view of an adapter according to a seventh embodiment.

As best shown in FIG. 25, the seventh embodiment of the adapter 7124 similarly includes both the braces 7172 and the stop 7164 defined by the head 7186 at the first end 7160 of the body 7158, and the slots 7166 and the resilient finger 7168 with the tooth 7170 at the second end 7162 of the body 7158. However, in this seventh embodiment of the adapter 7124, the slots 7166 have a curved configuration which facilitates securing to the attachment member 138 in a sequential "top-down, compound down and forward, linear" fashion, which is different than the linear fashion discussed above in connection with the third embodiment of the adapter 3124 (compare FIGS. 28A-28C to FIGS. 26A-26C), as well as the sequential "top-down, linear" fashion discussed above in connection with the sixth embodiment of the adapter 6124 (compare FIGS. 28A-28C to FIGS. 27A-27C). Here, the slots 7166 are likewise formed in the respective sidewalls 7176 of the body 7158 and are arranged so as to receive the respective protrusions 146 of the attachment member 138, with the channels 7194 extending longitudinally towards the first end 7160 and merging into the respective floors 7196. Like the sixth embodiment of the adapter 6124 described above, the slots 7166 of the seventh embodiment of the adapter 6124 similarly include vertical openings 7224 formed in the respective sidewalls 7176 which extend vertically towards the deck 7174 and which are disposed in communication with the respective channels 7194. As described in greater detail below, the vertical openings 7224 and the channels 7194 are configured so as to guide the attachment member 138 with respect to the adapter 7124 during connection between the wiper assembly 116 and the wiper arm 114, and help facilitate alignment between the various components and structural features of the adapter 7124 and the attachment member 138.

Referring now to FIGS. 28A-28C, certain assembly steps for securing the seventh embodiment of the adapter 7124 to the attachment member 138 are shown sequentially. Here, certain previously-introduced reference numerals are recited below for illustrative purposes but have been omitted from FIGS. 28A-28C for clarity. In order to effect proper connection to the wiper arm 114, the seventh embodiment of the adapter 7124 of the wiper assembly 116 is positioned such that the attachment member 138 is spaced vertically above the adapter 7124 with the vertical openings 7224 of the slots 7166 aligned longitudinally with the protrusions 146 of the attachment member 138 (see FIG. 28A). Next, the attachment member 138 is brought into engagement with the adapter 7124 whereby the attachment member 138 and/or adapter 7124 are moved vertically towards each other such that the protrusions 146 of the attachment member 138 are guided into and travel along the vertical openings 7224 of the slots 7166 towards the channels 7194 of the slots 7166 (compare FIG. 28A to FIG. 28B). In FIG. 28B, the slots 7166 are shown in phantom for illustrative purposes.

As the attachment member 138 moves further vertically closer to the adapter 7124, the upper wall 142 of the attachment member 138 comes into contact with the tooth 7170 of the resilient finger 7168 of the adapter 7124, which deflects the tooth 7170 and the resilient finger 7168 downwardly into the window 7206 as the upper wall 142 of the attachment member 138 comes into abutment with the deck 7174 of the adapter 7124. In this seventh embodiment of the adapter 7124, the slots 7166 also include respective profiled regions, generally indicated at 7228, which extend between and merge the respective vertical openings 7224 with the corresponding channels 7194 of the slots 7166. The profiled regions 7228 are sized, shaped, and arranged to accommodate the protrusions 146 and to facilitate compound movement of the attachment member 138 vertically downwardly and longitudinally towards the first end 7160 of the adapter 7124, after the top-down movement which occurs as the protrusions 146 travel along the vertical openings 7224. Those having ordinary skill in the art will appreciate that the profiled regions 7228 could have any suitable shape, profile, or configuration sufficient to guide the adapter 7124 into the attachment member 138, without departing from the scope of the present invention. Moreover, it will be appreciated that the slots 7166 could be realized without a discrete vertical opening 7224 and/or channel 7194 to guide the protrusions 146, whereby the profiled region 7228 could extend from the floor 7196 and the deck 7174, or another suitable portion of the adapter 7124 (not shown in detail).

As shown best in FIG. 28B, the vertical openings 7224, the profiled regions 7228, and the channels 7194 of the slots 7166 are sized so as to accommodate the protrusions 146 and help facilitate guiding the adapter 7124 into the attachment member 138 during assembly. As shown best in FIG. 28B, the slots 7166 in this seventh embodiment are arranged such that the terminal end 140 of the attachment member 138 is spaced longitudinally from the braces 7172 of the adapter 7124 as the protrusions 146 travel along the profiled regions 7228 which, in turn, are shaped and arranged so as to bring the respective lower brace surfaces 7216 into abutment with the upper cutout edges 150 of the cutouts 148 of the attachment member 138 as the protrusions 146 approach the channels 7194. Here, the protrusions 146 enter the channels 7194 and the attachment member 138 can subsequently move linearly and longitudinally towards the first end 7160 of the adapter 7124 as the protrusions 146 move along the channels 7194 away from the profiled regions 7228 and towards the floors 7196 (compare FIG. 28B to FIG. 28C).

As the attachment member 138 moves longitudinally towards the first end 7160 of the adapter 7124, the resilient finger 7168 remains deflected downwardly into the window 7206 as the lower brace surfaces 7216 of the braces 7172 contact and move along the lower cutout edges 152 of the cutouts 148 of the attachment member 138. As the attachment member 138 moves further longitudinally towards the first end 7160 of the adapter 7124, the terminal end 140 of the attachment member 138 comes into abutment with the stop 7164 of the adapter 7124 as the aperture 156 of the attachment member 138 comes into longitudinal alignment with the tooth 7170 of the adapter 7124 (see FIG. 28C), whereby the resilient finger 7168 returns upwardly out of the window 7206 and the tooth face 7208 of the tooth 7170 abuts the aperture face 210 of the aperture 156 so as to restrict longitudinal movement between the attachment member 138 and the adapter 7124.

Figure 23:
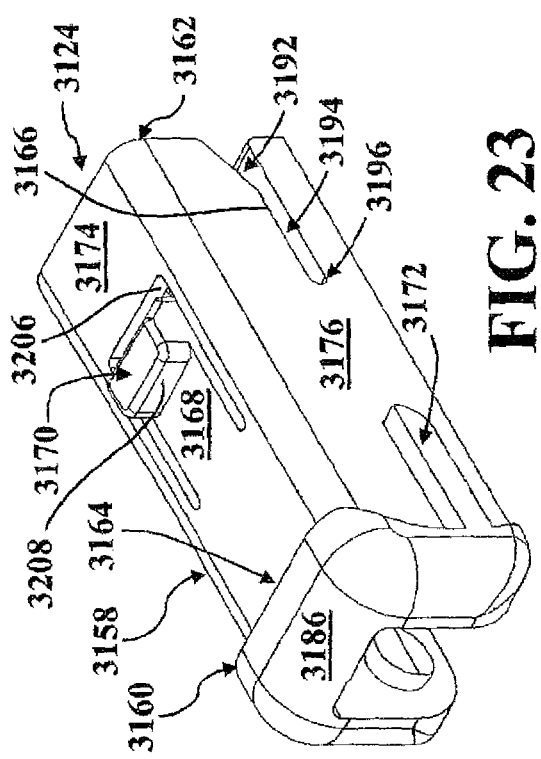
FIG. 23 is another perspective view of the third embodiment of the adapter of FIG. 13A.

With reference now to FIGS. 23-25, the third, sixth, and seventh embodiments of the adapter 3124, 6124, 7124 are shown respectively. As indicated above, the sixth and seventh embodiments of the adapter 6124, 7124 are substantially similar to the third embodiment of the adapter 3124 except with respect to the configuration of the slots. Specifically, while the third embodiment of the adapter 3124 employs slots 3166 which are configured so as to facilitate assembly with the attachment member 138 in a substantially linear longitudinal fashion (see also FIGS. 26A-26C), the sixth embodiment of the adapter 6124 employs slots 6166 which are configured so as to facilitate assembly with the attachment member 138 in a sequential "top-down, linear" fashion (see FIGS. 27A-27C), and the seventh embodiment of the adapter 7124 employs slots 7166 which are configured so as to facilitate assembly with the attachment member 138 in a sequential "top-down, compound down and forward, linear" fashion (see FIGS. 28A-28C). Those having ordinary skill in the art will appreciate that the slots 3166, 6166, 7166 help guide the adapter 3124, 6124, 7124 into the attachment member 138 during assembly in predetermined fashions, whereby the slots can be shaped, configured, or arranged so as to facilitate attaching the wiper assembly 116 to the wiper arm 114 in different ways, orientations, or discrete steps. It will be appreciated that the assembly fashions afforded by the slots 6166, 7166 of the sixth and seventh embodiments can be advantageously implemented where the vehicle 100 is configured with limited access to the wiper arms 114 and/or where the wiper arms 114 can only be manipulated or moved to certain limited positions during attachment of the wiper assemblies 116.

Those having ordinary skill in the art will appreciate that the slots 3166, 6166, 7166 of the third, sixth, and seventh embodiments of the adapter 3124, 6124, 7124 described above could be used in connection with structural features and/or components employed by certain other embodiments of the adapter described herein in order to secure to the attachment member 138 in different fashions. By way of non-limiting example, the slots 7166 of the seventh embodiment of the adapter 7124 could be combined with the braces 4172 of the fourth embodiment of the adapter 4124.

Figure 30:
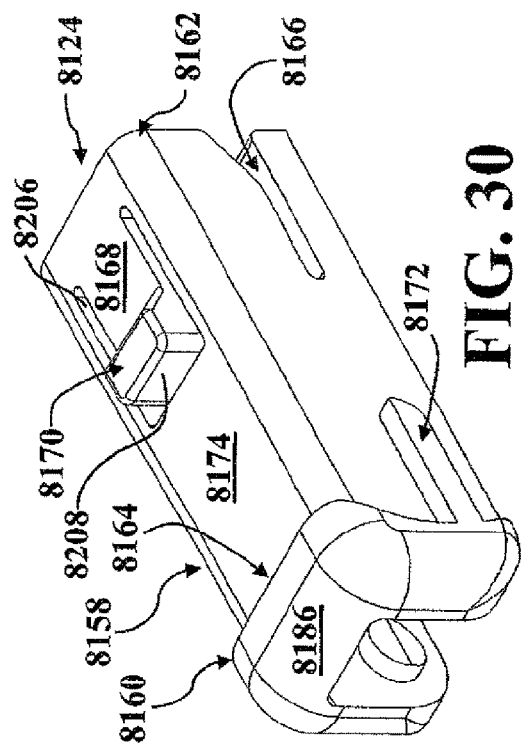
FIG. 30 is a perspective view of an adapter according to an eighth embodiment.

As noted above, an eighth embodiment of the adapter of the wiper assembly 116 is shown in FIG. 30. In the description that follows, the structure and components of the eighth embodiment that are the same as or that otherwise correspond to the structure and components of the first embodiment are provided with the same reference numerals increased by 8000.

The eighth embodiment of the adapter 8124 depicted in FIG. 30 and is also substantially similar to the third embodiment of the adapter 3124 described above (compare FIG. 30 to FIG. 29). Thus, for the purposes of clarity and consistency, only the specific differences between the eighth embodiment of the adapter 8124 and the third embodiment of the adapter 3124 will be described below and only certain structural features and components common between these embodiments will be discussed herein and depicted in the drawings of the eighth embodiment of the adapter 8124. Unless otherwise indicated below, it will be appreciated that the description of the third embodiment of the adapter 3124 above may be incorporated by reference with respect to the eighth embodiment of the adapter 8124 without limitation.

As shown in FIG. 30, the eighth embodiment of the adapter 8124 similarly includes both the braces 8172 and the stop 8164 defined by the head 8186 at the first end 8160 of the body 8158, and the slots 8166 and the resilient finger 8168 with the tooth 8170 at the second end 8162 of the body 8158. Here too, the resilient finger 8168 extends longitudinally into the window 8206 formed in the deck 8174 between the first end 8160 and the second end 8162, and employs the tooth 8170 to engage the aperture 156 of the attachment member 138 so as to effect longitudinal retention between the adapter 8124 and the attachment member 138 when the tooth face 8208 abuts the aperture face 210 in use. However, in this eighth embodiment of the adapter 8124, the resilient finger 8186 extends longitudinally towards the first end 8160 of the adapter 8124 rather than towards the second end, as is depicted in connection with the third embodiment of the adapter 3124 described above (compare FIG. 30 to FIG. 29). Moreover, it will be appreciated that the configuration and orientation of the resilient finger 8186 of this eighth embodiment of the adapter 8124 is similar to the configuration and orientation of the resilient finger 186 of the first embodiment of the adapter 124 described above (compare FIG. 30 to FIGS. 4A-4B.

Figure 31:
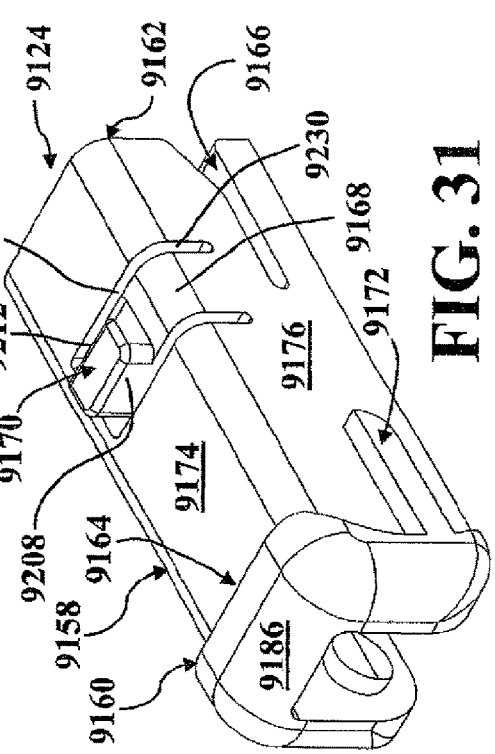
FIG. 31 is a perspective view of an adapter according to a ninth embodiment.

As noted above, a ninth embodiment of the adapter of the wiper assembly 116 is shown in FIG. 31. In the description that follows, the structure and components of the ninth embodiment that are the same as or that otherwise correspond to the structure and components of the first embodiment are provided with the same reference numerals increased by 9000.

The ninth embodiment of the adapter 9124 depicted in FIG. 31 and is also substantially similar to the third embodiment of the adapter 3124 described above (compare FIG. 31 to FIG. 29). Thus, for the purposes of clarity and consistency, only the specific differences between the ninth embodiment of the adapter 9124 and the third embodiment of the adapter 3124 will be described below and only certain structural features and components common between these embodiments will be discussed herein and depicted in the drawings of the ninth embodiment of the adapter 9124. Unless otherwise indicated below, it will be appreciated that the description of the third embodiment of the adapter 3124 above may be incorporated by reference with respect to the ninth embodiment of the adapter 9124 without limitation.

As shown in FIG. 31, the ninth embodiment of the adapter 9124 similarly includes both the braces 9172 and the stop 9164 defined by the head 9186 at the first end 9160 of the body 9158, and the slots 9166 and the resilient finger 9168 with the tooth 9170 at the second end 9162 of the body 9158. Here too, the resilient finger 9168 employs the tooth 9170 to engage the aperture 156 of the attachment member 138 so as to effect longitudinal retention between the adapter 9124 and the attachment member 138 when the tooth face 9208 abuts the aperture face 210 in use. However, in this ninth embodiment of the adapter 9124, a sidewall window, generally indicated at 9230, is formed in one of the sidewalls 9176 between the first end 9160 and the second end 9162. Specifically, in this ninth embodiment of the adapter 9124, the sidewall window 9230 is formed in the "left" sidewall 9176 and merges with the window 9206 formed in the deck 9174. Here, the resilient finger 9168 has a generally "L" shaped configuration extending vertically in the sidewall window 9230 and also extending laterally in the window 9206 formed in the deck 9174. The tooth 9170 of the resilient finger 9168 is similarly arranged so as to deflect into the window 9206 below the deck 9174 in response to engagement of the cam face 9212 with a portion of the attachment member 138, as described above. It will be appreciated that the "L" shaped configuration of the resilient finger 9168 in this ninth embodiment results in deflection which is both vertically downward with respect to the deck 9174 and laterally inward with respect to the "left" sidewall 9176.

Figure 32:
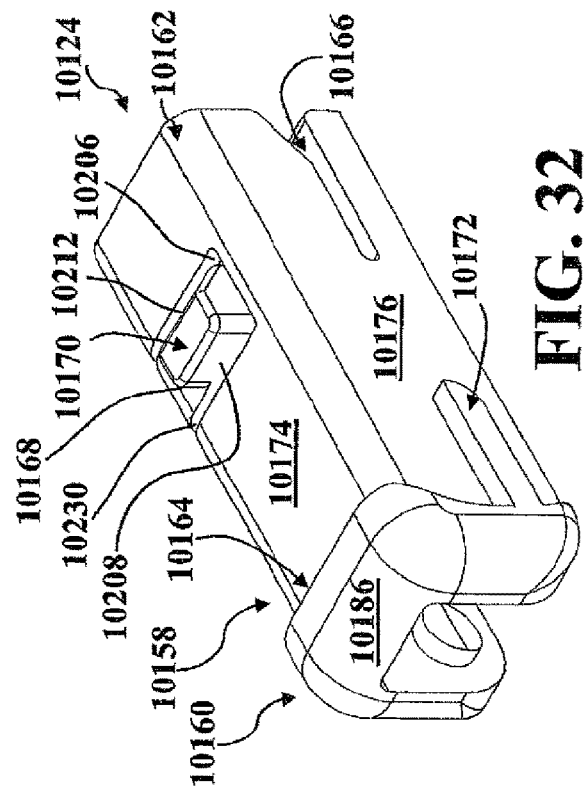
FIG. 32 is a perspective view of an adapter according to a tenth embodiment.

As noted above, a tenth embodiment of the adapter of the wiper assembly 116 is shown in FIG. 32. In the description that follows, the structure and components of the tenth embodiment that are the same as or that otherwise correspond to the structure and components of the first embodiment are provided with the same reference numerals increased by 10000.

The tenth embodiment of the adapter 10124 depicted in FIG. 32 is also substantially similar to the third embodiment of the adapter 3124 described above (compare FIG. 32 to FIG. 29). Thus, for the purposes of clarity and consistency, only the specific differences between the tenth embodiment of the adapter 10124 and the third embodiment of the adapter 3124 will be described below and only certain structural features and components common between these embodiments will be discussed herein and depicted in the drawings of the tenth embodiment of the adapter 10124. Unless otherwise indicated below, it will be appreciated that the description of the third embodiment of the adapter 3124 above may be incorporated by reference with respect to the tenth embodiment of the adapter 10124 without limitation.

As shown in FIG. 32, the tenth embodiment of the adapter 10124 similarly includes both the braces 10172 and the stop 10164 defined by the head 10186 at the first end 10160 of the body 10158, and the slots 10166 and the resilient finger 10168 with the tooth 10170 at the second end 10162 of the body 10158. Here too, the resilient finger 10168 employs the tooth 10170 to engage the aperture 156 of the attachment member 138 so as to effect longitudinal retention between the adapter 10124 and the attachment member 138 when the tooth face 10208 abuts the aperture face 210 in use. Like the ninth embodiment of the adapter 9124 described above, the tenth embodiment of the adapter 10124 also employs the sidewall window 10230 formed in one of the sidewalls 10176 between the first end 10160 and the second end 10162. Specifically, in this tenth embodiment of the adapter 10124, the sidewall window 10230 is formed in the "right" sidewall 10176 and merges with the window 10206 formed in the deck 10174. It will be appreciated that this configuration mirrors that of the ninth embodiment of the adapter 9124 described above, wherein the sidewall window 9230 is formed in the "left" sidewall 9176 (compare FIG. 32 to FIG. 31). Here too, the resilient finger 10168 has a generally "L" shaped configuration extending vertically in the sidewall window 10230 and also extending laterally in the window 10206 formed in the deck 10174. The tooth 10170 of the resilient finger 10168 is similarly arranged so as to deflect into the window 10206 below the deck 10174 in response to engagement of the cam face 10212 with a portion of the attachment member 138, as described above. It will be appreciated that the "L" shaped configuration of the resilient finger 10168 in this tenth embodiment likewise results in deflection which is both vertically downward with respect to the deck 10174 and laterally inward with respect to the "right" sidewall 10176.

With reference now to FIGS. 29-32, the third, eighth, ninth, and tenth embodiments of the adapter 3124, 8124, 9124, 10124 are shown respectively. As indicated above, the eighth, ninth, and tenth embodiments of the adapter 8124, 9124, 10124 are substantially similar to the third embodiment of the adapter 3124 except with respect to the configuration of the resilient finger and window. Specifically, while the third embodiment of the adapter 3124 employs a resilient finger 3168 which extends in the window 3206 in the deck 3174 towards the second end 3162, the eighth embodiment of the adapter 8124 employs a resilient finger 8168 which extends in the window 8206 in the deck 8174 towards the first end 8160, the ninth embodiment of the adapter 9124 employs an "L" shaped resilient finger 9168 which extends in both the window 9206 in the deck 9174 and the sidewall window 9230 formed in the "left" sidewall 9176, and the tenth embodiment of the adapter 10124 employs an "L" shaped resilient finger 10168 which extends in both the window 10206 in the deck 10174 and the sidewall window 10230 formed in the "right" sidewall 10176.

Those having ordinary skill in the art will appreciate that the different configurations of the resilient finger 3168, 8168, 9168, 10168 can be implemented so as to allow space for other structural features or components, such as those which may be employed to facilitate connecting the adapter 3124, 8124, 9124, 10124 to different types of wiper arms (not shown, but generally known in the related art). In addition, it will be appreciated that the different configurations of the resilient finger 3168, 8168, 9168, 10168 afford opportunities for optimizing tooling and/or equipment used to manufacture the adapter 3124, 8124, 9124, 10124. Moreover, those having ordinary skill in the art will appreciate that the resilient finger 8168, 9168, 10168 of the eighth, ninth, and tenth embodiments of the adapter 8124, 9124, 10124 described above could be used in connection with structural features and/or components employed by certain other embodiments of the adapter described herein in order to engage the aperture 156 of the attachment member 138. By way of non-limiting example, the resilient finger 9168 of the ninth embodiment of the adapter 9124 could be combined with the slots 7166 of the seventh embodiment of the adapter 7124 and the braces 4172 of the fourth embodiment of the adapter 4124.

As noted above, an eleventh embodiment of the adapter of the wiper assembly 116 is shown in FIGS. 33A-35. In the description that follows, the structure and components of the eleventh embodiment that are the same as or that otherwise correspond to the structure and components of the first embodiment are provided with the same reference numerals increased by 11000.

Figure 33A:
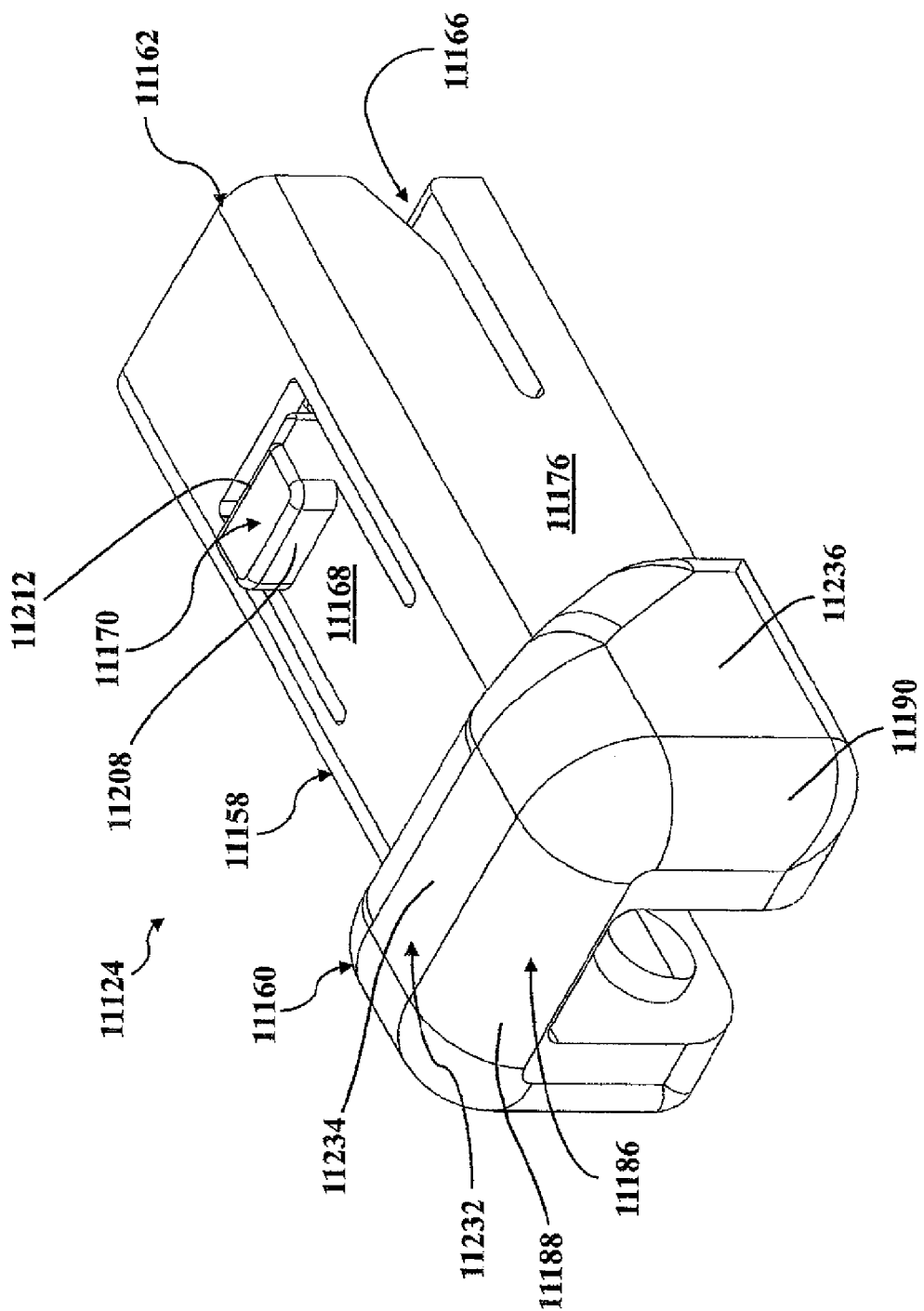
FIG. 33A is a perspective view of an adapter according to an eleventh embodiment.

The eleventh embodiment of the adapter 11124 depicted in FIGS. 33A-35 is similar to the third embodiment of the adapter 3124 described above (compare FIG. 33A to FIG. 29). Thus, for the purposes of clarity and consistency, only the specific differences between the eleventh embodiment of the adapter 11124 and the third embodiment of the adapter 3124 will be described below and only certain structural features and components common between these embodiments will be discussed herein and depicted in the drawings of the eleventh embodiment of the adapter 11124. Unless otherwise indicated below, it will be appreciated that the description of the third embodiment of the adapter 3124 above may be incorporated by reference with respect to the eleventh embodiment of the adapter 11124 without limitation.

Figure 33B:
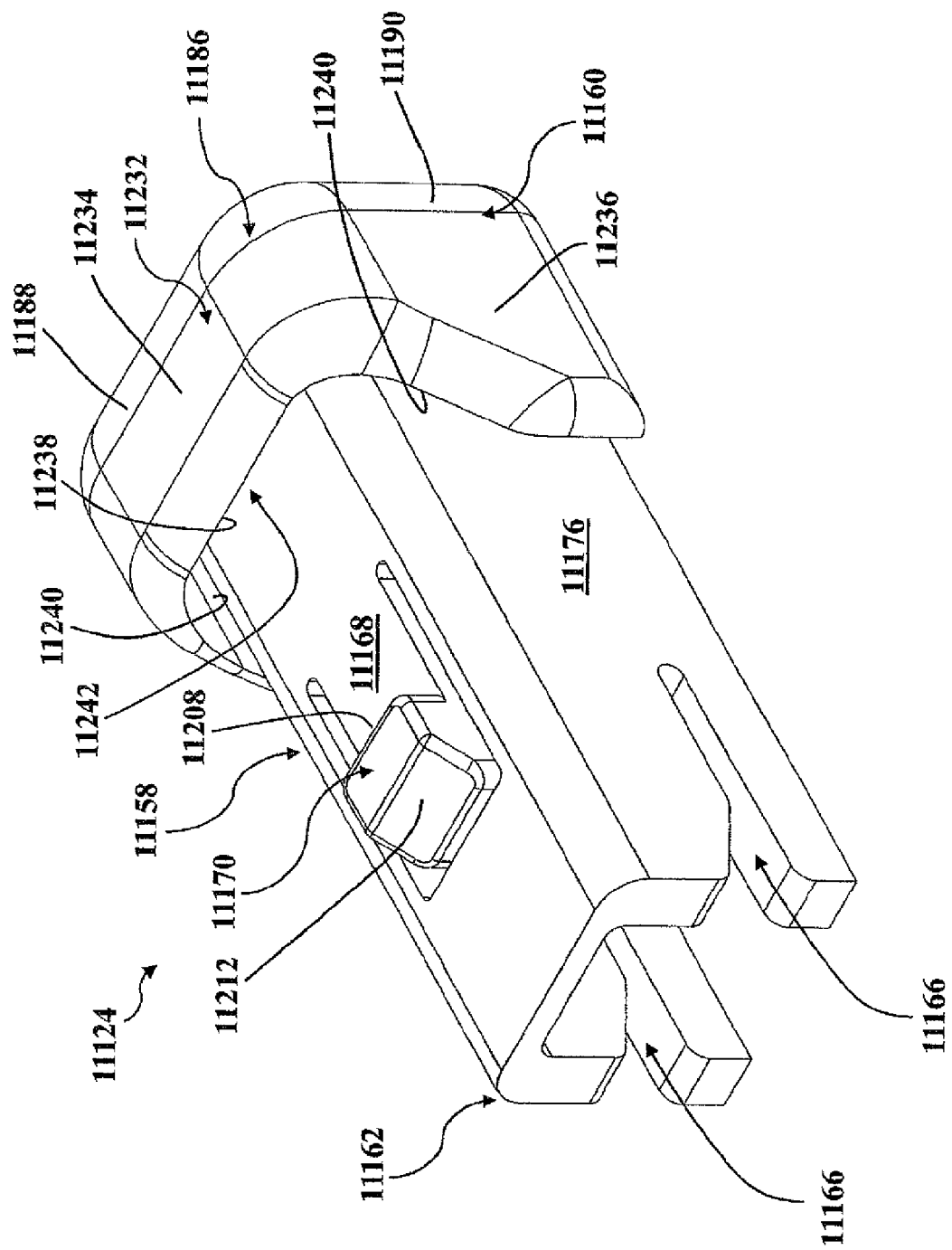
FIG. 33B is a rotated perspective view of the adapter of FIG. 33A.

As shown in FIGS. 33A-33B, the eleventh embodiment of the adapter 11124 similarly includes the slots 11166 and the resilient finger 11168 with the tooth 11170 at the second end 11162 of the body 11158. However, in this eleventh embodiment, the adapter 11124 employs a sheath, generally indicated at 11232, adjacent to the first end 11160 of the body 11158. The sheath 11232 extends longitudinally from the head 11186 towards the second end 11162 of the body 11158, and includes a sheath top 11234 and a pair of sheath sides 11236 depending from the sheath top 11234 (see also FIG. 35). Here, the sheath 11232 merges with the head 11186 such that the head upper surface 11188 extends with and defines a portion of the sheath top 11234, and the head side surfaces 11190 similarly extend with and define portions of the respective sheath sides 11236. As shown in FIG. 33B, the sheath top 11234 has a lower abutment surface 11238 arranged so as to abut a portion of the upper wall 142 of the attachment member 138 adjacent to the terminal end 140. The lower abutment surface 11238 is spaced vertically below and faces away from the head upper surface 11188 defined by the head 11186. The sheath sides 11236 each have an inner abutment surface 11240 arranged so as to abut a portion of one of the respective side walls 144 of the attachment member 138 adjacent to the terminal end 140. The inner abutment surfaces 11240 face towards each other and are spaced laterally inwardly from the head side surfaces 11190 defined by the head 11186. The sheath sides 11236 extend longitudinally further towards the second end 11162 of the body 11158 than the sheath top 11234, which gives the sheath 11232 an angled profile. Here, the sheath sides 11236 extend longitudinally far enough towards the second end 11162 so as to conceal the cutouts 148 of the attachment member 138 when secured, thereby providing increased aesthetic value and shielding the cutouts 148 from the elements in use. However, it will be appreciated that the sheath 11232 could be configured in any suitable way sufficient to effect retention of the attachment member 138 at the first end 11160 without departing from the scope of the present invention.

As shown best in FIG. 33B, the lower abutment surface 11238 and the inner abutment surfaces 11240 of the sheath 11232 cooperate to define a sheath pocket 11242 adjacent to the stop 11164 at the first end 11160 of the body 11158 of the adapter 11124 (see also FIG. 35). The sheath pocket 11242 is arranged so as to cooperate with the slots 11166 to guide the terminal end 140 of the attachment member 138 into the adapter 11124 during assembly as the tooth 11170 of the resilient finger 11168 engages the aperture 156 of the attachment member 138 so as to effect longitudinal retention between the adapter 11124 and the attachment member 138 when the tooth face 11208 abuts the aperture face 210 in use.

As noted above, a twelfth embodiment of the adapter of the wiper assembly 116 is shown in FIGS. 36A-38. In the description that follows, the structure and components of the twelfth embodiment that are the same as or that otherwise correspond to the structure and components of the first embodiment are provided with the same reference numerals increased by 12000.

Figure 36A:
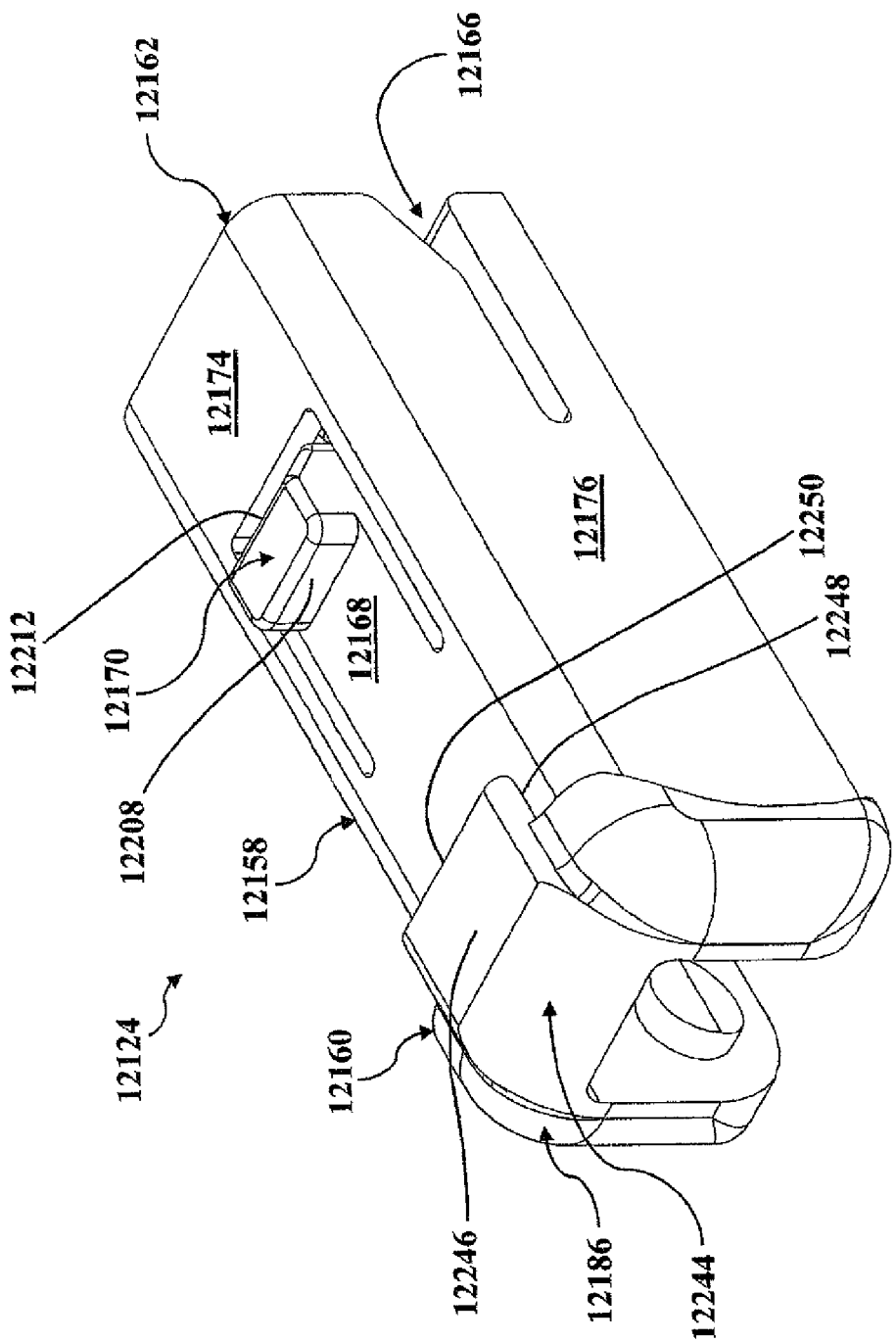
FIG. 36A is a perspective view of an adapter according to a twelfth embodiment.

The twelfth embodiment of the adapter 12124 depicted in FIGS. 36A-38 is similar to the third embodiment of the adapter 3124 described above (compare FIG. 36A to FIG. 29). Thus, for the purposes of clarity and consistency, only the specific differences between the twelfth embodiment of the adapter 12124 and the third embodiment of the adapter 3124 will be described below and only certain structural features and components common between these embodiments will be discussed herein and depicted in the drawings of the twelfth embodiment of the adapter 12124. Unless otherwise indicated below, it will be appreciated that the description of the third embodiment of the adapter 3124 above may be incorporated by reference with respect to the twelfth embodiment of the adapter 12124 without limitation.

Figure 36B:
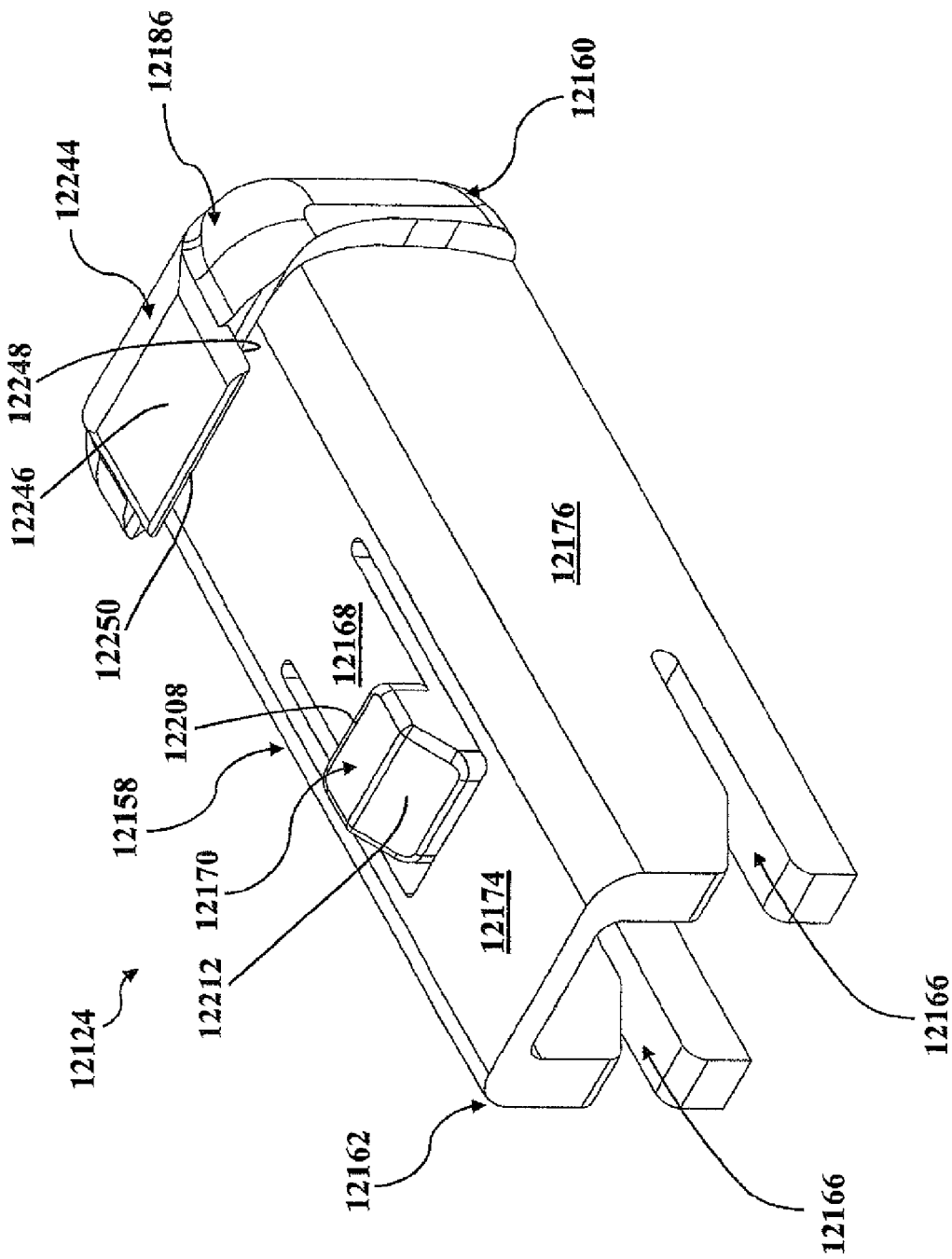
FIG. 36B is a rotated perspective view of the adapter of FIG. 36A.

As shown in FIGS. 36A-36B, the twelfth embodiment of the adapter 12124 similarly includes the slots 12166 and the resilient finger 12168 with the tooth 12170 at the second end 12162 of the body 12158. However, in this twelfth embodiment, the adapter 12124 employs a shelf, generally indicated at 12244, adjacent to the first end 12160 of the body 12158. The shelf 12244 has a generally rectangular profile and extends both vertically above longitudinally away from the head 12186 towards the second end 12162 of the body 12158. Here, the shelf 12244 merges with the head 12186 and has a shelf upper surface 12246 which faces away from the head 12186. As shown in FIG. 36B, the shelf 12244 also has a shelf abutment surface 12248 arranged so as to abut a portion of the upper wall 142 of the attachment member 138 adjacent to the terminal end 140. The shelf abutment surface 12248 is spaced vertically below and faces away from the shelf upper surface 12246. Here, the shelf 12244 extends longitudinally over the deck 12174 far enough towards the second end 12162 so as to effect retention of the attachment member 138 at the first end 12160 of the body 12158 of the adapter 12124. The shelf 12244 terminates longitudinally at a shelf curve surface, generally indicated at 12250, which is arranged to guide the terminal end 140 of the attachment member 138 under the shelf 12244 during attachment. The shelf curve surface 12250 merges the shelf abutment surface 12248 with the shelf upper surface 12246.

As shown best in FIG. 36B, the shelf 12244 also extends laterally and is arranged between the sidewalls 12176 of the adapter 12124 above the deck 12174. However, those having ordinary skill in the art will appreciate that the shelf 12244 could be arranged, shaped, or otherwise configured in any suitable way sufficient to effect retention of the attachment member 138 at the first end 12160 by abutting the upper wall 142 of the attachment member 138 adjacent to the terminal end 140, without departing from the scope of the present invention. Here too, the shelf 12244 is arranged so as to cooperate with the slots 12166 to guide the terminal end 140 of the attachment member 138 into the adapter 12124 during assembly as the tooth 12170 of the resilient finger 12168 engages the aperture 156 of the attachment member 138 so as to effect longitudinal retention between the adapter 12124 and the attachment member 138 when the tooth face 12208 abuts the aperture face 210 in use.

As noted above, a thirteenth embodiment of the adapter of the wiper assembly 116 is shown in FIGS. 39A-41. In the description that follows, the structure and components of the thirteenth embodiment that are the same as or that otherwise correspond to the structure and components of the first embodiment are provided with the same reference numerals increased by 13000.

Figure 39A:
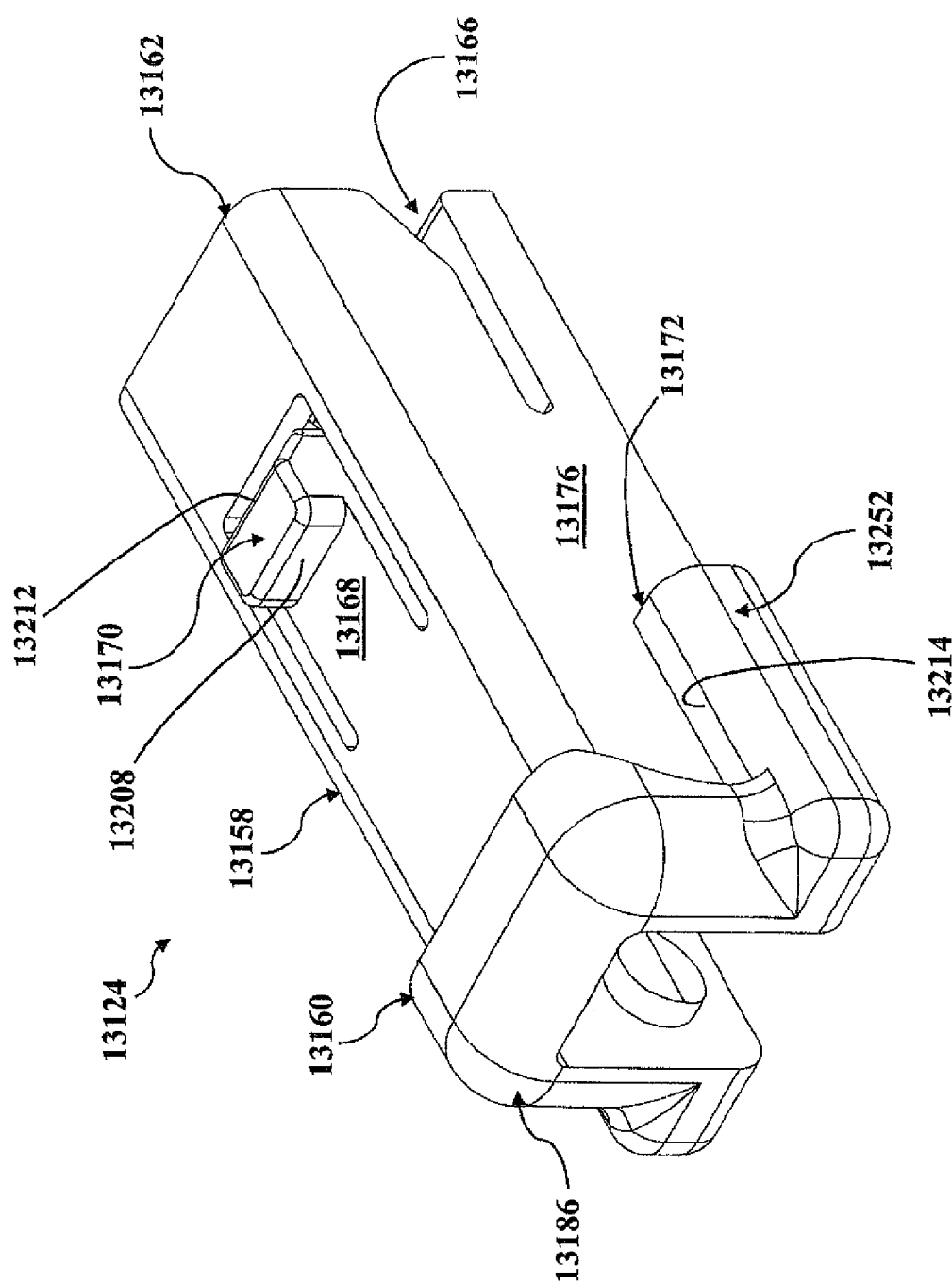
FIG. 39A is a perspective view of an adapter according to a thirteenth embodiment.

The thirteenth embodiment of the adapter 13124 depicted in FIGS. 39A-41 is similar to the third embodiment of the adapter 3124 described above (compare FIG. 39A to FIG. 29). Thus, for the purposes of clarity and consistency, only the specific differences between the thirteenth embodiment of the adapter 13124 and the third embodiment of the adapter 3124 will be described below and only certain structural features and components common between these embodiments will be discussed herein and depicted in the drawings of the thirteenth embodiment of the adapter 13124. Unless otherwise indicated below, it will be appreciated that the description of the third embodiment of the adapter 3124 above may be incorporated by reference with respect to the thirteenth embodiment of the adapter 13124 without limitation.

Figure 39B:
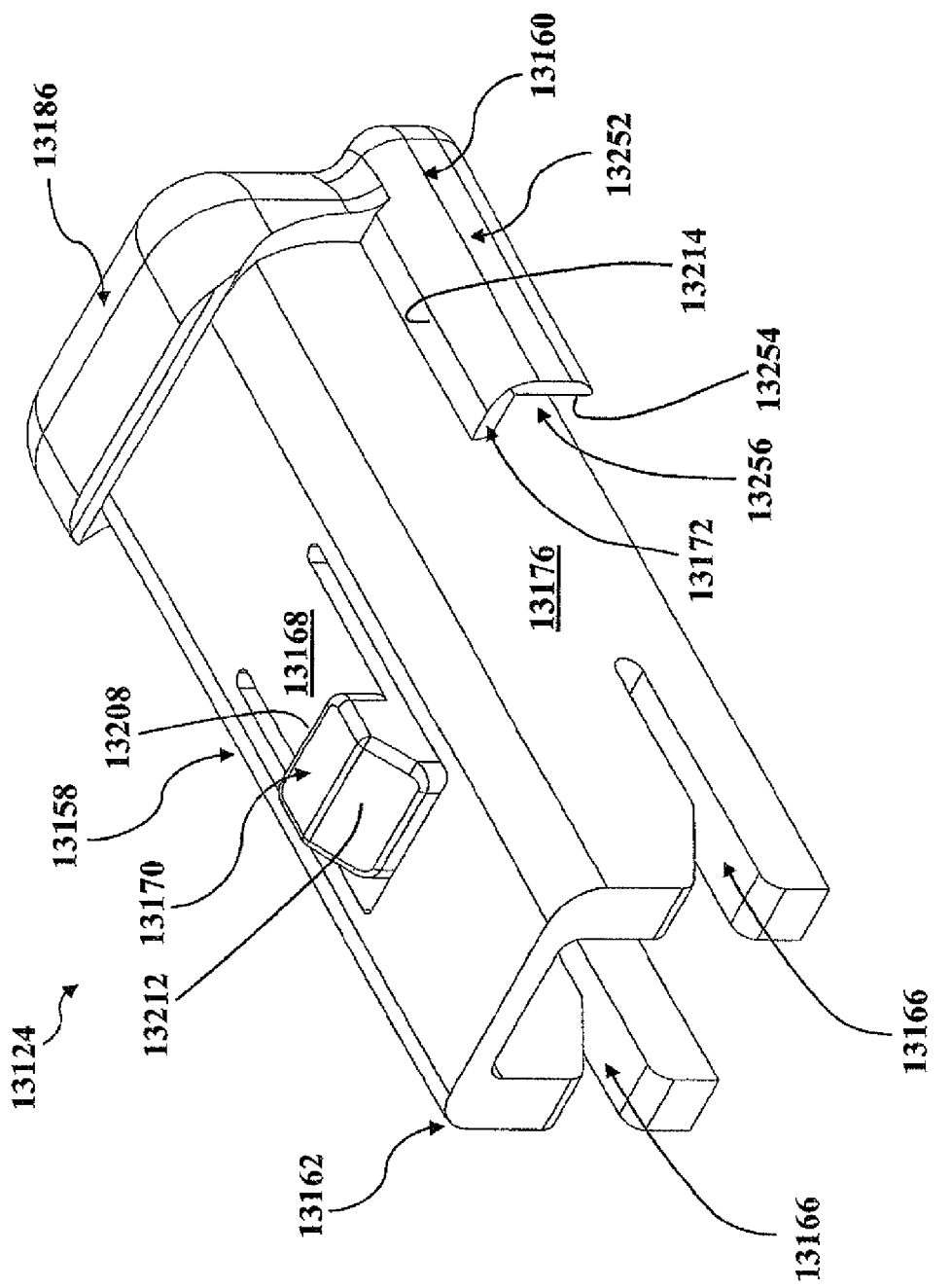
FIG. 39B is a rotated perspective view of the adapter of FIG. 39A.

As shown in FIGS. 39A-39B, the thirteenth embodiment of the adapter 13124 similarly includes both the braces 13172 and the stop 13164 defined by the head 13186 at the first end 13160 of the body 13158, and the slots 13166 and the resilient finger 13168 with the tooth 13170 at the second end 13162 of the body 13158. However, in this thirteenth embodiment, the adapter 13124 further includes a brace wall, generally indicated at 13252, which extends with each of the braces 13172 longitudinally from the first end 13160 of the body 13158 towards the second end 13162 of the body 13158. The brace walls 13252 are spaced laterally outwardly from each of the respective sidewalls 13176, and also depend vertically downwardly from the respective braces 13172 (see FIG. 39B). The brace walls 13252 merge with the respective braces 13172 as well as the head 13186. Specifically, the brace walls 13252 merge into the upper brace surfaces 13214 of the braces 13172 (see FIG. 39B).

Each of the brace walls 13252 has a wall abutment surface 13254 arranged to abut a portion of the respective side walls 144 of the attachment member 138 adjacent to the terminal end 140 and below the cutout 148. The wall abutment surfaces 13254 face laterally inwardly towards the respective sidewalls 13176. As shown best in FIG. 39B, the side stops 13164B defined by the head 13186 are disposed adjacent to and vertically above the braces 13172 and the brace walls 13252. As shown in FIGS. 39B and 41, the wall abutment surfaces 13254 of the brace walls 13252 and the lower brace surfaces 13214 of the braces 13172 are arranged perpendicularly with respect to each other. Here, the wall abutment surfaces 13254, the lower brace surfaces 13216, and the sidewalls 13176 cooperate so as to define a pocket 13256 for accommodating part of each of the side walls 144 below the cutouts 148 at the terminal end 140 of the attachment member 138. Here, the pocket 13256 has a downwardly-opening "U" shaped profile. However, those having ordinary skill in the art will appreciate that the pocket 13256 could have any suitable shape or configuration sufficient to engage the attachment member 138 adjacent to the first end 13160 of the body 13158 of the adapter so as to promote retention of the attachment member 138 in use. Moreover, it will be appreciated that the adapter 13124 could employ additional structure to abut the bottoms of the side walls 144 of the attachment member 138 (not shown).

It will be appreciated that the brace walls 13252 are arranged so as to cooperate with the slots 13166 to guide the terminal end 140 of the attachment member 138 into the adapter 13124 during assembly as the tooth 13170 of the resilient finger 13168 engages the aperture 156 of the attachment member 138 so as to effect longitudinal retention between the adapter 13124 and the attachment member 138 when the tooth face 13208 abuts the aperture face 210 in use. Moreover, it will be appreciated that no portion of the fourteenth embodiment of adapter 14124 engages the upper cutout edges 150 of the cutouts 148 of the attachment member 138.

As noted above, a fourteenth embodiment of the adapter of the wiper assembly 116 is shown in FIGS. 42A-44. In the description that follows, the structure and components of the fourteenth embodiment that are the same as or that otherwise correspond to the structure and components of the first embodiment are provided with the same reference numerals increased by 14000.

Figure 42A:
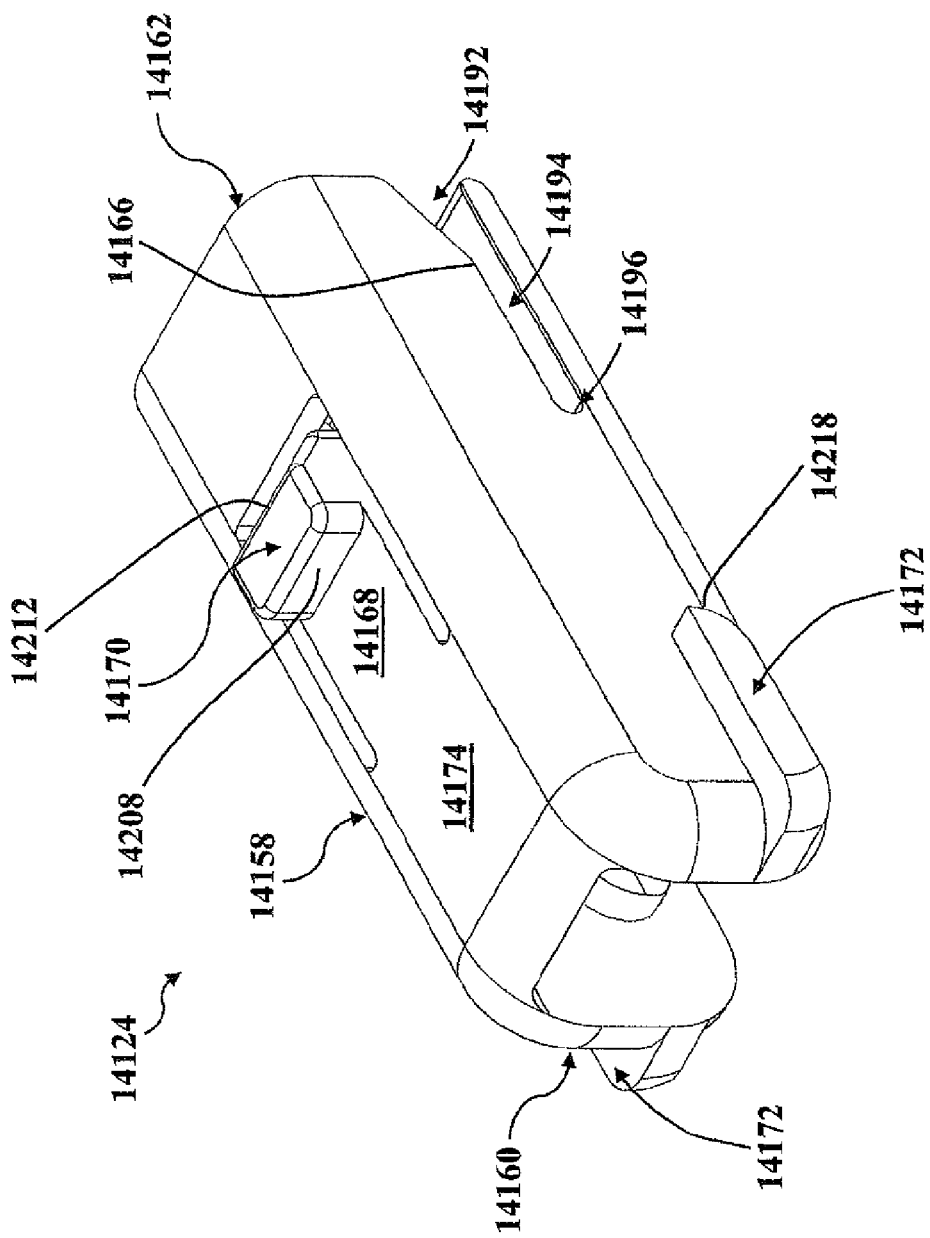
FIG. 42A is a perspective view of an adapter according to a fourteenth embodiment.

The fourteenth embodiment of the adapter 14124 depicted in FIGS. 42A-44 is similar to the third embodiment of the adapter 3124 described above (compare FIG. 42A to FIG. 29). Thus, for the purposes of clarity and consistency, only the specific differences between the fourteenth embodiment of the adapter 14124 and the third embodiment of the adapter 3124 will be described below and only certain structural features and components common between these embodiments will be discussed herein and depicted in the drawings of the fourteenth embodiment of the adapter 14124. Unless otherwise indicated below, it will be appreciated that the description of the third embodiment of the adapter 3124 above may be incorporated by reference with respect to the fourteenth embodiment of the adapter 14124 without limitation.

Figure 42B:
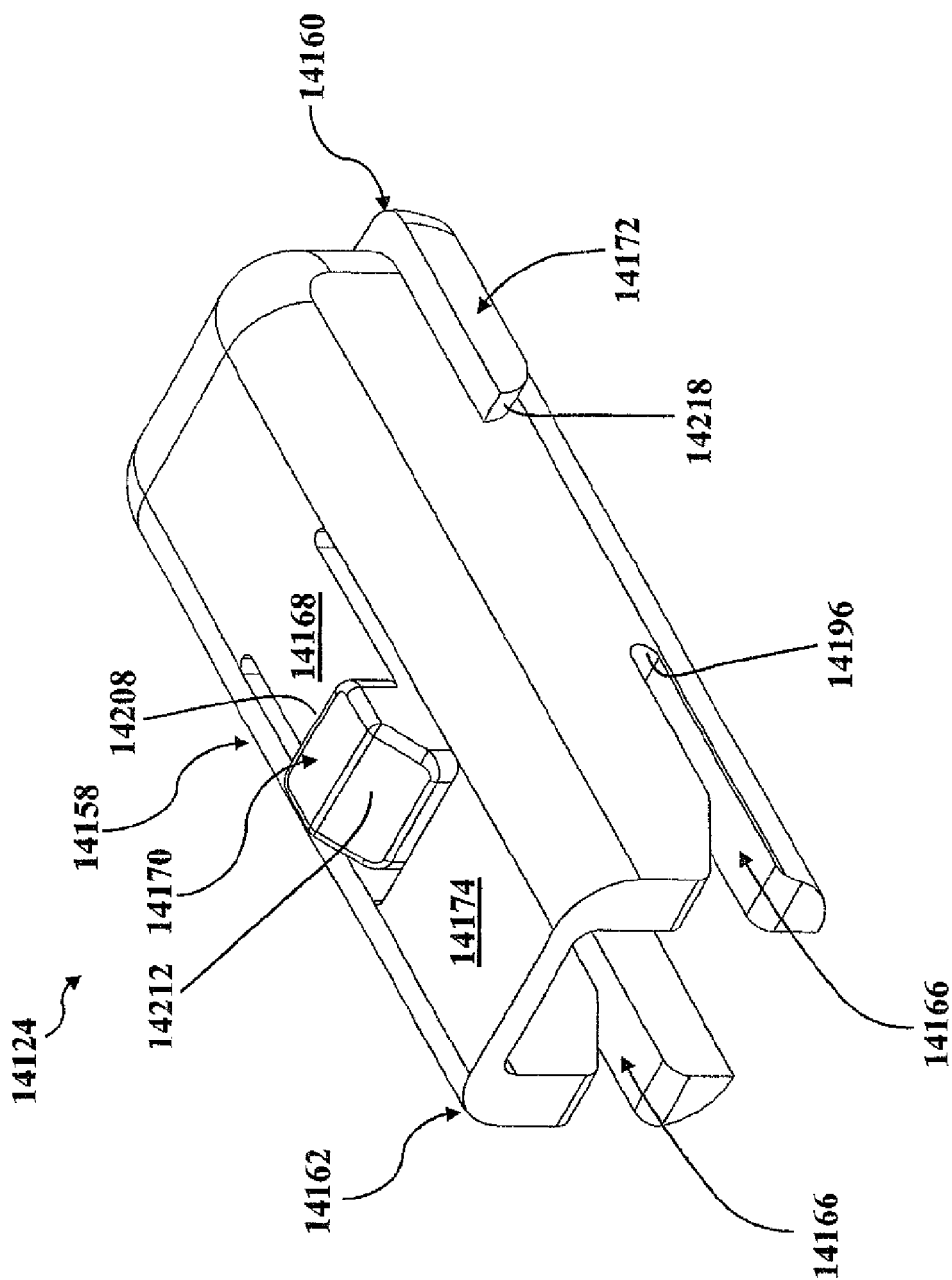
FIG. 42B is a rotated perspective view of the adapter of FIG. 42A.

As shown in FIGS. 42A-42B, the fourteenth embodiment of the adapter 14124 similarly includes the braces 14172 at the first end 14160 of the body 14158, and the slots 14166 and the resilient finger 14168 with the tooth 14170 at the second end 14162 of the body 14158. In this fourteenth embodiment, the body 14158 of the adapter 14124 has a smoother, rounded profile between the first end 14160 and the second end 14160 which omits anything like the head described above, such as in connection with the third embodiment of the adapter 3124 (compare FIG. 42A to FIG. 29). Rather, in this fourteenth embodiment of the adapter 14124, the floors 14196 of the slots 14166 are arranged so as to limit longitudinal movement of the attachment member 138 towards the first end 14160 of the body 14158 when the floors 14196 abut the respective protrusions 146 of the attachment member. In addition, the floors 14196 are arranged so as to cooperate with the resilient finger 14168 to prevent longitudinal movement between the secured adapter 14124 and the attachment member 138. Here too, the tooth 14170 of the resilient finger 14168 engages the aperture 156 of the attachment member 138 so as to effect longitudinal retention between the adapter 14124 and the attachment member 138 when the tooth face 14208 abuts the aperture face 210 in use.

As shown best in FIG. 44, in this fourteenth embodiment of the adapter 14124, both the floors 14196 of the slots 14166 and the tooth face 14208 of the tooth 14170 of the resilient finger 14168 are arranged on the body 14158 closer to the second end 14162 than to the first end 14160, and are disposed in spaced longitudinal relation with respect to each other. It will be appreciated that this configuration promotes sufficient longitudinal retention in use. Here, vertical retention is afforded by abutment of the deck 14174 of the adapter 14124 with the upper wall 142 of the attachment member 138 between the first end 14160 and the second end 14162. In addition, vertical retention is also afforded by engagement of the protrusions 146 in the slots 14166, as well as engagement of the braces 14172 in the cutouts 148. Moreover, the braces 14172 also contribute to additional longitudinal retention adjacent to the first end 14160 of the body 14158 due to abutment of the curve brace surfaces 14218 of the braces 14172 with the curve cutout edges 154 of the respective cutouts 148 of the attachment member 138 (see FIG. 44). Here too, it will be appreciated that no portion of the fourteenth embodiment of adapter 14124 engages the upper cutout edges 150 of the cutouts 148 of the attachment member 138.

As noted above, a fifteenth embodiment of the adapter of the wiper assembly 116 is shown in FIGS. 45A-52. In the description that follows, the structure and components of the fifteenth embodiment that are the same as or that otherwise correspond to the structure and components of the first embodiment are provided with the same reference numerals increased by 15000.

As shown best in FIGS. 45A-47, the fifteenth embodiment of the adapter 15124 similarly includes the body 15158 which extends between the first end 15160 and the second end 15162. In addition, the adapter 15124 of the fifteenth embodiment also includes a cap, generally indicated at 15258, which is pivotally attached to the body 15158 adjacent to the first end 15160, as described in greater detail below.

In this fifteenth embodiment, the body 15158 of the adapter 15124 includes a retention socket, generally indicated at 15260, which is formed adjacent to the first end 15160 and which is configured to receive a retention formation 15262 of the cap 15258 so as to selectively limit pivoting of the cap 15258 with respect to the body 15158. A projection 15264 is provided for engaging in the aperture 156 formed in the upper wall 142 of the attachment member 138, and extends vertically from the body 15158 adjacent to the second end 15162. The body 15158 also includes a pair of vertical slots, generally indicated at 15266, formed adjacent to the second end 15162 for receiving the protrusions 146 of the attachment member 138. The various components and structural features of the cap 15258 and the body 15158 of the adapter 15124 of the fifteenth embodiment, including the retention socket 15260, the retention formation 15262, the projection 15264, and the vertical slots 15266, will each be described in greater detail below.

Figure 45A:
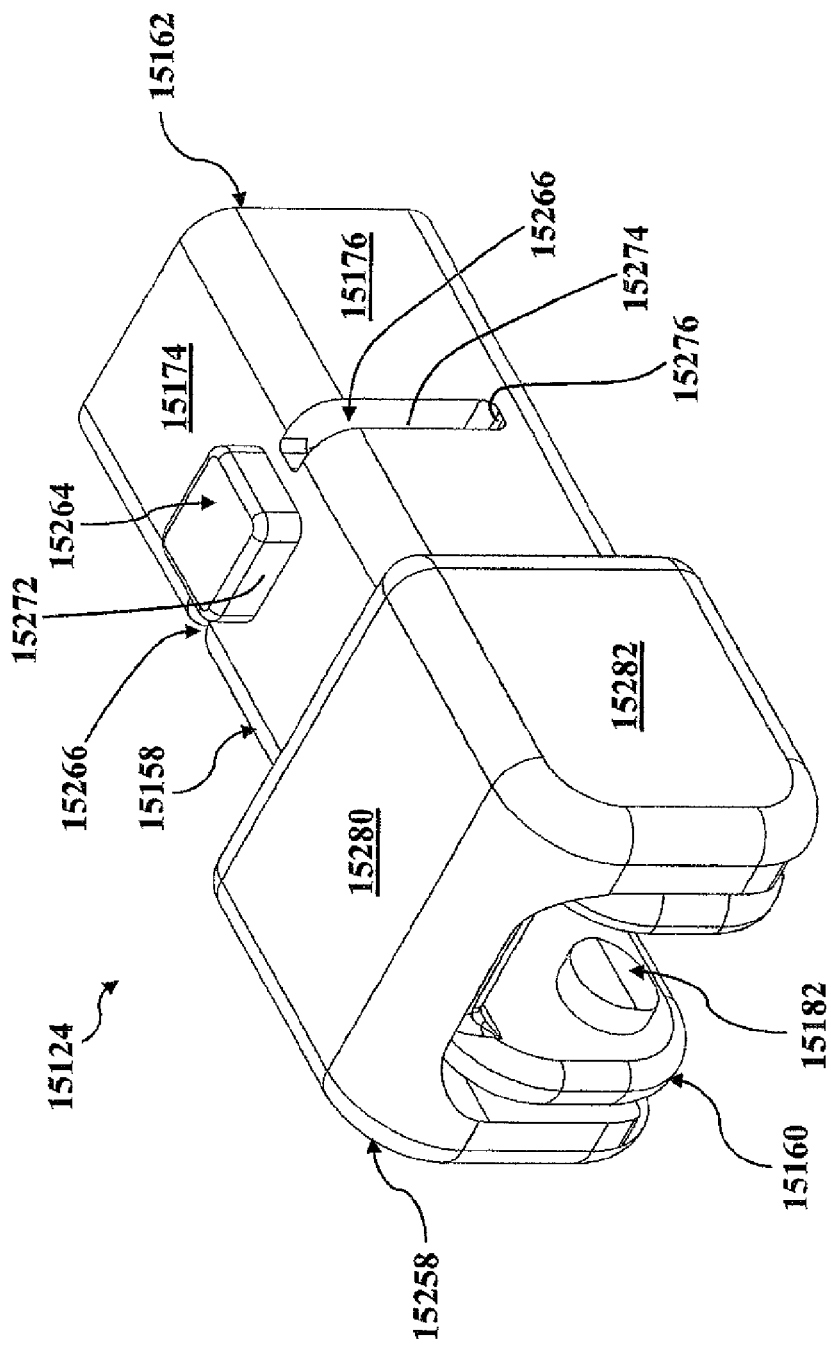
FIG. 45A is a perspective view of an adapter according to a fifteenth embodiment, the adapter having a body and a cap.
Figure 45B:
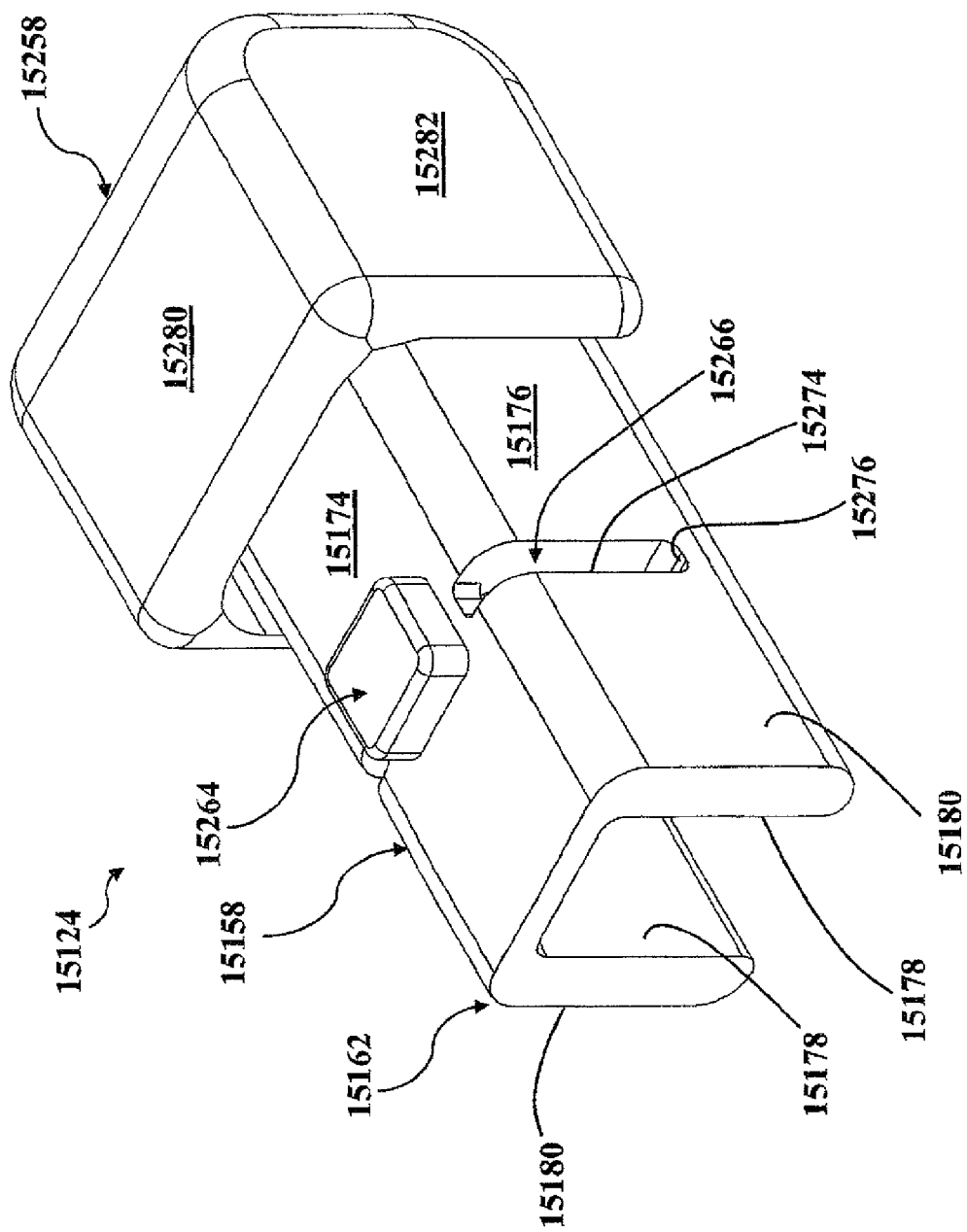
FIG. 45B is a rotated perspective view of the adapter of FIG. 45A.

As is shown best in FIG. 45B, the body 15158 of the adapter 15124 also includes the deck 15174 extending between the first end 15160 and the second end 15162 with opposing sidewalls 15176 depending from the deck 15174, each of which has an inner surface 15178 and an outer surface 15180. The sidewalls 15176 each extend from the deck 15174 substantially perpendicularly such that the inner and outer surfaces 15178, 15180 of the sidewalls 15176 are substantially parallel to each other. However, as noted above in connection with previous embodiments, those having ordinary skill in the art will appreciate that the sidewalls 15176 could be configured differently without departing from the scope of the present invention.

Here too in the fifteenth embodiment, the body 15158 of the adapter 15124 employs inwardly-facing trunnions 15182 formed on the body 15158 adjacent to the first end 15160. The trunnions 15182 extend towards each other from the respective inner surfaces 15178 of the sidewalls 15176 and are arranged to be disposed within the recesses 136 formed in the saddle 134 of the coupler 122 so as to effect pivoting of the body 15158 of the adapter 15124 with respect to the coupler 122 in operation. However, as noted above in connection with previous embodiments, those having ordinary skill in the art will appreciate that the trunnions 15182 could be configured or otherwise arranged in any suitable way sufficient to effect pivoting of the body 15158 of the adapter 15124 with respect to the coupler 122, or the trunnions 15182 could be omitted with the adapter 15124 and coupler 122 employing a different arrangement of structural features and/or components to effect pivoting, without departing from the scope of the present invention.

Figure 46:
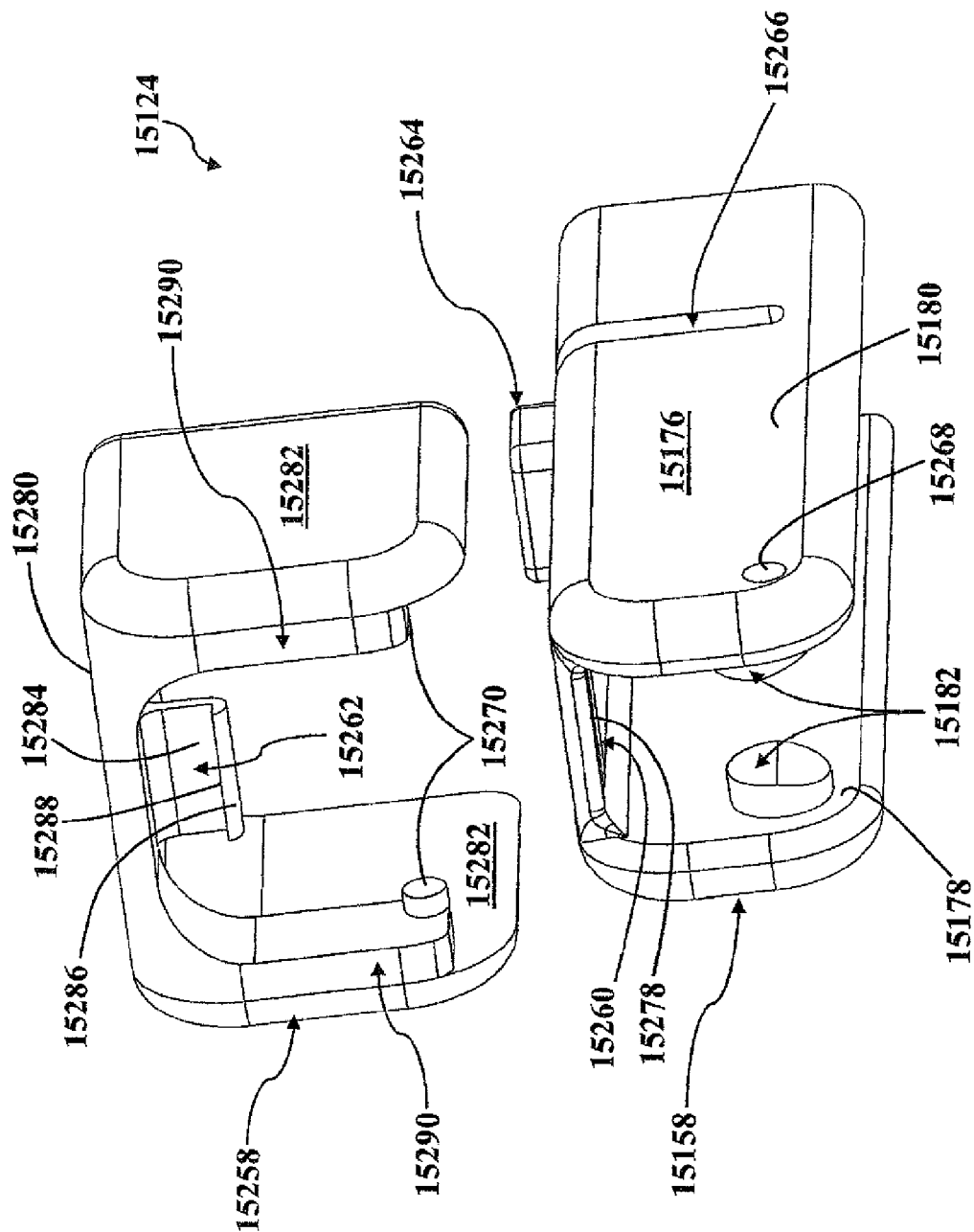
FIG. 46 is an exploded perspective view of the adapter of FIGS. 45A-45B.

With reference now to FIG. 46, an exploded view of the fifteenth embodiment of the adapter 15124 is shown with the cap 15258 removed from the body 15158. As noted above, the cap 15258 is configured to pivot with respect to the body 15158. To that end, the body 15158 includes opposing bores 15268 formed in the sidewalls 15176 which are arranged to receive corresponding bosses 15270 of the cap 15258 such that the cap 15258 can pivot with respect to the body 15158 when the adapter 15124 is being secured to the attachment member 138, as described in greater detail below. Those having ordinary skill in the art will appreciate that the bores 15268 and/or the bosses 15270 could be configured or otherwise arranged in any suitable way sufficient to effect pivoting of the cap 15258 of the adapter 15124 with respect to the body 15158 of the adapter 15124, or a different arrangement of structural features and/or components could otherwise be employed to effect selective relative pivoting therebetween, without departing from the scope of the present invention.

As noted above, in the fifteenth embodiment of the adapter 15124, the projection 15264 of the body 15158 engages in the aperture 156 of the attachment member 138 to effect longitudinal retention adjacent to the second end 15162. The projection 15264 is advantageously formed as a rigid, integral component of the body 15158, and is disposed closer to the second end 15162 than to the first end 15160. The projection 15264 extends vertically from the deck 15174 so as to define a projection face 15272 which faces towards the first end 15160 and which is arranged to abut the aperture face 210 of the aperture 156 of the attachment member 138 when the adapter 15124 is secured to the attachment member 138 (see FIGS. 50 and 52). As shown best in FIGS. 45A-45B, the projection 15264 has a generally rounded-rectangular profile that compliments the profile of the aperture 156 of the attachment member 138. However, those having ordinary skill in the art will appreciate that the projection 15264 could have any suitable shape, profile, or configuration sufficient to be disposed in the aperture 156 of the attachment member 138 so as to restrict longitudinal movement between the attachment member and the body 15158 of the adapter 15124, without departing from the scope of the present invention.

Figure 52:
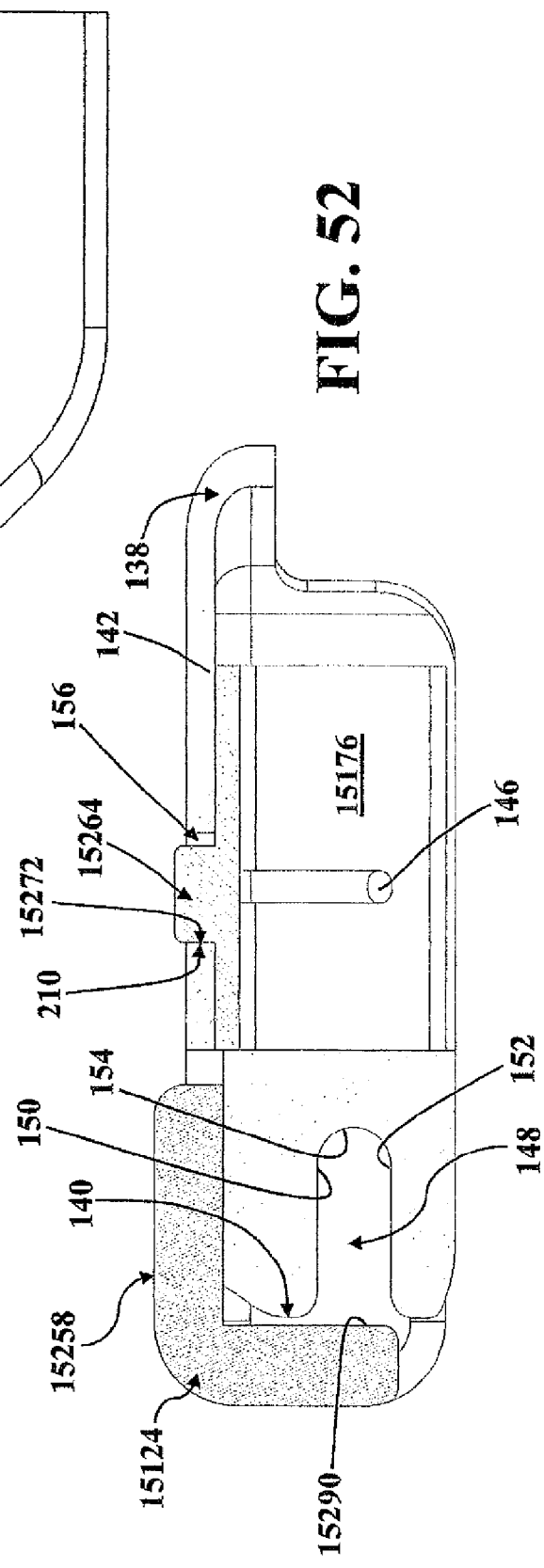
FIG. 52 is a sectional view taken along line 52-52 of FIG. 51.
Figure 53A:
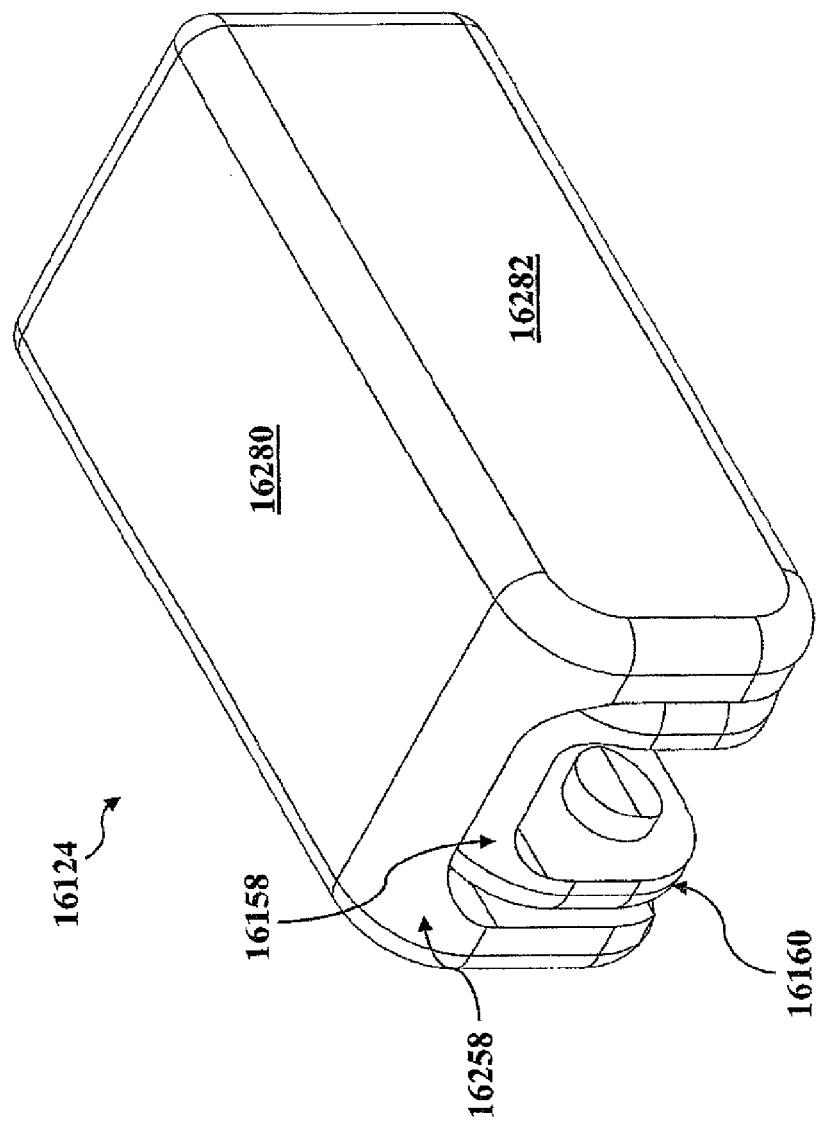
FIG. 53A is a perspective view of an adapter according to a sixteenth embodiment, the adapter having a body and a cap.
Figure 53B:
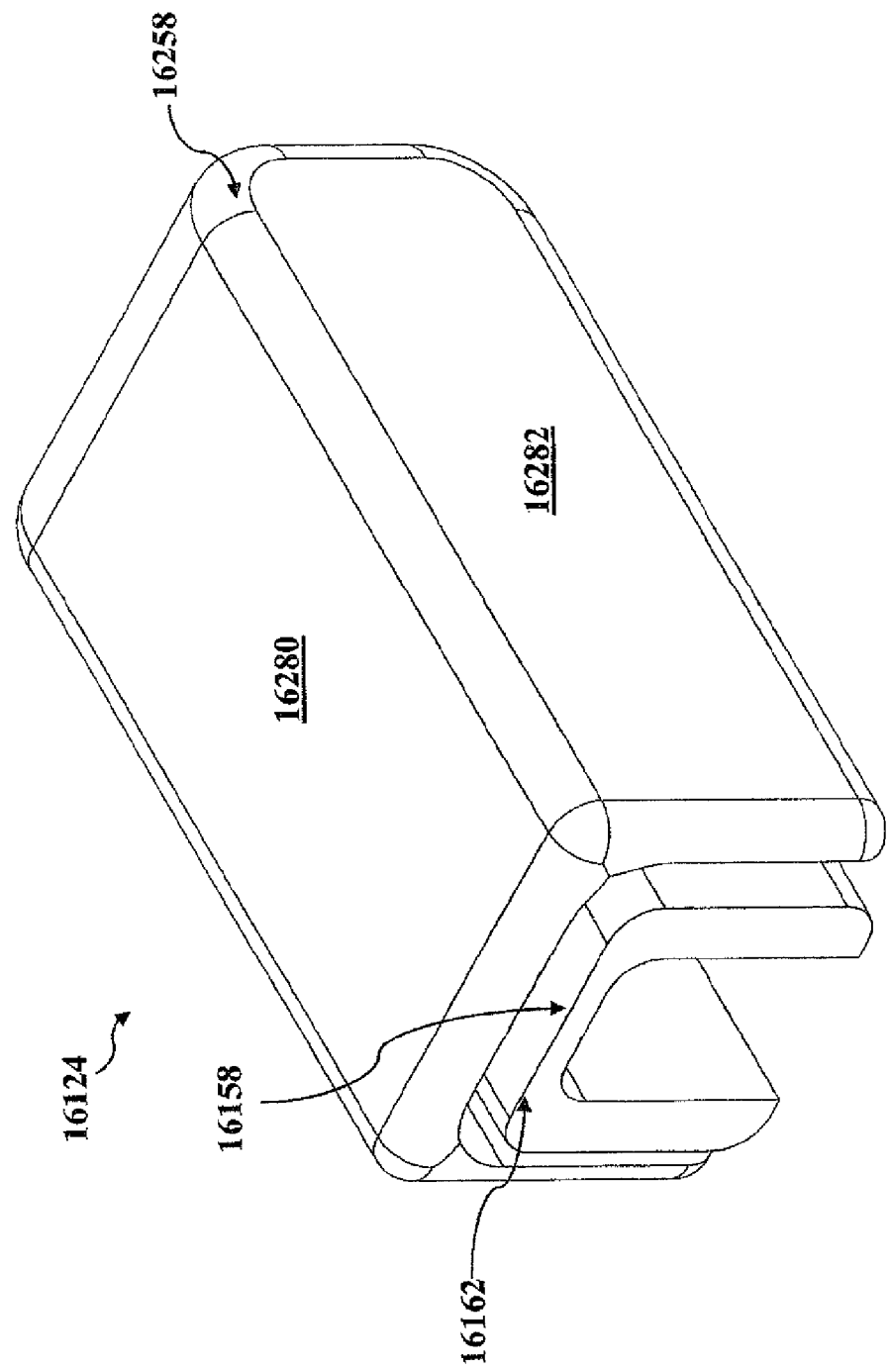
FIG. 53B is a rotated perspective view of the adapter of FIG. 53A.
Figure 54:
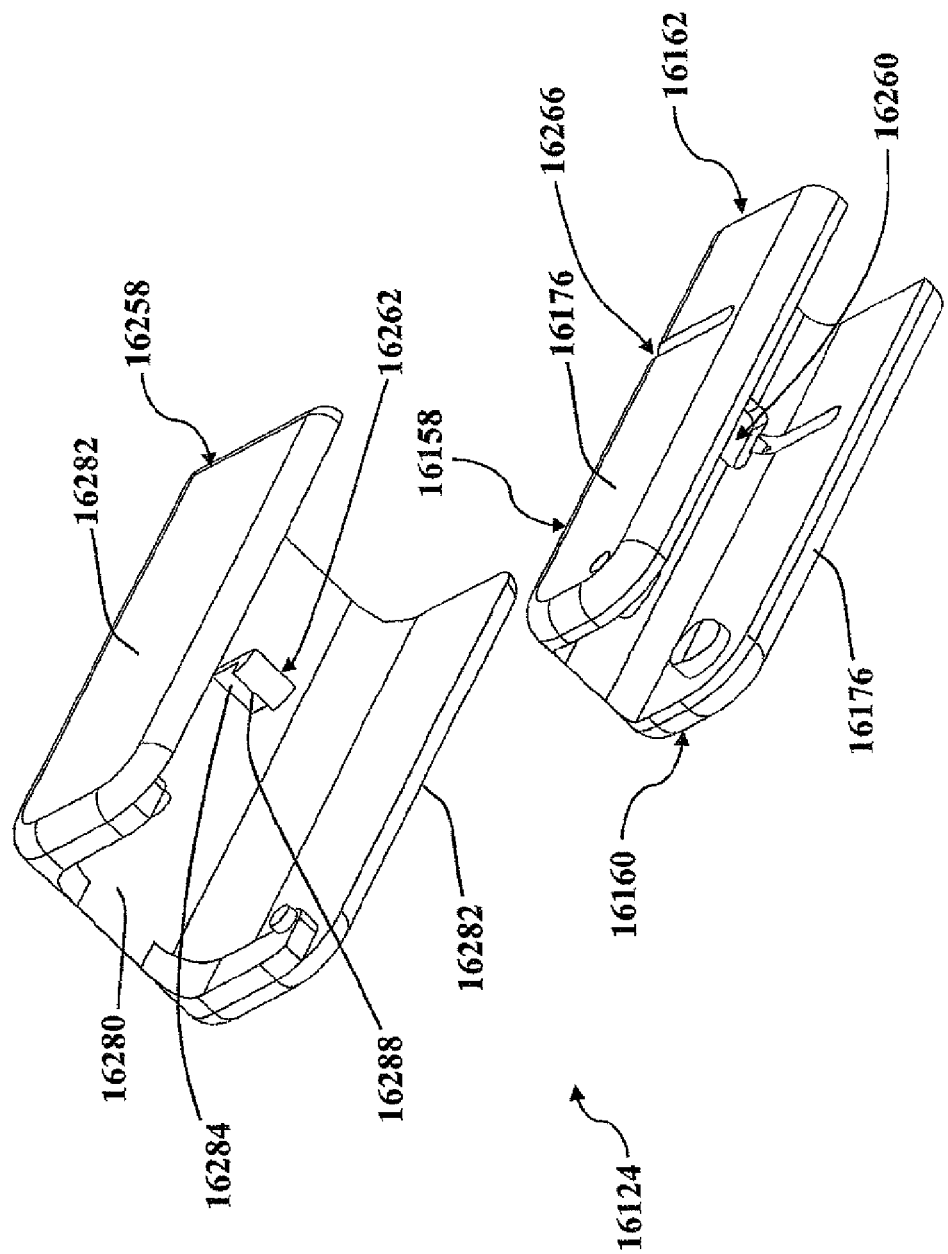
FIG. 54 is an exploded perspective view of the adapter of FIGS. 53A-53B.

As noted above, the fifteenth embodiment of the adapter 15124 employs vertical slots 15266 to accommodate the protrusions 146 of the attachment member 138. To that end, the vertical slots 15266 are formed in the respective sidewalls 15176 adjacent to the second end 15162, and each has a vertical channel, generally indicated at 15274 which extends vertically downwardly from the deck 15174 to a vertical floor, generally indicated at 15276, defined in each of the sidewalls 15176. As shown in FIGS. 50 and 52, the vertical floors 15276 are arranged to abut the protrusions 146 of the attachment member 138 when the adapter 15124 is secured to the attachment member 138 so as to contribute to vertical retention at the second end 15162 of the body 15158 of the adapter 15124.

Figure 47:
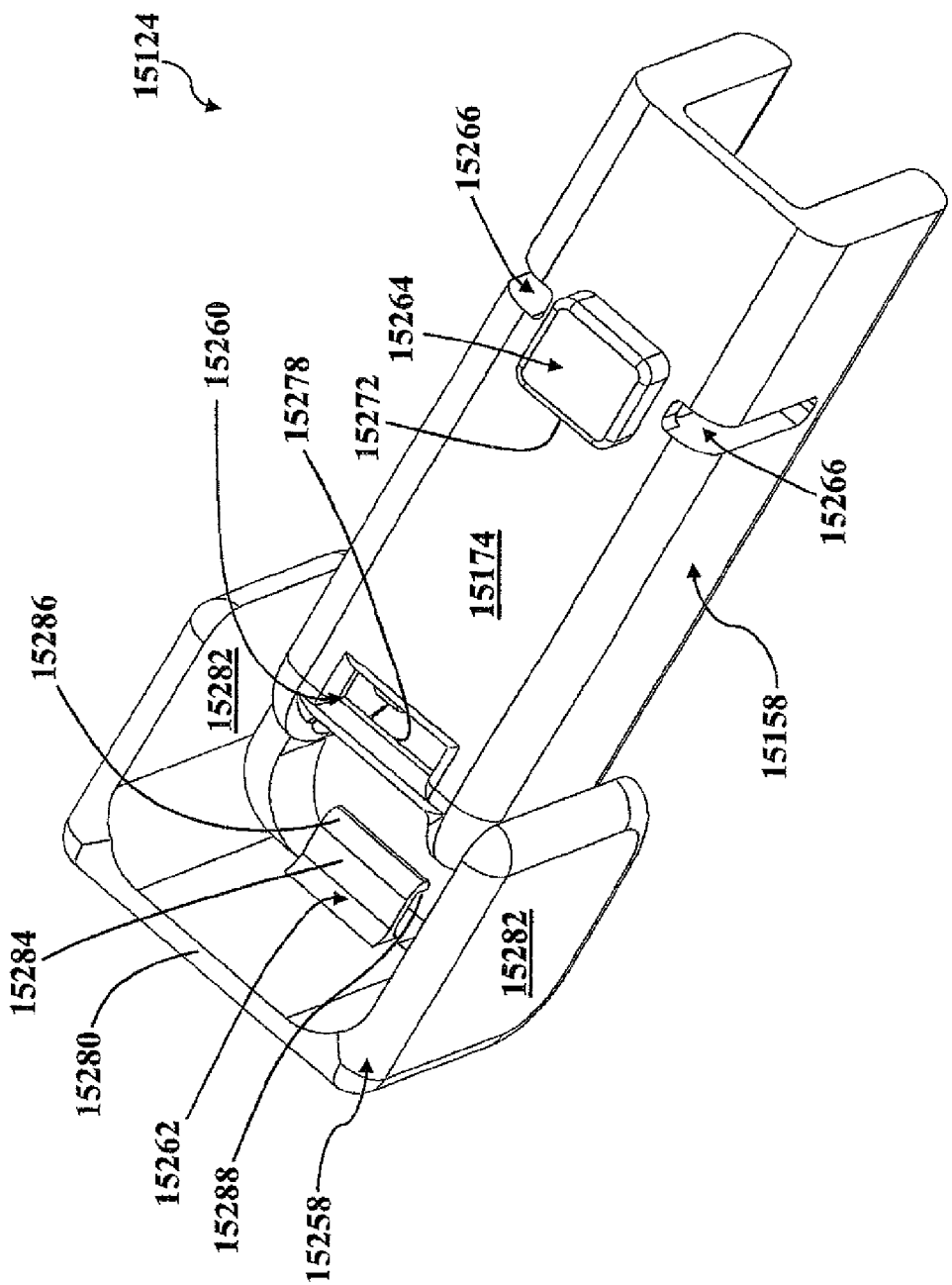
FIG. 47 is a perspective view of the adapter of FIGS. 45A-46 shown in an open configuration.

With reference now to FIGS. 47 and 52, as noted above, the body 15158 of the fifteenth embodiment of the adapter 15124 employs the retention socket 15260 adjacent to the first end 15160 to receive the retention formation 15262 of the cap 15258 so as to selectively limit pivoting of the cap 15258 with respect to the body 15158. Here, the retention socket 15260 is defined by a rectangular aperture formed in the deck 15174 adjacent to the first end 15160, with a retention face 15278 that is arranged to engage the retention formation 15262, as described in greater detail below. As will be appreciated from the subsequent description of the retention formation 15262 below, the retention socket 15260 and/or the retention face 15278 could have any suitable shape or configuration sufficient to cooperate with the retention formation 15262 to selectively restrict rotation of the cap 15258 with respect to the body 15158, without departing from the scope of the present invention.

Referring now to FIGS. 46, 47, and 50, as noted above, the cap 15258 of the fifteenth embodiment of the adapter 15124 can be selectively pivoted with respect to the body 15158 so as to secure the adapter 15124 to the attachment member 138 when the retention formation 15262 engages the retention socket 15260. Here, the cap 15258 has a generally rectangular top wall 15280 and a pair of generally rectangular edge walls 15282 which depend vertically downwardly from the top wall 15280 and which are spaced laterally from each other so as to accommodate the side walls 144 of the attachment member 138 therebetween. As shown best in FIG. 47, the retention formation 15262 depends from the top wall 15280 of the cap 15258. More specifically, the retention formation 15262 has a resiliently flexible formation body 15284 which is operatively attached to the top wall 15280 and extends vertically downwardly to a bulb 15286 which, in turn, defines a formation face 15288 arranged to engage the retention face 15278 of the retention socket 15260 so as to prevent rotation of the cap 15258 with respect to the body 15158. As shown in FIG. 50, the formation body 15284 has a generally rectangular profile shaped to be accommodated in the retention socket 15260 when the formation face 15288 abuts the projection face 15272. The bulb 15286 has a rounded profile configured to deflect the retention formation 15262 towards the second end 15162 of the body 15158 as the bulb 15286 is brought into engagement with a portion of the deck 15174 adjacent to the retention socket 15260 (see FIG. 50; certain reference numerals omitted for clarity). The formation face 15288 is arranged perpendicularly to the formation body 15284 and is parallel to the top wall 15280 of the cap 15258. Those having ordinary skill in the art will appreciate that the retention formation 15262 and/or the retention socket 15260 could be arranged, configured, or shaped in any suitable way and with any suitable structure sufficient to selectively prevent rotation of the cap 15258 with respect to the body 15158, without departing from the scope of the present invention.

As shown in FIGS. 46 and 52, the cap 15258 of the adapter 15124 also includes a spacer, generally indicated at 15290, formed on each of the edge walls 15282. The spacers 15290 extend laterally inwardly towards each other and are arranged so as to be disposed adjacent to the terminal end 140 of the attachment member 138 when the adapter 15124 is secured to the attachment member 138 (see FIG. 52). While the spacers 15290 are shown as being spaced from the terminal end 140 of the attachment member 138, it will be appreciated that the spacers 15290 could be configured to extend longitudinally towards the second end 15162 of the body 15158 when secured so as to abut part of the terminal end 140 of the attachment member 138. As shown in FIG. 46, the bosses 15270 extend laterally inwardly from the respective spacers 15290 towards each other. As noted above, the edge walls 15282 are spaced laterally from each other so as to accommodate the side walls 144 of the attachment member 138 therebetween. Similarly, the spacers 15290 are spaced laterally from each other so as to accommodate the sidewalls 15176 of the body 15158 therebetween.

Figure 48A:
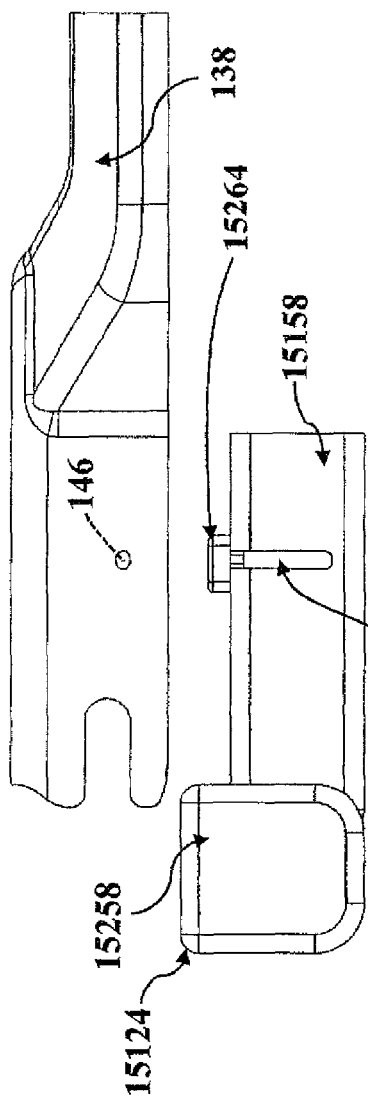
FIG. 48A is a right-side plan view of the fifteenth embodiment of the adapter of FIG. 47 shown in the open configuration spaced from the attachment member of FIGS. 5A-5B.
Figure 48B:
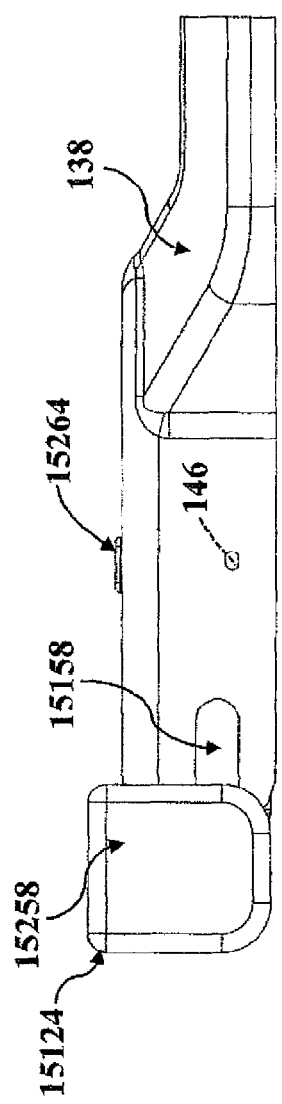
FIG. 48B is a right-side plan view of the adapter and the attachment member of FIG. 48A shown in the open configuration with the attachment member engaging the body of the adapter.
Figure 48C:
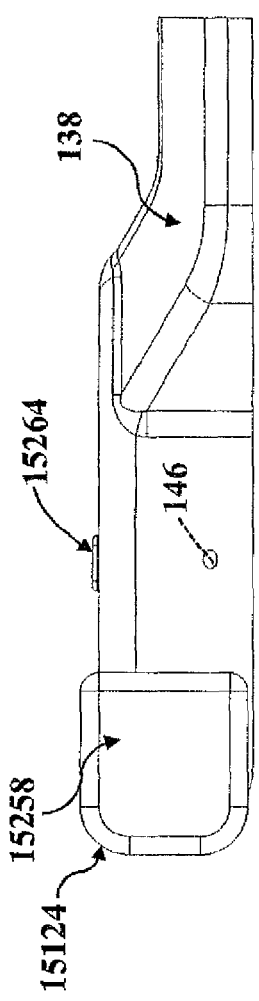
FIG. 48C is a right-side plan view of the adapter and the attachment member of FIGS. 48A-48B shown in a closed configuration with the adapter secured to the attachment member.
Figure 51:
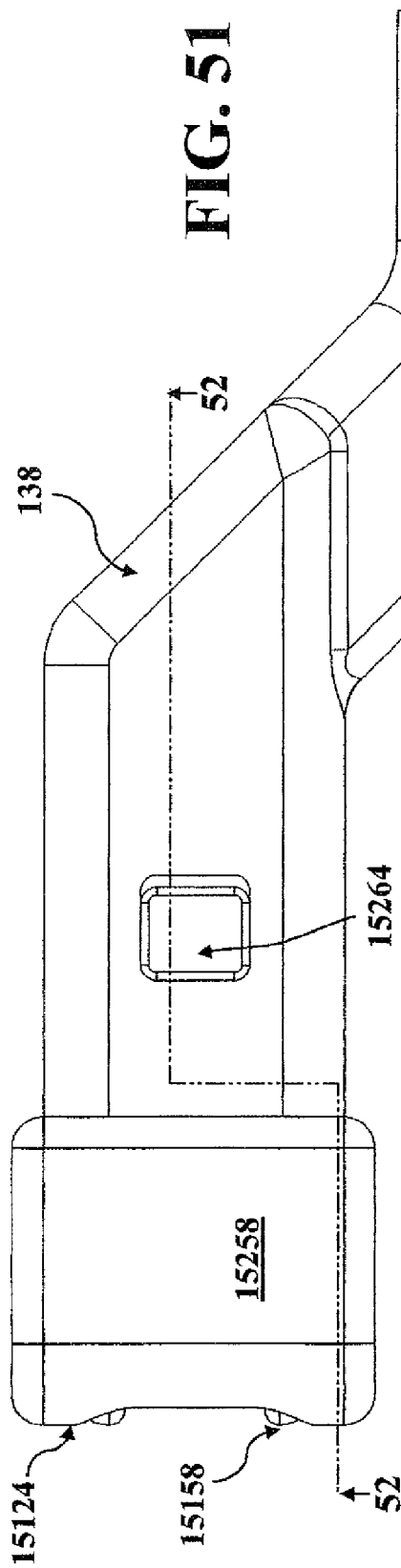
FIG. 51 is another top-side plan view of the fifteenth embodiment of the adapter and the attachment member of FIG. 49.

Referring now to FIGS. 48A-48C, certain assembly steps for securing the fifteenth embodiment of the adapter 15124 to the attachment member 138 are shown sequentially. Here, certain previously-introduced reference numerals are recited below for illustrative purposes but have been omitted from FIGS. 26A-26C for clarity. In order to effect proper connection to the wiper arm 114, the fifteenth embodiment of the adapter 15124 of the wiper assembly 116 is positioned such that the attachment member 138 is spaced vertically above the body 15158 of the adapter 15124 and the cap 15258 is rotated such that the top wall 15280 is moved longitudinally away from the second end 15162 of the body 15158 to accommodate the terminal end 140 of the attachment member 138 between the edge walls 15282 (see FIG. 48A). Next, the attachment member 138 is brought into engagement with the body 15158 of the adapter 15124 whereby the attachment member 138 and/or adapter 15124 are moved vertically towards each other such that the protrusions 146 of the attachment member 138 enter into the vertical channels 15274 of the vertical slots 15266 formed in the sidewalls 15176 of the body 15158. The protrusions 146 of the attachment member 138 travel along the vertical slots 15266 until coming into abutment with the vertical floors 15276 which, in turn, also guides the projection 15264 of the body 15158 into the aperture 156 of the attachment member 138 (see FIG. 48B; see also FIGS. 50 and 52). Next, the cap 15258 of the adapter 15124 is rotated towards the second end 15162 of the body 15158 such that the retention formation 15262 is deflected into the retention socket 15260. As the cap 15258 is rotated further towards the second end 15162 of the body 15158, the top wall 15280 of the cap 15258 comes into abutment with the deck 15174 of the body 15158 and the retention formation 15262 resiliently returns away from the second end 15162 of the body 15158 such that the formation body 15284 of the retention formation 15262 is disposed within the retention socket 15260 and the formation face 15288 of the retention formation 15262 comes into abutment with the retention face 15278 of the retention socket 15260, thereby preventing subsequent rotation of the cap 15258 with respect to the body 15158 and, at the same time, securing the adapter 15124 to the attachment member 138 (see FIG. 48C). Here, the cooperation between the cap 15258 and the body 15158 affords vertical and lateral retention adjacent to the first end 15160 via engagement with the upper wall 142 and the side walls 144 of the attachment member 138. In addition, the projection 15264 and the vertical slots 15266 of the body 15158 afford longitudinal, lateral, and vertical retention adjacent to the second end 15162 via engagement with the aperture 156 and the protrusions 146, respectively, of the attachment member 138 (see FIGS. 50 and 52). Here too, it will be appreciated that no portion of the body 15158 or the cap 15258 of the adapter 15124 engages or otherwise abuts the upper cutout edge 150 of the cutout 148 of the attachment member 138.

As noted above, a sixteenth embodiment of the adapter of the wiper assembly 116 is shown in FIGS. 53A-60. In the description that follows, the structure and components of the sixteenth embodiment that are the same as or that otherwise correspond to the structure and components of the first embodiment are provided with the same reference numerals increased by 16000.

The sixteenth embodiment of the adapter 16124 depicted in FIGS. 53A-60 is similar to the fifteenth embodiment of the adapter 15124 described above (compare FIGS. 53A-55 to FIGS. 45A-47). Thus, for the purposes of clarity and consistency, only the specific differences between the sixteenth embodiment of the adapter 16124 and the fifteenth embodiment of the adapter 15124 will be described below and only certain structural features and components common between these embodiments will be discussed herein and depicted in the drawings of the sixteenth embodiment of the adapter 16124. Unless otherwise indicated below, it will be appreciated that the description of the fifteenth embodiment of the adapter 15124 above may be incorporated by reference with respect to the sixteenth embodiment of the adapter 16124 without limitation.

As shown best in FIGS. 53A-55, the sixteenth embodiment of the adapter 16124 similarly employs a configuration in which the cap 16258 is pivotally mounted to the body 16158 at the first end 16160, and vertical slots 16266 are formed in the body 16158 adjacent to the second end 16162. Here too, the cap 16258 includes a retention formation 16262 depending vertically downwardly from the top wall 16280 which cooperates with a retention socket 16260 formed in the body 16158 so as to selectively limit pivoting of the cap 16258 with respect to the body 16158. However, in the sixteenth embodiment of the adapter 16124, the retention socket 16260 is formed adjacent to the second end 16162 of the body 16158, as opposed to the first end 15160 of the body 15158 as described above in connection with the fifteenth embodiment of the adapter 15124 (compare FIGS. 54-55 to FIGS. 46-47).

Figure 55:
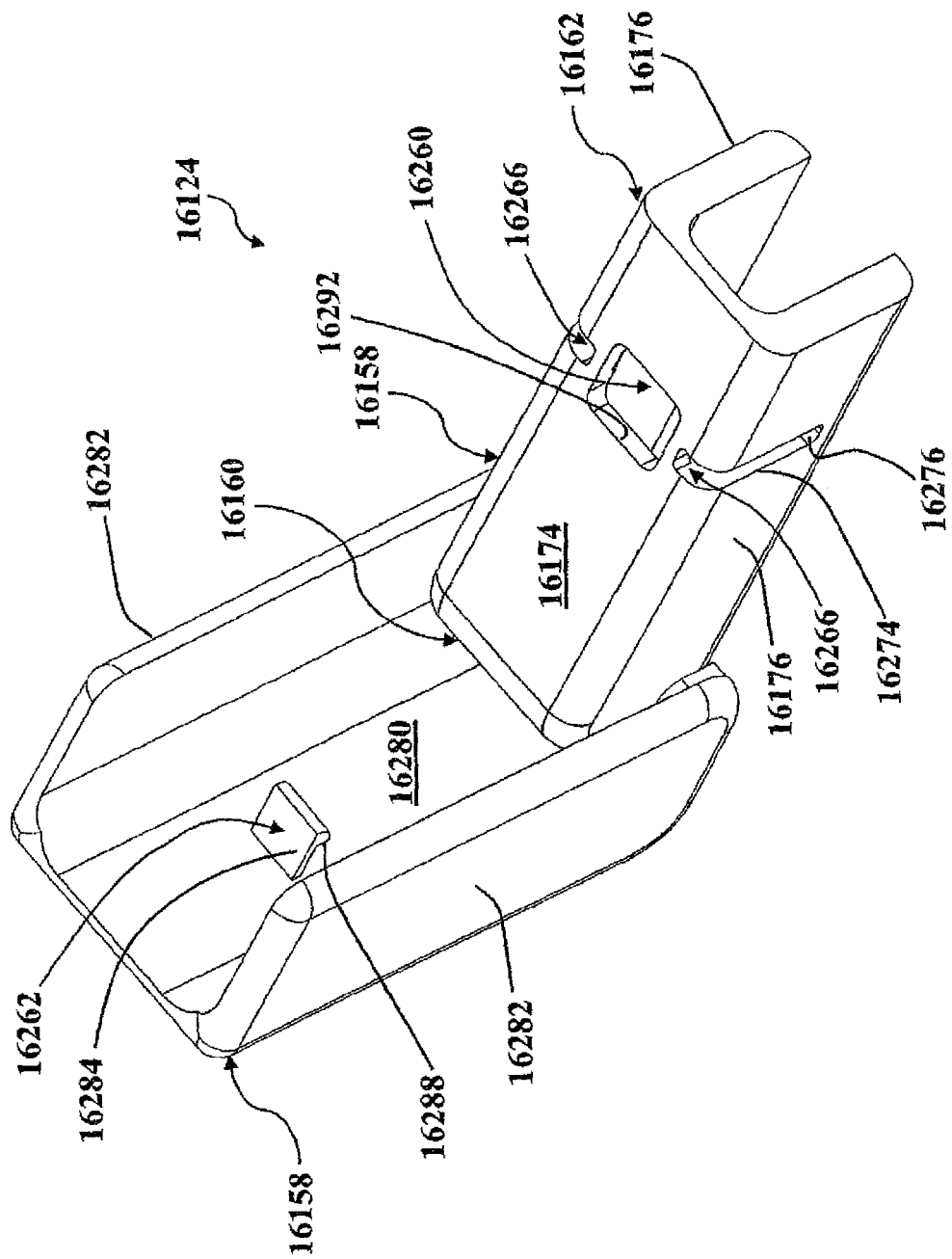
FIG. 55 is a perspective view of the adapter of FIGS. 53A-54 shown in an open configuration.

As shown best in FIG. 55, the retention socket 16260 has a generally rectangular profile, is formed vertically through the deck 16174, and is arranged laterally between both the sidewalls 16176 and the vertical slots 16266. In this sixteenth embodiment, the retention socket 16260 defines a socket face, generally indicated at 16292, which is arranged so as to align longitudinally with the aperture face 210 of the aperture 156 of the attachment member 138 when the adapter 16124 is secured to the attachment member 138, as described in greater detail below (see FIGS. 58 and 60). To that end, in this sixteenth embodiment, the retention formation 15262 of the cap 16258 is arranged such that the formation body 15284 extends through both the retention socket 16260 formed in the body 16158 and the aperture 156 of the attachment member 138 when the adapter 16124 is secured to the attachment member 138. Here, as shown in FIGS. 58 and 60, the formation face 16288 engages the underside of the upper wall 142 of the attachment member 138, and the formation body 16284 abuts both the socket face 16292 of the socket 16260 of the body 16158 and the aperture face 210 of the aperture 156 of the attachment member 138 (see FIG. 58; certain reference numerals omitted for clarity).

Figure 56A:
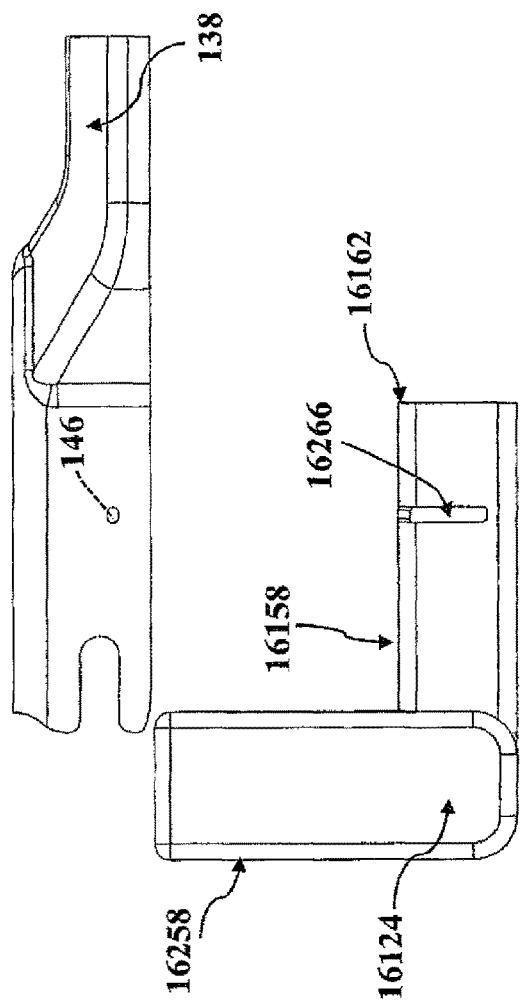
FIG. 56A is a right-side plan view of the sixteenth embodiment of the adapter of FIG. 55 shown in the open configuration spaced from the attachment member of FIGS. 5A-5B.
Figure 56B:
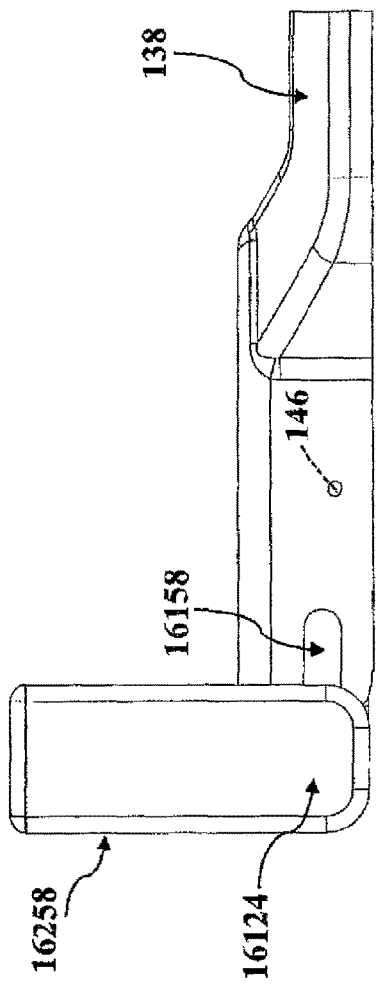
FIG. 56B is a right-side plan view of the adapter and the attachment member of FIG. 56A shown in the open configuration with the attachment member engaging the body of the adapter.
Figure 56C:
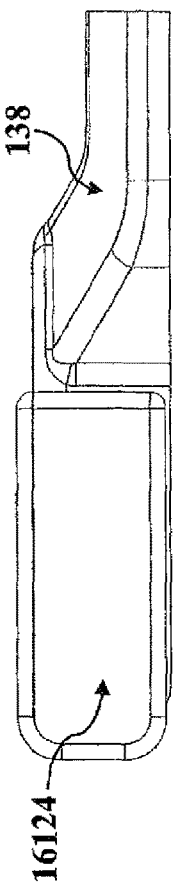
FIG. 56C is a right-side plan view of the adapter and the attachment member of FIGS. 56A-56B shown in a closed configuration with the adapter secured to the attachment member.

Referring now to FIGS. 56A-56C, certain assembly steps for securing the sixteenth embodiment of the adapter 16124 to the attachment member 138 are shown sequentially. Here, certain previously-introduced reference numerals are recited below for illustrative purposes but have been omitted from FIGS. 56A-56C for clarity. In order to effect proper connection to the wiper arm 114, the sixteenth embodiment of the adapter 16124 of the wiper assembly 116 is positioned such that the attachment member 138 is spaced vertically above the body 16158 of the adapter 16124 and the cap 16258 is rotated such that the top wall 16280 is moved longitudinally away from the second end 16162 of the body 16158 to accommodate the terminal end 140 of the attachment member 138 between the edge walls 16282 of the cap 16258 (see FIG. 56A). Next, the attachment member 138 is brought into engagement with the body 16158 of the adapter 16124 whereby the attachment member 138 and/or adapter 16124 are moved vertically towards each other such that the protrusions 146 of the attachment member 138 enter into the vertical channels 16274 of the vertical slots 16266 formed in the sidewalls 16176 of the body 16158. The protrusions 146 of the attachment member 138 travel along the vertical slots 16266 until coming into abutment with the vertical floors 16276 which, in turn, also aligns the retention socket 16260 of the body 16158 with the aperture 156 of the attachment member 138 (see FIG. 56B; see also FIGS. 58 and 60). Next, the cap 16258 of the adapter 16124 is rotated towards the second end 16162 of the body 16158 such that the retention formation 16262 is deflected into the retention socket 16260 and also into the aperture 156 of the attachment member 138. As the cap 16258 is rotated further towards the second end 16162 of the body 16158, the top wall 16280 of the cap 16258 comes into abutment with the deck 16174 of the body 16158 and the retention formation 16262 resiliently returns away from the second end 16162 of the body 16158 such that the formation body 16284 of the retention formation 16262 is disposed within both the retention socket 16260 of the body 16158 and the aperture 156 of the attachment member 138, and the formation face 16288 of the retention formation 16262 comes into abutment with the underside of the upper wall 142 of the attachment member 138, thereby preventing subsequent rotation of the cap 16258 with respect to the body 16158 and, at the same time, securing the adapter 16124 to the attachment member 138 (see FIG. 56C). Here, the cooperation between the cap 16258 and the body 16158 affords vertical and lateral retention adjacent to the first end 16160 via engagement with the upper wall 142 and the side walls 144 of the attachment member 138. In addition, both the vertical slots 16266 of the body 16158, as well as the cooperation between the retention formation 16262 and the retention socket 16260, afford longitudinal, lateral, and vertical retention adjacent to the second end 16162 via engagement with the protrusions 146 and the aperture 166 and, respectively, of the attachment member 138 (see FIGS. 58 and 60). It will be appreciated that abutment of the formation body 16284 of the retention formation 16262 of the cap 16258 against the socket face 16292 of the retention socket 16160 of the body 16158 and the aperture face 210 of the aperture 156 of the attachment member 138 contributes significantly to longitudinal retention adjacent to the second end 16162. Here too, it will be appreciated that no portion of the body 16158 or the cap 16258 of the adapter 16124 engages or otherwise abuts the upper cutout edge 150 of the cutout 148 of the attachment member 138.

As noted above, a seventeenth embodiment of the adapter of the wiper assembly 116 is shown in FIGS. 61A-65. In the description that follows, the structure and components of the seventeenth embodiment that are the same as or that otherwise correspond to the structure and components of the first embodiment are provided with the same reference numerals increased by 17000.

Moreover, as will be appreciated from the subsequent description of the seventeenth embodiment of the adapter 17124 described below, certain structural features of the fifteenth embodiment of the adapter 15124 are likewise employed by the seventeenth embodiment of the adapter 17124. Thus, for the purposes of clarity and consistency, certain structure and components of the seventeenth embodiment that are the same as or that otherwise correspond to the structure and components of the fifteenth embodiment are provided with the same reference numerals increased by 2000.

Figure 61A:
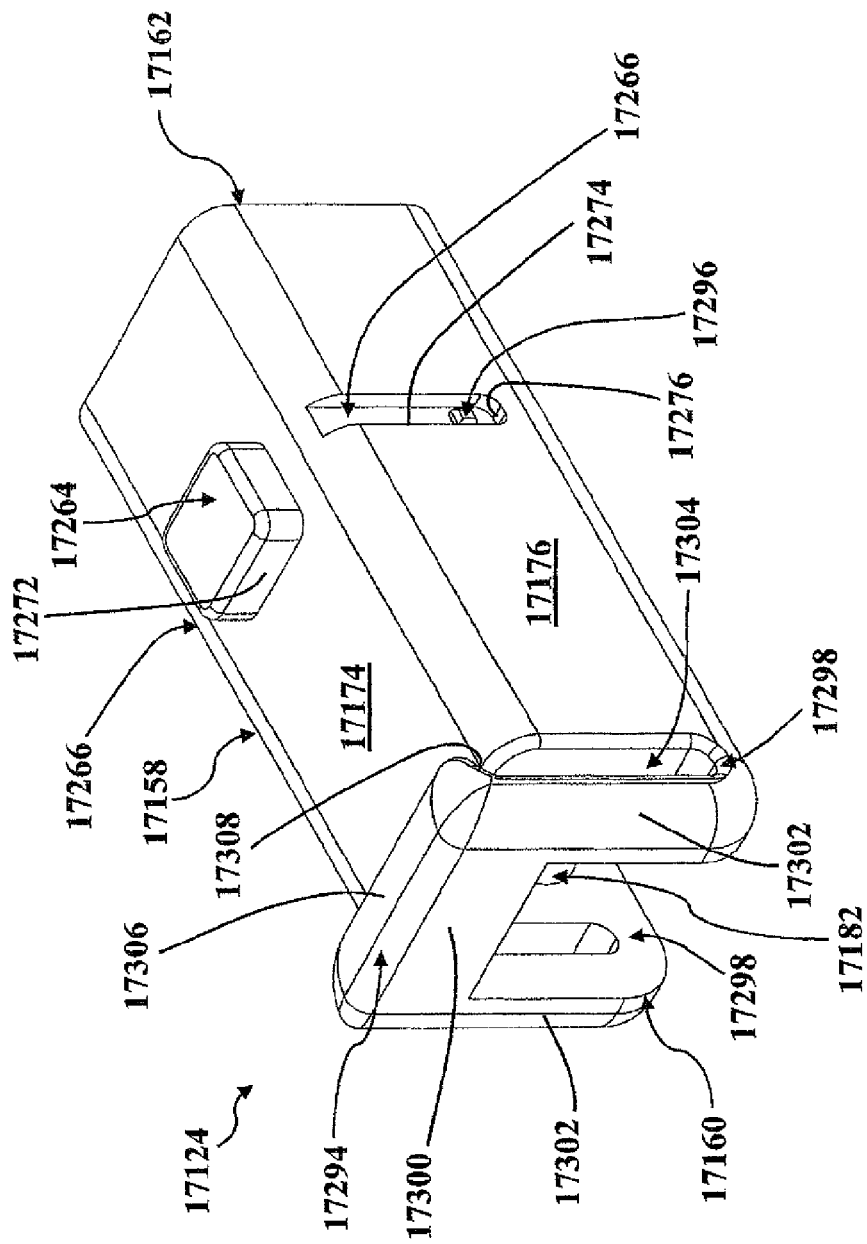
FIG. 61A is a perspective view of an adapter according to a seventeenth embodiment.
Figure 61B:
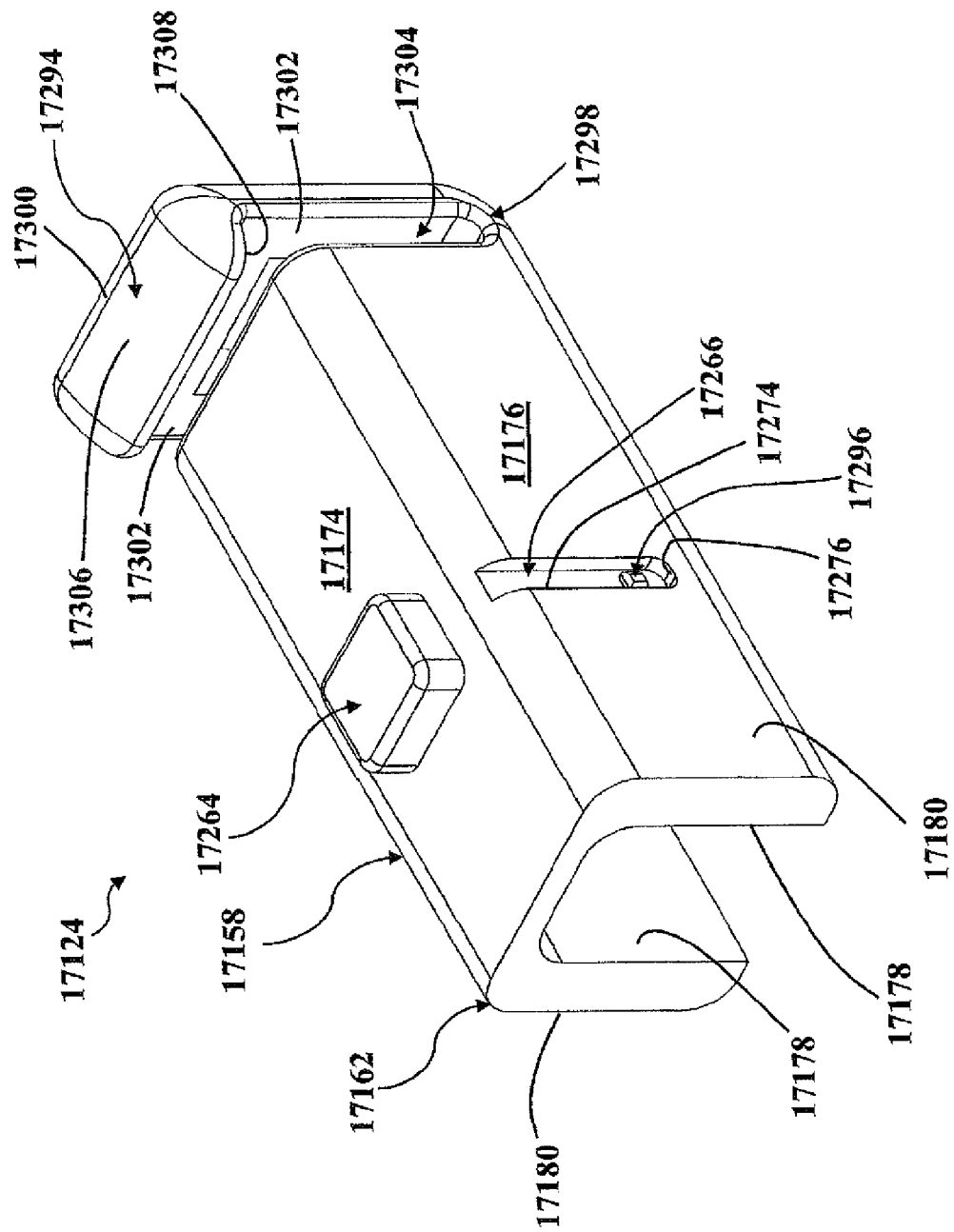
FIG. 61B is a rotated perspective view of the adapter of FIG. 61A.

As shown best in FIGS. 61A-61B, the body 17158 of the seventeenth embodiment of the adapter 17124 similarly extends between the first end 17160 and the second end 17162. Similar to the fifteenth embodiment of the adapter 15124 described above, the seventeenth embodiment of the adapter 17124 also employs the projection 17264 for engaging in the aperture 156 formed in the upper wall 142 of the attachment member 138, and the pair of vertical slots 17266 formed adjacent to the second end 17162 for receiving the protrusions 146 of the attachment member 138 (compare FIG. 61A to FIG. 45A). Further, in this seventeenth embodiment, the body 17158 also includes a retainer, generally indicated at 17294, formed adjacent to the first end 17160 and configured to receive a portion of the terminal end 140 of the attachment member 138 so as to secure the adapter 17124 to the attachment member 138, as described in greater detail below. The various components and structural features of the adapter 17124 of the seventeenth embodiment will each be described in greater detail below.

As shown best in FIGS. 61A-61B, the body 17158 of the adapter 17124 also includes the deck 17174 extending between the first end 17160 and the second end 17162 with opposing sidewalls 17176 depending from the deck 17174, each of which has an inner surface 17178 and an outer surface 17180. The sidewalls 17176 each extend from the deck 17174 substantially perpendicularly such that the inner and outer surfaces 17178, 17180 of the sidewalls 17176 are substantially parallel to each other. However, as noted above in connection with previous embodiments, those having ordinary skill in the art will appreciate that the sidewalls 17176 could be configured differently without departing from the scope of the present invention.

Figure 65:
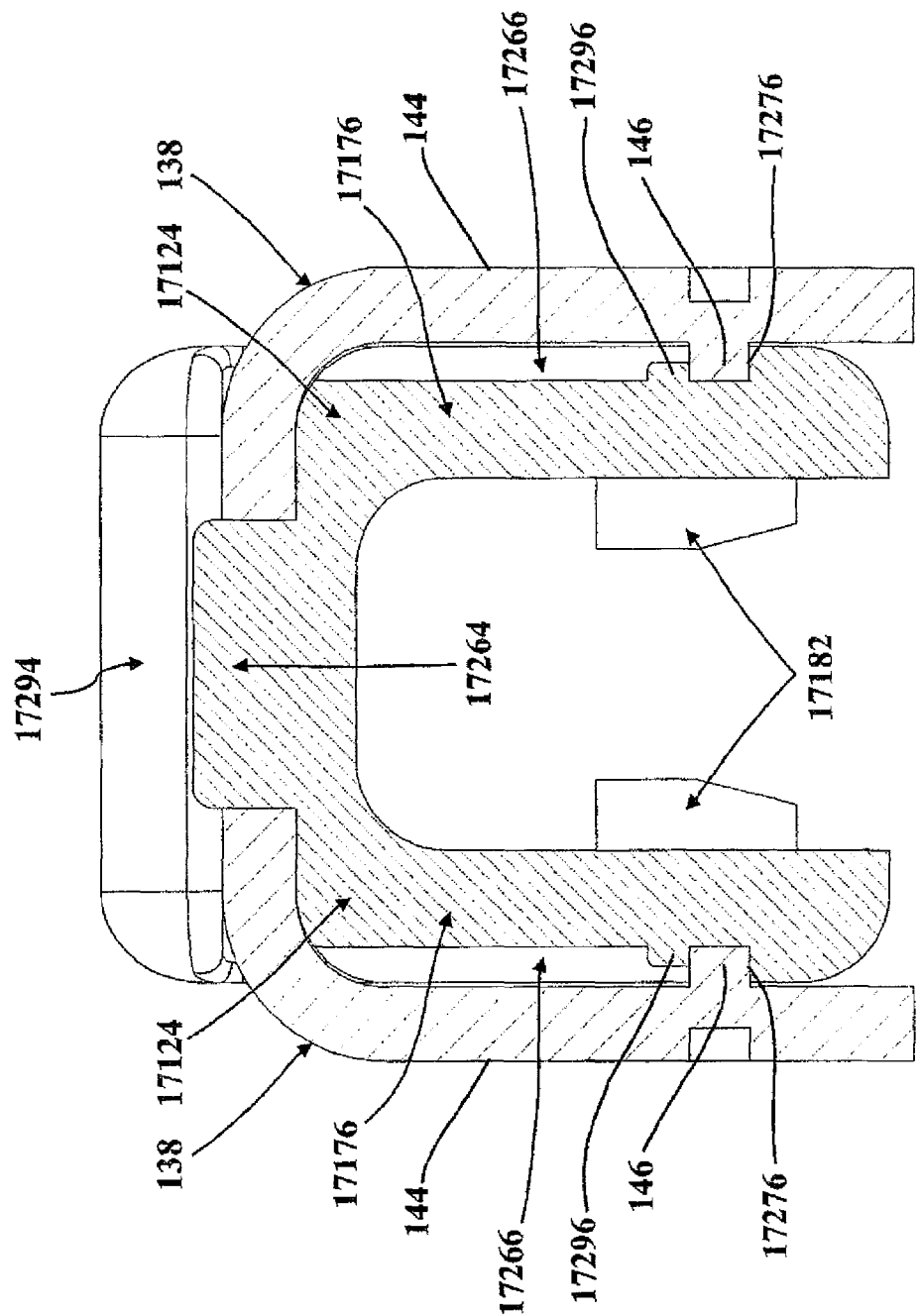
FIG. 65 is a sectional view taken along line 65-65 of FIG. 63.

Here too in the seventeenth embodiment, the body 17158 of the adapter 17124 employs inwardly-facing trunnions 17182 formed on the body 17158 adjacent to the first end 17160 (see FIGS. 61A and 65). The trunnions 17182 extend towards each other from the respective inner surfaces 17178 of the sidewalls 17176 and are arranged to be disposed within the recesses 136 formed in the saddle 134 of the coupler 122 so as to effect pivoting of the body 17158 of the adapter 17124 with respect to the coupler 122 in operation. However, as noted above in connection with previous embodiments, those having ordinary skill in the art will appreciate that the trunnions 17182 could be configured or otherwise arranged in any suitable way sufficient to effect pivoting of the body 17158 of the adapter 17124 with respect to the coupler 122, or the trunnions 17182 could be omitted with the adapter 17124 and coupler 122 employing a different arrangement of structural features and/or components to effect pivoting, without departing from the scope of the present invention.

As noted above, in the seventeenth embodiment of the adapter 17124, the projection 17264 engages in the aperture 156 of the attachment member 138 to effect longitudinal retention adjacent to the second end 17162. The projection 17264 is advantageously formed as a rigid, integral component of the body 17158, and is disposed closer to the second end 17162 than to the first end 17160. The projection 17264 extends vertically from the deck 17174 so as to define the projection face 17272, which faces towards the first end 17160 and which is arranged to abut the aperture face 210 of the aperture 156 of the attachment member 138 when the adapter 17124 is secured to the attachment member 138 (see FIG. 64). As shown best in FIGS. 61A-61B, the projection 17264 has a generally rounded-rectangular profile that compliments the profile of the aperture 156 of the attachment member 138. However, those having ordinary skill in the art will appreciate that the projection 17264 could have any suitable shape, profile, or configuration sufficient to be disposed in the aperture 156 of the attachment member 138 so as to restrict longitudinal movement between the attachment member and the body 17158 of the adapter 17124, without departing from the scope of the present invention.

As noted above, the seventeenth embodiment of the adapter 17124 also employs vertical slots 17266 to accommodate the protrusions 146 of the attachment member 138. To that end, the vertical slots 17266 are formed in the respective sidewalls 17176 adjacent to the second end 17162, each with the vertical channel 17274 extending vertically downwardly from the deck 17174 to the respective vertical floor 17276. As shown in FIG. 65, the vertical floors 17276 are arranged to abut the protrusions 146 of the attachment member 138 when the adapter 17124 is secured to the attachment member 138 so as to contribute to vertical retention at the second end 17162 of the body 17158 of the adapter 17124. In this seventeenth embodiment, the adapter 17124 further includes a tab 17296 arranged in each of the vertical channels 17274 spaced vertically above the respective vertical floors 17276. The tabs 17296 extend laterally outwardly away from each other (see FIG. 65) and are configured to promote vertical retention at the second end 17162 of the body 17158 when the adapter 17124 is secured to the attachment member 138. Specifically, the tabs 17296 are arranged so as to impede vertical movement of the protrusions 146 of the attachment member 138 in the vertical channels 17274 away from the vertical floors 17276 when the adapter 17124 is secured to the attachment member 138. Thus, the tabs 17296 are configured so as to allow the protrusions 146 to travel along the vertical channels 17274 to the vertical floors 17276, and to inhibit subsequent movement of the protrusions 146 back out of the vertical channels 16274 once the protrusions 146 come into abutment with the vertical floors 17276. To that end, it will be appreciated that the tabs 17296 may be configured so as to urge the sidewalls 17176 of the body 17158 laterally towards each other in response to engagement with the protrusions 146 of the attachment member 138 until the protrusions 146 come into abutment with the vertical floors 17276 and the sidewalls 17176 resiliently return and move laterally away from each other. However, those having ordinary skill in the art will appreciate that the tabs 17296 could be shaped, sized, spaced, arranged, or otherwise configured in any suitable way sufficient to promote vertical retention adjacent to the second end 17162 of the body 17158 without departing from the scope of the present invention. Moreover, those having ordinary skill in the art will appreciate that the tabs 17296 could be omitted for certain applications where sufficient vertical retention is afforded by other structural features or components.

Referring again to FIGS. 61A-61B, as noted above, the retainer 17294 is formed on the body 17158 adjacent to the first end 17160 and is configured to secure the terminal end 140 of the attachment member 138. To that end, a living hinge, generally indicated at 17298, connects the retainer to the sidewalls 17176 and allows the retainer 17294 to move resiliently with respect to the second end 17162 of the body 17158 in response to engagement with the attachment member 138, as described in greater detail below. In this embodiment, the retainer 17294 includes a laterally-extending crossbrace 17300 and a pair of pillars 17302 depending vertically downwardly from the crossbrace 17300, with the living hinge 17298 merging each of the pillars 17302 with one of the sidewalls 17176. The living hinges 17298 each have a curved profile configured to facilitate resilient movement of the retainer 17294, as described in greater detail below. Here, the living hinges 17298 define a longitudinally-extending valley 17304 arranged adjacent to the pillars 17302 and the sidewalls 17176 and vertically above the living hinges 17298. Those having ordinary skill in the art will appreciate that the retainer 17294 and/or the living hinge 17298 could be configured in a number of different ways without departing from the scope of the present invention. By way of non-limiting example, the retainer 17294 could employ a single pillar depending from the crossbrace 17300, with a single living hinge 17298 extending between and merging with the pillar and the sidewalls 17176 (not shown).

The crossbrace 17300 of the retainer 17294 has a crossbrace cam, generally indicated at 17306, and a crossbrace face 17308 spaced vertically below the crossbrace cam 17306. The crossbrace cam 17306 and the crossbrace face 17308 each extend longitudinally into the valley 17304 towards the second end 17162 of the body 17158. Here, portions of the crossbrace cam 17306 and the crossbrace face 17308 are spaced vertically above the living hinge 17298 (see FIG. 64). As shown best in FIGS. 61A-61B, the crossbrace cam 17306 has a rounded profile configured to engage the upper wall 142 of the attachment member 138 during assembly, as described in greater detail below. However, those having ordinary skill in the art will appreciate that the crossbrace cam 17306 could have any suitable profile sufficient to effect releasable attachment with the attachment member 138 without departing from the scope of the present invention. The crossbrace face 17308 of the crossbrace 17300 is spaced vertically below the crossbrace cam 17306 and is arranged so as to be substantially parallel to the deck 17174 and likewise so as to be substantially perpendicular to the pillars 17302. Here, the crossbrace face 17308 is configured to abut the upper wall 142 of the attachment member 138 adjacent to the terminal end 140 so as to promote vertical retention adjacent to the first end 17160 of the body 17158, as described in greater detail below. Those having ordinary skill in the art will appreciate that the crossbrace face 17308 could have any suitable profile, arranged in any suitable way sufficient to promote vertical retention adjacent to the first end 17160 of the body 17158, without departing from the scope of the present invention.

Referring now to FIGS. 62A-62C, certain assembly steps for securing the seventeenth embodiment of the adapter 17124 to the attachment member 138 are shown sequentially. Here, certain previously-introduced reference numerals are recited below for illustrative purposes but have been omitted from FIGS. 62A-62C for clarity. In order to effect proper connection to the wiper arm 114, the seventeenth embodiment of the adapter 17124 of the wiper assembly 116 is positioned such that the attachment member 138 is spaced vertically above and the body 17158 of the adapter 17124 (see FIG. 62A). Next, the attachment member 138 is brought into engagement with the body 17158 of the adapter 17124 whereby the attachment member 138 and/or adapter 17124 are moved vertically towards each other such that the protrusions 146 of the attachment member 138 enter into the vertical channels 17274 of the vertical slots 17266 formed in the sidewalls 17176 of the body 17158 (shown in phantom in FIG. 62B). The protrusions 146 of the attachment member 138 travel along the vertical slots 17266 and pass beyond the tabs 17296, deflecting the sidewalls 17176 laterally inwardly towards each other until the protrusions 146 come into abutment with the vertical floors 17276, as discussed below. As the protrusions 146 travel along the vertical slots 17266, the retainer 17294 comes into engagement with the upper wall 142 of the attachment member 138 adjacent to the terminal end 140, while the alignment afforded by the vertical slots 17266 also helps guide the projection 17264 of the body 17158 into the aperture 156 of the attachment member 138 (see FIG. 62B; see also FIGS. 64 and 65). The crossbrace cam 17306 of the crossbrace 17300 of the retainer 17294 abuts the upper wall 142 of the attachment member 138 and is deflected away from the second end 17162 of the body 17158 via the living hinge 17298 until the protrusions 146 pass beyond the tab 17296 and abut the vertical floors 17276 of the respective vertical slots 17266, whereby the retainer 17294 subsequently returns resiliently towards the second end 17162 and the crossbrace face 17308 comes into engagement with the upper wall 142 of the attachment member 138 (compare FIGS. 62B and 62C). Here, the retainer 17294 promotes vertical and longitudinal retention adjacent to the first end 17160 and cooperates with the sidewalls 17176 and the deck 17174 of the body 17158 to effect lateral retention. Similarly, the projection 17264 and the vertical slots 17266 cooperate to effect longitudinal, lateral, and vertical retention adjacent to the second end 17162 via engagement with the aperture 156 and the protrusions 146, respectively, of the attachment member 138. Moreover, the tabs 17296 help further promote vertical retention adjacent the second end 17162 via engagement with the protrusions 146 of the attachment member 138. Here too, it will be appreciated that no portion of the adapter 17124 engages or otherwise abuts the upper cutout edge 150 of the cutout 148 of the attachment member 138.

As noted above, an eighteenth embodiment of the adapter of the wiper assembly 116 is shown in FIGS. 66A-70. In the description that follows, the structure and components of the eighteenth embodiment that are the same as or that otherwise correspond to the structure and components of the first embodiment are provided with the same reference numerals increased by 18000.

The eighteenth embodiment of the adapter 18124 depicted in FIGS. 66A-70 is similar to the seventeenth embodiment of the adapter 17124 described above (compare FIGS. 66A-66B to FIGS. 61A-61B). Thus, for the purposes of clarity and consistency, only the specific differences between the eighteenth embodiment of the adapter 18124 and the seventeenth embodiment of the adapter 17124 will be described below and only certain structural features and components common between these embodiments will be discussed herein and depicted in the drawings of the eighteenth embodiment of the adapter 18124. Unless otherwise indicated below, it will be appreciated that the description of the seventeenth embodiment of the adapter 17124 above may be incorporated by reference with respect to the eighteenth embodiment of the adapter 18124 without limitation.

Figure 66A:
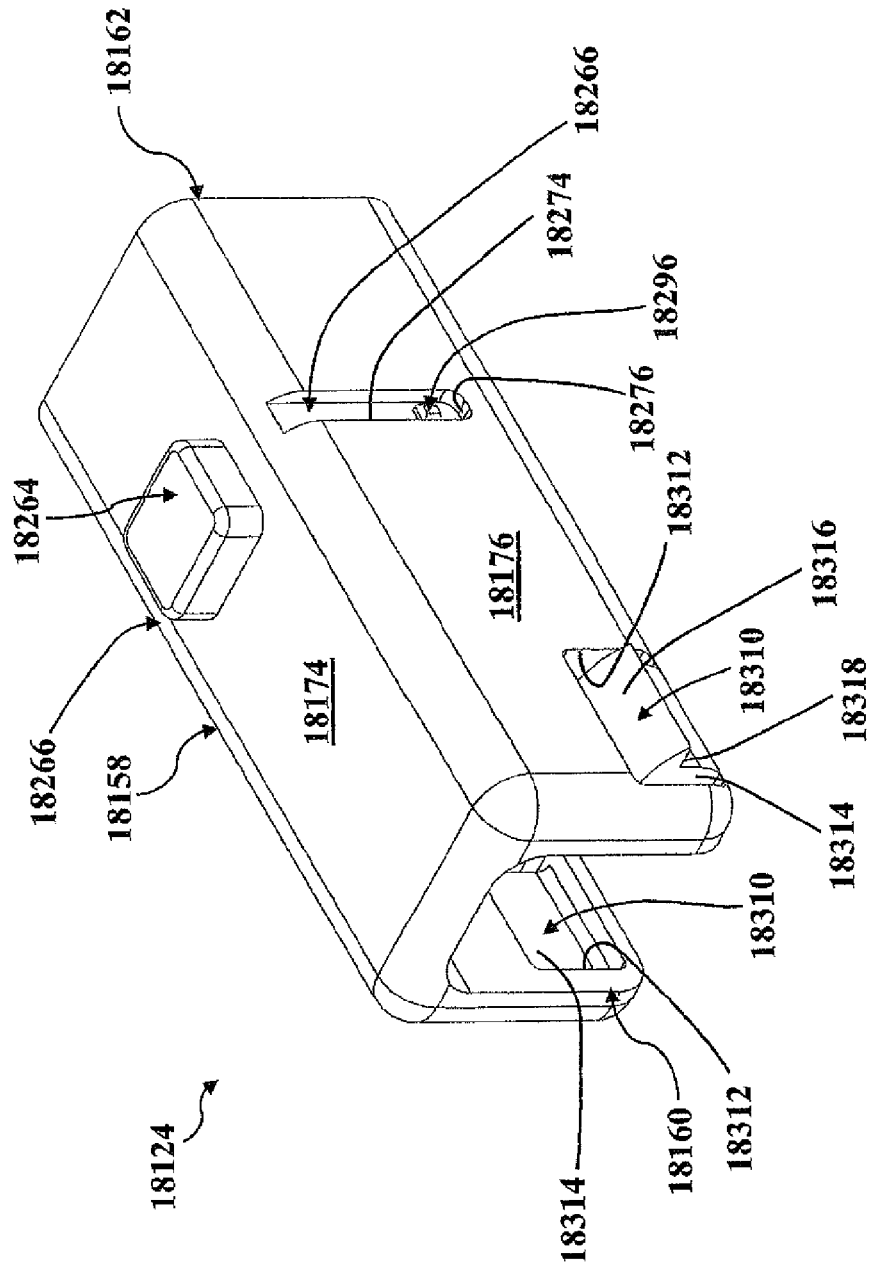
FIG. 66A is a perspective view of an adapter according to an eighteenth embodiment.
Figure 66B:
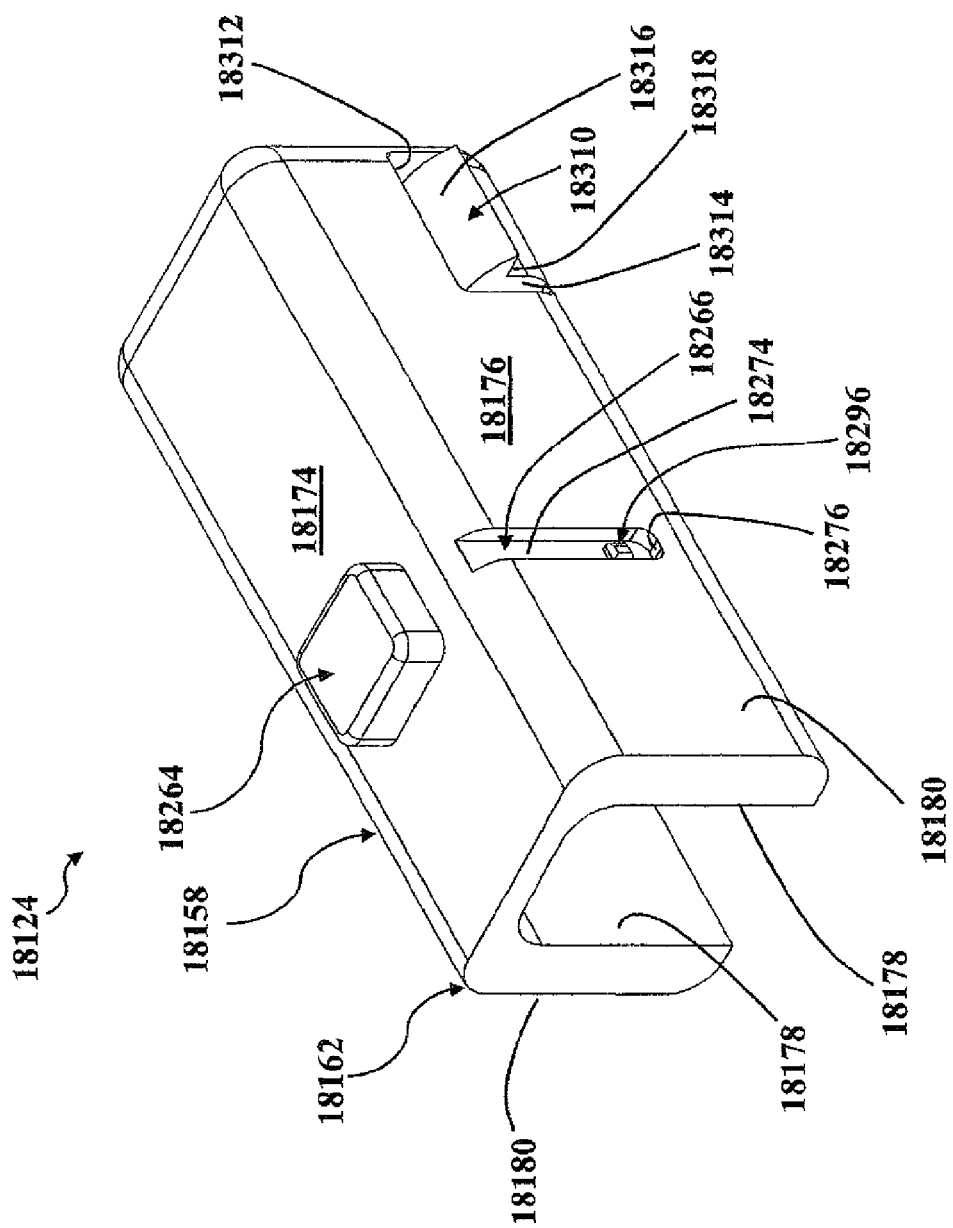
FIG. 66B is a rotated perspective view of the adapter of FIG. 66A.
Figure 70:
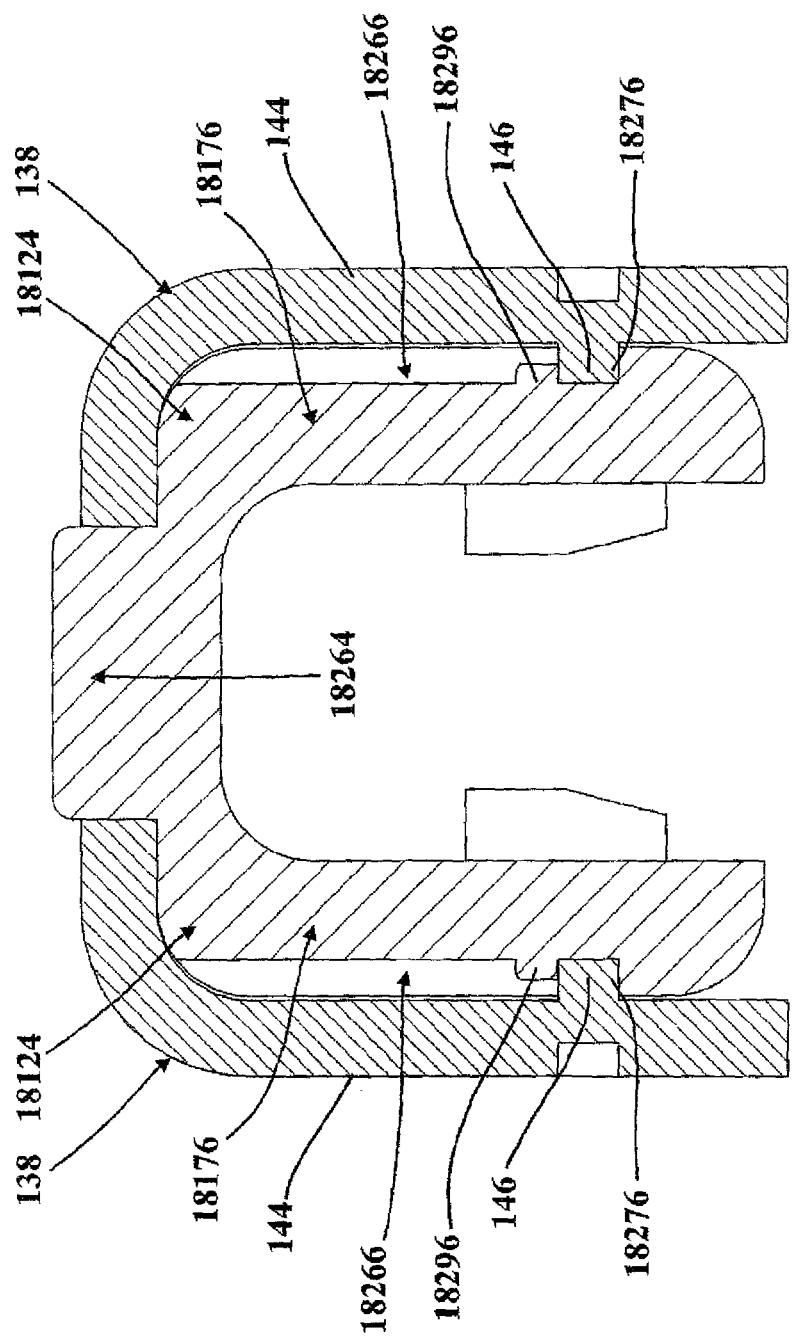
FIG. 70 is a sectional view taken along line 70-70 of FIG. 68.

As shown in FIGS. 66A-66B, the eighteenth embodiment of the adapter 18124 similarly includes the projection 18264, the vertical slots 18266, and the tabs 18296 which cooperate so as to effect retention of the attachment member 138 adjacent to the second end 18162 of the body 18158 of the adapter 18124. Here too, the projection 18264 extends vertically from the deck 18174, the vertical slots 18266 are formed in the sidewalls 18176, and the tabs 18296 are arranged within the vertical slots 18266 and extend laterally outwardly away from each other. However, in this eighteenth embodiment of the adapter 18124, retention adjacent to the first end 18160 of the body 18158 is afforded by a pair of sidewall hooks, generally indicated at 18310, which are configured to releasably secure to the attachment member 138, as described in greater detail below.

The sidewall hooks 18310 are formed in the respective sidewalls 18176 of the body 18158 of the adapter 18124 adjacent the first end 18160. As best shown in FIGS. 66A-66B, a hook window 18312 is formed in each of the sidewalls 18176 spaced below the deck 18174 adjacent to the first end 18160, with the sidewall hooks 18130 extending into the respective hook windows 18312 towards the deck 18174 (see also FIG. 69). Here, the hook windows 18312 have a generally rectangular profile and are formed between the inner surface 18178 and the outer surface 18180 of the respective sidewalls 18176. However, as will be appreciated from the subsequent description below, those having ordinary skill in the art will appreciate that the hook windows 18312 could have any suitable shape or configuration sufficient to accommodate the sidewall hooks 18310 without departing from the scope of the present invention.

The sidewall hooks 18310 each have a hook body 18314 which extends vertically towards the deck 18174 to a hook cam, generally indicated at 18316. The hook cam 18316 has an angled profile and extends laterally outwardly from the hook body 18314, beyond the outer surface 18180 of the respective sidewall 18176, so as to define a hook face 18318 arranged to engage the lower cutout edge 152 of the respective cutout 148 of the attachment member 138 in use, as described in greater detail below. The hook faces 18318 are generally rectangular, are defined substantially perpendicular to the hook body 18314, are arranged so as to be substantially parallel to the deck 18174, and extend laterally to beyond the outer surfaces 18180 of the respective sidewalls 18176. However, those having ordinary skill in the art will appreciate that the sidewall hooks 18310 could have any suitable shape or configuration sufficient to releasably engage the lower cutout edges 152 of the cutouts 148 of the attachment member 138 without departing from the scope of the present invention. Moreover, while the eighteenth embodiment of the adapter 18124 is depicted as having two sidewall hooks 18310, it will be appreciated that a single sidewall hook 18310 could be utilized without departing from the scope of the present invention.

Referring now to FIGS. 67A-67C, certain assembly steps for securing the eighteenth embodiment of the adapter 18124 to the attachment member 138 are shown sequentially. Here, certain previously-introduced reference numerals are recited below for illustrative purposes but have been omitted from FIGS. 26A-26C for clarity. In order to effect proper connection to the wiper arm 114, the eighteenth embodiment of the adapter 18124 of the wiper assembly 116 is positioned such that the attachment member 138 is spaced vertically above and the body 18158 of the adapter 18124 (see FIG. 67A). Next, the attachment member 138 is brought into engagement with the body 18158 of the adapter 18124 whereby the attachment member 138 and/or adapter 18124 are moved vertically towards each other such that the protrusions 146 of the attachment member 138 enter into the vertical channels 18274 of the vertical slots 18266 formed in the sidewalls 18176 of the body 18158 (shown in phantom in FIG. 67B). The protrusions 146 of the attachment member 138 travel along the vertical slots 18266 and pass beyond the tabs 18296, deflecting the sidewalls 18176 laterally inwardly towards each other until the protrusions 146 come into abutment with the vertical floors 18276, as discussed below. As the protrusions 146 travel along the vertical slots 18266, the hook cams 18316 of the sidewall hooks 18310 come into engagement with the respective side walls 144 of the attachment member 138 (see FIG. 67B), which deflects the sidewall hooks 18310 towards each other into the respective hook windows 18312 until the protrusions 146 come into abutment with the vertical floors 18276 of the respective vertical slots 18266, whereby the sidewall hooks 18310 resiliently deflect away from each other and the hook faces 18318 come into engagement with the respective lower cutout edges 152 of the cutouts 148 of the attachment member (see FIG. 67C; see also FIG. 69). Here too, the alignment afforded by the vertical slots 18266 helps guide the projection 18264 of the body 18158 into the aperture 156 of the attachment member 138 (see FIGS. 69-70). Here, the sidewall hooks 18310 promote vertical retention adjacent to the first end 18160 and cooperate with the sidewalls 18176 and the deck 18174 of the body 18158 to effect lateral retention. Similarly, the projection 18264 and the vertical slots 18266 cooperate to effect longitudinal, lateral, and vertical retention adjacent to the second end 18162 via engagement with the aperture 156 and the protrusions 146, respectively, of the attachment member 138. Moreover, the tabs 18296 also help further promote vertical retention adjacent the second end 18162 via engagement with the protrusions 146 of the attachment member 138. Here too, it will be appreciated that no portion of the adapter 18124 engages or otherwise abuts the upper cutout edge 150 of the cutout 148 of the attachment member 138.

As noted above, a nineteenth embodiment of the adapter of the wiper assembly 116 is shown in FIGS. 71A-74. In the description that follows, the structure and components of the nineteenth embodiment that are the same as or that otherwise correspond to the structure and components of the first embodiment are provided with the same reference numerals increased by 19000.

The nineteenth embodiment of the adapter 19124 depicted in FIGS. 71A-74 is similar to the eighteenth embodiment of the adapter 18124 described above (compare FIGS. 71A-71B to FIGS. 66A-66B), and also includes certain structural features used in connection with the other embodiments of the adapter described above. Thus, for the purposes of clarity and consistency, the specific differences between the nineteenth embodiment of the adapter 19124 and the eighteenth embodiment of the adapter 18124 will be described below and certain structural features and components common between these embodiments, and other previously described embodiments, will be discussed herein and depicted in the drawings of the nineteenth embodiment of the adapter 19124. Unless otherwise indicated below, it will be appreciated that the description of these previously described embodiments may be incorporated by reference with respect to the nineteenth embodiment of the adapter 19124 without limitation.

Figure 71A:
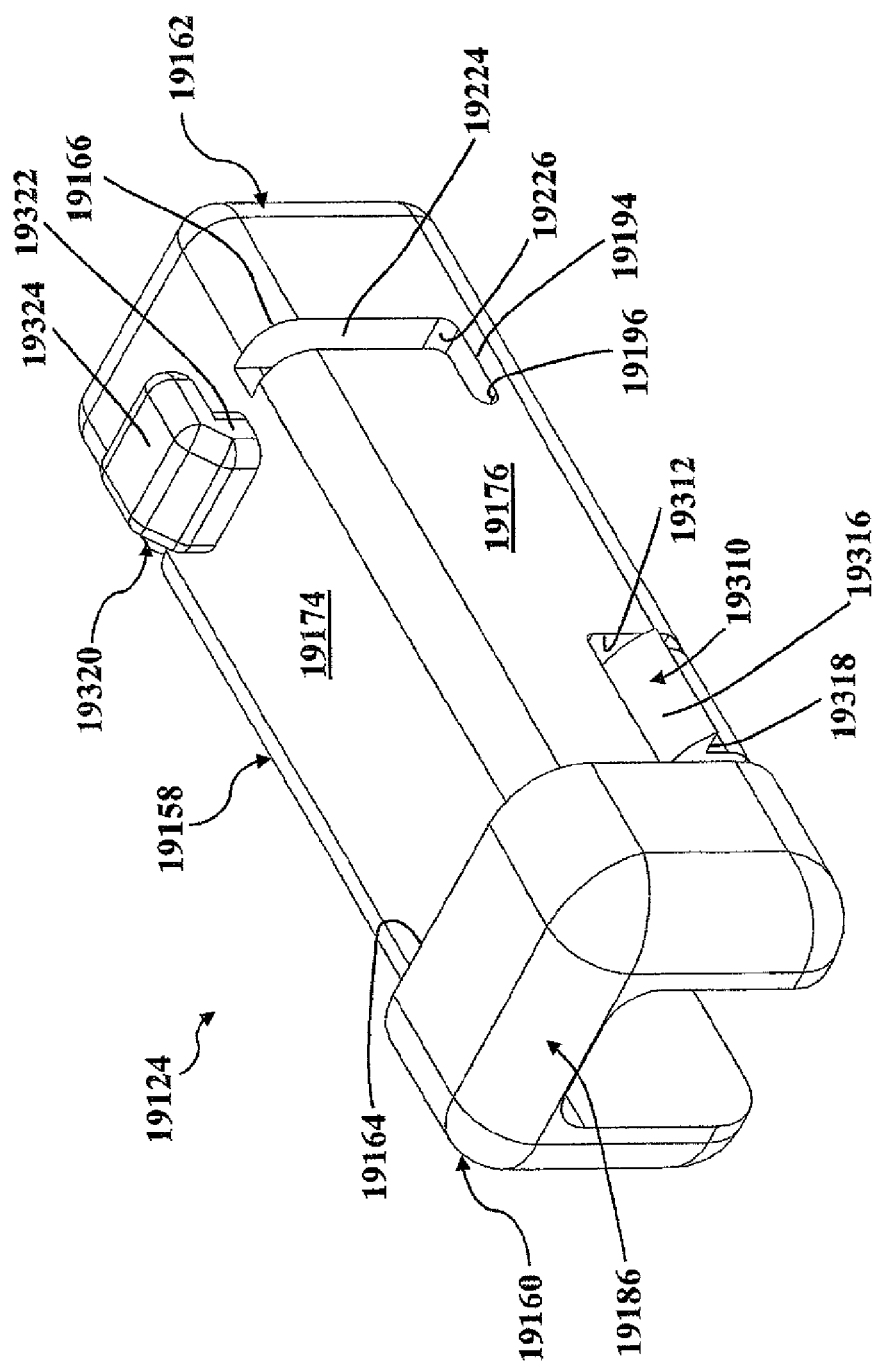
FIG. 71A is a perspective view of an adapter according to a nineteenth embodiment.
Figure 71B:
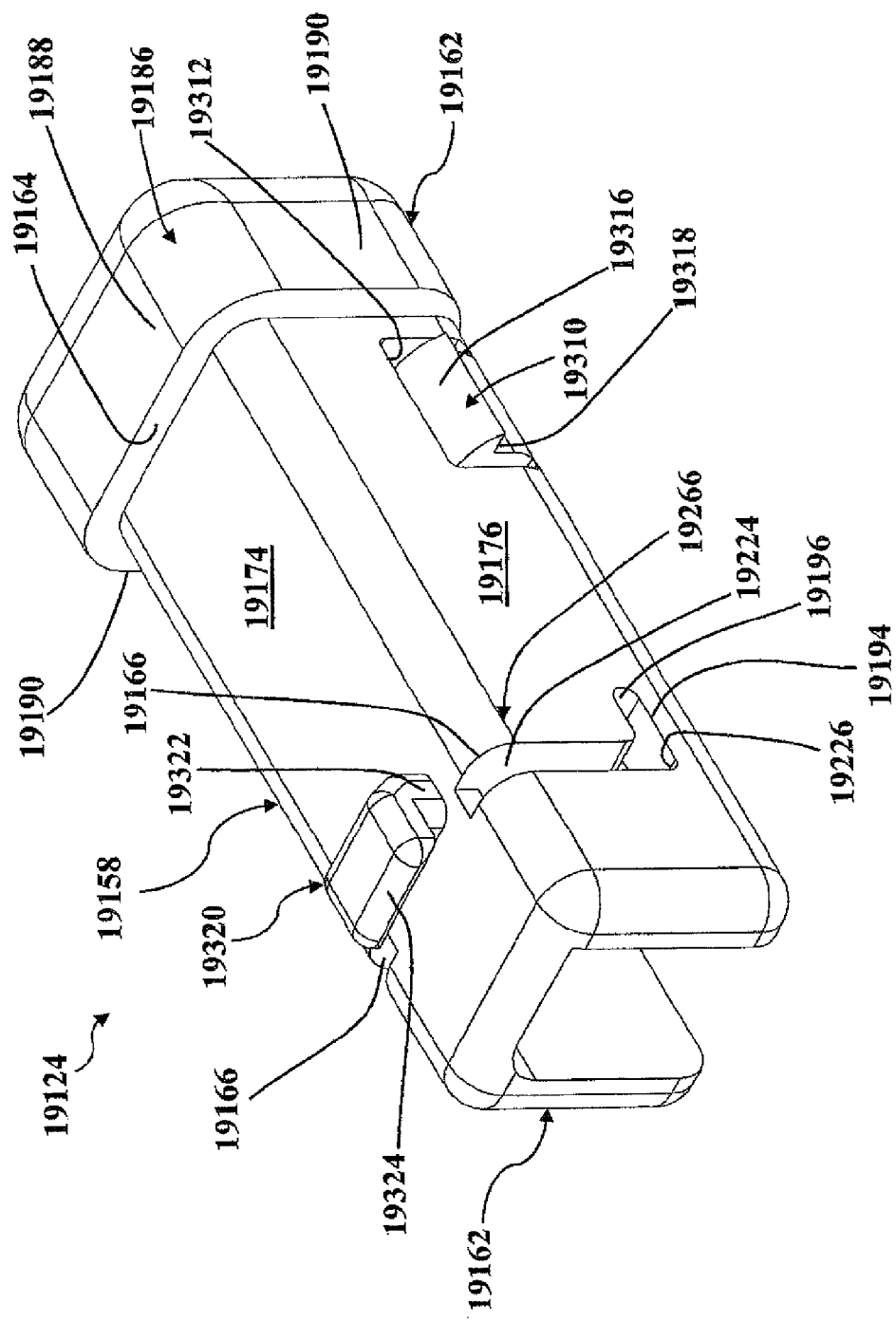
FIG. 71B is a rotated perspective view of the adapter of FIG. 71A.
Figure 72A:
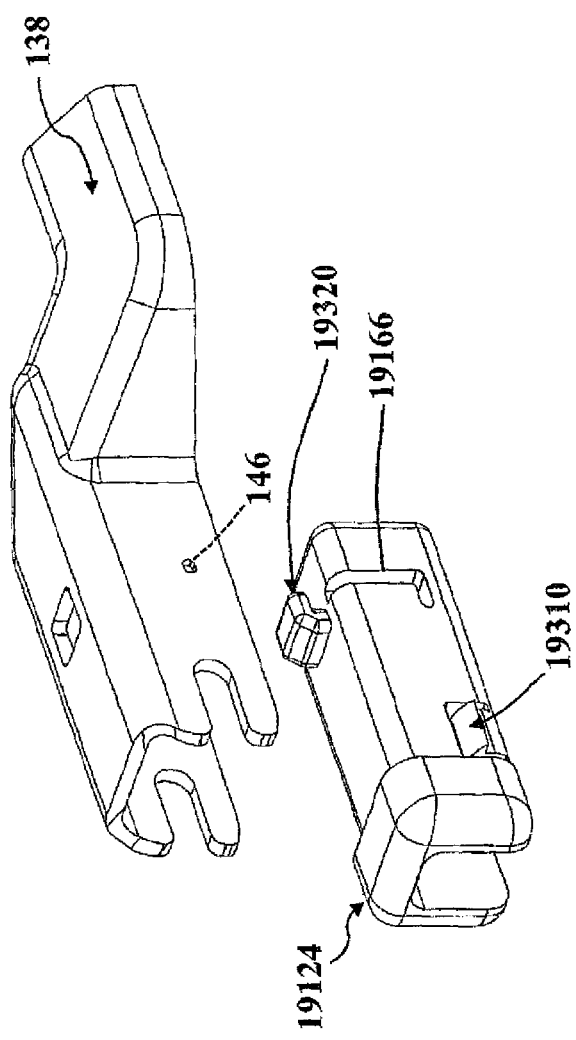
FIG. 72A is a perspective view of the nineteenth embodiment of the adapter of FIGS. 71A-71B shown spaced from the attachment member of FIGS. 5A-5B.
Figure 72B:
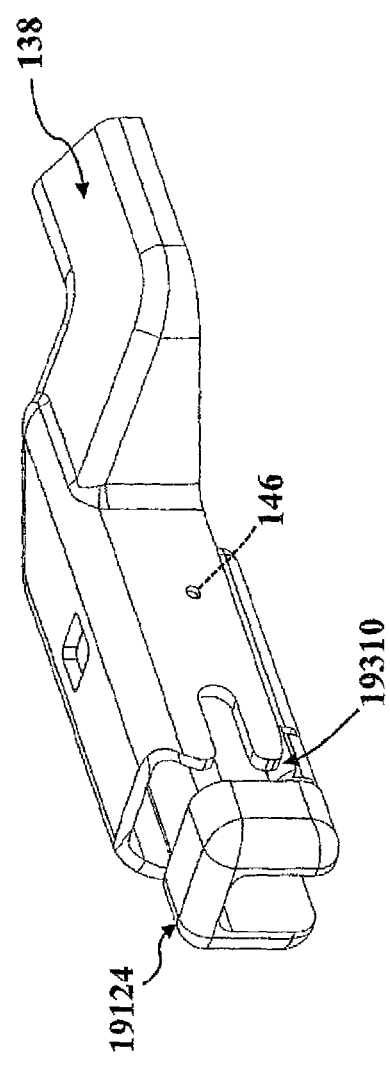
FIG. 72B is a perspective view of the adapter and the attachment member of FIG. 72A shown with the attachment member beginning to slide into engagement with the adapter.
Figure 73:
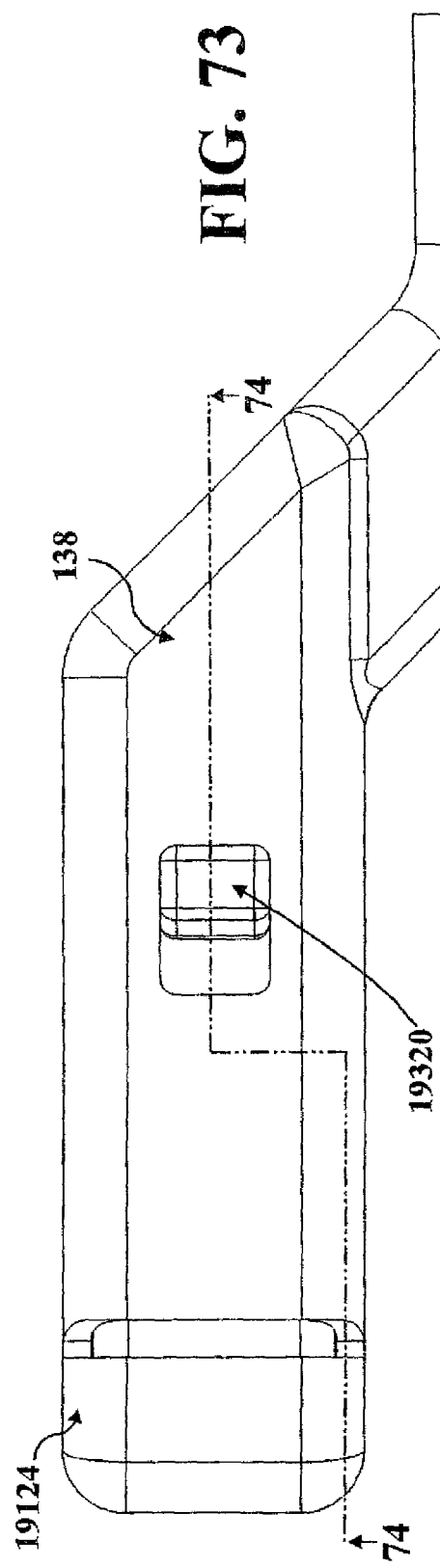
FIG. 73 is a top-side plan view of the nineteenth embodiment of the adapter of FIGS. 71A-72D shown secured to the attachment member of FIGS. 5A-5B.

As shown in FIGS. 71A-71B, the nineteenth embodiment of the adapter 19124, like the eighteenth embodiment of the adapter 18124 described above, employs sidewall hooks 19310 extending in hook windows 19312 formed in the sidewalls 19176 adjacent to the first end 19160 of the body 19158 which engage the lower cutout edges 152 of the cutouts 148 of the attachment member 138 so as to effect vertical retention adjacent to the first end 19160, as described in greater detail below. Further, the nineteenth embodiment of the adapter 19124, like the third embodiment of the adapter 3124 described above, includes the head 19168 formed adjacent to the first end 19160 of the body 19158 which, in turn, defines the stop 19164 for abutting the terminal end 140 of the attachment member 138 so as to effect longitudinal retention adjacent to the first end 19160, as described in greater detail below. Moreover, like the sixth embodiment of the adapter 6124 described above, the nineteenth embodiment of the adapter 19124 employs the slots 19166 formed in the sidewalls 19176 adjacent to the second end 19162 which each utilize the vertical openings 19224 extending vertically between the deck 19174 and the apex 19226, and the channels 19194 extending longitudinally between the apex 19226 and the floor 19196. However, in this nineteenth embodiment of the adapter 19124, additional retention adjacent to the second end 19162 of the body 19158 is afforded by a step protrusion, generally indicated at 19320, which extends from the deck 19174 and is configured to engage the aperture 156 of the attachment member 138 as described in greater detail below.

Figure 74:
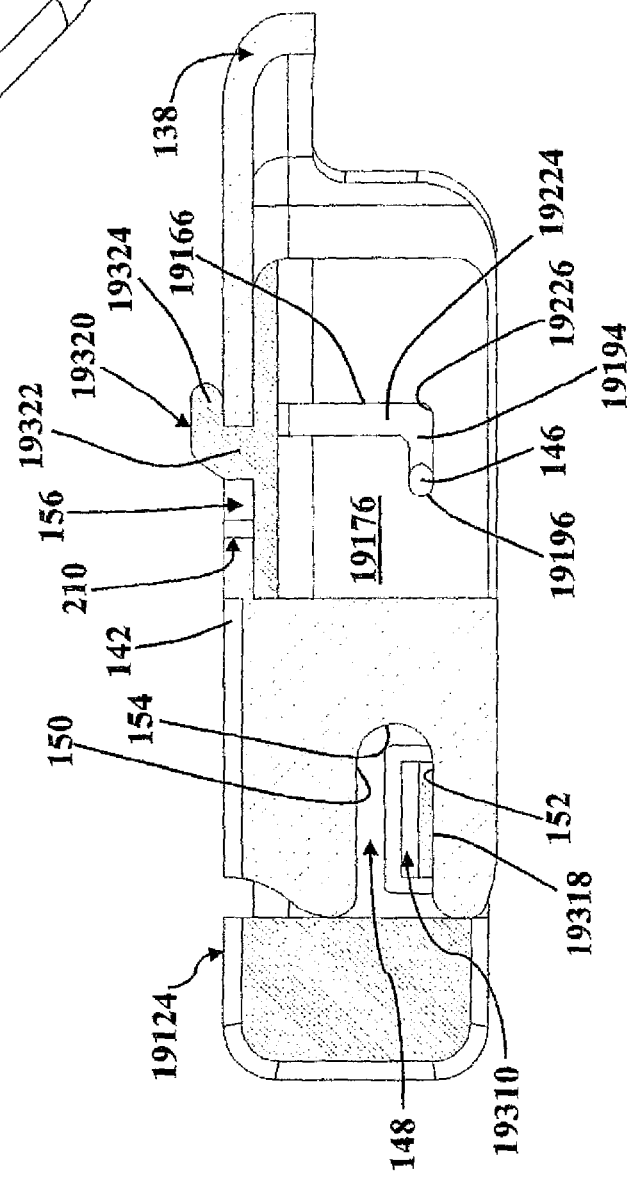
FIG. 74 is a sectional view taken along line 74-74 of FIG. 73.

As shown best in FIG. 71B, in this nineteenth embodiment of the adapter 19124, the head upper surface 19188 of the head 19186 is arranged so as to be generally perpendicular to the deck 19174, unlike the curved profile of the head upper surface 3188 of the third embodiment of the adapter 3124 described above (compare FIG. 71B to FIG. 13B). Similarly, the head 19186 of the nineteenth embodiment of the adapter 19124 employs head side surfaces 19190 which are generally perpendicular to the sidewalls 19176, unlike the curved profile of the head side surfaces 3190 of the third embodiment of the adapter 3124 described above (compare FIG. 71A to FIG. 13A). Indeed, as is best shown in FIG. 74, when the nineteenth embodiment of the adapter 19124 is secured to the attachment member 138, the head side surfaces 19190 abut the side edges 140B of the terminal end 140 of the attachment member 138 and the head upper surface 19188 remains spaced from the front edge 140A of the terminal end 140 of the attachment member 138. However, those having ordinary skill in the art will appreciate that the head 19186 of the nineteenth embodiment of the adapter 19124 could be configured or otherwise arranged in any suitable way without departing from the scope of the present invention.

As noted above, the nineteenth embodiment of the adapter 19124 employs slots 19166 formed in the sidewalls 19176 adjacent to the second end 19162 of the body 19158 for receiving the protrusions 146 of the attachment member 138. As is explained in greater detail below in connection with FIGS. 72A-72D, the slots 19166 are arranged and shaped to cooperate with the step protrusion 19320 so as to guide the attachment member 138 into the adapter 19124 during assembly.

As shown best in FIGS. 71A, 71, and 74, the step protrusion 19320 has a generally L-shaped profile defined by a step body 19322 and a step arm 19324. The step body 19322 has a generally rounded rectangular profile, extends vertically from the deck 19174, and is shaped to be accommodated in the aperture 156 formed in the upper wall 142 of the attachment member 138, as described in greater detail below. The step arm 19324 similarly has a generally rounded rectangular profile and extends longitudinally from the step body 19322 away from the first end 19160 of the body 19158. Here, the step arm 19324 is spaced vertically above the deck 19174 and is shaped so as to pass through the aperture 156 formed in the upper wall 142 of the attachment member 138, and to abut against the upper wall 142 of the attachment member 138, as described in greater detail below.

Referring now to FIGS. 72A-72D, certain assembly steps for securing the nineteenth embodiment of the adapter 19124 to the attachment member 138 are shown sequentially. Here, certain previously-introduced reference numerals are recited below for illustrative purposes but have been omitted from FIGS. 72A-72D for clarity. In order to effect proper connection to the wiper arm 114, the nineteenth embodiment of the adapter 19124 of the wiper assembly 116 is positioned such that the attachment member 138 is spaced vertically above and the body 19158 of the adapter 19124 with the protrusions 146 of the attachment member 138 aligned with the vertical openings 19224 of the slots 19166 (see FIG. 72A). Next, the attachment member 138 is brought into engagement with the body 19158 of the adapter 19124 whereby the attachment member 138 and/or adapter 19124 are moved vertically towards each other such that the protrusions 146 of the attachment member 138 enter into the vertical openings 19224 of the slots 19166 (compare FIG. 72B to FIG. 72A). As the protrusions 146 of the attachment member 138 travel along the vertical openings 19224 of the slots 19166, the hook cams 19316 of the sidewall hooks 19310 come into engagement with the respective side walls 144 of the attachment member 138 (see FIG. 72B), which deflects the sidewall hooks 19310 towards each other into the respective hook windows 19312 until the protrusions 146 come into abutment with the apexes 19266 of the slots 19166 (compare FIG. 72C to FIG. 72B) whereby the sidewall hooks 19310 resiliently deflect away from each other and the hook faces 19318 come into engagement with the respective lower cutout edges 152 of the cutouts 148 of the attachment member (see FIG. 72C; see also FIG. 74). Here, as the protrusions 146 approach the apexes 19266 while traveling along the vertical openings 19224 of the slots 19166, the step arm 19324 passes through the aperture 156 formed in the upper wall 142 of the attachment member 138. Next, the protrusions 146 can travel longitudinally along the channels 19194 of the slots 19166 away from the apexes 19266 until coming into abutment with the floors 19196 of the slots 19166. As the protrusions 146 travel towards the floors 19196 of the slots 19166, the step arm 19324 of the step protrusion 19320 comes into engagement with the upper wall 142 of the attachment member 138 with the step body 19322 of the step protrusion 19320 passing through the aperture 156 of the attachment member 138 (see FIG. 72D; see also FIG. 74). Here, the head side surface 19190 of the head 19186 abut the side edges 140B of the terminal end 140 of the attachment member 138, which effects longitudinal retention adjacent to the first end 19160 of the body 19158. In addition, the sidewall hooks 19310 promote vertical retention adjacent to the first end 19160 and cooperate with the sidewalls 19176 and the deck 19174 of the body 19158 to effect lateral retention. Moreover, as noted above, the slots 19166 and the step protrusion 19320 are complimentarily shaped and cooperate to effect retention of the adapter 19124 adjacent to the second end 19162 of the body 19158. Here, the floors 19196 of the slots 19166 abut the protrusions 146 of the attachment member 138 to promote longitudinal and vertical retention adjacent to the second end 19162, and the step arm 19324 of the step protrusion 19320 abuts the upper wall 142 of the attachment member 138 to further promote vertical retention adjacent to the second end 19162. Here too, it will be appreciated that no portion of the adapter 19124 engages or otherwise abuts the upper cutout edge 150 of the cutout 148 of the attachment member 138.

It will be appreciated that the slots 19166 of the nineteenth embodiment of the adapter 19124 could be configured to promote sufficient vertical retention adjacent to the second end 19162 of the body 19158 without the use of the step protrusion 19320 without departing from the scope of the present invention. Similarly, the slots 19166 of the nineteenth embodiment of the adapter 19124 could be configured to cooperate with the sidewall hooks 19310 in such a way as to promote sufficient longitudinal retention of the adapter 19124 without the use of a head 19186 without departing from the scope of the present invention.

As noted above, a twentieth embodiment of the adapter of the wiper assembly 116 is shown in FIGS. 75A-79. In the description that follows, the structure and components of the twentieth embodiment that are the same as or that otherwise correspond to the structure and components of the first embodiment are provided with the same reference numerals increased by 20000.

The twentieth embodiment of the adapter 20124 depicted in FIGS. 75A-79, is also similar to the third embodiment of the adapter 3124 described above (compare FIGS. 75A-75B to FIGS. 13A-13B). Thus, for the purposes of clarity and consistency, only the specific differences between the twentieth embodiment of the adapter 20124 and the third embodiment of the adapter 3124 will be described below and only certain structural features and components common between these embodiments will be discussed herein and depicted in the drawings of the twentieth embodiment of the adapter 20124. Unless otherwise indicated below, it will be appreciated that the description of the third embodiment of the adapter 3124 above may be incorporated by reference with respect to the twentieth embodiment of the adapter 20124 without limitation.

Figure 75A:
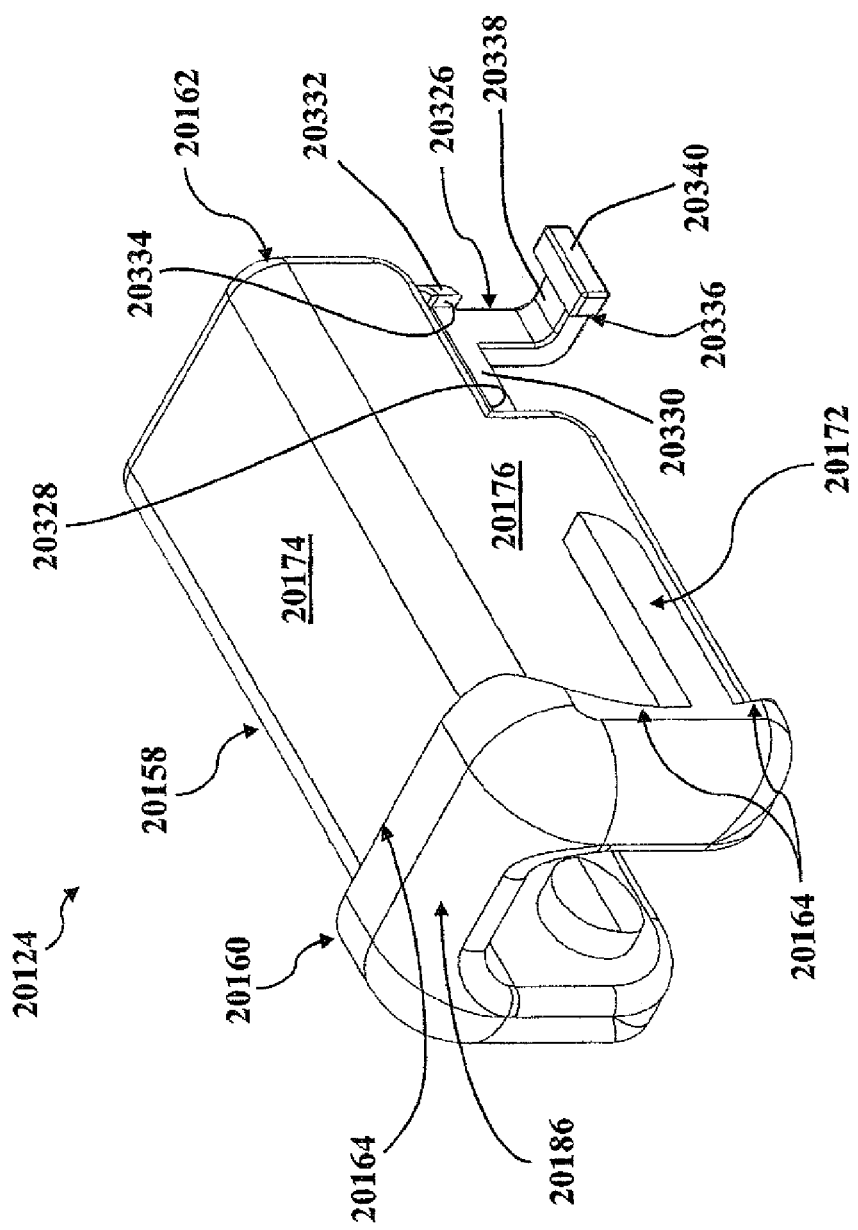
FIG. 75A is a perspective view of an adapter according to a twentieth embodiment.
Figure 75B:
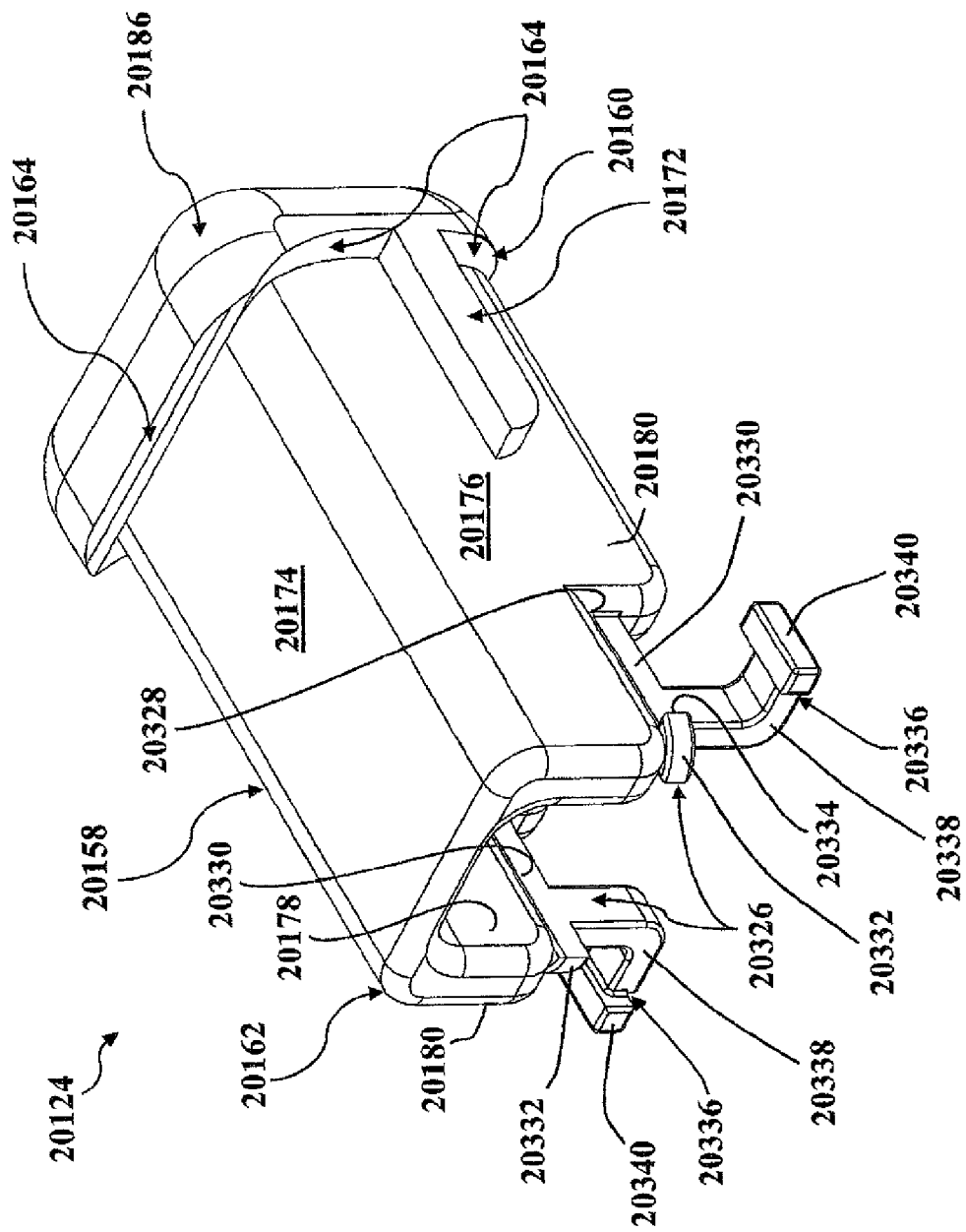
FIG. 75B is a rotated perspective view of the adapter of FIG. 75A.

As best shown in FIGS. 75A-75B, the twentieth embodiment of the adapter 20124 similarly includes the stop 20164 defined by the head 20186, as well as braces 20172 extending laterally from the sidewalls 19176 spaced below the deck 20174. Here too, the stop 20164 and the braces 20172 are arranged at the first end 20160 of the body 20158 and cooperate to promote vertical, lateral, and longitudinal retention adjacent to the first end 20160 when the adapter 20124 is secured to the attachment member 138. However, in this twentieth embodiment, the adapter 20124 employs a pair of resilient locks 20326 to effect retention adjacent to the second end 20162 when the adapter 20124 is secured to the attachment member 138, as described in greater detail below.

The resilient locks 20326 are arranged adjacent to the second end 20162 of the body 20158. Here, an L-shaped knock 20328 is formed laterally through each respective sidewall 20176 adjacent to the second end 20162 of the body 20158, and the resilient locks 20326 are arranged within the knocks 20328 and extend generally longitudinally away from the first end 20162 of the body 20158. To that end, the resilient locks 20326 each include a lock body 20330 arranged within the respective knock 20328 which extends longitudinally from the sidewall 20176 to a lock cam 20332. Here, the lock body 20330 has a generally rectangular profile and is spaced laterally inwardly from the outer surface 20180 of the respective sidewall 20176 so as to accommodate one the protrusions 146 of the attachment member 138. To that end, the lock cams 20332 extend laterally outwardly away from the inner surfaces 20178 of the respective sidewalls 20176 and define corresponding lock faces 20334 arranged to abut the protrusions 146 of the attachment member 138 when the adapter 20124 is secured to the attachment member 138 (see FIG. 78). Here, the lock cams 20332 have a curved profile configured to urge the resilient locks 20326 laterally inwardly towards each other in response to engagement with the protrusions 146 of the attachment member 138, whereby the resilient locks 20326 subsequently return laterally away from each other when the lock faces 20334 comes into abutment with the protrusions 146. It will be appreciated that the resilient locks 20326 cooperate with the sidewalls 20176 adjacent to the knocks 20328 so as to effect retention of the attachment member 138 adjacent to the second end 20162 of the body 20158.

Figure 76:
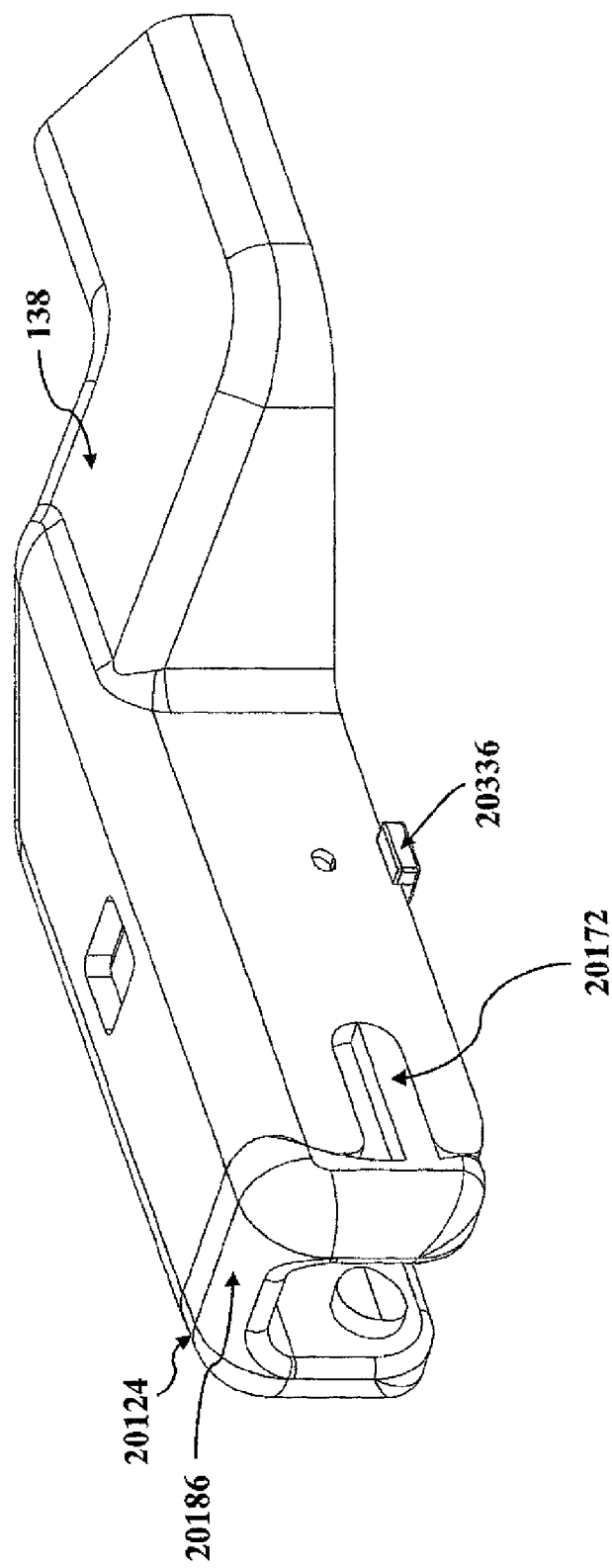
FIG. 76 is a perspective view of the twentieth embodiment of the adapter of FIGS. 75A-75B shown secured to the attachment member of FIGS. 5A-5B.
Figure 77:
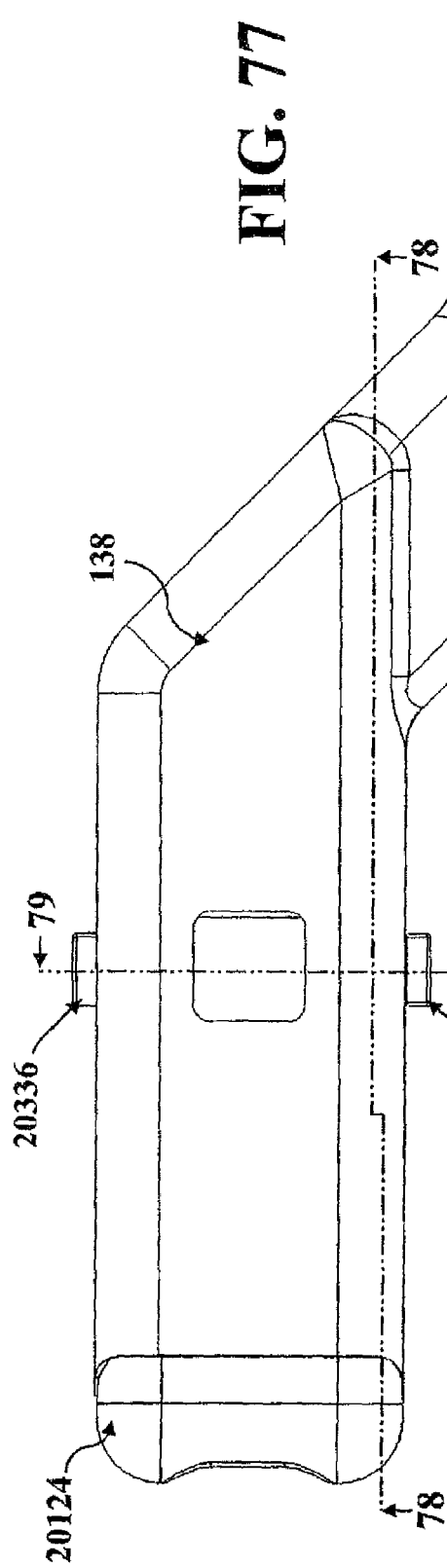
FIG. 77 is a top-side plan view of the twentieth embodiment of the adapter of FIGS. 75A-76 shown secured to the attachment member of FIGS. 5A-5B.
Figure 78:
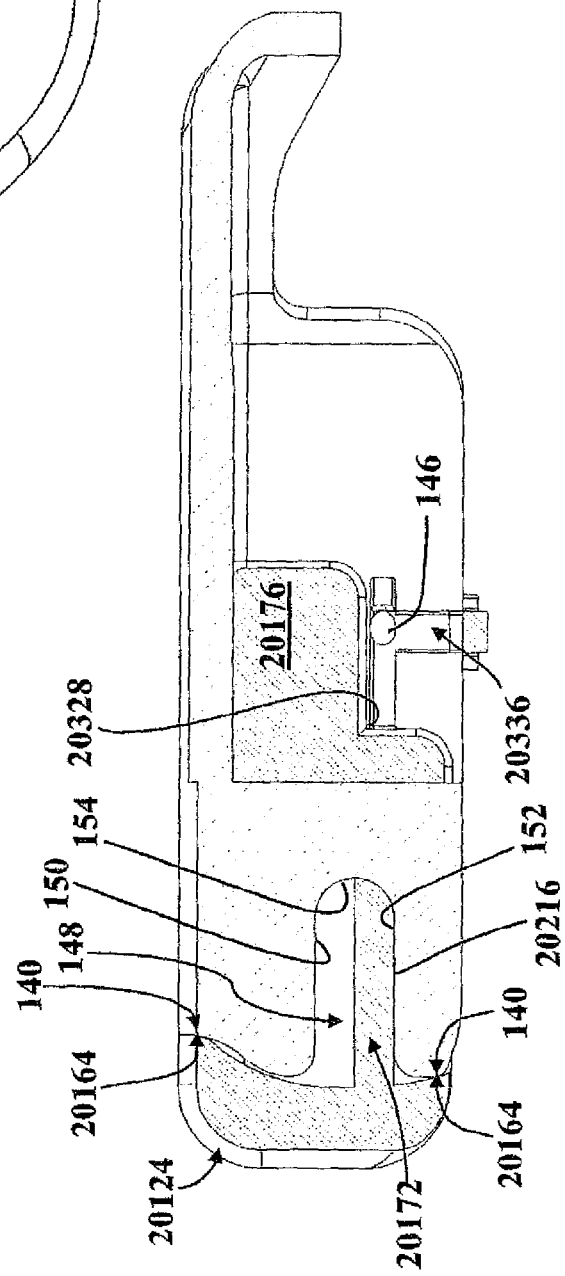
FIG. 78 is a sectional view taken along line 158-158 of FIG. 77.
Figure 79:
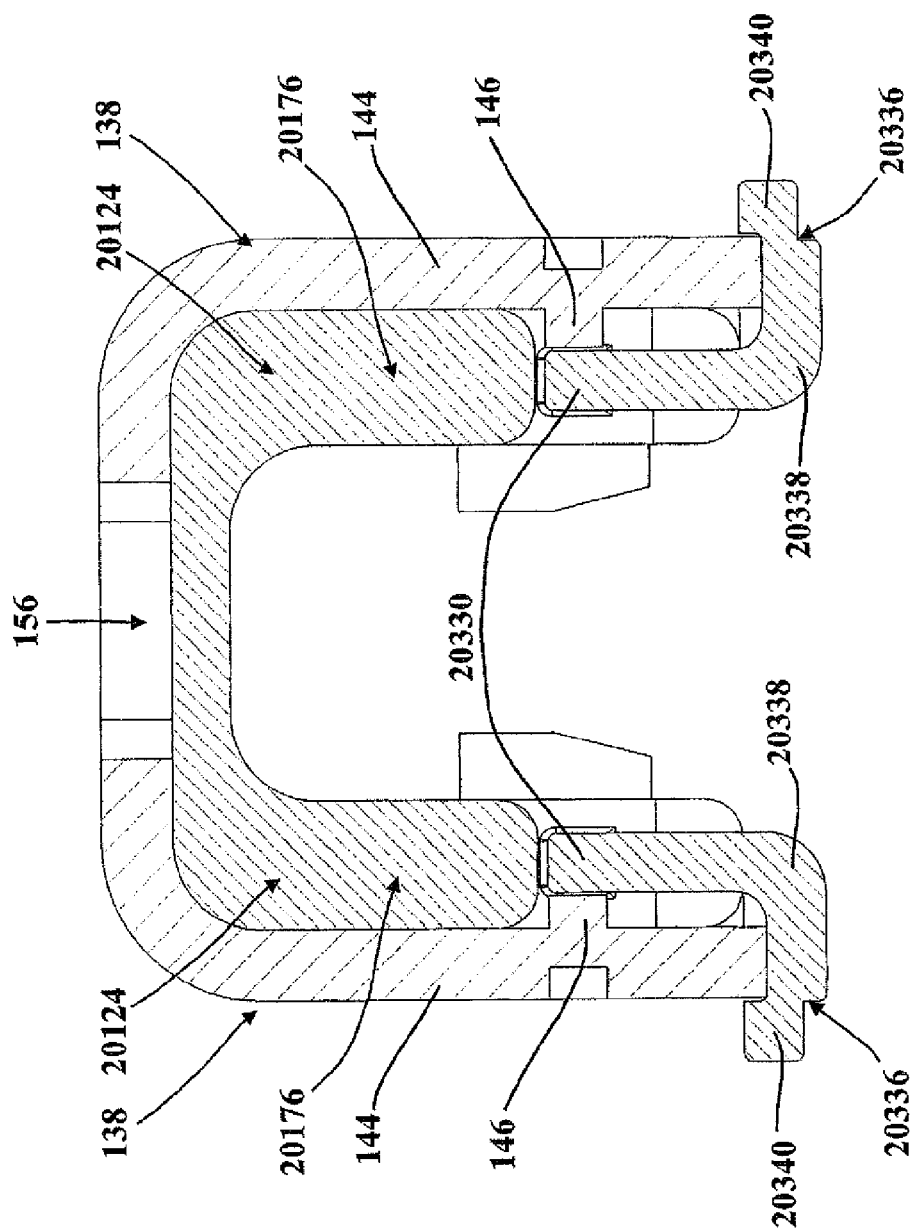
FIG. 79 is a sectional view taken along line 79-79 of FIG. 77.

As shown in FIG. 76, when the twentieth embodiment of the adapter 20124 is secured to the attachment member 138, the side walls 144 of the attachment member 138 may inhibit or otherwise restrict access to the resilient locks 20326 due to the relative position of the protrusions 146 of the attachment member 138. In order to promote access to the resilient locks 20326, such as to help facilitate detaching the adapter 20124 from the attachment member 138, in one embodiment the resilient locks 20326 are provided with actuators, generally indicated at 20336. Here, the actuators 20336 have an actuator body 20338 and an actuator head 20340. The actuator bodies 20338 are formed with a generally L-shaped profile and extend between the respective actuator head 20340 and the respective lock body 20330 of the resilient lock 20326. The actuator heads 20340 also have a generally rectangular profile. As shown best in FIG. 79, the actuator bodies 20338 are arranged so as to extend vertically downwardly from the lock bodies 20330 and also laterally under the side walls 144 of the attachment member 138 to the respective actuator heads 20340. Here, in order to release the adapter 20124 from the attachment member 138, the actuator heads 20340 can be pressed laterally towards each other so as to urge the resilient locks 20326 laterally inwardly until the lock faces 20334 disengage from the protrusions 146 of the attachment member 138, thereby enabling longitudinal movement of the adapter 20134 with respect to the attachment member 138. Here too, it will be appreciated that no portion of the adapter 20124 engages or otherwise abuts the upper cutout edge 150 of the cutout 148 of the attachment member 138.

In this way, the embodiments of the present invention provides for simple, releasable attachment of the wiper assembly 116 to the attachment member 138 of the wiper arm 114 described above. Those having ordinary skill in the art will appreciate that various components and structural features of the embodiments of the adapter cooperate to efficiently secure the attachment member 138 longitudinally, vertically, and laterally with respect to the adapter without necessitating complicated relative positioning of the wiper arm 114 and/or the wiper assembly 116 with respect to the windshield 110 of the vehicle. Specifically, those having ordinary skill in the art will appreciate that the embodiments of the present invention enable installation of the wiper assembly 116 to the attachment member 138 described above in efficient, non-complicated manor. Thus, the present invention affords increased opportunity for connection of the wiper assembly 116 and wiper arm 114 in more advantageous positions and at significantly shallow angles and, thus, significantly improves ease-of-use on a substantial number of vehicle 100 types, makes, and models, in particular where the vehicle 100 utilizes a cowl 102 that covers or otherwise partially hides the wiper arm 114. Further, the embodiments of the adapter afford minimal play between the wiper arm 114 and the secured wiper assembly 116, thereby ensuring improved wipe quality and optimized life of the wiper assembly 116 in use. Moreover, it will be appreciated that the embodiments of the adapter strike a substantial balance between usability and manufacturability while, at the same time, affording significant opportunities for improved wiper assemblies 116 used in wiper systems 32.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A wiper system for wiping a surface of a vehicle, said wiper system comprising:
    an elongated wiper arm;
    an attachment member fixed to said wiper arm and extending therefrom to a terminal end, said attachment member including
        an upper wall,
        a pair of side walls depending from said upper wall,
        a protrusion extending inwardly from each side wall and spaced longitudinally from said terminal end,
        an aperture extending through said upper wall and spaced longitudinally from said terminal end,
        at least one U-shaped cutout formed at said terminal end of said attachment member, said at least one U-shaped cutout defining upper and lower cutout edges; and
    an adapter releasably coupled to said attachment member, said adapter including
        a body extending between opposite first and second ends,
        a stop formed on said body of said adapter adjacent said first end for abutting said terminal end of said attachment member,
        at least one slot formed in said body at said second end for receiving one of said protrusions of said attachment member, and
        a resilient finger operatively extending from said body and having a tooth for engaging said aperture of said attachment member to prevent longitudinal movement between said adapter and said attachment member when said stop abuts said terminal end of said attachment member.

2. The wiper system of claim 1 further comprising at least one brace formed on said body of said adapter at said first end thereof for being received in one of said at least one U-shaped cutouts of said attachment member when said tooth of said resilient finger engages said aperture of said attachment member, wherein said at least one brace at least partially abuts said lower cutout edge of said attachment member.

3. The wiper system of claim 2 wherein said at least one slot has a floor arranged to abut one of said protrusions of said attachment member so as to further limit longitudinal movement of said attachment member towards said first end of said body of said adapter when said floor abuts said protrusion.

4. The wiper system of claim 3 wherein said at least one brace remains spaced from said upper cutout edge of said attachment member when said at least one brace is received in one of said at least one U-shaped cutouts and said at least one brace at least partially abuts said lower cutout edge of said attachment member.

5. The wiper system of claim 4 further comprising a wiper assembly pivotally and releasably coupled to said adapter, said wiper assembly including
    a wiping element adapted to engage the surface to be wiped,
    at least one elongated spline for supporting said wiping element, said at least one elongated spline extending between opposite longitudinal ends,
    an airfoil operatively attached to said at least one elongated spline,
    an end cap operatively coupled to each of said longitudinal ends of said at least one elongated spline, and
    a coupler operatively attached to said at least one elongated spline between said longitudinal ends for pivotally and releasably coupling to said body of said adapter.

* * * * *